US012571521B2

(12) United States Patent
Wang et al.

(10) Patent No.: US 12,571,521 B2
(45) Date of Patent: Mar. 10, 2026

(54) LED LIGHTING DEVICE

(71) Applicant: JIAXING SUPER LIGHTING ELECTRIC APPLIANCE CO., LTD, Jiaxing (CN)

(72) Inventors: Mingbin Wang, Jiaxing (CN); Kuan Lin, Jiaxing (CN); Yichuan Liu, Jiaxing (CN); Guosheng Tan, Jiaxing (CN)

( * ) Notice: Subject to any disclaimer, the term of this patent is extended or adjusted under 35 U.S.C. 154(b) by 0 days.

(21) Appl. No.: 19/008,674

(22) Filed: Jan. 3, 2025

(65) Prior Publication Data

US 2025/0137618 A1 May 1, 2025

Related U.S. Application Data

(63) Continuation-in-part of application No. PCT/CN2024/116863, filed on Sep. 4, 2024, and a (Continued)

(30) Foreign Application Priority Data

May 28, 2021 (CN) ........................ 202121172638.5
Sep. 10, 2021 (CN) ........................ 202111061744.0
(Continued)

(51) Int. Cl.
*F21V 13/04* (2006.01)
*F21V 5/00* (2018.01)
(Continued)

(52) U.S. Cl.
CPC .............. *F21V 13/04* (2013.01); *F21V 5/007* (2013.01); *F21V 7/0083* (2013.01);
(Continued)

(58) Field of Classification Search
CPC ........ F21V 5/007; F21V 7/0083; F21V 13/08; F21V 13/10; F21V 13/14
See application file for complete search history.

(56) References Cited

U.S. PATENT DOCUMENTS

2001/0001241 A1 5/2001 Kawakami et al.
2003/0165061 A1 9/2003 Martineau
(Continued)

FOREIGN PATENT DOCUMENTS

CN 102287646 A 12/2011
CN 204592956 U 8/2015
(Continued)

*Primary Examiner* — William N Harris
(74) *Attorney, Agent, or Firm* — Simon Kuang Lu

(57) ABSTRACT

A LED lighting device comprises a seat including a baseplate and a sidewall surrounding the baseplate and forming a receiving space with the baseplate; an optical assembly disposed in the receiving space, wherein the optical assembly includes a light source component and an optical member; the optical member including a plurality of optical units, each of the optical units including a first optical member and a second optical member surrounding a periphery of the first optical member; the optical member covers the light source component; and an install border including a plurality of support elements, and the install border and an outer side of the sidewall forming a redundant space, wherein the optical member is clamped by the seat and the install border, and a power source is disposed in the redundant space.

20 Claims, 88 Drawing Sheets

Related U.S. Application Data continuation-in-part of application No. 18/689,451, filed as application No. PCT/CN2022/115343 on Aug. 29, 2022, now Pat. No. 12,253,257, and a continuation-in-part of application No. 17/775,307, filed as application No. PCT/CN2021/143481 on Dec. 31, 2021, now Pat. No. 12,188,653.

(30) Foreign Application Priority Data

| | | |
|---|---|---|
| Nov. 11, 2021 | (CN) | 202111331195.4 |
| Nov. 11, 2021 | (CN) | 202111332265.8 |
| Nov. 26, 2021 | (CN) | 202111418895.7 |
| Dec. 2, 2021 | (CN) | 202111461923.3 |
| Dec. 13, 2021 | (CN) | 202111517441.5 |
| Mar. 18, 2022 | (CN) | 202210267139.7 |
| Mar. 18, 2022 | (CN) | 202210267368.9 |
| Mar. 25, 2022 | (CN) | 202210299020.8 |
| May 10, 2022 | (CN) | 202210501344.5 |
| May 13, 2022 | (CN) | 202210519001.1 |
| Jul. 13, 2022 | (CN) | 202210818629.1 |
| Aug. 2, 2022 | (CN) | 202210919254.8 |
| Sep. 21, 2023 | (CN) | 202311228547.2 |
| Sep. 26, 2023 | (CN) | 202311254158.7 |
| Sep. 28, 2023 | (CN) | 202311268258.5 |
| Dec. 13, 2023 | (CN) | 202311713384.7 |
| Dec. 19, 2023 | (CN) | 202311752933.1 |
| Feb. 2, 2024 | (CN) | 202410150477.1 |
| Apr. 10, 2024 | (CN) | 202410430333.1 |
| Aug. 30, 2024 | (CN) | 202411211928.4 |

(51) Int. Cl.

| | |
|---|---|
| ***F21V 7/00*** | (2006.01) |
| ***F21V 23/02*** | (2006.01) |
| ***F21Y 105/16*** | (2016.01) |
| ***F21Y 115/10*** | (2016.01) |

(52) U.S. Cl.

CPC ......... *F21V 23/023* (2013.01); *F21Y 2105/16* (2016.08); *F21Y 2115/10* (2016.08)

(56) References Cited

U.S. PATENT DOCUMENTS

| | | | | |
|---|---|---|---|---|
| 2009/0310381 | A1 | 12/2009 | Chang et al. | |
| 2010/0207131 | A1 | 8/2010 | Chiang et al. | |
| 2011/0292658 | A1 | 12/2011 | Ho | |
| 2012/0206911 | A1 | 8/2012 | Pickard et al. | |
| 2013/0201693 | A1 | 8/2013 | Tang | |
| 2013/0265751 | A1 | 10/2013 | Edmond et al. | |
| 2014/0063802 | A1* | 3/2014 | Garcia | F21V 5/08 362/241 |
| 2014/0168992 | A1 | 6/2014 | Xue et al. | |
| 2015/0138766 | A1 | 5/2015 | Kuo | |
| 2015/0138769 | A1* | 5/2015 | Chen | F21K 9/00 362/240 |
| 2016/0003454 | A1 | 1/2016 | Ye | |
| 2018/0299096 | A1 | 10/2018 | Zhou | |
| 2019/0004238 | A1 | 1/2019 | Peng et al. | |
| 2019/0063723 | A1 | 2/2019 | Yamada | |
| 2022/0034481 | A1 | 2/2022 | Caprara et al. | |
| 2022/0299197 | A1 | 9/2022 | Henrici et al. | |
| 2022/0381421 | A1 | 12/2022 | Wang et al. | |
| 2023/0117836 | A1* | 4/2023 | Caprara | F21V 7/0083 362/236 |

FOREIGN PATENT DOCUMENTS

| | | | | | |
|---|---|---|---|---|---|
| CN | 205191348 | U | | 4/2016 | |
| CN | 205208278 | U | | 5/2016 | |
| CN | 206459105 | U | | 9/2017 | |
| CN | 208566388 | U | | 3/2019 | |
| CN | 208997833 | U | | 6/2019 | |
| CN | 209638797 | U | | 11/2019 | |
| CN | 211040856 | U | | 7/2020 | |
| CN | 112781012 | A | | 5/2021 | |
| CN | 215372333 | U | | 12/2021 | |
| CN | 215411610 | U | | 1/2022 | |
| CN | 216017257 | U | | 3/2022 | |
| CN | 217131150 | U | | 8/2022 | |
| CN | 217441545 | U | | 9/2022 | |
| CN | 115789573 | A | | 3/2023 | |
| JP | 2016058284 | A | | 4/2016 | |
| KR | 101001953 | B1 | | 12/2010 | |
| NL | 2021671 | B1 | * | 5/2020 | F21V 7/22 |
| NL | 2025168 | B1 | * | 10/2021 | G02B 19/0028 |

* cited by examiner

LED LIGHTING DEVICE

CROSS-REFERENCE TO RELATED APPLICATIONS

This application is also a continuation-in-part of prior U.S. application Ser. No. 18/689,451 filed on 2024 Mar. 6; which is a continuation-in-part of prior U.S. application Ser. No. 17/775,307 filed on 2022 May 8, and a continuation-in-part of International application number PCT/CN2022/115343 filed on 2022 Aug. 29.

The application Ser. No. 18/689,451 claims priority to the following Chinese Patent Applications Nos.: CN202121172638.5 filed on 2021 May 28; CN202111061744.0 filed on 2021 Sep. 10; CN202111331195.4 filed on 2021 Nov. 11; CN202111332265.8 filed on 2021 Nov. 11; CN202111418895.7 filed on 2021 Nov. 26; CN202111461923.3 filed on 2021 Dec. 2; CN202111517441.5 filed on 2021 Dec. 13; CN202210267368.9 filed on 2022 Mar. 18; CN202210267139.7 filed on 2022 Mar. 18; CN202210299020.8 filed on 2022 Mar. 25; CN202210501344.5 filed on 2022 May 10; CN202210519001.1 filed on 2022 May 13; CN202210818629.1 filed on 2022 Jul. 13; CN202210919254.8 filed on 2022 Aug. 2, the disclosures of which are incorporated herein in their entirety by reference.

FIELD OF THE INVENTION

The invention relates to lighting apparatuses, particularly to LED lighting devices.

BACKGROUND OF THE INVENTION

Light-emitting diode (LED) lighting has been widely adopted because of the advantages of energy-saving and long life. In currently available LED lighting, flat lamps and grille lamps are common.

A prior-art planar lamp usually includes a light strip, a base frame, a light guide plate and a diffuser plate. The light strip is disposed beside the base frame to provide lateral light emitting. Light emitted by the light strip is ejected from the diffuser plate via the light guide plate. Such a planar lamp has following drawbacks. Light emitted by the light strip will generate a greater light loss after passing through the light guide plate and the diffuser plate to result in low efficiency of light emitting. The guide plate is high in cost, this is disadvantageous to cost control. Glare control of the planar lamp is less good.

A prior-art grille lamp includes a base frame, a light source (may adopt a light strip, fluorescent tube or LED tube) and a grille. The light source is fixed on the base frame. The grille is disposed on the light emitting side of the light source. Such a grille lamp has following drawbacks. The arrangement of the grille is disadvantageous to the height control of the grille lamp to cause cost increase of package and transportation. The high cost of the grille is disadvantageous to the cost control of the whole lamp. The grille generates greater light loss and a dark area is easy to occur in the grille to be disadvantageous to light emitting.

In view of this, the inventors have devoted themselves to the above-mentioned prior art, researched intensively and cooperated with the application of science to try to solve the above-mentioned problems, improve light efficiency and reduce costs. Finally, the invention which is reasonable and effective to overcome the above drawbacks is provided.

SUMMARY OF THE INVENTION

A number of embodiments relating to the invention are briefly described in this summary. However, the terms herein are used to describe only certain embodiments disclosed in this specification (whether or not already claimed) and not to be a complete description of all possible embodiments. Certain embodiments of the various features or aspects of the invention described above may be combined in various ways to form an LED lighting device or a portion thereof.

An embodiment of the invention provides an LED (light-emitting diode) lighting device, which includes:

a seat, wherein the seat comprises a baseplate and a sidewall, the sidewall surrounds the baseplate and forms a receiving space with the baseplate, and the baseplate comprises an integrally formed bottom groove;

an optical assembly, wherein at least part of the optical assembly is disposed in the receiving space; the optical assembly comprises a light source component and an optical member; the light source component comprises circuit boards, LED arrays and an electric connecting unit, the circuit boards are disposed on the baseplate of the seat, the LED arrays are disposed on the circuit boards, the circuit boards are electrically connected to each other by means of the electric connecting unit, and at least part of each of the circuit boards is received in the bottom groove; and the optical member comprises a plurality of optical units, each of the optical units comprises a first optical member and a second optical member surrounding a periphery of the first optical member, and the optical member covers the LED arrays and is located in a light-emitting direction of the LED arrays;

an install border, wherein the install border comprises a plurality of support elements, the optical member is clamped by the seat and the install border, and the install border and the sidewall form a redundant space on an outer side of the receiving space; and a power source, wherein the power source is disposed in the redundant space, and the install border covers the power source.

In one embodiment according to the present invention, further comprising a bracket, wherein the bracket is disposed on the seat, and the bracket comprises a plurality of hanging hooks.

In one embodiment according to the present invention, the first optical members cover the LED arrays, and at least a part of light generated by the LED arrays is emitted from the first optical members.

In one embodiment according to the present invention, each of the second optical members comprises a plurality of sets of optical walls surrounding the first optical member, and the optical walls at least reflect a part of the light emitted from the first optical member.

In one embodiment according to the present invention, wherein the sidewall comprises an install end wall far away from the baseplate and parallel to the baseplate, and the sidewall extends to form the install end wall.

In one embodiment according to the present invention, the install end wall comprises a bearing portion and a limiting portion, the bearing portion and the limiting portion are integrally formed, and the limiting portion is an arc-shaped protrusion.

In one embodiment according to the present invention, each of the support elements comprises a first wall, and the first wall and the limiting portion clamp the optical assembly.

In one embodiment according to the present invention, each of the first walls is provided with a first step structure and a second step structure, the first step structure abuts against the bearing portion, and the second step structure surrounds an outer side of the bearing portion.

In one embodiment according to the present invention, each of the LED arrays comprises a plurality of LED chips, each of the circuit boards comprises a convex portion and a concave portion, and the LED chips are disposed at the convex portions.

Some embodiments according to the present invention provide an LED lighting device, comprising:

a seat, wherein the seat comprises a baseplate and a sidewall, the sidewall surrounds the baseplate and forms a receiving space with the baseplate, and the baseplate comprises an integrally formed bottom groove; and the optical assembly comprises a light source component, an optical member and an optical bearing portion; the light source component comprises circuit boards, LED arrays and an electric connecting unit, the circuit boards are disposed on the baseplate of the seat, the LED arrays are disposed on the circuit boards, the circuit boards are electrically connected to each other by means of the electric connecting unit, and at least part of each of the circuit boards is received in the bottom groove; the optical bearing portion is disposed on the baseplate of the seat; the optical member is disposed on the optical bearing portion; and the optical bearing portion comprises a plurality of window structures corresponding to the LED arrays, and light emitted by the LED arrays passes through the window structures to reach the optical member.

In one embodiment according to the present invention, the optical bearing portion comprises a first polygonal frustum structure and a second polygonal frustum structure which are spaced apart from each other, the first polygonal frustum structure comprises a polygonal frustum surface provided with windows, the second polygonal frustum surface covers and presses the circuit boards, and the windows expose the LED arrays.

In one embodiment according to the present invention, the optical member comprises a plurality of optical units arranged in arrays, and each of the optical units comprises a first optical member and a second optical member surrounding the first optical member.

In one embodiment according to the present invention, wherein each of the LED arrays comprises a plurality of LED chips, each of the circuit boards comprises a convex portion and a concave portion, and the LED chips are disposed at the convex portions.

Some embodiments according to the present invention provide an LED lighting device, comprising:

a seat, wherein the seat comprises a baseplate and a sidewall, the sidewall surrounds the baseplate and forms a receiving space with the baseplate, and the baseplate comprises an integrally formed bottom groove; and an optical assembly, wherein at least part of the optical assembly is disposed in the receiving space; the optical assembly comprises a light source component and an optical member; the light source component comprises circuit boards, LED arrays and an electric connecting unit, the circuit boards are disposed on the baseplate of the seat, the LED arrays are disposed on the circuit boards, the circuit boards are electrically connected to each other by means of the electric connecting unit, and at least part of each of the circuit boards is received in the bottom groove;

the optical member comprises a plurality of optical units, and each of the optical units comprises a first optical member and a second optical member surrounding a periphery of the first optical member;

the optical member covers the LED arrays and is located in a light-emitting direction of the LED arrays;

the optical member further comprises a directed diffusing film, a light guide plate and light reflecting paper, one end of the optical member close to the light source component is provided with a first snap-fitting portion, and the directed diffusing film, the light guide plate and the light reflecting paper are connected to the optical member by means of the first snap-fitting portion; and the light source component is disposed on two sides of the light guide plate.

In one embodiment according to the present invention, further comprising an install border and a power source, wherein the install border comprises a plurality of support elements, and the optical member is clamped by the seat and the install border;

the install border and the sidewall form a redundant space on an outer side of the receiving space; and the power source is disposed in the redundant space, and the install border covers the power source.

In one embodiment according to the present invention, each of the second optical members comprises a plurality of optical walls, each of the optical walls comprises a light-emitting hole, and the light-emitting hole exposes the LED array.

In one embodiment according to the present invention, one end of the optical member close to the light source component is provided with a support portion, and the support portion is in contact with the baseplate and enables the optical member to be spaced apart from the baseplate.

In one embodiment according to the present invention, further comprising a bracket, wherein the bracket is fixed to the seat, and the bracket comprises a plurality of hanging hooks.

In one embodiment according to the present invention, the sidewall comprises an install end wall far away from the baseplate and parallel to the baseplate, and the sidewall extends to form the install end wall.

In one embodiment according to the present invention, the install end wall comprises a bearing portion and a limiting portion, the bearing portion and the limiting portion are integrally formed, and the limiting portion is an arc-shaped protrusion.

The outstanding and beneficial technical effect of the present invention compared to the prior art is that the optical components are directly fixed through the base and installation unit, which improves product reliability and simplifies the installation process.

BRIEF DESCRIPTION OF THE DRAWINGS

FIG. 124 is a schematic view of one kind of distribution of directed diffusing films in another embodiment of the present invention;

FIG. 125 is another light pattern of the LED lighting device when lighting in another embodiment of the present invention;

FIG. 126 is a schematic view of the LED lighting device in an embodiment of the present invention;

FIG. 127 is a front exploded schematic view of the LED lighting device in an embodiment of the present invention;

FIG. 128 is a back schematic view of the LED lighting device in an embodiment of the present invention;

FIG. 129 is a sectional schematic view along A-A in FIG. 128;

FIG. 130 is a partially enlarged view of part A' in FIG. 129;

FIG. 131 is a partially enlarged view of part B' in FIG. 129;

FIG. 132 is a sectional schematic view along B-B in FIG. 128;

FIG. 133 is a partially enlarged view of part C' in FIG. 132;

FIG. 134 is a schematic view of the light processing unit in an embodiment of the present invention;

FIG. 135 is a partially enlarged view of part D' in FIG. 134;

Figure 136:
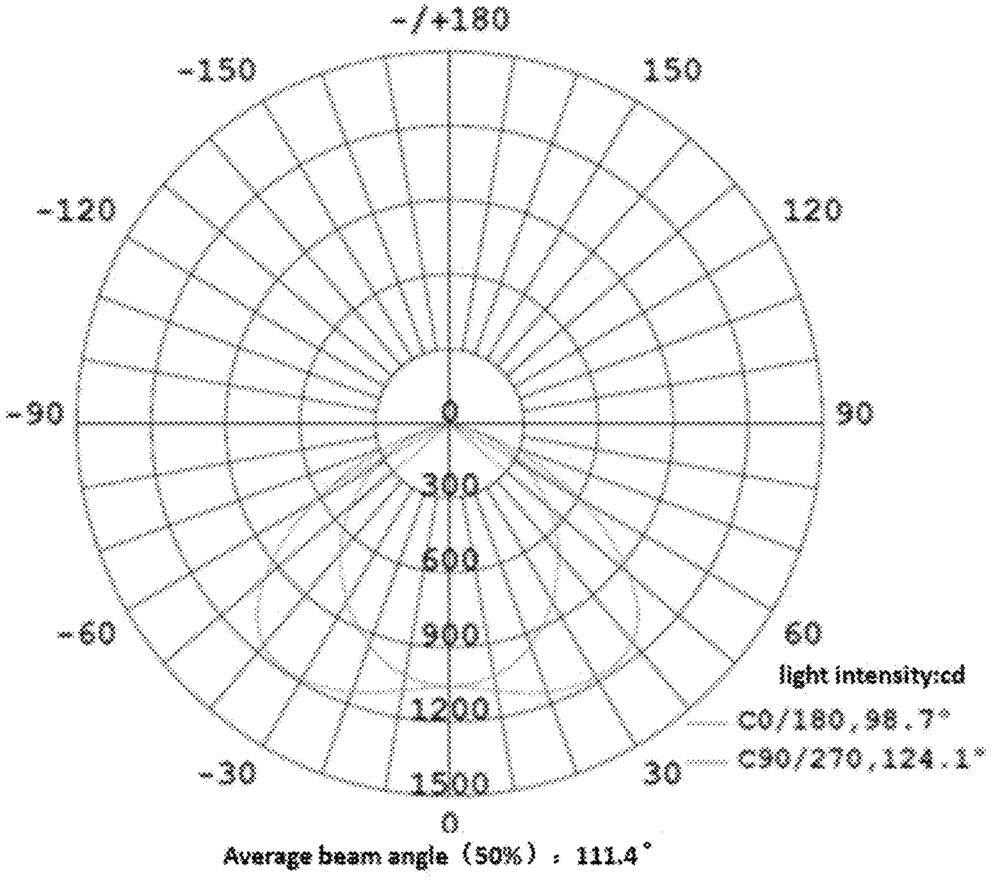
Figure 137:
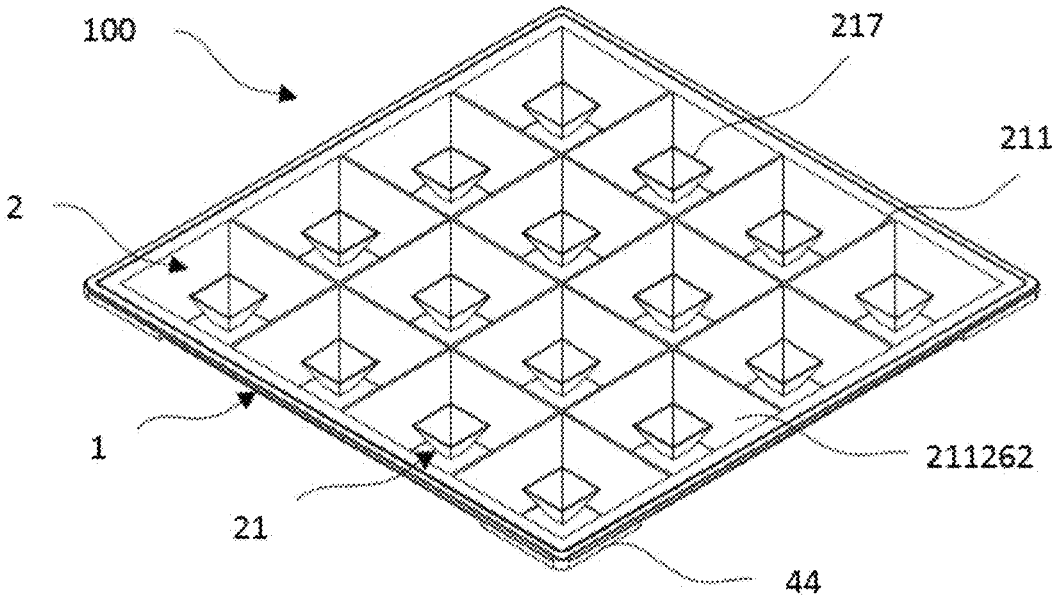
Figure 138:
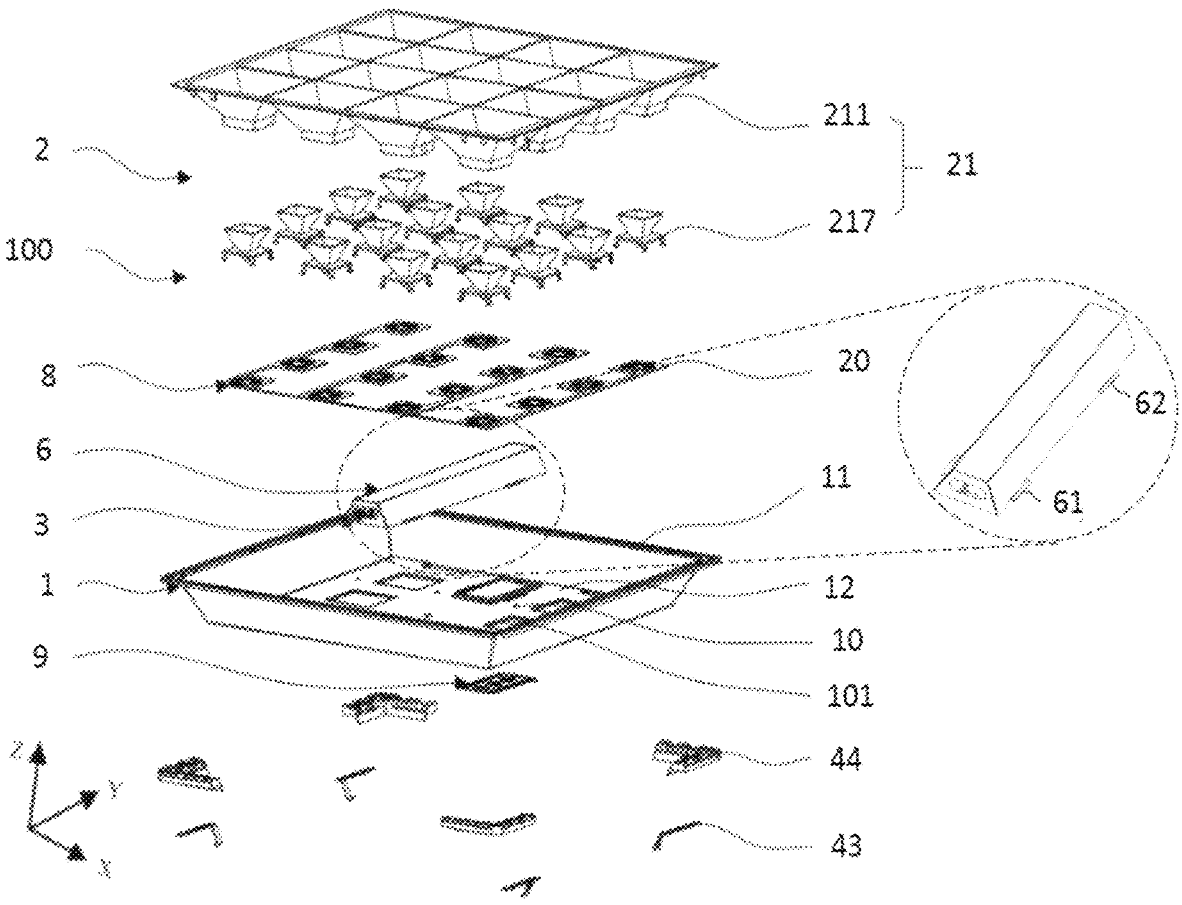
Figure 139:
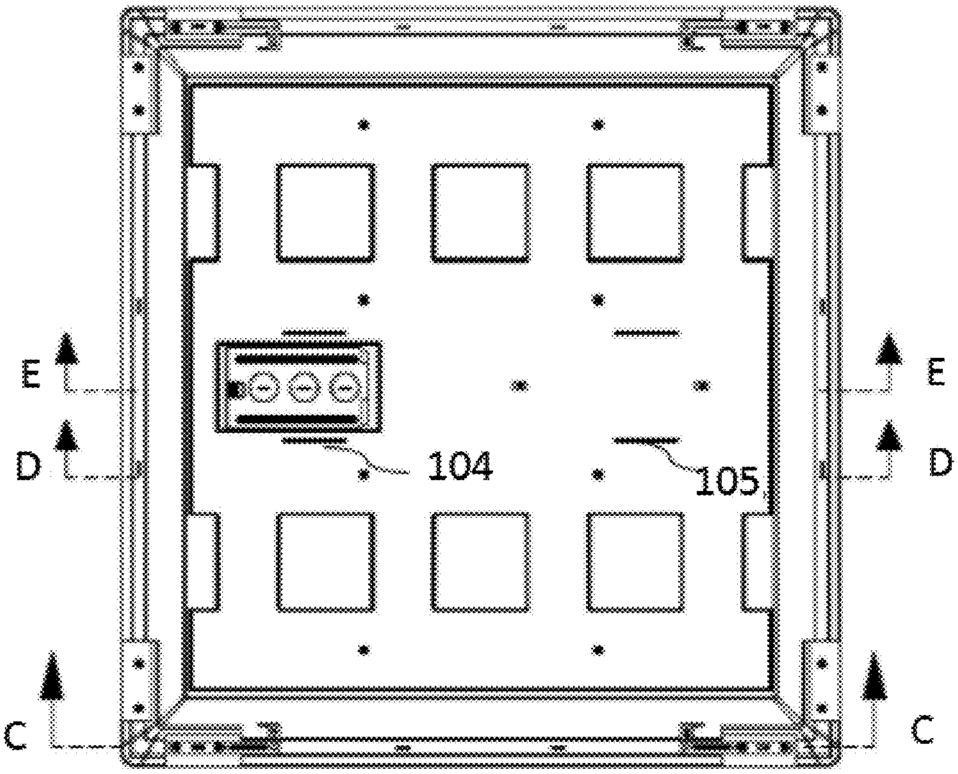
Figure 140:
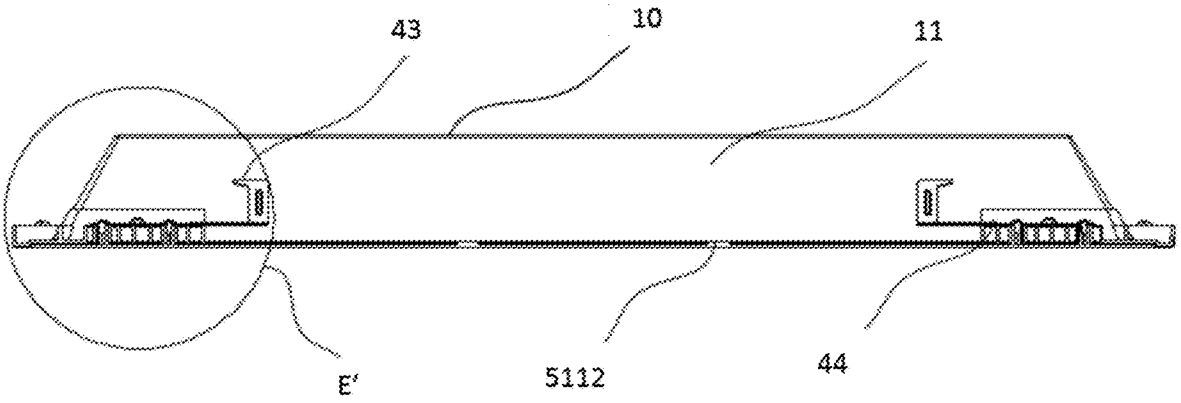
Figure 141:
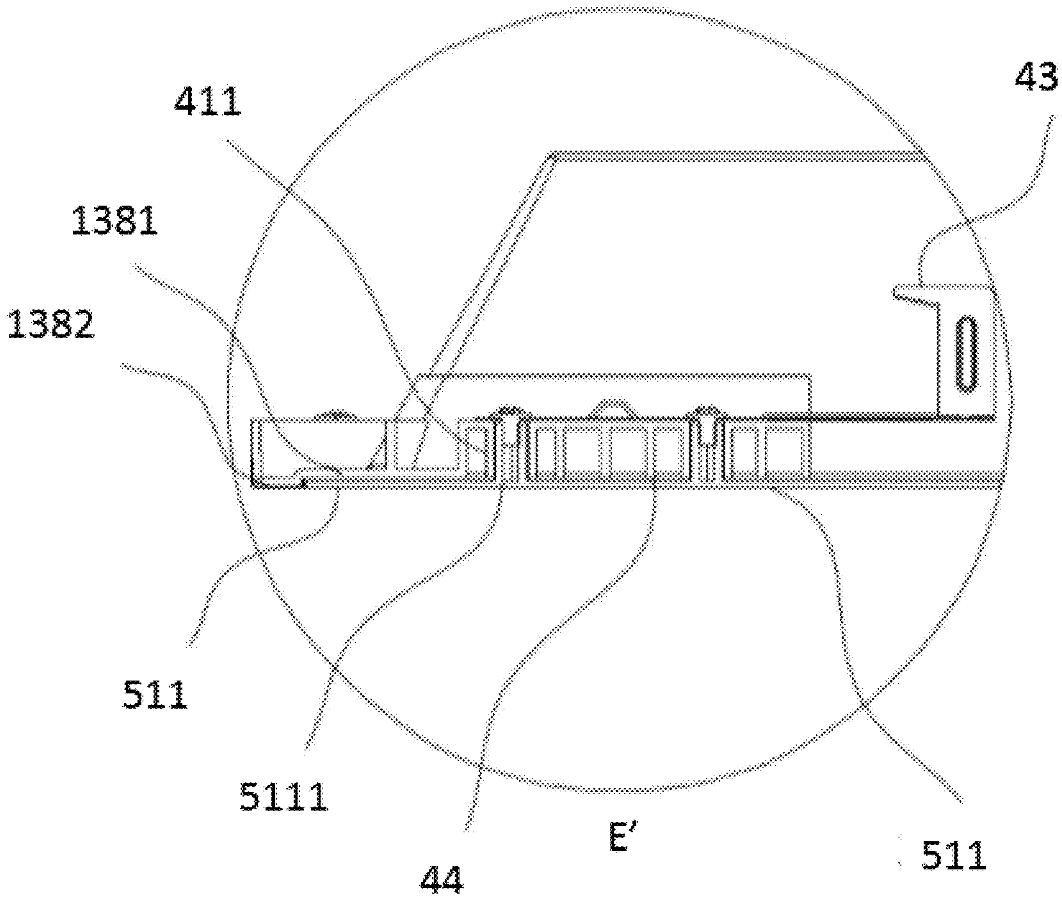
Figure 142:
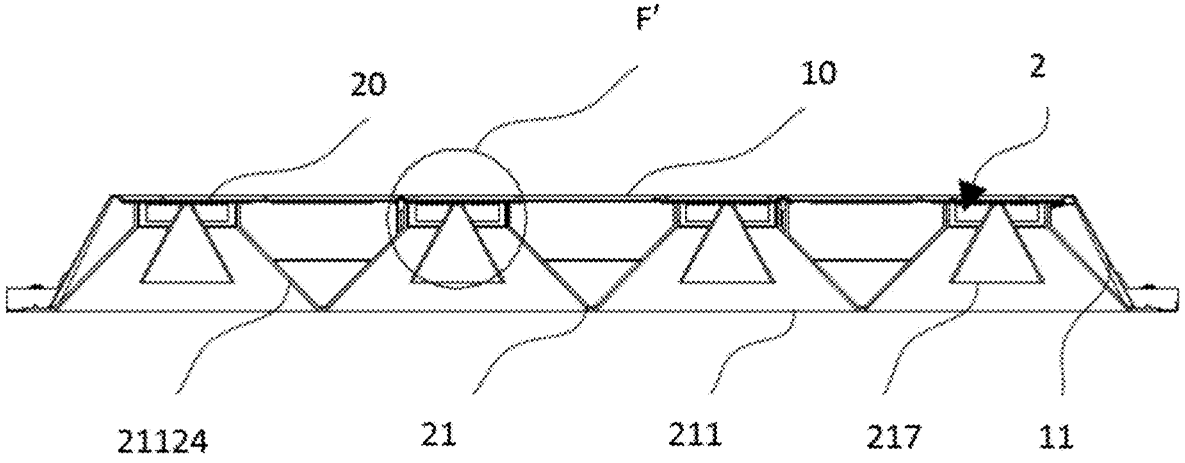
Figure 143A:
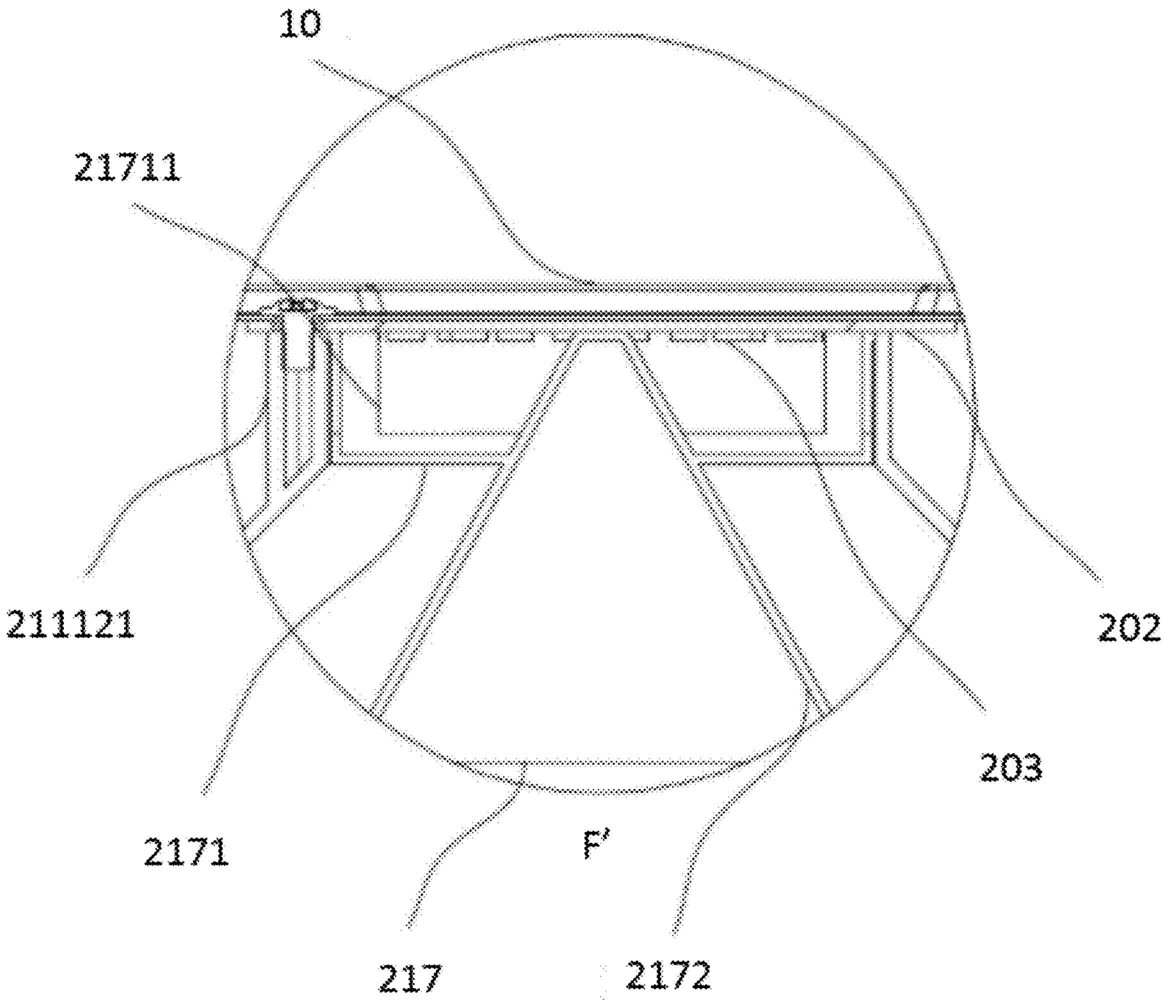
Figure 143B:
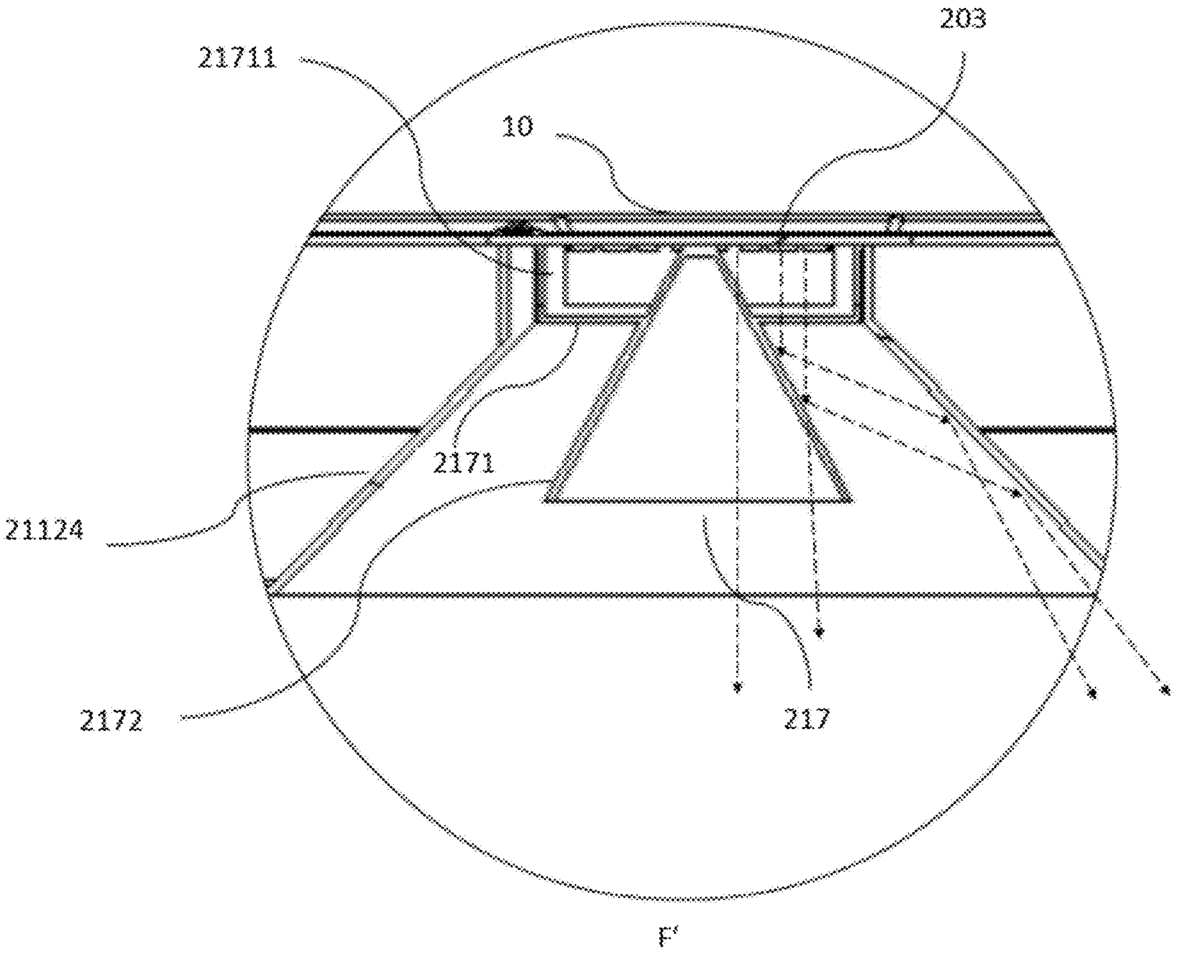
Figure 144:
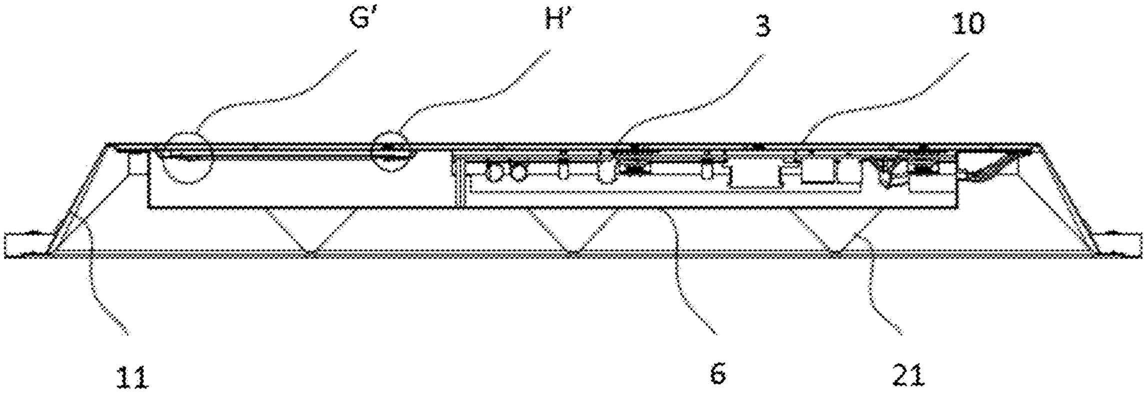
Figure 145:
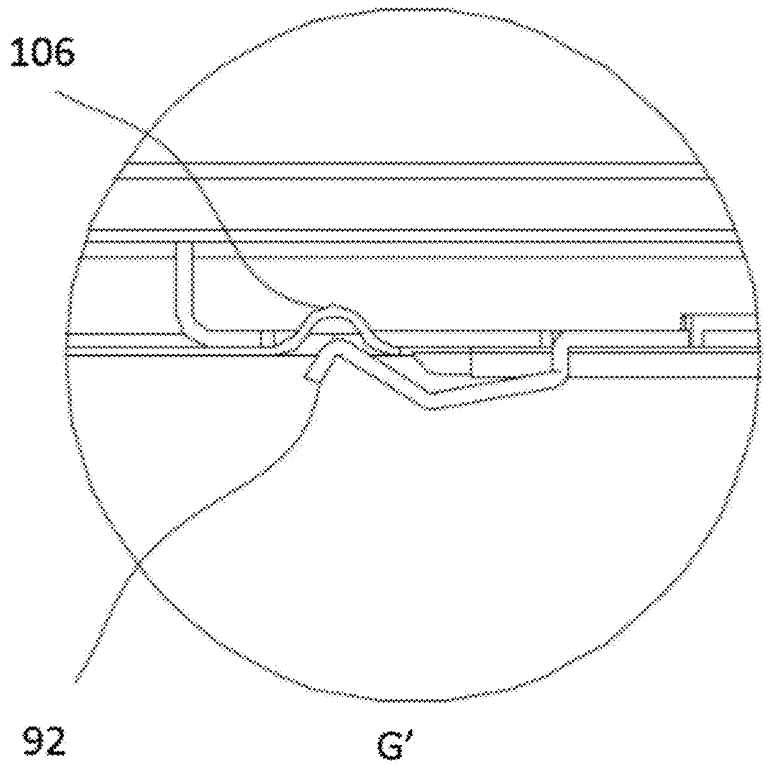
Figure 146:
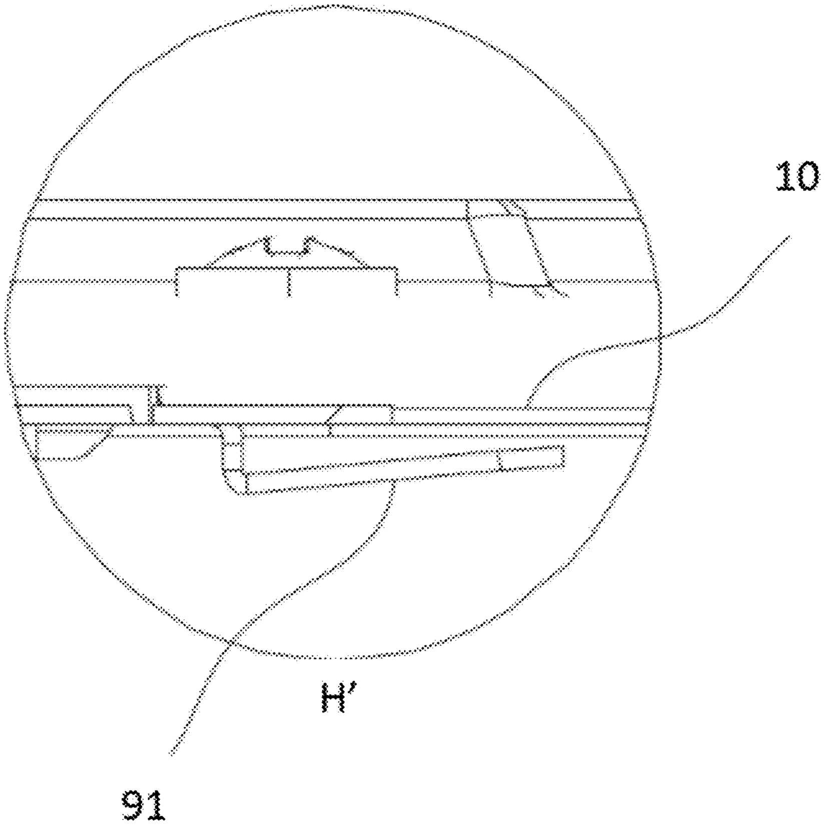
Figure 147:
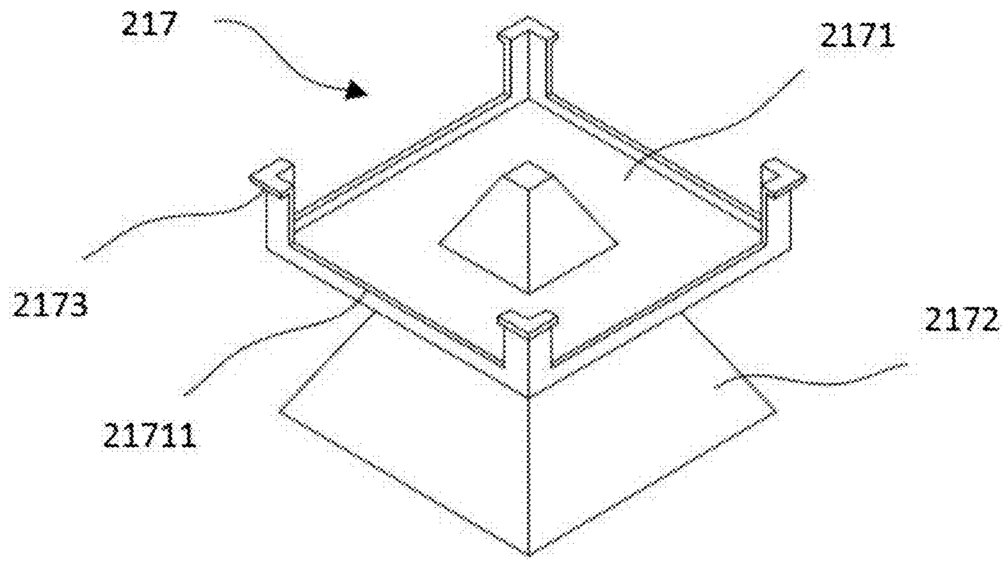
Figure 148:
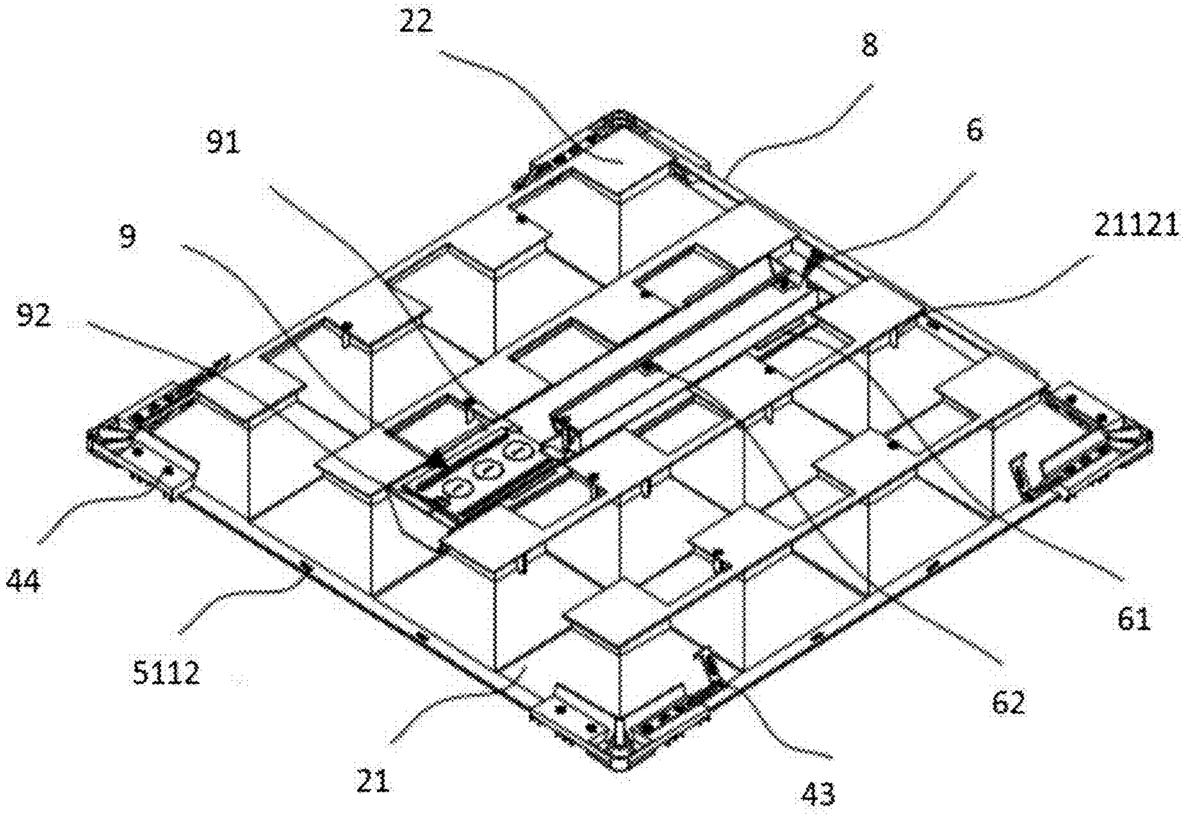
Figure 149A:
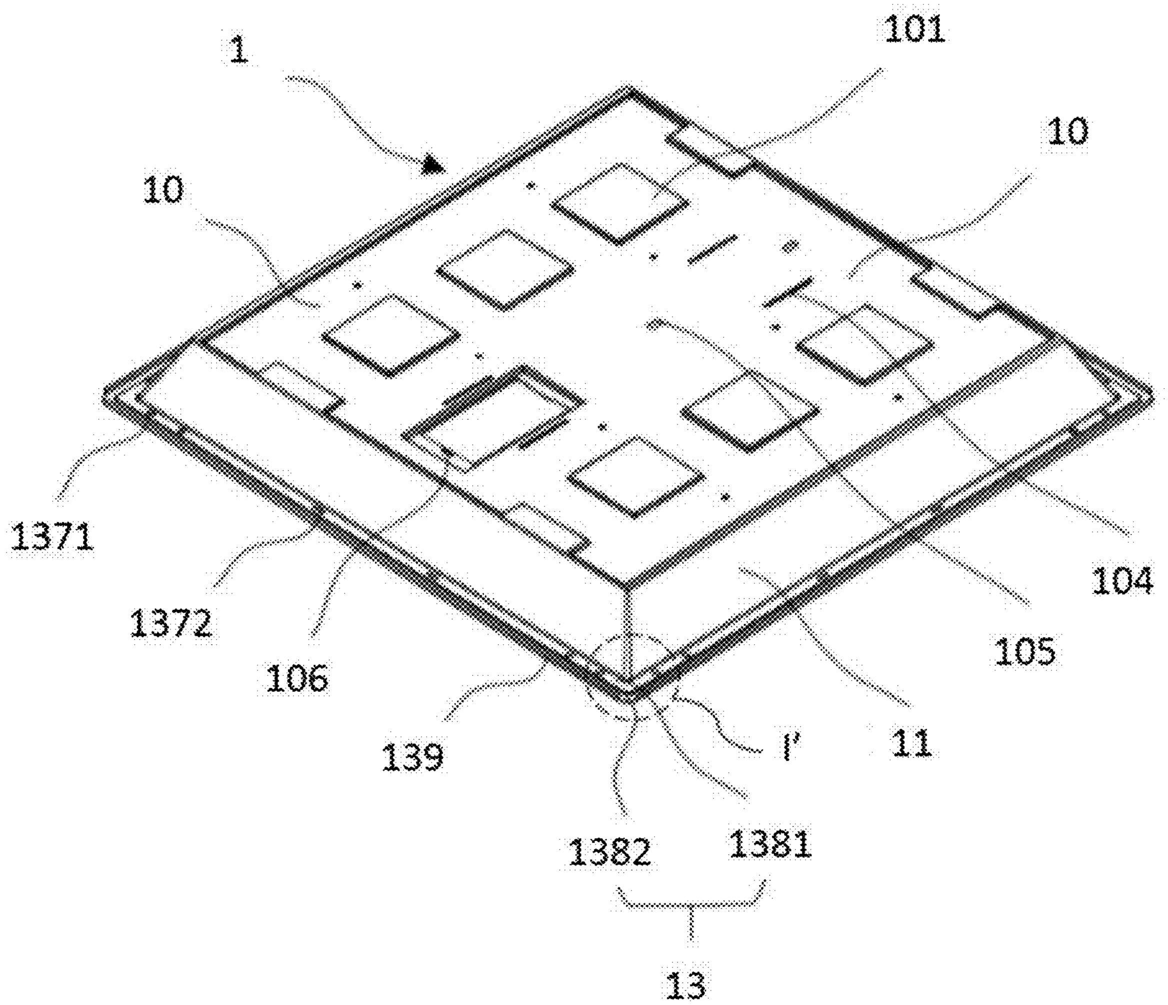
Figure 149B:
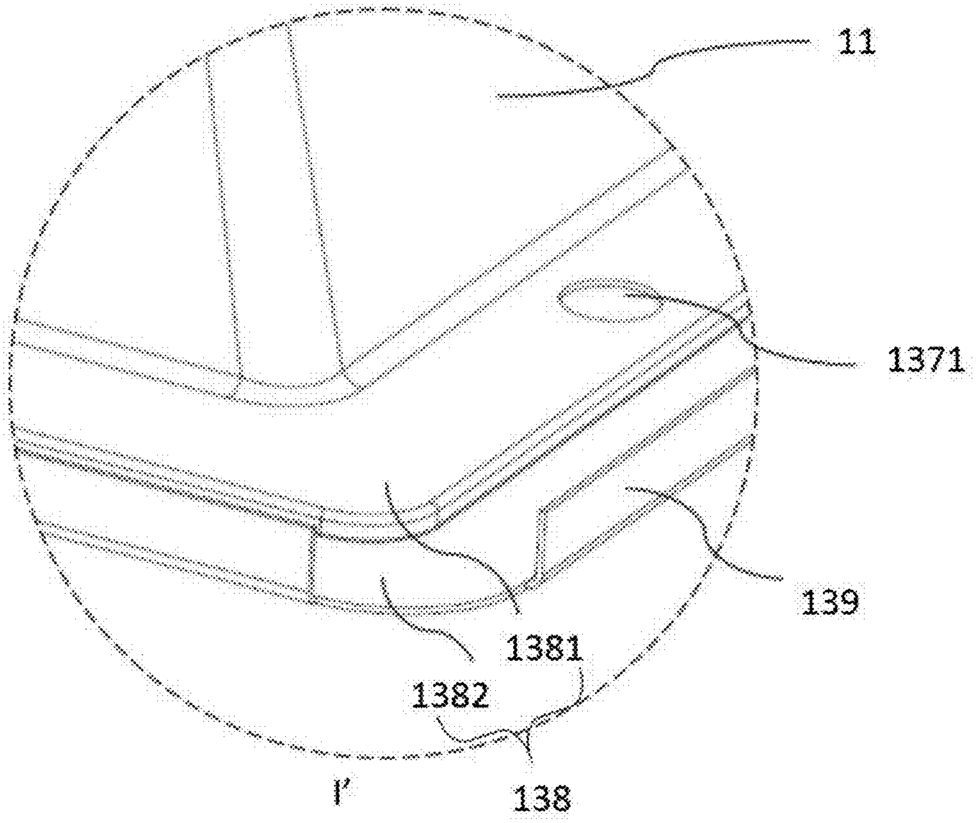
Figure 150:
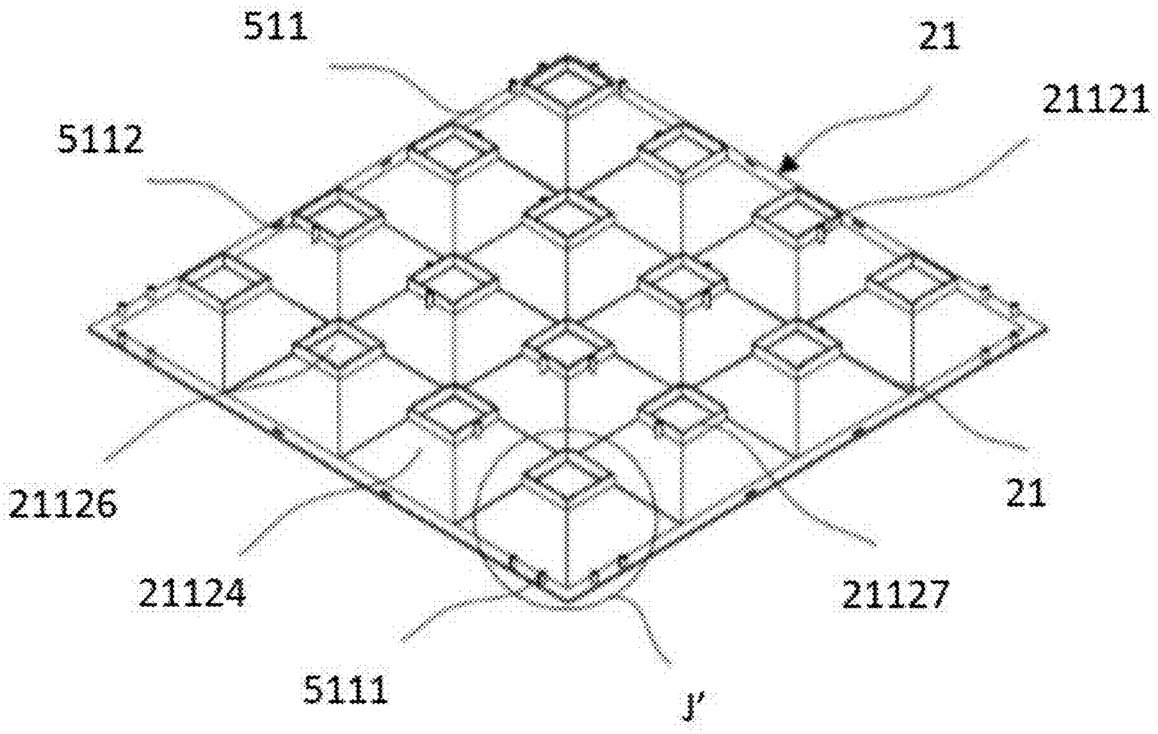
Figure 151:
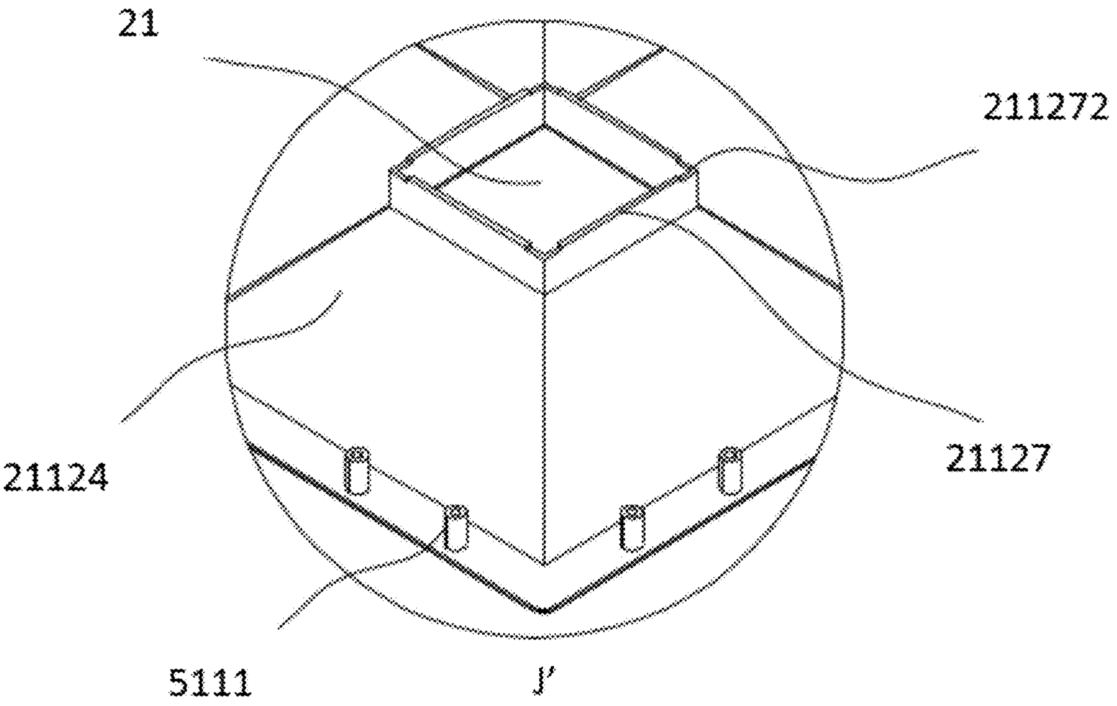

FIG. 136 is a light pattern of the LED lighting device when lighting in an embodiment of the present invention;

FIG. 137 is a schematic view of the LED lighting device in one embodiment of the present invention;

FIG. 138 is a front exploded schematic view of the LED lighting device in one embodiment of the present invention;

FIG. 139 is a back schematic view of the LED lighting device in one embodiment of the present invention;

FIG. 140 is a sectional schematic view along line C-C in FIG. 139;

FIG. 141 is a partially enlarged view of part E' in FIG. 140;

FIG. 142 is a sectional schematic view along line D-D in FIG. 139;

FIG. 143A is a partially enlarged view of part F' in FIG. 142;

FIG. 143B is a schematic view of a light path in FIG. 143A;

FIG. 144 is a sectional schematic view along line E-E in FIG. 139;

FIG. 145 is a partially enlarged view of part G' in FIG. 144;

FIG. 146 is a partially enlarged view of part H' in FIG. 144;

FIG. 147 is a schematic view of the diffusing member in one embodiment of the present invention;

FIG. 148 is a back schematic view of the LED lighting device without the chassis in one embodiment of the present invention;

FIG. 149A is a schematic view of the chassis in one embodiment of the present invention;

FIG. 149B is a partially enlarged view of part I' in FIG. 149A of the present invention;

FIG. 150 is a schematic view of the light processing unit in an embodiment of the present invention;

FIG. 151 is a partially enlarged view of part J' in FIG. 150; and

Figure 152:
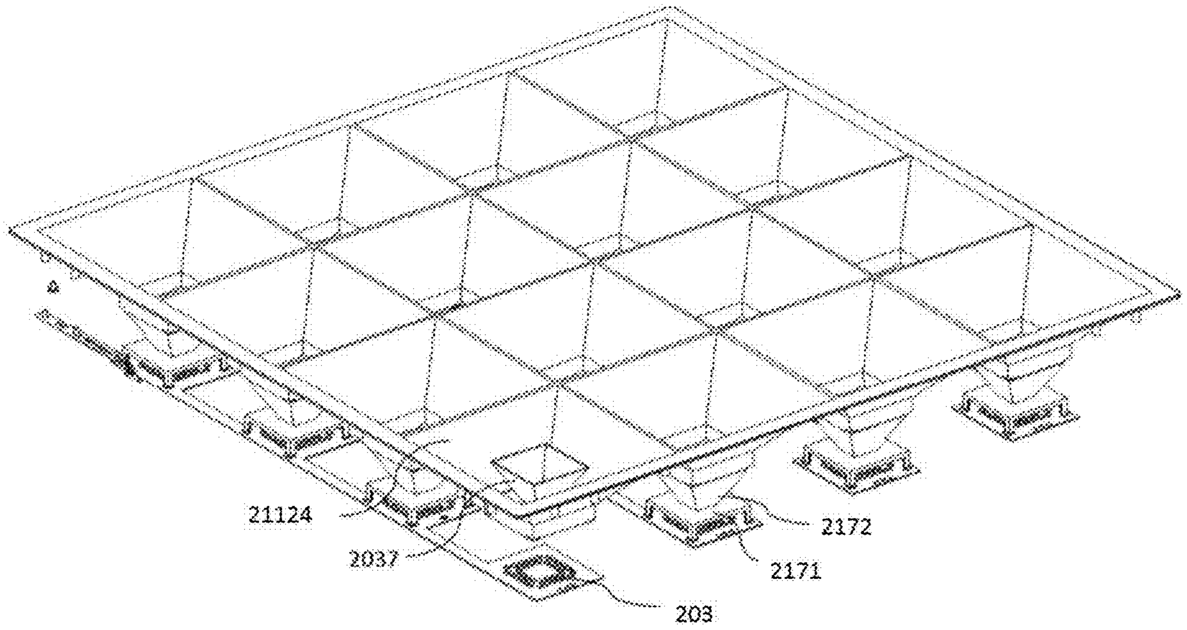

FIG. 152 is a partially exploded view of the LED lighting device in an embodiment of the present invention.

DETAILED DESCRIPTION OF PREFERRED EMBODIMENTS

The following detailed description in association with the drawings is intended to provide further details to the invention. The drawings depict embodiments of the invention. However, the following descriptions of various embodiments of this invention are presented herein for purpose of illustration and giving examples only. It is not intended to be exhaustive or to be limited to the precise form disclosed. These exemplary embodiments are just examples and many implementations and variations are possible without the details provided herein. Contrarily, these embodiments make the invention thorough and complete and entirely convey the scope of the invention to persons having ordinary skill in the art. The same reference characters in the drawings indicate the same element.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes one or more any and all combinations of the associated listed items.

It will be understood that when an element such as a layer, region or substrate is referred to as being "on" or extending "over" another element, the element can be directly on another element or directly extended over another element, or an intervening element may also be present. In contrast, when an element is referred to as being "directly on" or "extending directly on" another element, there are no intervening elements present. It will also be understood that when an element is referred to as being "connected" or "coupled" to another element, it can be directly connected or coupled to another element or an intervening element may be present. In contrast, when an element is referred to as being "directly connected" or "directly coupled" to another element, there are no intervening elements present.

Some terms mentioned in the following description, such as "lower", "upper", "above", "under", "perpendicular" or "horizontal" are used for clear structural relationship of an element, layer or region and another element, layer or region. It will be understood that these terms are intended to assist in understanding preferred embodiments of the invention with reference to the accompanying drawing Figures and with respect to the orientation of the sealing assemblies as shown in the Figures, and are not intended to be limiting to the scope of the invention or to limit the invention scope to the preferred embodiments shown in the Figures. In the present invention, the terms "perpendicular", "horizontal" and "parallel" are defined in a range of ±10% based on a standard definition. For example, "perpendicular" (perpendicularity) means the relationship between two lines which meet at a right angle (90 degrees). However, in the present invention, "perpendicular" may encompass a range from 80 degrees to 100 degrees.

The phrases used herein are for the purpose of describing particular embodiments only and are not intended to limit the invention. As used herein, the singular forms "a" "an" and "the" are intended to include the plural forms as well, unless the context clearly dictates otherwise. It will also be understood that the terms "comprise", "comprising", "include" and/or "including" used herein designate the presence of recited features, integers, steps, operations, elements and/or parts, but do not preclude the presence or addition of one or more other features, integers, steps, operations, elements, parts and/or combinations thereof.

Unless otherwise defined, all terms (including technical and scientific terms) used herein have the same meaning as commonly understood by a person having ordinary skill in the art. It will also be understood that terms used herein should be construed to have meanings consistent with their meanings in the context of this specification and the relevant art, and should not be construed in an idealized or overly formal manner unless they are expressly so limited.

Unless explicitly stated otherwise, comparative quantitative terms such as "less than" and "greater than" are intended to encompass the concept of equality. As an example, "less than" means not only "less than" in the strictest mathematical sense, but also "less than or equal to."

Please refer to FIGS. 1 to 6. The invention provides a light-emitting diode (LED) lighting device which includes a seat 1 and an optical assembly 2. The optical assembly includes a light source 20, an optical members 21 and an electric power source 3. The light source 20 electrically connects to the electric power source 3. The light source 20 is disposed on the seat 1. The optical members 21 is disposed on a light-emitting direction of the light source 20.

Figure 9:
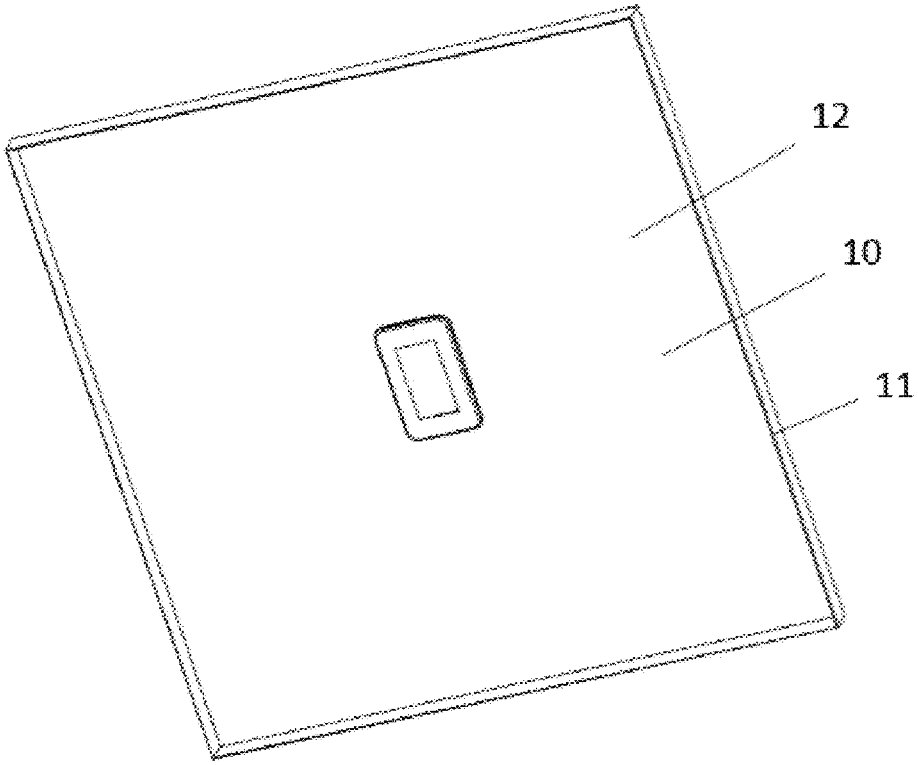
FIG. 9 is a perspective schematic view of the seat.

Please refer to FIG. 9. The seat 1 in the embodiment has a baseplate 10 and a sidewall 11. The sidewall 11 is disposed on a periphery of the baseplate 10 to form a receiving space 12 between the baseplate 10 and the sidewall 11. The light source component is disposed in receiving space 12. The seat 1 may be made of metal such as iron or stainless steel to increase its thermal performance. In some embodiments, the seat 1 is formed by an integrated structure. The sidewall 11 is formed by directly bending the baseplate 10. In some embodiments, the seat 1 is formed by an integrated structure which is directly formed by pressing or stretching to possess better structural strength. In some embodiments, the seat 1 may also adopt plastic material.

Figure 6:
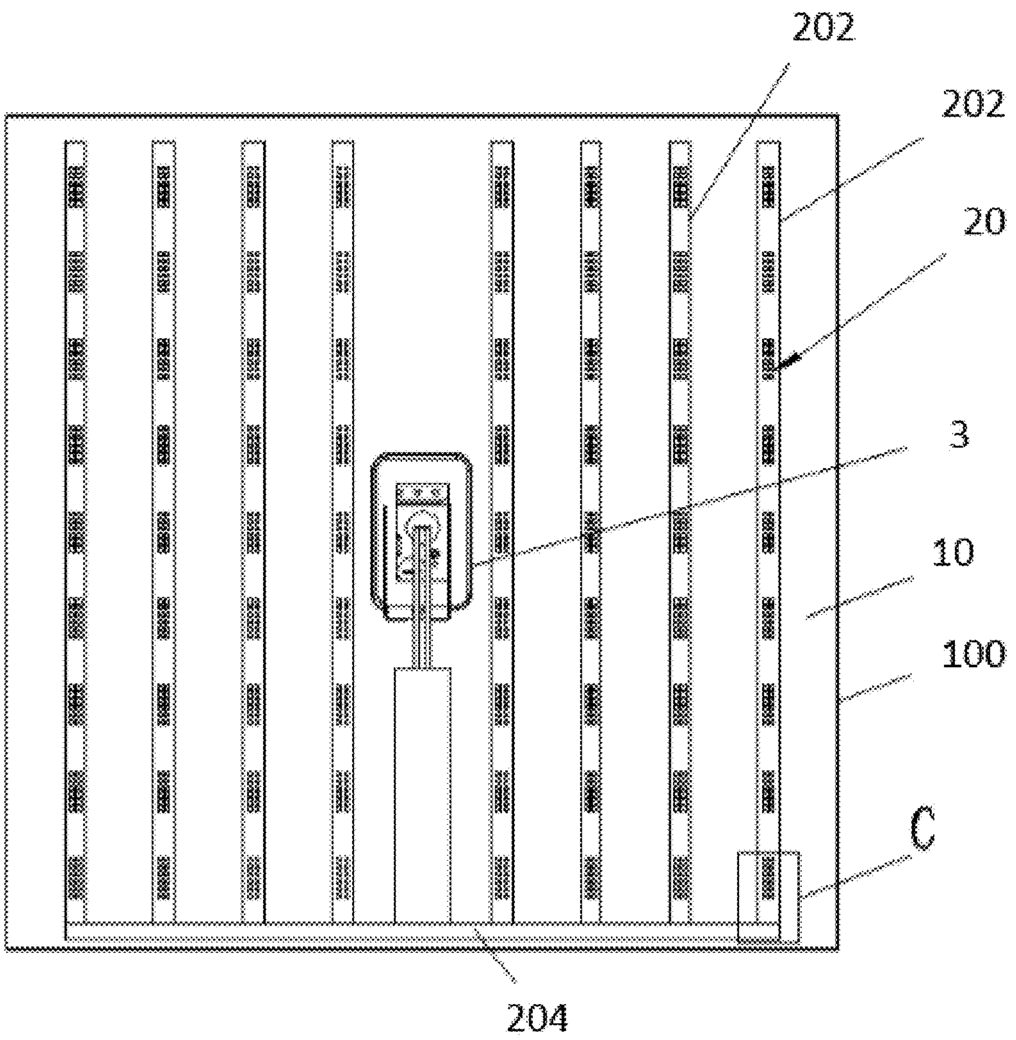
FIG. 6 is a schematic view of FIG. 1 which removes the optical assembly.
Figure 7:
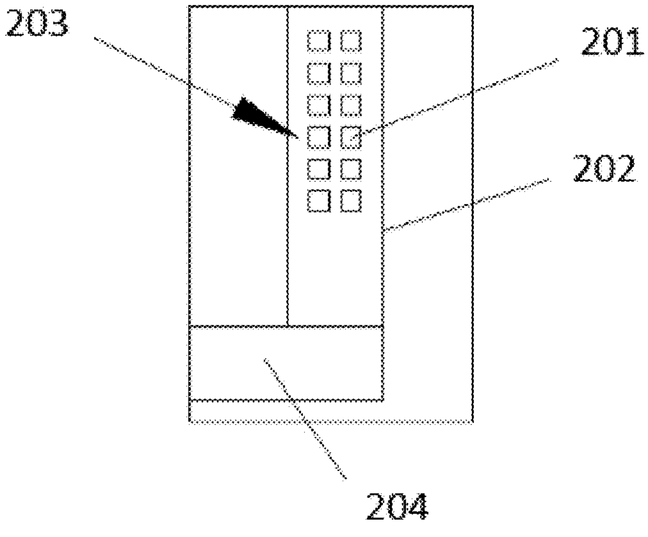
FIG. 7 is an enlarged view of part C in FIG. 6.

Please refer to FIGS. 6 and 7. In the embodiment, the light source component 20 may be directly fixed on the baseplate 11 of the seat 1. In detail, the light source component 20 includes LED chips 201 (In this article, LED lamp beads can also be LED chips) and a circuit board 202. The LED chips 201 are fixed on the circuit board 202. The light source component 20 is directly fixed to the baseplate 11 of the seat 1 through the circuit board 202. In some embodiments, the circuit board 202 is directly fixed to the baseplate 11 of the seat 1 by means of bonding. In some embodiments, the light source component 20 may be clamped on the baseplate 11 of the seat 1 through the circuit board 202. In some embodiments, the light source component 20 may be fixed to the baseplate 11 of the seat 1 by soldering. In the above embodiments, the light source component 20 and the baseplate 11 of the base 1 form a heat conduction path to make the heat from the LED chips 201 which are working rapidly conducted to the seat 1 and dissipated by the seat 1 to improve the cooling efficiency. Please refer to FIG. 7. In some embodiments, the LED chips 201 on the circuit 202 are arranged in two rows. Please refer to FIGS. 13 and 15. In some embodiments, the LED chips 201 on the circuit 202 are arranged in one row.

In some embodiments, the LED chips 201 are arranged in multiple rows, and the adjacent LED chips 201 are arranged in a staggered manner or at intervals.

Figure 12:
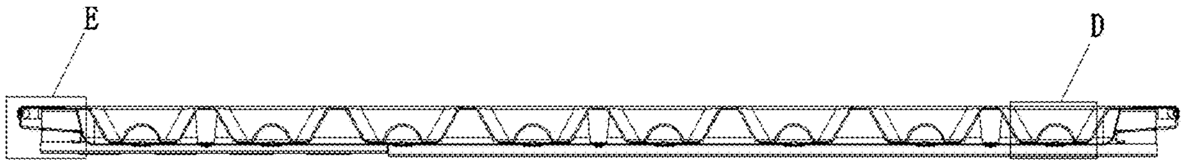
FIG. 12 is a cross-sectional schematic view of an embodiment of the LED lighting device of the invention.
Figure 13:
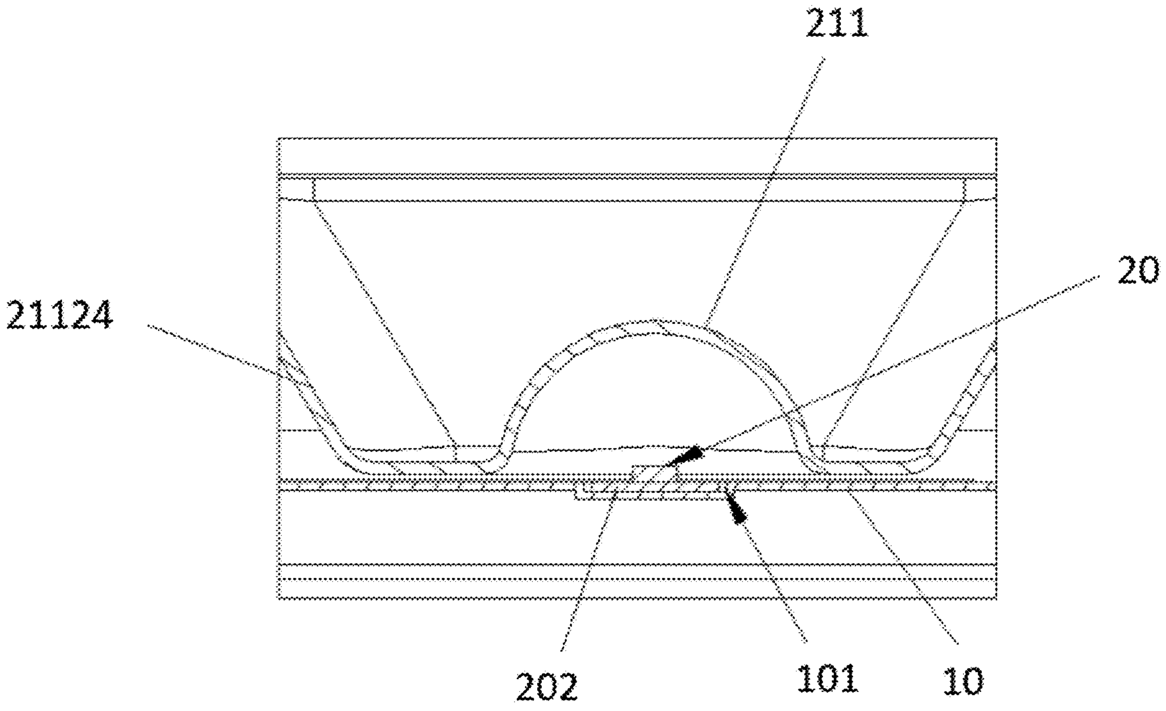
FIG. 13 is an enlarged view of part D in FIG. 12.
Figure 15:
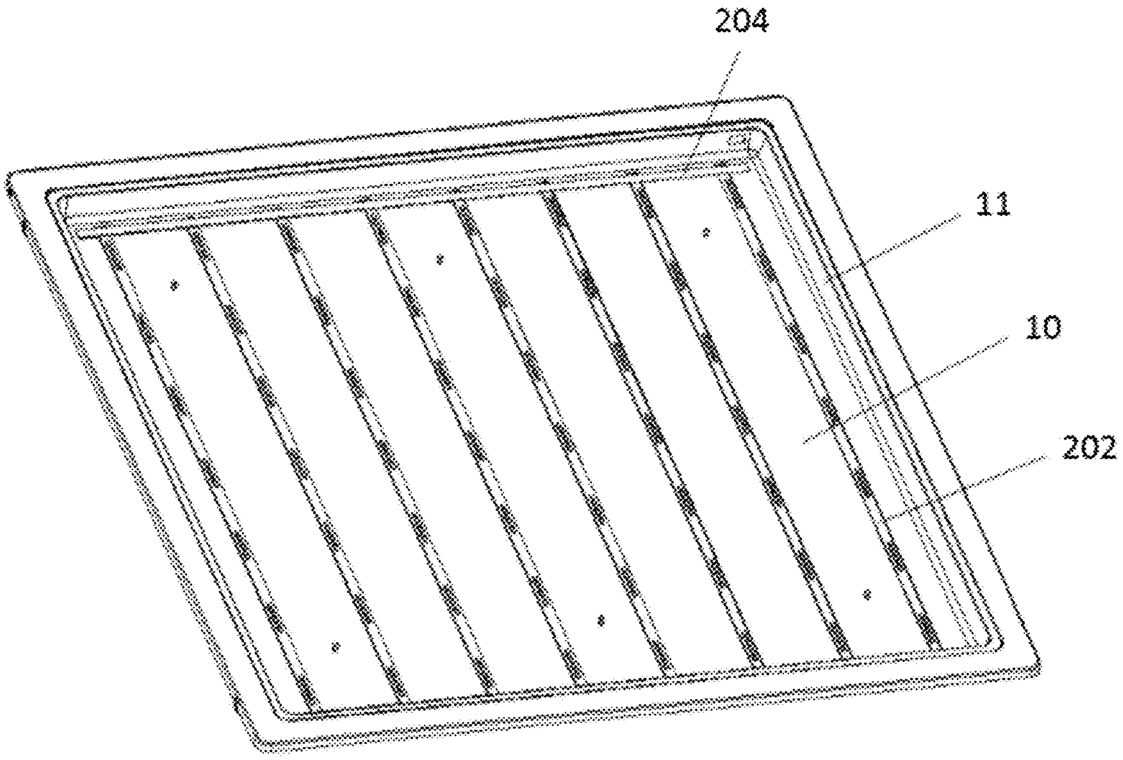
FIG. 15 is a perspective schematic view of an embodiment of the LED lighting device of the invention which removes the optical assembly.

Please refer to FIGS. 12, 13 and 15. In some embodiments, the seat 1 may be provided with a positioning unit 1011 for positioning the light source component 20. The positioning unit 1011 includes a strip-shaped trench formed on the baseplate 10. A part or the whole of the circuit board 202 of the light source component 20 is received in the trench to fix the circuit board 202 at a predetermined position on the baseplate 10. In addition, the trench formed on the baseplate 10 by pressing is equivalent to a reinforced rib disposed on the baseplate 10 to increase the structural strength of flexural resistance of the baseplate 10. In the embodiment, a thickness of the circuit board 202 is approximately equal to a depth of the trench. The light source component 20 further includes the electric connecting unit 204, where the electric connecting unit 204 can be attached to the baseplate 10 and is electrically connected to the circuit board 202 located in the groove. An electric connecting unit 204 may be attached on the baseplate 10 and is electrically connected to the circuit board 202 in the trench. The electric connecting unit 204 attached on the baseplate 11 can tightly press the circuit board 202 to prevent the circuit board 202 from loosening. Also, the electric connecting unit 204 may be fixed on the baseplate 10, for example, by an adhesive or screws, to increase the stability and prevent the electric connection between the electric connecting unit 204 and the circuit board 202 from separating to malfunction due to loosening of the electric connecting unit 204.

Please refer to FIGS. 46-53. In some embodiments, in order to enhance the strength of the seat 1, the seat 1 may be further disposed with a reinforcement unit 1012. The reinforce unit 1012 may include some first reinforcement structures 10121 and some second reinforcement structures 10122. The first reinforcement structures 10121 and the second reinforcement structures 10122 may be connected. In some embodiments, the first reinforcement structures 10121 and the second reinforcement structures 10122 may be arranged to be perpendicular or substantially perpendicular to each other. The first reinforcement structures 10121 are disposed to be extended along the length direction of the lighting device. In some embodiments, the first reinforcement structures 10121 projects toward the back of the seat 1 (a side without the light source component 20). Identically, the second reinforcement structures 10122 projects toward the back of the seat 1. On the front of the seat 1, the first reinforcement structures 10121 and the second reinforcement structures 10122 are connected. The first reinforcement structures 10121 and the second reinforcement structures 10122 may be integrally formed on the seat 1, such as stretch or press, so as to make the first reinforcement structures 10121 and the second reinforcement structures 10122 project toward the back of the seat 1. Also, the thickness of each of the first reinforcement structures 10121 and the second reinforcement structures 10122 is substantially the same as the thickness of the rest of the seat 1. In other words, under the condition of being not disposed with additional material on the seat 1, the first reinforcement structures 10121 and the second reinforcement structures 10122 can improve the overall structural strength of the seat 1.

Figure 53:
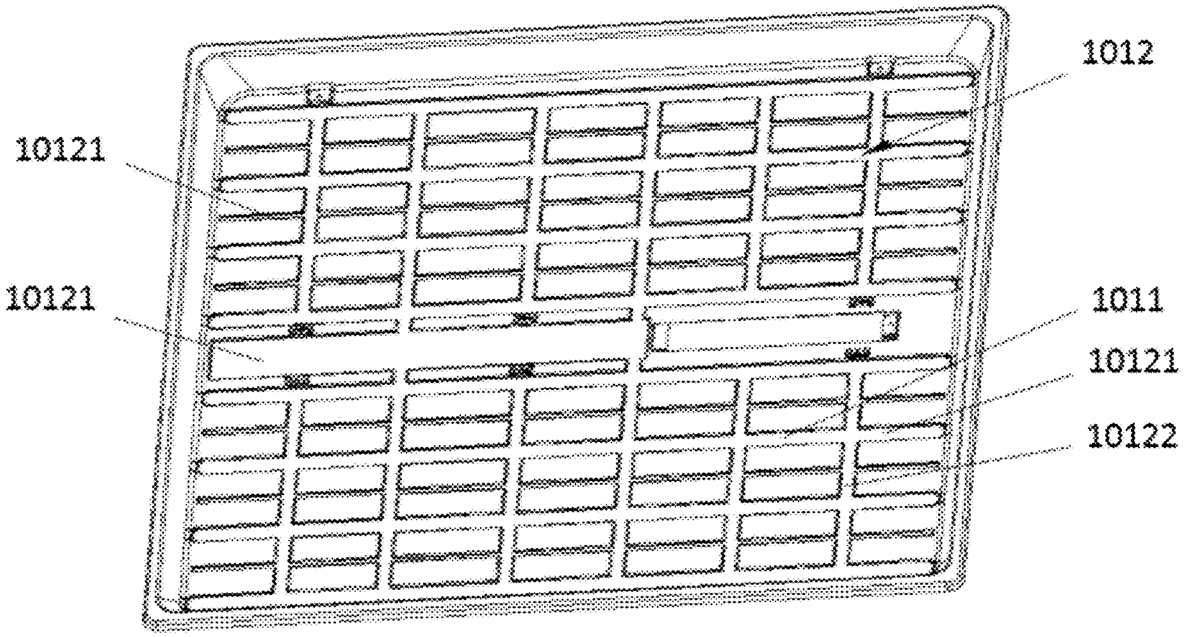
FIG. 53 is a perspective structural schematic view of the baseplate in some embodiments.
Figure 54:
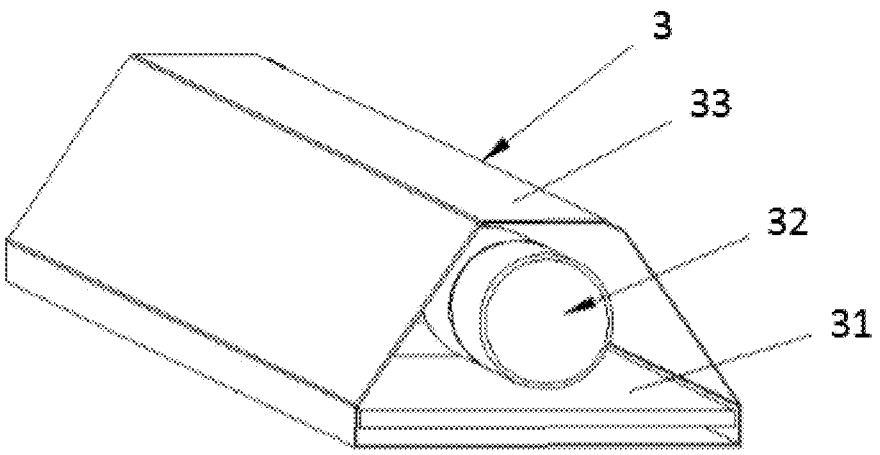
FIG. 54 is a perspective structural schematic view of the electric power source in some embodiments.
Figure 55:
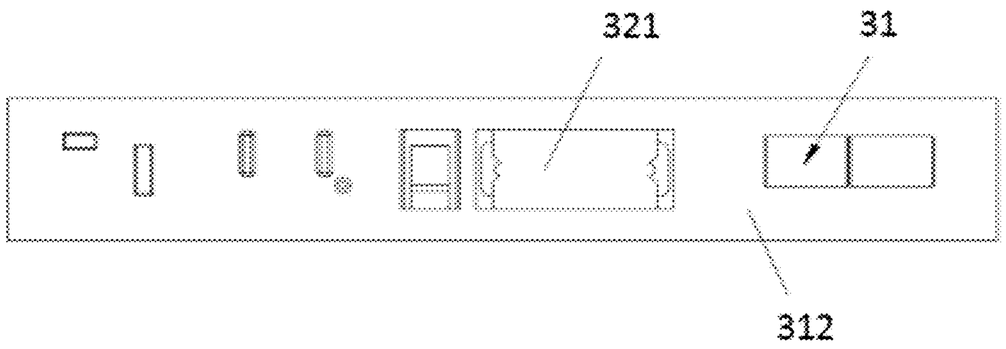
FIG. 55 is a schematic view of matching of the power source circuit board and the electronic components.
Figure 56:
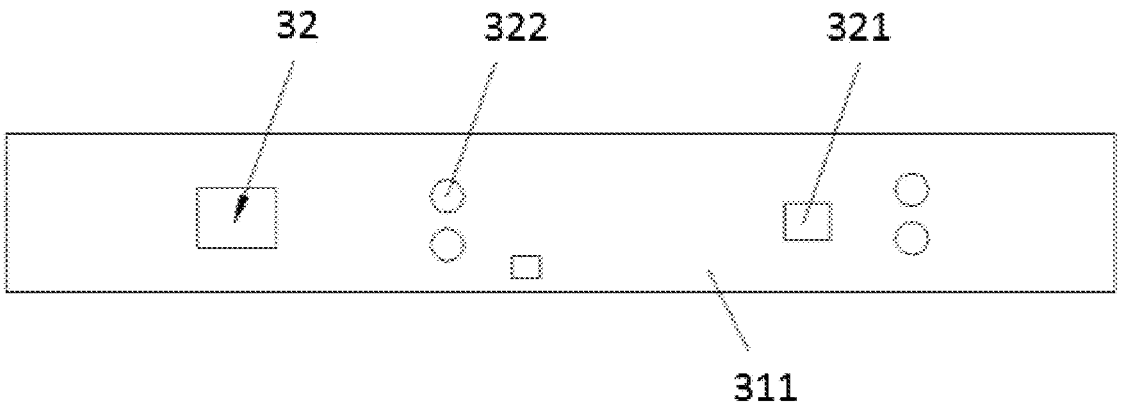
FIG. 56 is a rear view of FIG. 55.
Figure 57:
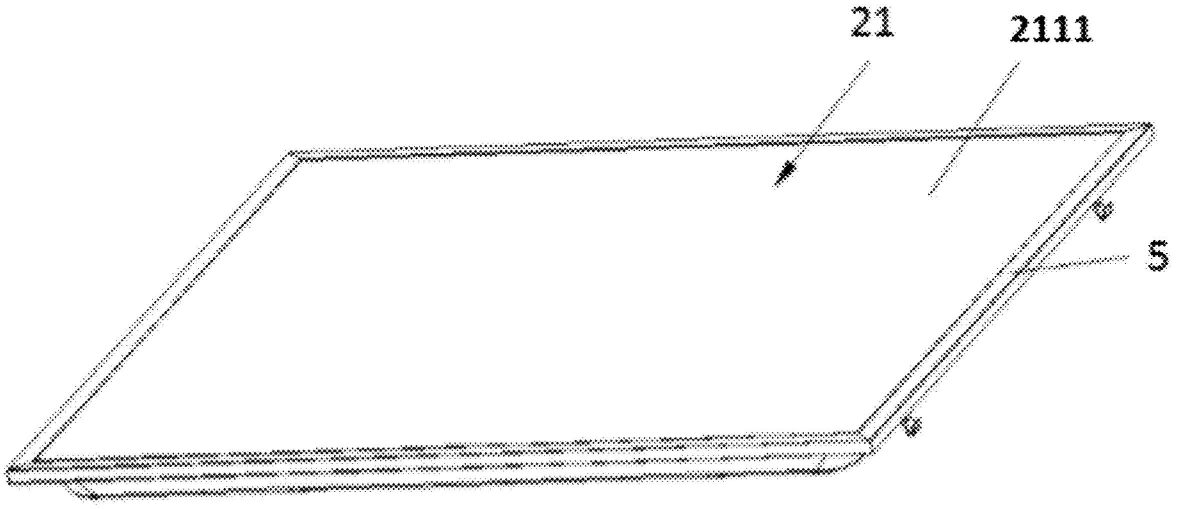
FIG. 57 is a perspective structural schematic view of the LED lighting device in some embodiments.
Figure 58:
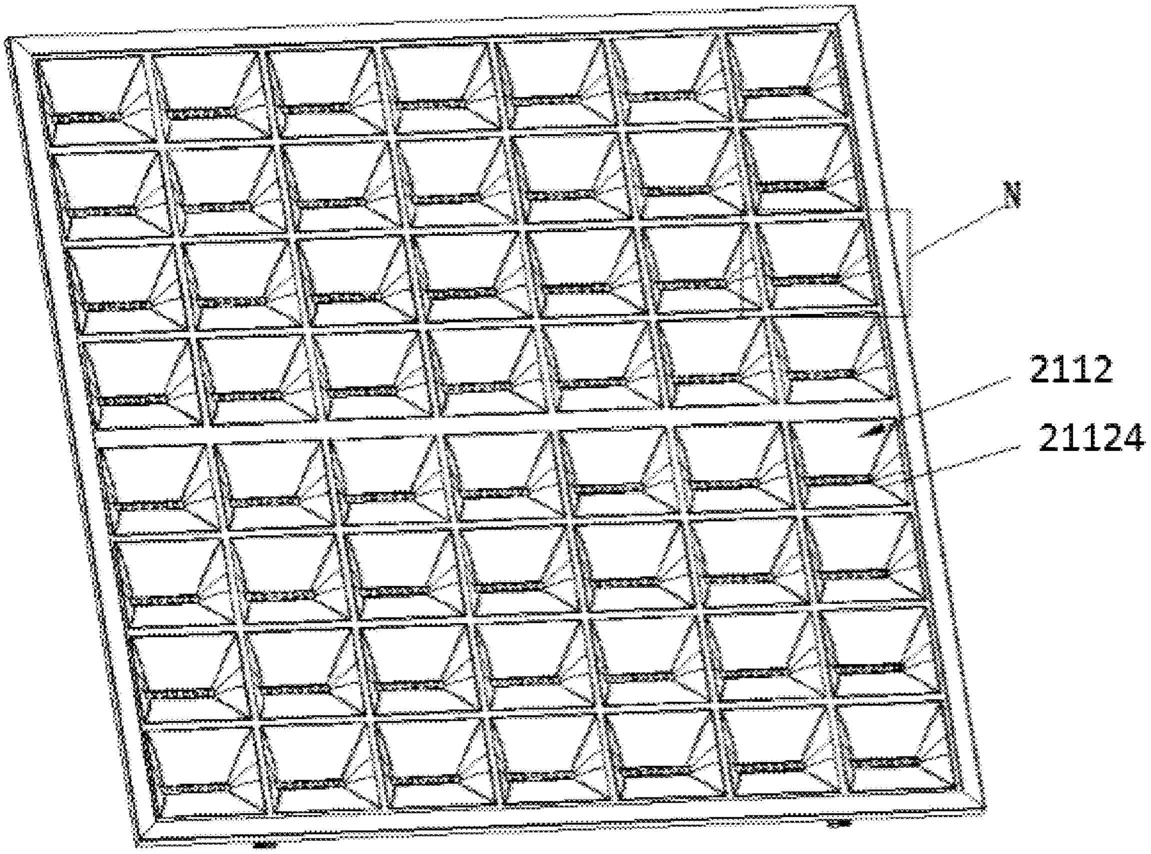
FIG. 58 is a perspective structural schematic view of FIG. 57 without the second optical element.
Figure 59:
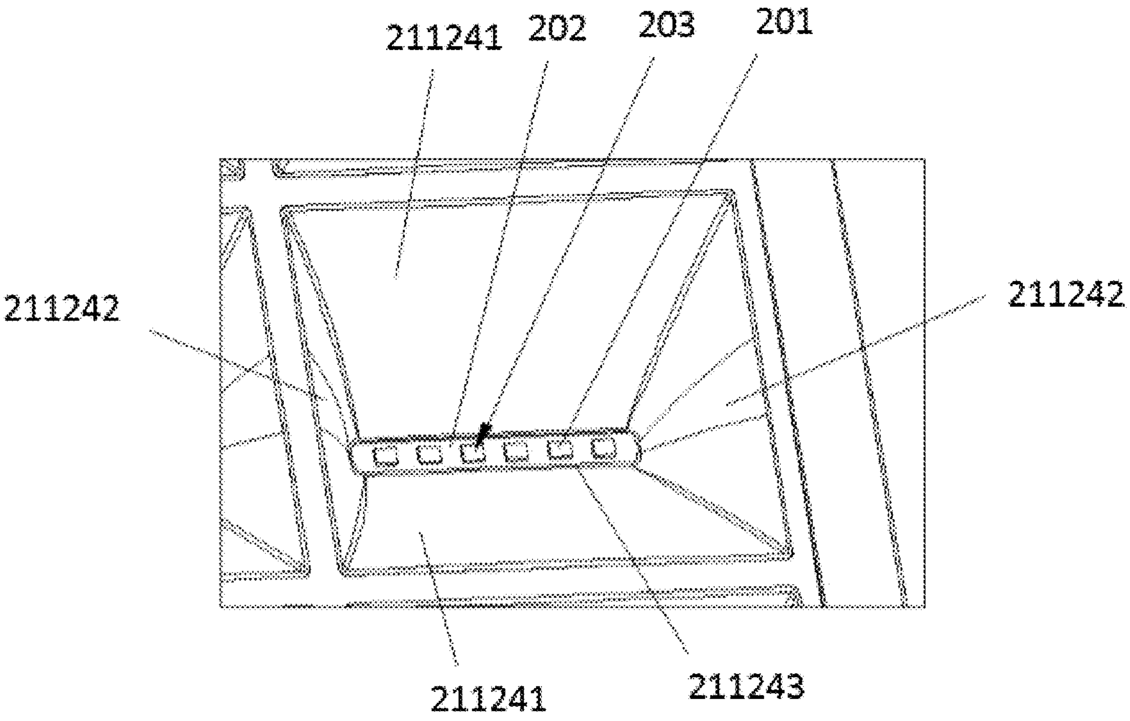
FIG. 59 is an enlarged view of part N in FIG. 58.
Figure 60:
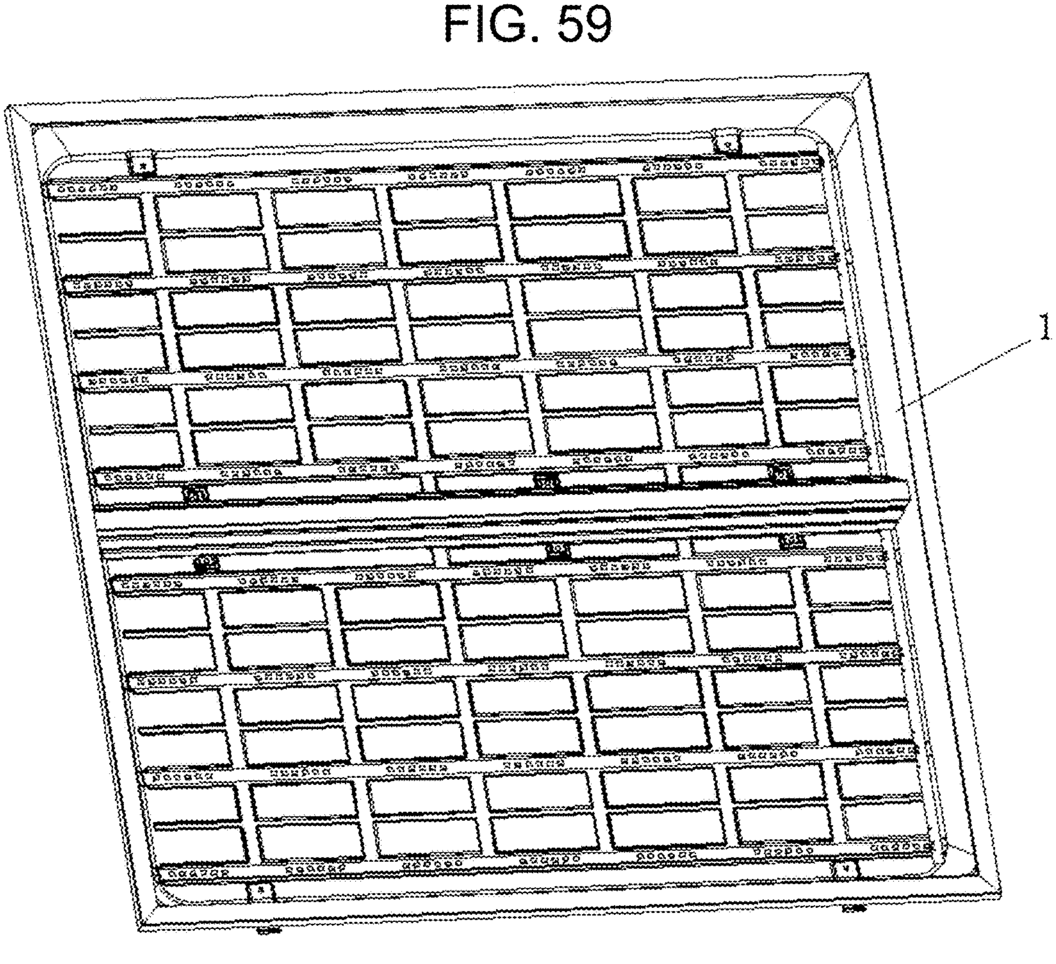
FIG. 60 is a perspective structural schematic view of FIG. 57 without the optical member.

Please refer to FIG. 53. A part of the first reinforcement structures 10121 form the positioning unit 1011 for installing the circuit board 202 of the light source component 20. The part of the first reinforcement structures 10121 has a first width. One of the first reinforcement structures 10121 has an area used for installing the electric power source 3 and this first reinforcement structures 10121 has a second width. Because the first reinforcement structures 10121 appear to be a dented shape on the front of the seat 1, the size of the electric power source 3 projecting from a surface of the seat 1 can be reduced when the electric power source 3 is disposed on the first reinforcement structures 10121, so as to decrease the overall thickness of the LED lighting device. The rest of the first reinforcement structures 10121 have a third width. The third width is less than the first width in size, and the first width is less than the second width in size. The third width is greater than 2.5 mm.

Please refer to FIG. 53. Some of the second reinforcement structures 10122 adopt the same or substantially the same width.

Please refer to FIG. 53. A distance between adjacent two of the first reinforcement structures 10121 is between 10 mm and 30 mm.

Figure 1:
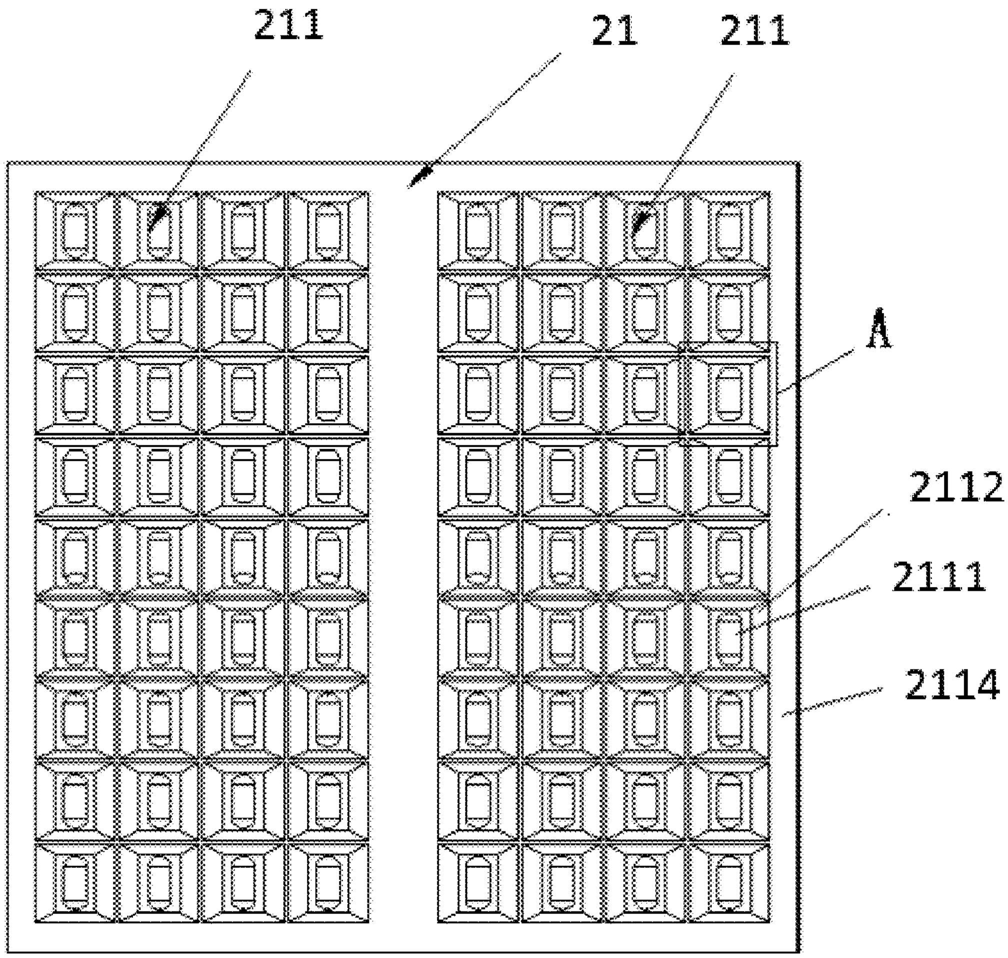
FIG. 1 is a front schematic view of an embodiment of the LED lighting device of the invention.
Figure 2:
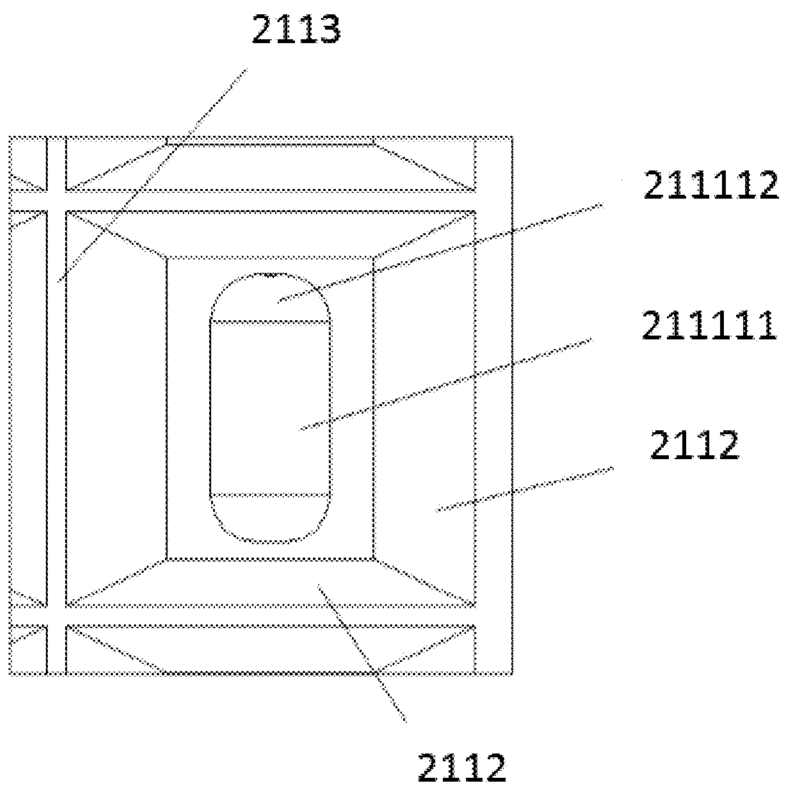
FIG. 2 is an enlarged view of part A in FIG. 1.
Figure 3:
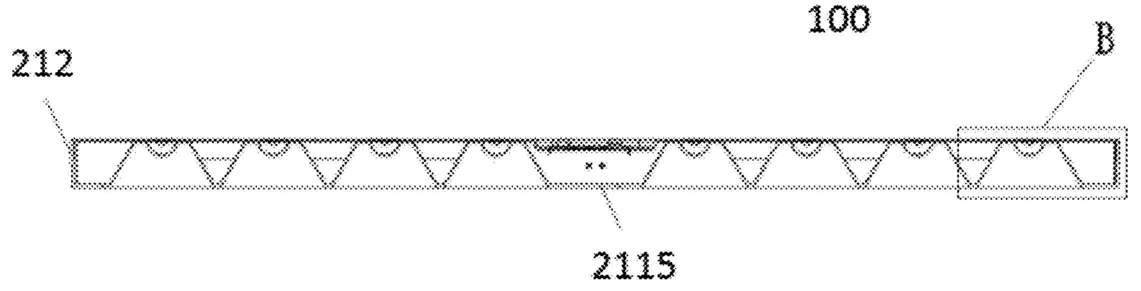
FIG. 3 is a cross-sectional view of an embodiment of the LED lighting device of the invention.

Please refer to FIGS. 1 to 3. In the embodiment, the optical members 21 includes an optical unit 211 and an installing unit 212. The installing unit 212 corresponds to the seat 1. In detail, the installing unit 212 connects with the sidewall 11 of the seat 1. The installing unit 212 may be disposed inside or outside the sidewall 11. In the embodiment, the installing unit 212 is disposed outside the sidewall 11 to make the optical members 21 completely cover a light-emitting side of the LED lighting device on the seat 1. When the LED lighting device is installed on the ceiling, the seat 1 is not exposed, so a user cannot see the seat 1. The optical unit 211 is only one in number.

Figure 10:
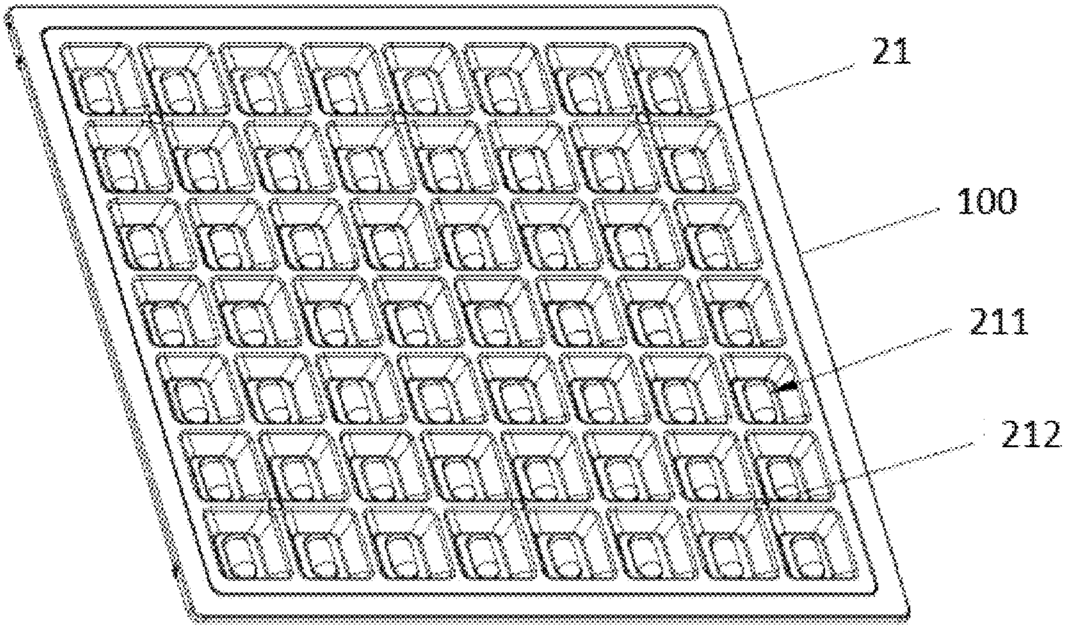
FIG. 10 is a structural schematic view of an embodiment of the LED lighting device of the invention.
Figure 11:
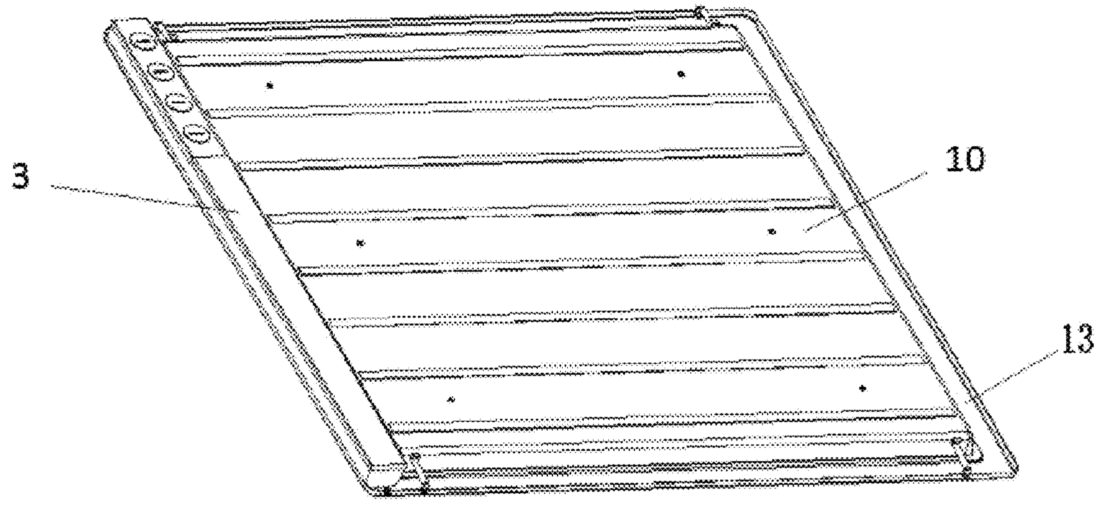
FIG. 11 is another structural schematic view of an embodiment of the LED lighting device of the invention.
Figure 16:
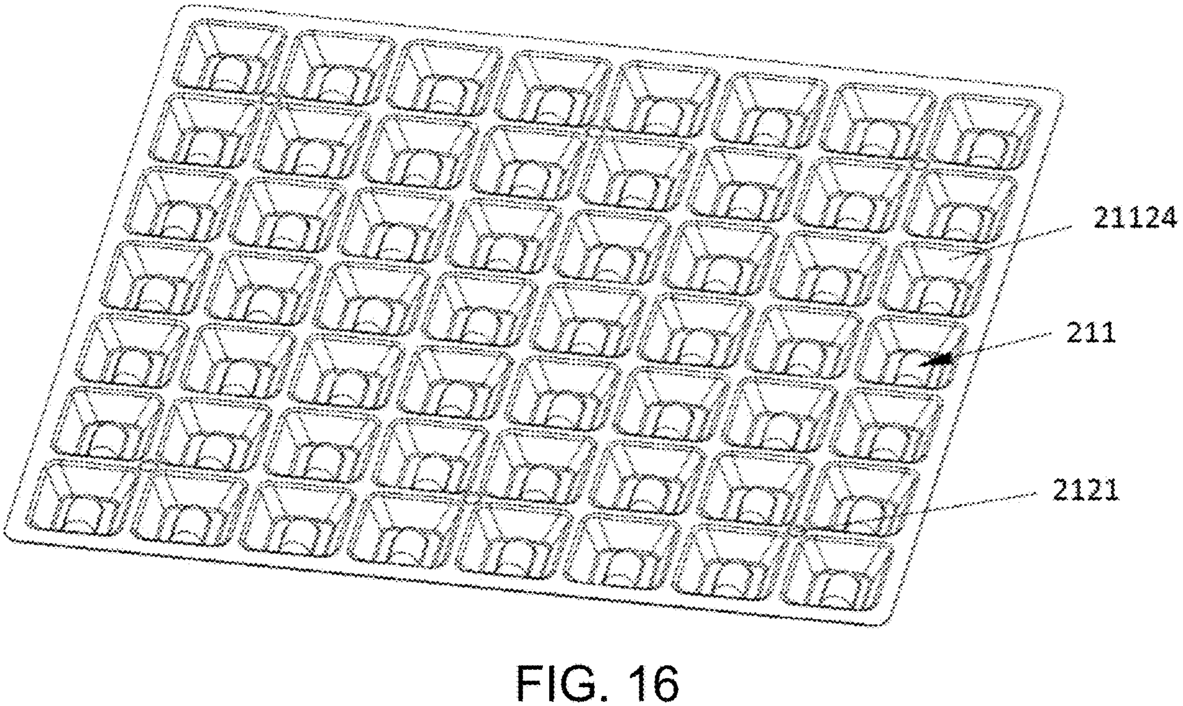
FIG. 16 is a perspective schematic view of an embodiment of the optical assembly of the LED lighting device of the invention.
Figure 17:
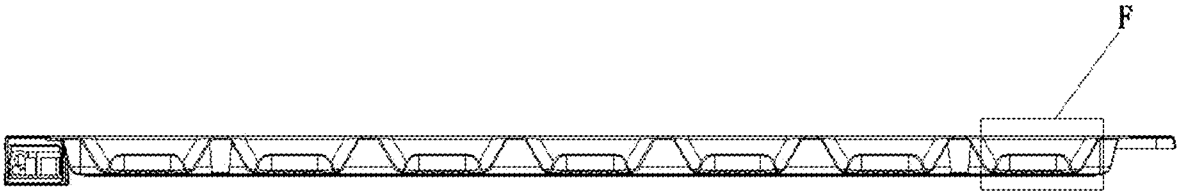
FIG. 17 is a cross-sectional schematic view of an embodiment of the LED lighting device of the invention.
Figure 18:
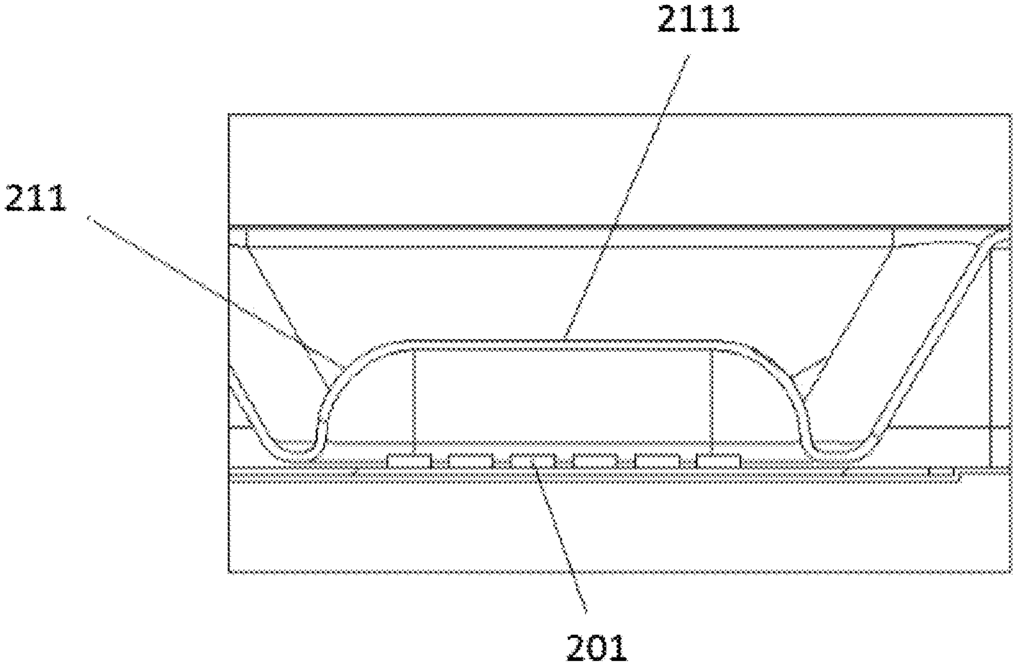
FIG. 18 is an enlarged view of part F in FIG. 17.
Figure 19:
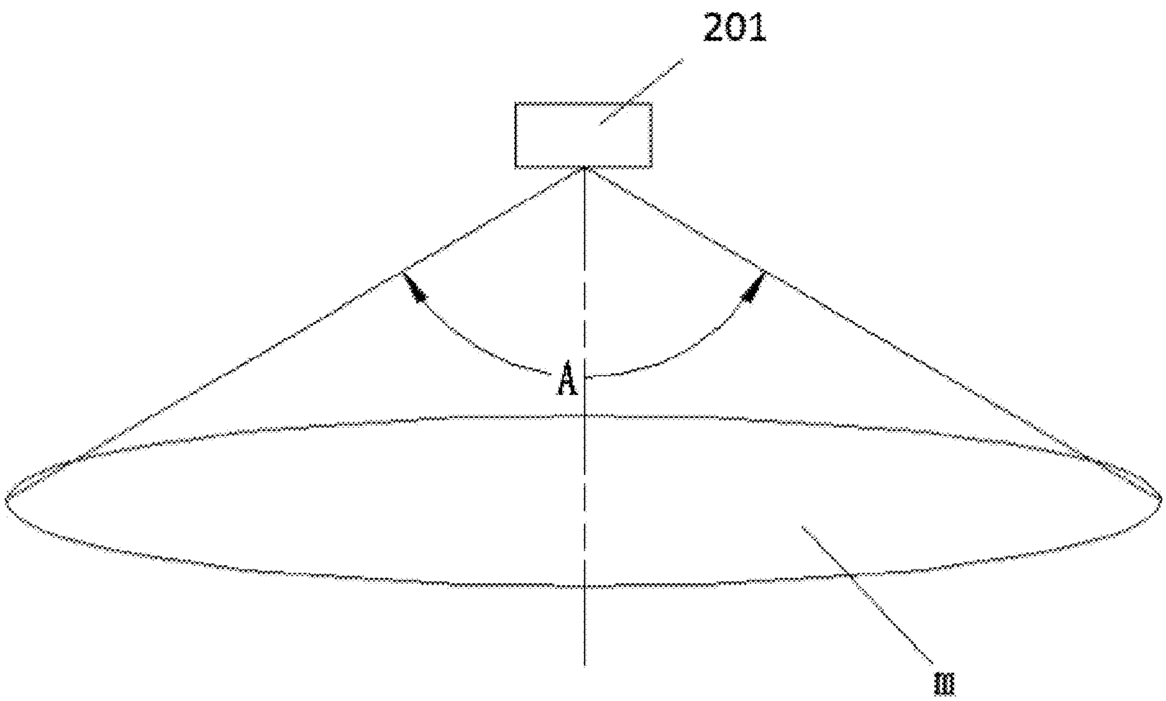
FIG. 19 is a schematic view of light emitting of the LED chip.

Please refer to FIGS. 10 and 16. In one embodiment, the installing unit 212 includes at least one aperture 2121 formed on the optical members 21 and the installing wall 2122. Correspondingly, the seat 1 is also formed with an aperture corresponding to the aperture 2121. Thus, the optical members 21 is fixed to the seat 1 by inserting a rivet into the corresponding apertures of the optical members 21 and the seat 1.

Please refer to FIGS. 21 to 24. In one embodiment, the installing unit 212 is disposed on a periphery of the optical members 21 and includes an installing wall 2122. The installing wall 2112 surrounds the sidewall 11 of the seat 1 and outside the sidewall 11. The installing wall 2112 is disposed with a bending portion 21221. The bending portion 21221 sheathes or abuts against an end of the sidewall 11 in a thickness direction of the LED lighting device, so the bending portion 21221 and the optical members 21 can clamp the sidewall by themselves to fix the optical members 21 on the seat 1. Also, by such a fixing manner, the optical members 21 and the seat 1 can be fixed without any fastener (such as screws or rivets). This can prevent a fastener disposed to a light-emitting surface of the optical members 21 from affecting light emitting of the optical members 21 (for example, the light-emitting surface of the optical members 21 forms a local dark spot because of arranging a fastener on the light-emitting surface of the optical members 21) and can guarantee integrity and beauty of appearance of the optical members 21.

The optical members 21 is made of plastic. When the optical members 21 is placed outside the seat 1, the installing wall 2122 of the optical members 21 may be deformed by hot pressing to form the bending portion 21221.

In other embodiments, when the optical members 21 is placed outside the seat 1, the installing wall 2122 and the sidewall 11 of the seat 1 may also be fixed by clips or fasteners.

The installing wall 2122 of the optical members 21 disposed outside and fixed to the sidewall 11 can simplify the structure. This can reduce a bezel of the lamp, improve beauty and the effect of light emitting and reduce dark areas resulting from the bezel.

The installing unit may also be an independent component. As shown in FIGS. 69-72, the install border 5 includes a support element 51 surrounding the periphery of the optical members 21 and/or the seat 1 to provide support to the optical members 21 and the seat 1. In other words, the support elements 51 constitute the border on the outer side of the LED lighting device.

The support element 51 includes a first wall 511. The first wall 511 is attached on a surface of the optical members 21 in the thickness direction of the LED lighting device. A first connecting wall 2113 of the edge of the optical members 21 is clamped between the support element 51 and the install end wall 13 which is extended outwardly from the side wall 11 of the seat 1. That is, the optical member 21 is clamped and fixed by the install border 5 (or the support elements 51) and the seat 1 (or the end wall 13 on the seat 1).

The support element 51 may further include a second wall 512. The second wall 512 has a stopping portion 5121. The install end wall 13 has a compression element 131. The compression element 131 is embedded into the space formed between the stopping portion 5121 and the first wall 511 to make the first connecting wall 2113 of the edge of the optical members 21 tightly compressed between the install end wall 13 and the first wall 511 to finish the fixing of the three pieces. In other words, when the seat 1 matches with the support element 51, the compression element 131 is embedded between the first wall 511 and the stopping portion 5121 in an interference manner to finish the fixing. When the compression element 131 is compressed between the stopping portion 5121 and the first wall 511, the install end wall 13 tightly presses the first connecting wall 2113 of the edge of the optical members 21 so as to fix the seat 1, the optical unit 211 and the support element 51 to be one piece.

The install end wall 13 has a fitting part 132 attached on the first connecting wall 2113 of the edge of the optical members 21 and a extension 133 not attached on the first connecting wall 2113 of the edge of the optical members 21. The distance between the extension 133 and the first wall 511 is less than the distance between the fitting part 132 and the first wall 511. In other words, because the first connecting wall 2113 of the edge of the optical members 21 is not disposed between the extension 133 and the first wall 511, there will be a certain gap between the extension 133 and the first wall 511. As a result, when the compression element 131 is embedded between the stopping portion 5121 and the first wall 511 by an external force, the extension 133 connected with the compression element 131 could be deformed toward the first wall 511 to allow the compression element 131 to be embedded between the stopping portion 5121 and the first wall 511. The setting of the extension 133 makes the deformation occurring at the compression element 131 and the extension 133 when the compression element 131 being embedded between the stopping portion 5121 and the first wall 511 to prevent the compression element 131 from being damaged or being unable to be embedded between the stopping portion 5121 and the first wall 511 because the deformation is concentrated at the compression element 131.

An end of the compression element 131 abuts against the stopping portion 5121. A gap is kept between at least part of the main portion of the compression element 131 and the second wall 512 so as to make the compression element 131 have sufficient elastic deformation to keep a sufficient force to the stopping portion 5121 to prevent the compression element 5121 from escaping between the stopping portion 8121 and the first wall 511.

The distance between an end of the compression element 131 and the second wall 512 is the shortest, and the distance between the compression element 131 and the second wall 512 gradually increases in the direction from the compression element 131 to the install end wall 131.

The support element 51 may be formed by a metal sheet, for example, a sheet of material is bent. The support element 51 may be formed by extrusion molding.

The support element 51 is configured into multiple in number and adjacent support elements 51 may be fixed by welding.

In the thickness direction of the LED lighting device, the support element 51 does not exceed the space defined by the optical members 21. As a result, the support element 51 will not additionally occupy the thickness size of the LED lighting device. When the LED lighting device is installed on a horizontal plane and emits light downward, a lower surface of the first wall 511 of the support element 51 is flush or substantially flush with a lower surface of the optical members 21.

Please refer to FIGS. 1 to 4. The optical unit 211 of the embodiment includes multiple first optical members 2111 (light-permeable parts) and the second members 2112 which surround the first optical member 2111. The light from the light source component 20 can penetrate the first optical members 2111. The light source component 20 includes multiple LED arrays 203. Each LED array 203 includes at least one LED chip 201. In the embodiment, each LED array 203 includes multiple LED chips 201. The LED arrays 203 correspond to the first optical members 2111. In other words, each LED array 203 is arranged to correspond to one of the first optical members 2111, they both are same in number. In other embodiments, the first optical members 2111 may be greater than the LED arrays 203 in number.

In the embodiment, the LED chip 201 of the LED array 203 only corresponds to the first optical member 2111. In other words, the LED chip 201 of the LED array 203 (or the LED array 203) is completely cloaked by the first optical member 2111. At least part of the light from the LED chip 201 of the LED array 203 is emitted from the first optical member 2111. In detail, in the embodiment, the first optical member 2111 has a first light-emitting surface 21111. There is a distance between the first light-emitting surface 21111 and the LED chip 201 of the LED array 203. The light from the LED chip 201 is emitted from the first light-emitting surface 21111.

Please refer to FIGS. 6 and 7. In the embodiment, the LED chips 201 of the LED array 203 are arranged along a first direction. The first optical member 2111 (or the first light-emitting surface 21111) is arranged along the first direction.

Please refer to FIGS. 1 to 4. In the embodiment, the first light-emitting surface 21111 has a main portion 211111 arranged in the first direction and two end portions 211112 separately located at two ends of the main portion 211111 along the first direction. A cross-section of the main portion 211111 (a cross-section on the width direction of the first light-emitting surface 21111) is of an arcuate shape, and each end portion 211112 is an arcuate surface, so that the first light-emitting surface 21111 has a better effect of light emitting. In addition, in comparison with a flat surface, when the light from the LED chip 201 is emitted to an arcuate surface, reflection will decrease, so the light-emitting efficiency can be enhanced to improve the light efficiency. Also, the first light-emitting surface 21111 is more adjacent to the LED chip 201 than the second optical member 2112. When the LED chip 201 is working, the first light-emitting surface 21111 has a higher temperature than the second optical member 2112. Thus, the first light-emitting surface 21111 adopting an arcuate shape can improve the structural strength and have better property of anti-deformation when heated. In other embodiments, the first light-emitting surface 21111 may also be shaped into a spherical surface or a flat surface.

In one embodiment, each first optical member 2111 is configured to possess an effect of light diffusion to increase a light-emitting angle of the light source component 20 and prevent light from concentrating to cause visual uncomfortableness. In one embodiment, each first optical member 2111 possesses an effect of light diffusion resulting from its own material property, for example, plastic or acrylic. In one embodiment, each first optical member 2111 is coated with a diffusion coating or disposed with a diffusion film (not shown) to make it have an effect of light diffusion.

Please refer to FIGS. 1 and 2. In one embodiment, the optical unit 211 further has multiple second optical members 2112 (anti-glare parts) corresponding to the first optical members 2111. The second optical members 2112 are configured to reflect at least part of light emitted by the first optical members 2111 and at least part of light emitted by the first optical members 2111 penetrates the second optical members 2112. At least part of light penetrating the second optical member 2112 may be emitted from an adjacent one of the second optical members 2112 or at least part of light penetrating the second optical member 2112 is emitted from the second optical member 2112 after reflection to prevent from forming a dark area at the second optical member 2112 so as to improve beauty of the LED lighting device which is illuminated. In addition, the second optical member 2112 reflecting at least part of light emitted from the first optical member 2111 generates a certain effect of light blocking and glare reducing.

In some embodiments, at least part of the surface of the optical member 21 (the optical unit 211, the first optical member 2111 and/or the second optical member 2112) is provided with a micro-optical structure, for example, a frosted surface or a prism surface, thereby enhancing the light diffusing function of the optical member 21 (the optical unit 211, the first optical member 2111 and/or the second optical member 2112), and reducing glaring.

Figure 4:
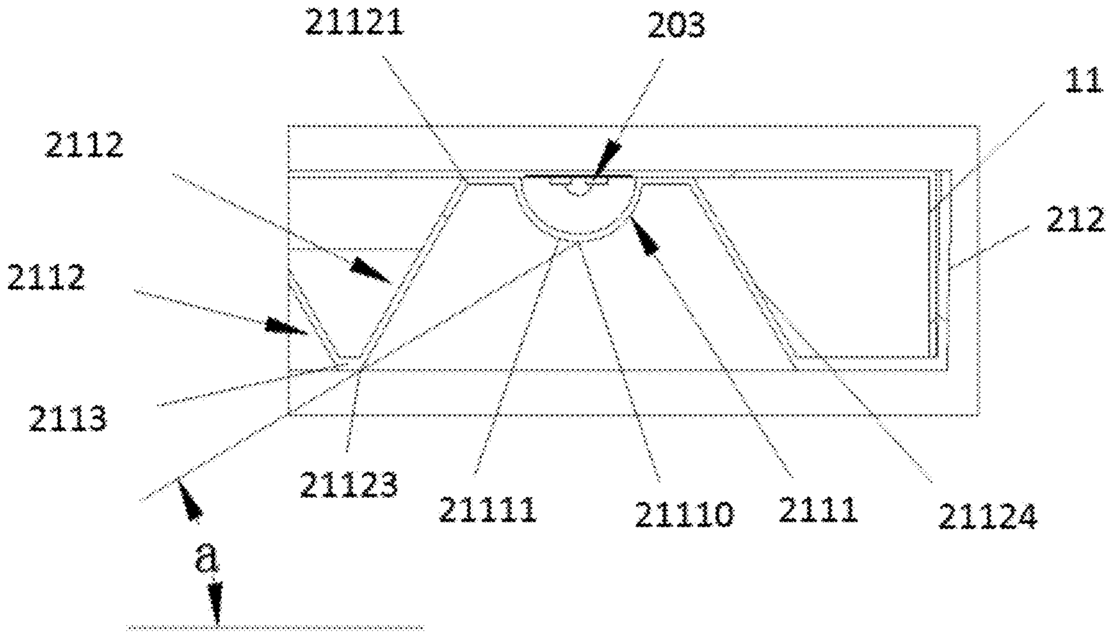
FIG. 4 is an enlarged view of part B in FIG. 3.

Please refer to FIG. 4. On a cross-section in the width direction of the first optical member 2111, the first optical member 2111 has a midpoint 21110 at the bottom, where the bottom means the bottom position of the first optical member 2111 when the LED lighting device is normally installed on a horizontal plane and emits light downward. As shown in the figure, the midpoint 21110 means the midpoint on a cross-section in the width direction of the first optical member 2111. The second optical member 2112 has a near end 21122 and a far end 21123 on a cross-section in the height direction of the LED lighting device. The near end 21122 is more adjacent to the corresponding light source component 20 than the far end 21123. The far end 21123 is the bottommost end of the second optical member 2112 in the height direction of the LED lighting device. The angle a between the line through the midpoint 21110 and the far end 21123 and a lower-end surface of the LED lighting device (the plane on which the second connecting wall 2114 is located) is between 10 degrees and 45 degrees. Further, the angle a between the line through the midpoint 21120 and the far end 21123 and a lower-end surface of the LED lighting device (the plane on which the second connecting wall 2114 is located) is between 25 degrees and 35 degrees. As a result, part of the direct light emission from the first optical member 2111 can be shaded to reduce the glare. It is noted that the abovementioned positional relationship, such as the positional relationship between the midpoint, the near end and the far end, is based on the cross-sectional view shown in FIG. 4.

In the embodiment, the second optical member 2112 includes one or more sets of optical walls 21124. The optical walls 21124 are configured to possess functions of reflection and light-permeability. The optical walls 21124 surround the first optical member 2111. In the embodiment, a set of second optical members 2112 has four sets of optical walls 21124, the four sets of optical walls 21124 are connected in series, and each optical 21124 is configured to be a plane. In some embodiments, a set of second optical members 2112 may have only one set of optical walls 21124, and a cross-section of each optical wall is of an annular shape. The optical wall 21124 may be a slant which is aslant arranged against the baseplate 10. As shown in FIGS. 10 and 16, in one embodiment, a smooth transition is formed between two adjacent optical walls 21124, such as an arcuate transition, to prevent an angle between two adjacent optical walls 21124 from forming a dark area and to make a region between two adjacent optical walls 21124 have a better effect of reflection.

In an embodiment, the optical walls 21124 at least reflect part of light directly emitted by the first optical members 2111.

Please refer to FIG. 4. In the embodiment, the optical walls 21124 of two adjacent second optical members 2112 are connected through a first connecting wall 2113. At least part of light penetrating the second optical member 2112 is emitted from the first connecting wall 2113 to prevent the first connecting wall 2113 from form a dark area. The first connecting wall 2113 is greater than the optical wall 21124 in thickness to provide better connective strength. Also, thinned optical wall 21124 makes the optical wall 21124 have less light loss.

Figure 8:
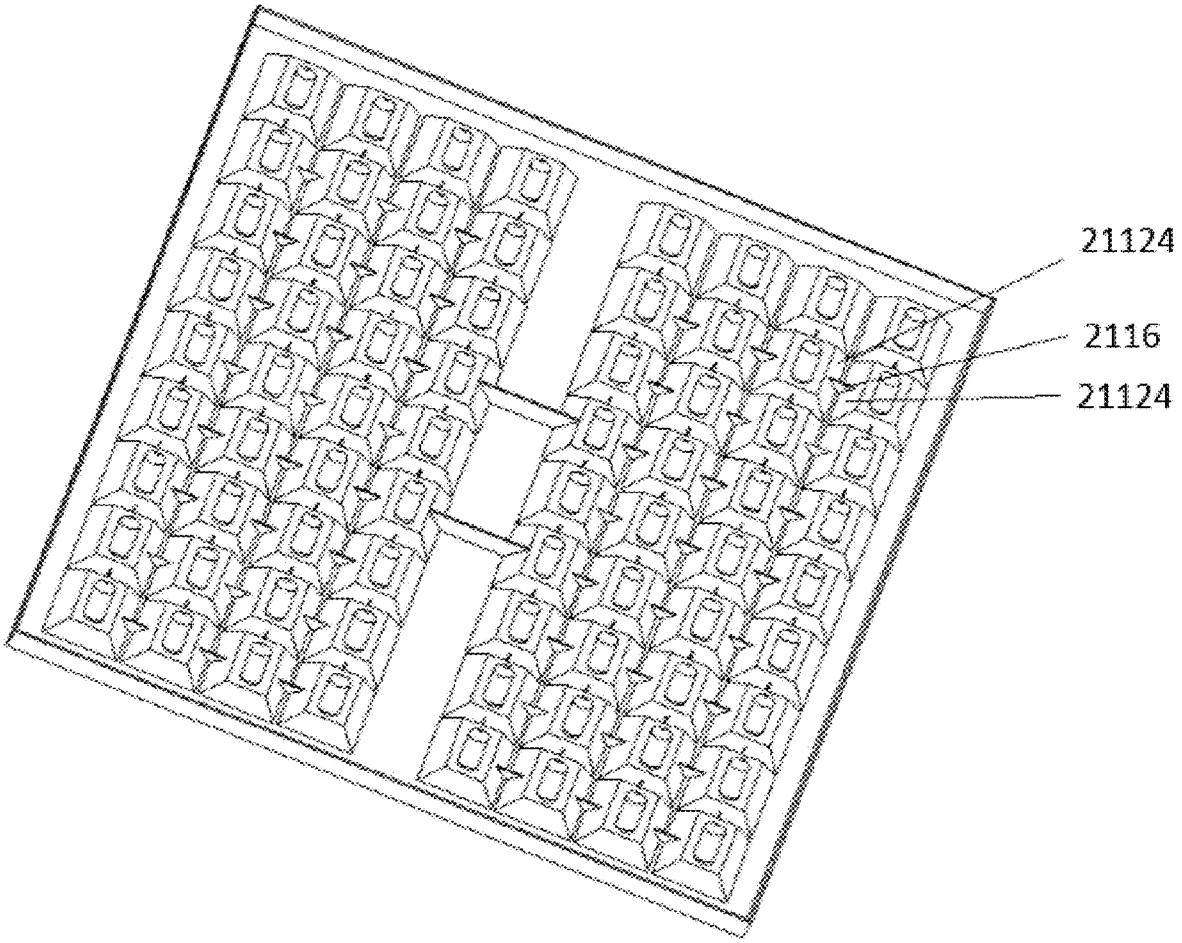
FIG. 8 is a perspective schematic view of the optical assembly.

Please refer to FIGS. 1 and 8. In the embodiment, the second optical member 2112 may be disposed with a reinforcement wall 2116 to improve the structural strength. In detail, the reinforcement wall 2116 is disposed between the optical walls 21124 of adjacent second optical members 2112. In other words, the optical walls 21124 between adjacent second optical members 2112 are connected through the reinforcement wall 2116. In the embodiment, the reinforcement wall 2116 is a thin wall structure.

Figure 5:
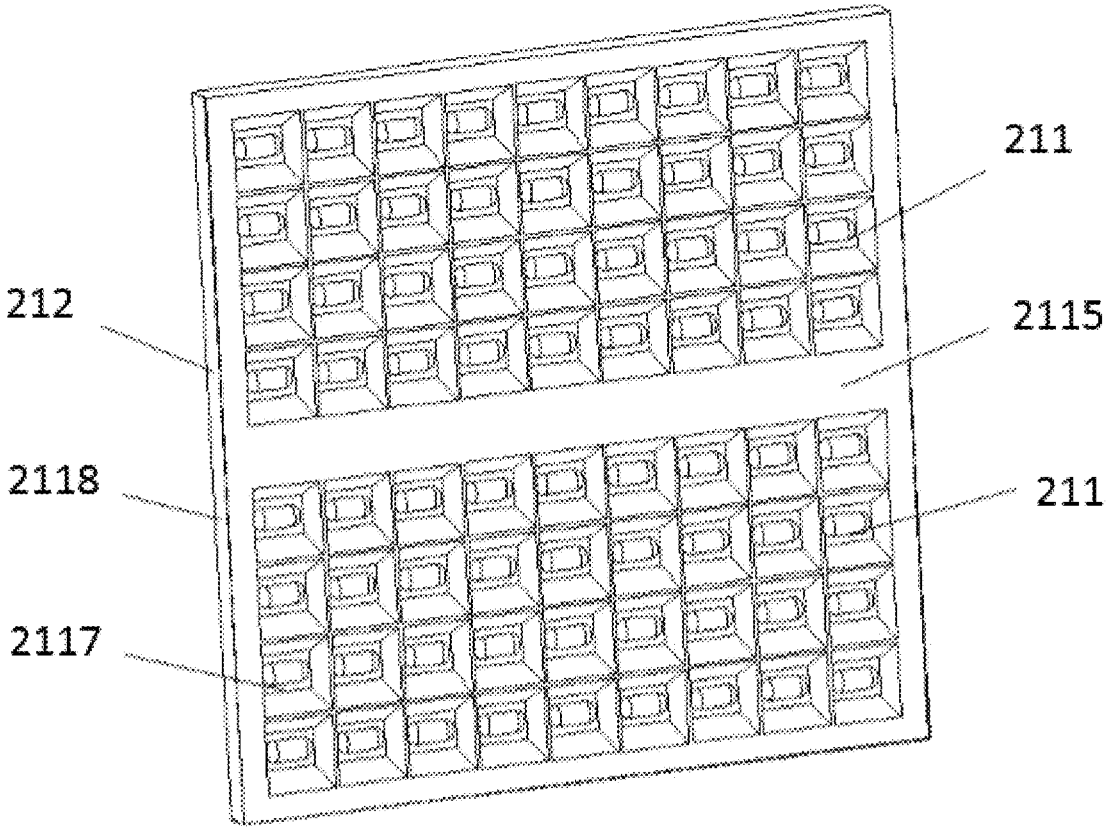
FIG. 5 is a perspective schematic view of an embodiment of the LED lighting device of the invention.

Please refer to FIGS. 1 and 5. In the embodiment, the optical unit 211 further includes a second connecting wall 2114. The installing unit 212 and adjacent second optical member 2112 are connected by the second connecting wall 2114. At least part of light penetrating the second optical member 2112 is emitted from the second connecting wall 2114 to prevent the second connecting wall 2114 from forming a dark area.

Figure 14:
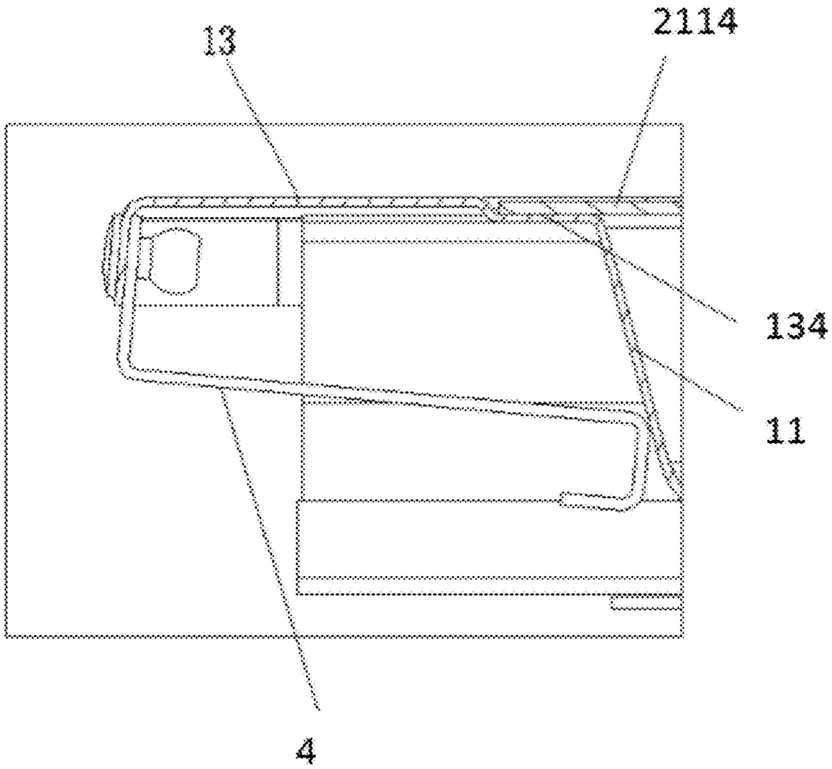
FIG. 14 is an enlarged view of part E in FIG. 12.

Please refer to FIGS. 12 and 14. In some embodiments, the second connecting wall 2114 is adjacent to the install end wall 13. And, a surface of the second connecting wall 2114 is substantially flush with the install end wall 13 to improve beauty. In the embodiment, the install end wall 13 is disposed with an indent 131. The second connecting wall 314 is placed in the storage section 134 to make a surface of the second connecting wall 2114 flush or substantially flush with the install end wall 13.

In the embodiment, a wall thickness of each of the first optical member 2111 and the second optical member 2112 is less than a wall thickness of the first connecting wall 2113 or the second connecting wall 2114. The first optical member 2111 is primarily used for light emitting of the light source component 20 (too much wall thickness will increase light loss). The second optical member 2112 is primarily used for reflection and light permeability (too much wall thickness will increase light loss). Both the first connecting wall 2113 and the second connecting wall 2114 are primarily used for structural connection which needs a certain strength. Thus, the abovementioned wall thicknesses can satisfy the demands in optics and structure.

In the embodiment, the optical assembly 211 is formed by an integrated structure.

Please refer to FIGS. 1 to 6. In the embodiment, the optical assembly 21 has a first region 2117 corresponding to the baseplate 10 of the seat 1 and a second region 2118 corresponding to the sidewall 11. The second region 2118 is used to connect the sidewall 11. In detail, the second region 2118 is disposed with the installing unit 212. In the embodiment, when the LED lighting device is working, the light source component 20 is lit, and at least 80% of the first region 2117 has light emission to obtain even light emitting. Furthermore, when the LED lighting device is working, the light source component 20 is lit, and at least 90% of the first region 2117 has light emission to obtain even light emitting. Furthermore, when the LED lighting device is working, the light source component 20 is lit, and the entire first region 2117 has light emission to obtain even light emitting.

In the embodiment, the first region 2117 may include the abovementioned first optical member 2111, second optical member 2112, first connecting wall 2113 and second connecting wall 2114.

Please refer to FIGS. 6 and 7. In the embodiment, the circuit board 202 may be multiple, and each circuit board 202 may be disposed with one or more sets of LED arrays 203. The embodiment further includes an electric connecting unit 204. The LED chips 201 on different circuit boards 202 are electrically connected by the electric connecting unit 204. In some embodiments, the electric connecting unit 204 adopts wires. In some embodiments, the electric connecting unit 204 adopts flexible circuit boards and the flexible circuit boards are fixed to the circuit boards 202 by soldering. In detail, the electric connecting unit 204 is affixed to the circuit boards 202 and is connected with the circuit boards 202 by soldering directly to implement electric connection. In some embodiments, the electric connecting unit 204 adopts PCB boards to perform connection.

Please refer to FIG. 5. In the embodiment, the optical unit 211 may be multiple, for example, two or four. Two adjacent optical units 211 are connected through the third connecting wall 2115. A receiving space is formed between the third connecting wall 2115 and the baseplate 10. The power source 3 is disposed in the receiving space. The power source 3 is disposed in the LED lighting device, in comparison with the power source 3 disposed outside the seat 1, the power source 3 does not occupy additional height space of the LED lighting device so as to reduce a height of the LED lighting device. In the embodiment, a height of the LED lighting device is less than 35 mm. Further, a height of the LED lighting device is less than 30 mm. Furthermore, a height of the LED lighting device is between 20 mm and 30 mm.

Figure 76:
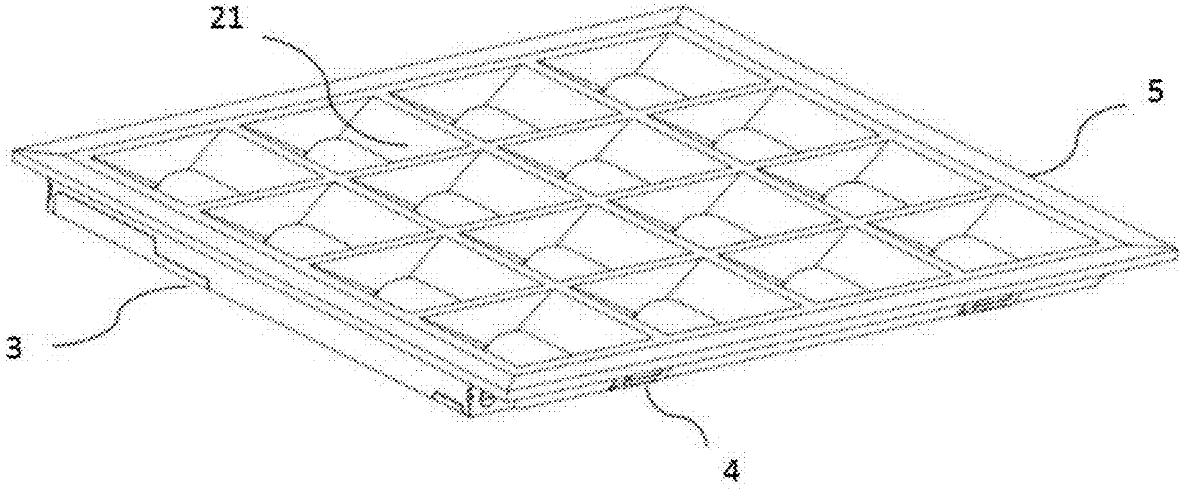
FIG. 76 is a front schematic view of an overall structure of the LED lighting device in some embodiments.

Please refer to FIG. 76 to FIG. 79. In an embodiment, the LED lighting device includes at least one power source 3, where the power source 3 is disposed outside the receiving space 12 formed by the baseplate 10 and the sidewall 11, and more specifically, it is disposed on the outer side of the sidewall 11 facing away from the receiving space 12. As shown in FIG. 76, the power source 3 is disposed on the sidewall 11 and is blocked by the install border 5 and the sidewall 11 in the light-emitting direction of the LED lighting device, that is, in a direction opposite to the light-emitting direction of the LED lighting device, the projections of the install border 5 and the sidewall 11 completely or at least partially cover the power source 3, and when it is completely covered, after the LED lighting device is installed in the use environment, the power source 3 cannot be observed, thereby increasing the aesthetic of the LED lighting device. On the other hand, the power source 3 is disposed in the redundant space formed on the outer side of the receiving space 12 by the sidewall 11 and the install boarder 5 due to the structural design; the redundant space is reused to dispose the power source 3, so that the size of the LED lighting device is not additionally increased; meanwhile, the power source 3 is disposed on the outer side of the sidewall 11, and heat generated during operation of the power source 3 can be directly dissipated by the external air environment, so that the heat dissipation of the device is improved, and the heat generated during operation of the power source 3 is prevented from affecting operation of other components of the LED lighting device.

Figure 77:
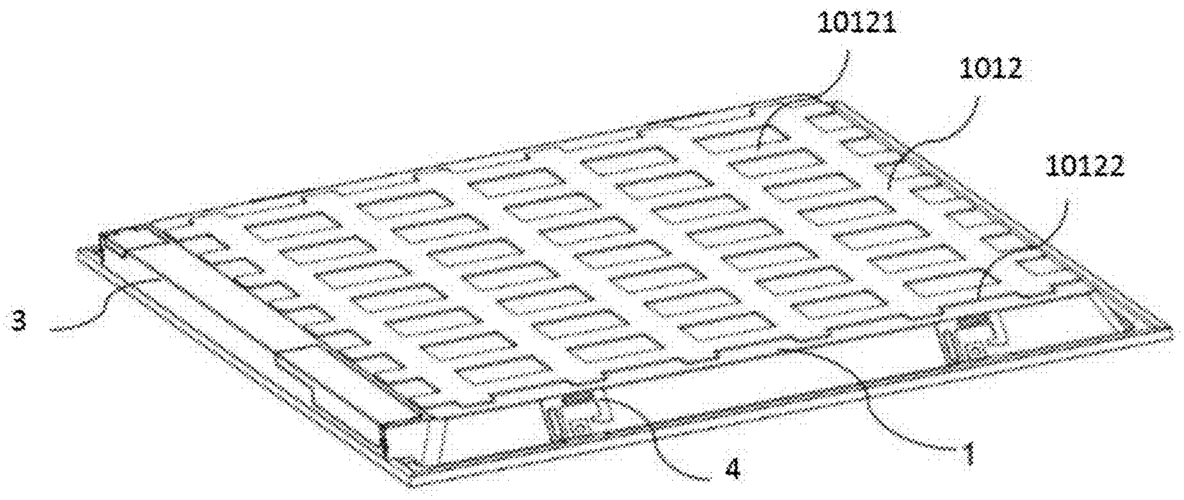
FIG. 77 is a back schematic view of an overall structure of the LED lighting device in some embodiments.

As shown in FIG. 77, the power source 3 is closely attached to the sidewall 11, the upper and lower boundary of the power source 3 do not exceed the baseplate 10 and the install border 5, the height of the power source 3 is less than or equal to the total height of the LED lighting device, and in the height direction, the power source is limited to the space formed by two planes where the maximum distance between the install border 5 or the optical member 21 and the baseplate 10 is located, that is, the space clamped by the plane where the maximum height of the install border 5 or the optical member 21 is located in the light-emitting direction and the plane where the bottom of the baseplate 10 is located in the direction opposite to the light-emitting direction. In this embodiment, the power source 3 is closely attached to the sidewall 11. The power source 3 includes a power source panel 31 and electronic components 32, and the electronic components 32 are disposed on the power source panel 31.

Figure 78:
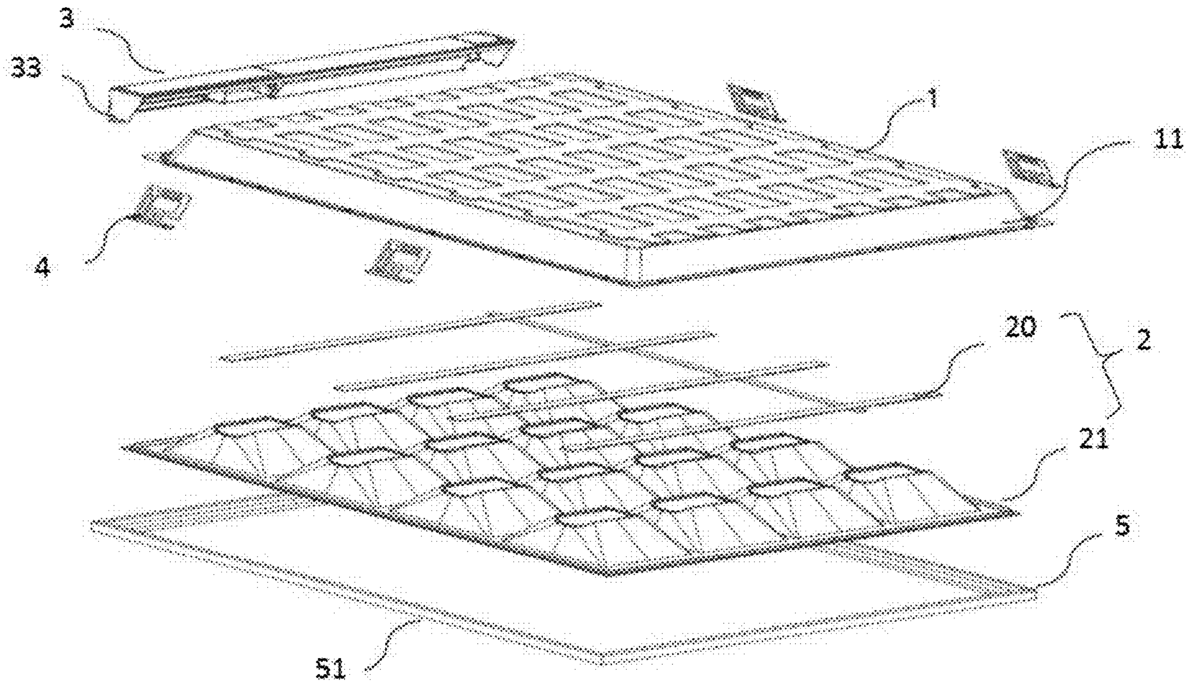
FIG. 78 is a back exploded view of an overall structure of the LED lighting device in some embodiments.

The power source 3 can further include a power source box 33 (as shown in FIG. 78). The power source box 33 is disposed on the outer side of the sidewall 11, and the power source box 33 is provided with an inclined surface matched with the sidewall 11 in inclination degree. The inclined surface is matched with the sidewall 11 to form a receiving space to receive the power source 3, the power source panel 31 and the electronic components 32. In this embodiment, the power source 3 can be disposed in the width direction or the length direction of the LED lighting device, and at least one power source 3 is provided. In an embodiment, the power source box 33 and the sidewall 11 at least share one surface, thereby reducing the cost of the lamp.

Figure 79:
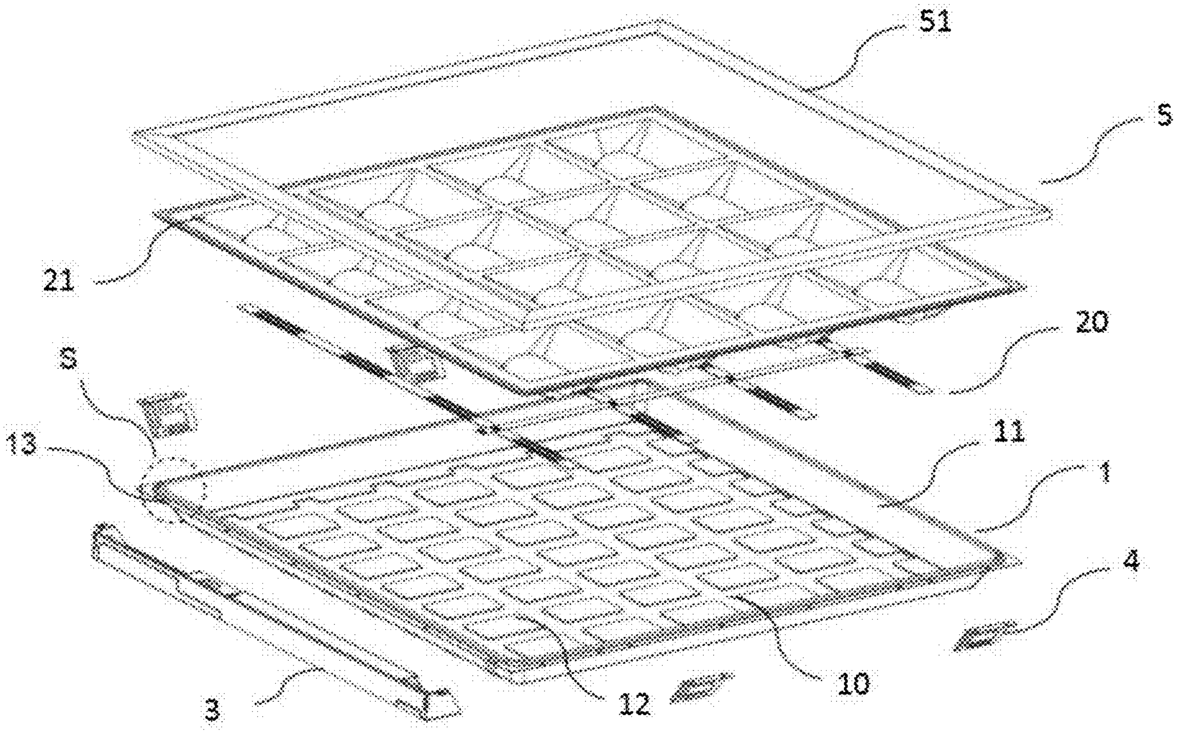
FIG. 79 is a front exploded view of an overall structure of the LED lighting device in some embodiments.

Please refer to FIG. 78 which is the exploded view of the LED lighting device in the forward direction (the light-emitting direction toward downwards) and FIG. 79 which is the exploded view of the LED lighting device in the reverse direction (the light-emitting direction toward upwards). As shown in FIG. 78 and FIG. 79, the LED lighting device includes the seat 1 serving as the install foundation. The seat 1 includes the baseplate 10 basically parallel with the horizontal plane and the sidewall 11 surrounding the baseplate 10. The included angle between the sidewall 11 and the baseplate 10 is greater than or equal to 90 degrees, and the receiving space 12 is formed by the baseplate 10 and the sidewall 11. The included angle between the sidewall 11 and the baseplate 10 is greater than or equal to 90 degrees. The install end wall 13 is disposed at one end of the sidewall 11 away from the baseplate 10, and the sidewall 11 continuously and integrally extends outwards in the direction substantially parallel to the baseplate 10 to form the install end wall 13.

Please refer to FIGS. 77, 78, 79 and 83. As shown in FIG. 77, the seat 1 is provided with the reinforcement unit 1012. The reinforcement unit 1012 includes first reinforcement structures 10121 and second reinforcement structures 10122, the baseplate 10 extends integrally or is stamped to form the first reinforcement structures 10121 and the second reinforcement structures 10122, which form protruding structures in the direction facing away from the light-emitting direction of the LEDs and form groove structures in the light-emitting direction of the LED lighting device. The protrusions and the grooves have certain heights relative to the baseplate 10, and the baseplate 10 has a three-dimensional spatial structure by means of the first reinforcement structures 10121 and the second reinforcement structures 10122, and the overall strength of the baseplate 10 is enhanced without increasing additional materials.

In the present application, the first reinforcement structures 10121 and the second reinforcement structures 10122 have cross points, that is, the first reinforcement structures 10121 and the second reinforcement structures 10122 are connected to each other. In addition, the first reinforcement structures 10121 and the second reinforcement structures 10122 protrude relative to the baseplate 10 in the direction opposite to the light-emitting direction of the LED lighting device and form the grooves in the light-emitting direction of the LED lighting device, and the grooves are connected and communicated with each other to form heat dissipation channels distributed in a net structure and covered most region of the baseplate 10. For example, in an embodiment, the net-shaped heat dissipation channels cover 50% or more of the area of the baseplate 10. Moreover, at the back of the baseplate 10, that is, on the side facing away from the light-emitting direction, the protruding net-shaped heat dissipation channels are provided, which can also be called heat dissipation protrusions or heat dissipation fins, thereby increasing the heat dissipation area of the LED lighting device, and improving the heat dissipation efficiency of the LED lighting device.

In an embodiment of the present application, the first reinforcement structures 10121 and the second reinforcement structures 10122 are perpendicular to each other.

Figure 83:
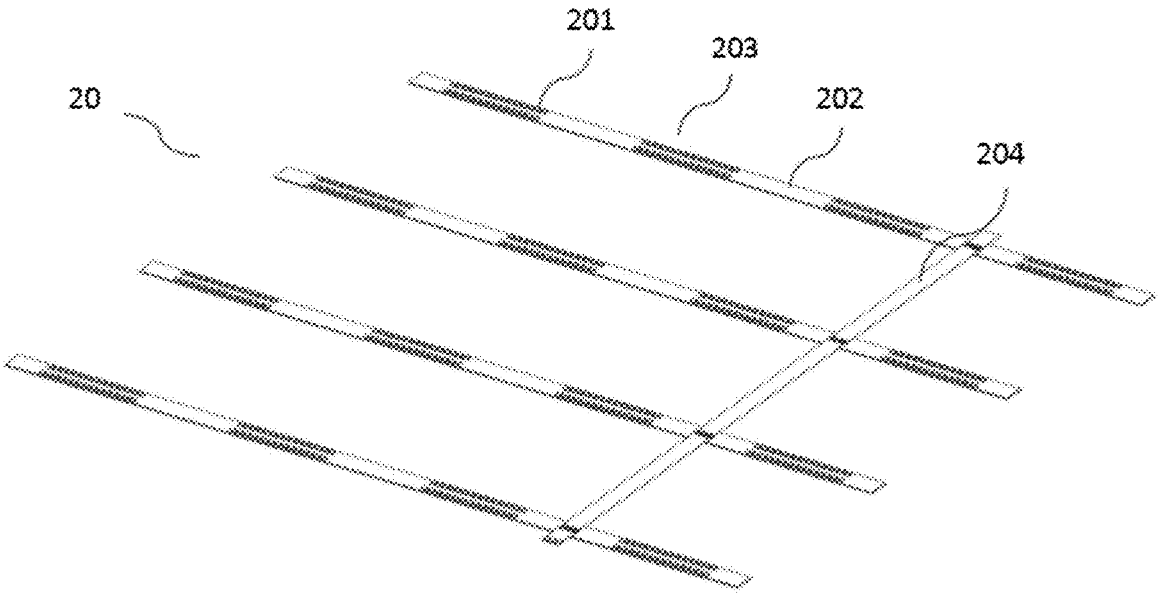
FIG. 83 is a schematic view of the light source in some embodiments.

Please refer to FIGS. 78, 79 and 83. The LED lighting device further includes light source component 20, where the light source component 20 includes a plurality of LED arrays 203. Each LED array 203 includes at least one LED chip 201, and the LED chips 201 (LED arrays 203) are fixed to the circuit board 202. The circuit board 202 is fixed to the baseplate 10 of the seat 1, and the circuit board 202 can be disposed in the groove formed by the reinforcement unit 1012. In an embodiment, the circuit board 202 can be directly disposed on the baseplate 10 without being disposed in the groove formed by the reinforcement unit 1012. In some embodiments, the circuit board 202 is directly fixed to the baseplate 10 of the seat 1 by means of bonding. In some embodiments, the light source component 20 can be clamped on the baseplate 10 of the seat 1 through the circuit board 202. In some embodiments, the light source component 20 can be directly fixed to the baseplate 10 of the seat 1 by means of soldering. In the above embodiments, the light source component 20 and the baseplate of the seat 1 form the heat conduction path to enable the heat generated by the LED chips 201 during operation to be rapidly conducted to the seat 1 and dissipated by the seat 1 to improve the heat dissipation efficiency.

In an embodiment of the present application, each LED array 203 at least includes two sorts of LED chips 201, and the at least two sorts of LED chips can implement at least two dimming and color regulating functions. For example, dimming and color regulation of the LED lighting device are controlled by controlling the at least two rows of LED chips 201 having different functions in the LED array 203.

In an embodiment of the present application, the light source component 20 is provided with at least two sets of LED arrays 203 having different functions, that is, a single LED array 203 has a single function. However, at least two kinds of single LED arrays 203 having the different functions are included, and dimming and color regulation of the LED lighting device are achieved by controlling the different LED arrays.

In an embodiment, the adjacent LED chips 201 are staggered, thereby meeting the lighting requirement while reducing the power consumption.

Figure 80:
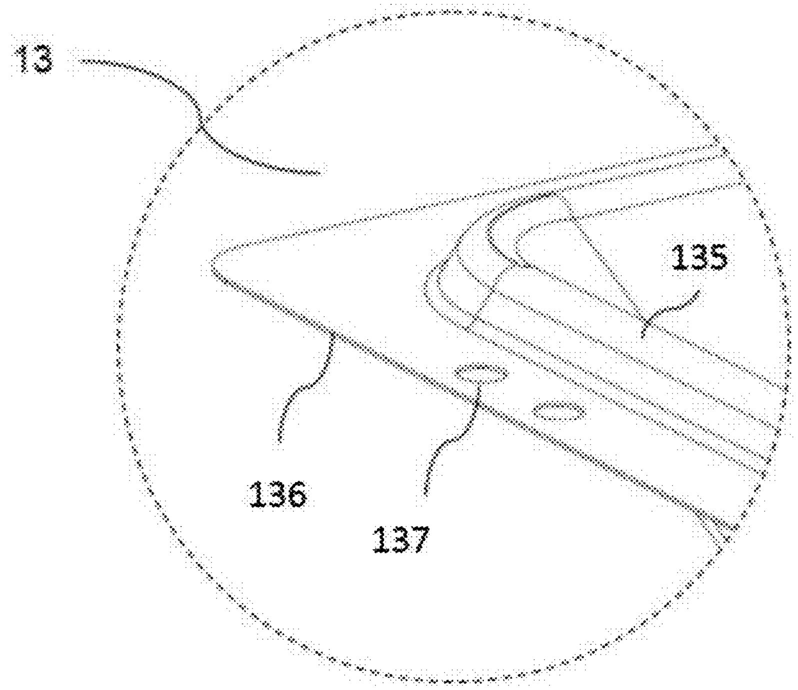
FIG. 80 is an enlarged view of part S in FIG. 79.

Please refer to FIG. 80. FIG. 80 is the enlarged view of part S in FIG. 79. The enlarged view is the partially enlarged view of the install end wall 13. As shown in the drawing, the install end wall 13 includes a bearing portion 136 parallel or substantially parallel to the baseplate 10. The bearing portion 136 is provided with a through hole 137, and the through hole 137 is used for disposing a fixing member such as a screw, a bolt or a rivet for fixing other components of the LED lighting device such as the power source 3, the optical member 21 or the install border 5. The bearing portion 136 can be used for bearing the install border 5 (or the support elements 51), the optical member 21 or other components of the LED lighting device. It should be noted that the install end wall 13 further includes a limiting portion 135 with the height greater than that of the bearing portion 136 in the light-emitting direction. An extension portion 120 of the sidewall 11 is bent to form the limiting portion 135. The limiting portion and the bearing portion 136 are integrally formed, and the limiting portion 135 is an arc-shaped protrusion in the horizontal direction and surrounds the baseplate 10.

Figure 81:
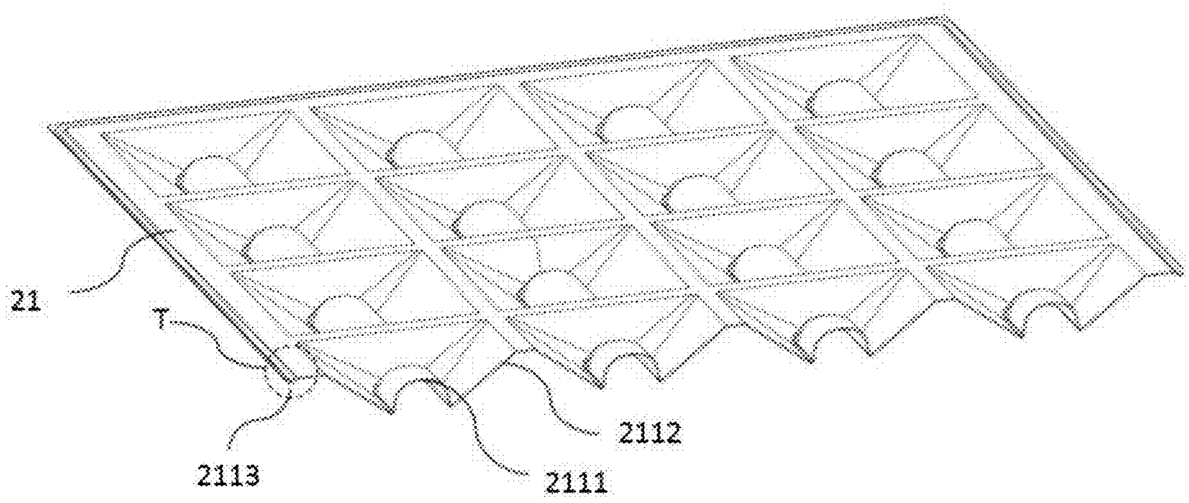
FIG. 81 is a sectional schematic view of the optical member in some embodiments.

Please refer to FIG. 81. FIG. 81 is the sectional schematic view of the optical member 21 in an embodiment of the present application. As shown in FIG. 81, the optical member 21 includes a plurality of first optical members 2111 and second optical members 2112 disposed in arrays, where the first optical members 2111 are round or oval, or protrude in a certain direction to form a hollow structure, thereby forming an open cavity. The outer edge of the optical member 21 is provided with a first connecting wall 2113 surrounding the optical member 21, and the optical member 21 extends integrally to form the first connecting wall 2113 which is substantially parallel to the baseplate 10. A positioning portion 21131 corresponding to the limiting portion 135 is disposed on the edge of the first connecting wall 2113, and the positioning portion 21131 is located on the outer side of the limiting portion 135 in the direction of the projection in the light-emitting direction and is formed by bending the first connecting wall 2113.

Figure 82:
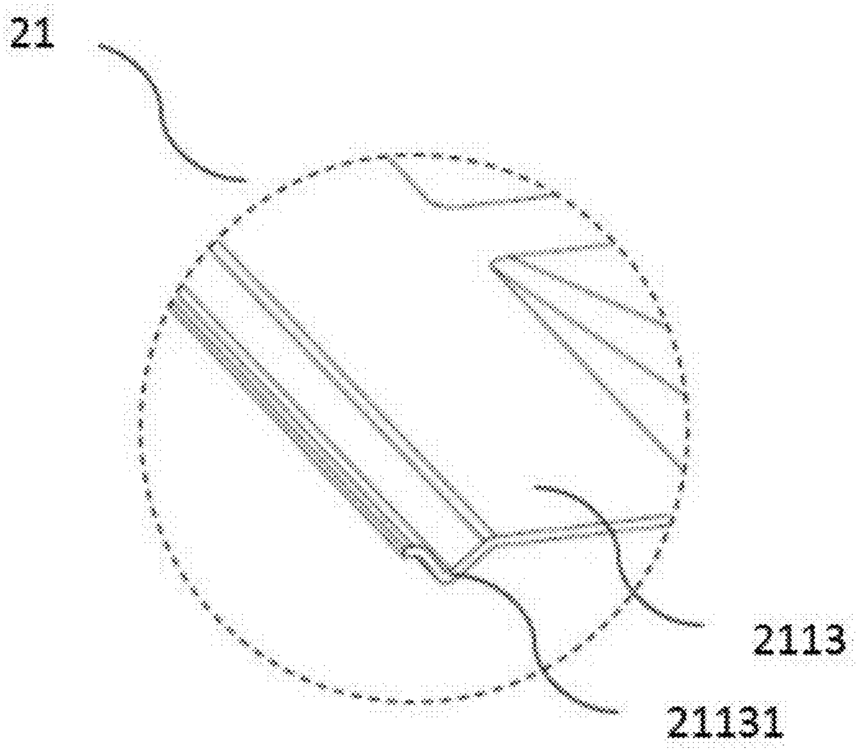
FIG. 82 is an enlarged view of part T in FIG. 81.

Please refer to FIG. 82. FIG. 82 is the partially enlarged view of part T in FIG. 81 and is used for relatively clearly introducing the structure of the positioning portion 21131. As shown in the drawing, the outer edge of the first connecting wall 2113 is provided with the substantially arc-shaped positioning portion 21131 protruding towards the first optical members 2111 or the baseplate 10. In the installing process, the optical member 21 is stacked on the seat 1 and the first connecting wall 2113 is borne by the install end wall 13. The positioning portion 21131 of the first connecting wall 2113 is attached to the limiting portion 135 of the end wall, and the positioning portion 21131 is located at the outer side and the limiting portion 135 is located at the inner side, thereby rapidly aligning the optical member 21 and the seat 1. In one embodiment, in the light-emitting direction, at least part of the limiting portion 135 and at least part of the positioning portion 21131 overlap with each other in the height direction, thereby reducing the overall height of the LED lighting device.

In this embodiment of the present application, the first optical members 2111, the second optical members 2112, the first connecting wall 2113 and the positioning portion 21131 of the optical member 21 are integrally formed, for example, of plastic materials in the integrated injection molding, thermoplastic forming, blister forming and hot-press molding manner, and the light transmittance is greater than or equal to 50%, and is further greater than or equal to 80%. Of course, the optical member can also be made of other common light-transmitting materials, such as acrylic or glass.

Please refer to FIG. 83, which is a brief schematic view of the light source component 20 in an embodiment of the present application. The light source component 20 includes the circuit boards 202 and at least one LED array 203 disposed on the circuit boards 202, and each LED array 203 includes at least one LED chip 201. The circuit boards 202 are connected by means of the electric connecting unit 204. In the embodiment of the present application, the electric connecting unit 204 is an FPC. In other embodiments, the electric connecting unit 204 may also be a PCB, a metal sheet/foil (such as a copper sheet/foil, an aluminum sheet/foil, and a silver sheet/foil), a lead and a wire.

Figure 84:
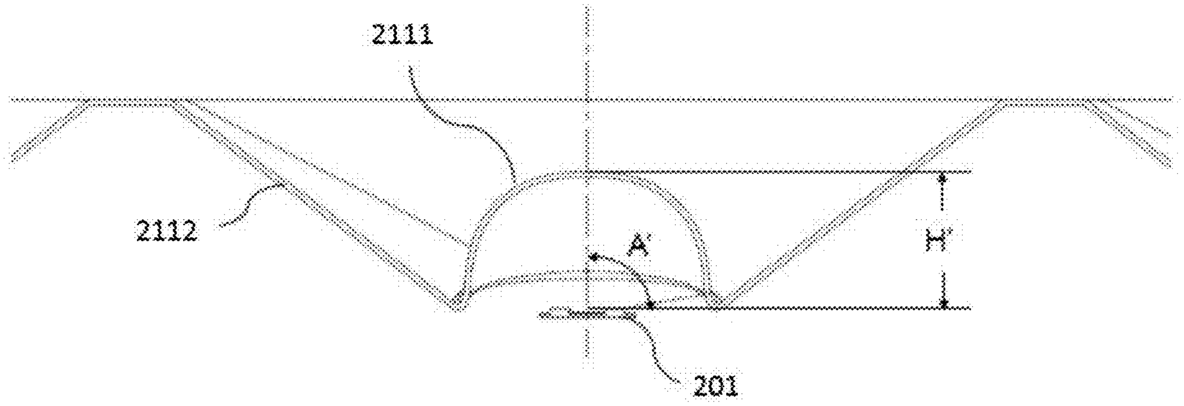
FIG. 84 is a schematic view of the positional relationship of the LED chips and the optical member in some embodiments.

Please refer to FIG. 84. FIG. 84 is the schematic view of the positional relationship between the LED chips and the optical member in an embodiment of the present application. As shown in the drawing, the LED chips 201 or the LED arrays 203 disposed on the circuit boards 202 are covered by the first optical members 2111, that is, the first optical members 2111 and the baseplate 10 form a space for receiving the LED chips 201. In the embodiment of the present application, two rows of LED chips 201 are arranged on the circuit board 202. The midpoints of the two parallel LED chips 201 serve as the center line, the distance from the center line to the outermost layer that can be irradiated by one LED chip 201 serves as the boundary, a single-side irradiation angle A' exists, and the angle A' is 60-80 degrees. The distance between each LED chip 201 and the first optical member 2111 in the light-emitting direction of the LED chip is H', and H' is in the range of 16-20 mm, and is preferably 19.2 mm. In the embodiment, the maximum light-emitting angle of the LED arrays 203 can reach 160 degrees, and after light emitted by the LED arrays 203 is diffused or reflected by the first optical members 2111 and is reflected by the second optical members 2112, the final light-emitting angle can be greater than 160 degrees, for example, 165 degrees, 170 degrees and 175 degrees, thereby increasing the light-emitting angle and uniformity. Meanwhile, the UGR of the LED lighting device is less than or equal to 22, the UGR value is the unified glare rating and can be used for evaluating the lighting quality to a certain extent, and the calculating method of the unified glare rating is as $$UGR = 8\log\frac{0.25}{L_b}\sum\frac{L_a^2\cdot\omega}{P^2}$$

where, Lb is the background luminance in the unit of cd/m2; ω is the solid angle formed by the light-emitting portion of each lamp on the eye of the observer in the unit of sr; Lα is the luminance of the lamp in the direction of the eye of the observer in the unit of cd/m2; and P is the position index of each separate lamp.

In the present application, Lb, ω, Lα and P are controlled by controlling the light intensity, the shape of the light-emitting surface and the thickness of the lamp, thereby controlling the unified glare rating (that is, the UGR value) of the lamp, and ensuring the light-emitting quality and use comfort level of the lamp. With regard to the solid angle, the observation point (that is, the eye) serves as the center of sphere, a unit sphere is constructed, and the projection area of any object projected onto the unit sphere is the solid angle of the object relative to the observation points.

Figure 85:
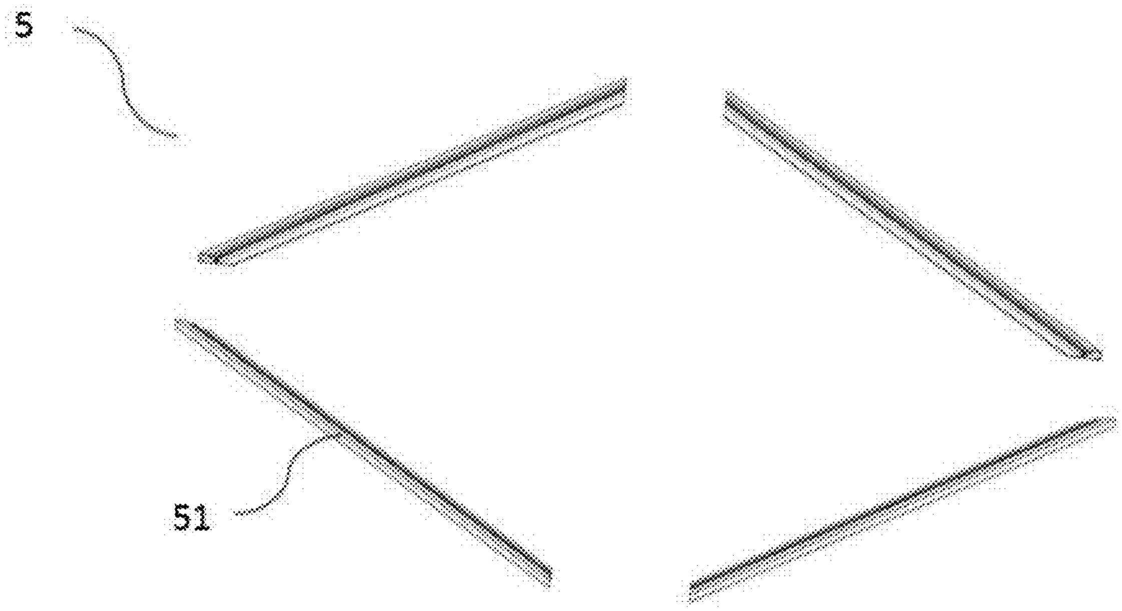
FIG. 85 is an exploded view of the installing unit in some embodiments.

Please refer to FIG. 85. FIG. 85 is the exploded schematic view of the install border 5. In the embodiment of the present application, the install border 5 is composed of four support elements 51. Each support element 51 is a strip-shaped structural element with two ends being inclined edges, and each inclined edge has an angle of 45 degrees, that is, the support element 51 is trapezoidal. The support elements 51 are connected end to end, and the four support elements form a rectangle, that is, inclined surface at one end of each support element 51 are combined with the inclined surface at one end of another support element 51 to form a right angle.

Figure 86:
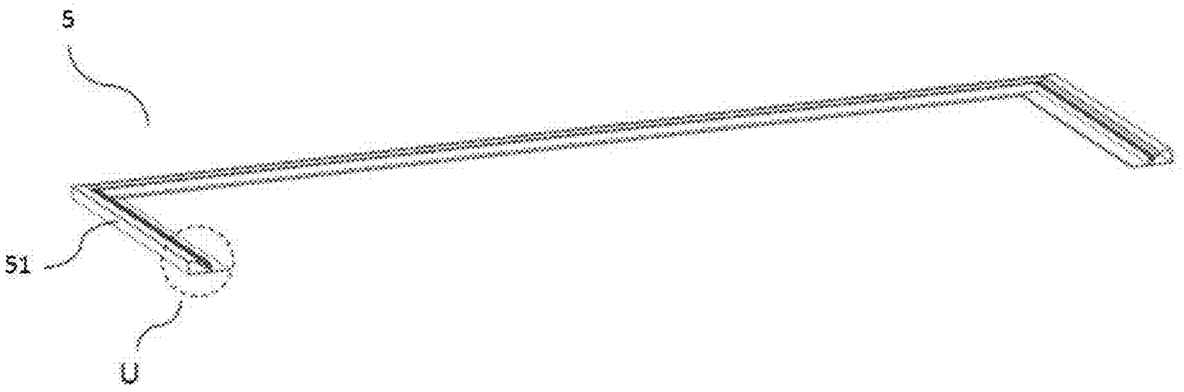
FIG. 86 is a sectional schematic view of the installing unit in some embodiments.

FIG. 86 is the sectional schematic view of the install border 5 in an embodiment of the present application. Each support element 51 forming the installing unit is provided with at least one step structure, and the step structure is matched with the limiting portion 135 and the positioning portion 21131 to achieve the fixing between the seat 1 and the optical member 21 of the LED lamp.

Figure 87:
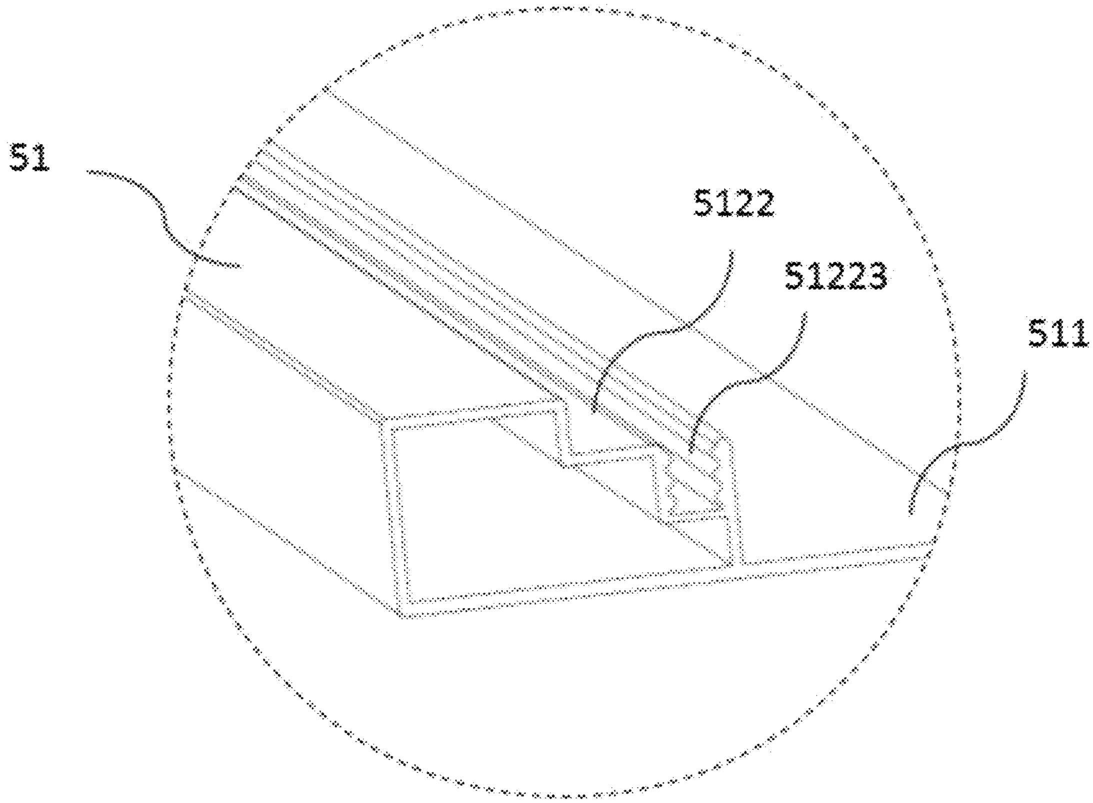
FIG. 87 is an enlarged view of part U in FIG. 86.
Figure 88:
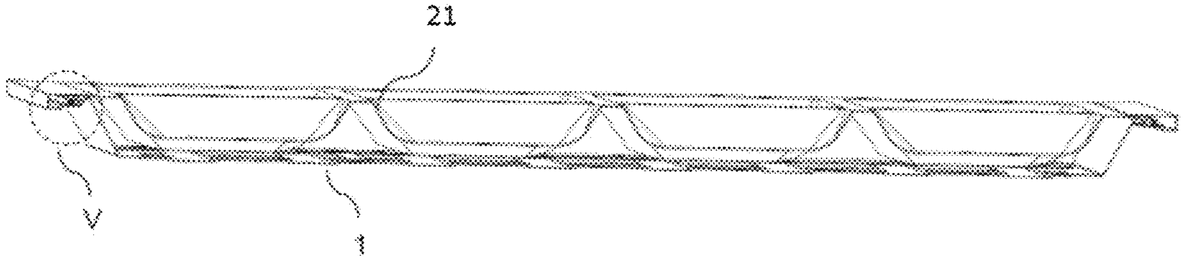
FIG. 88 is a sectional view of the LED lighting device in some embodiments.
Figure 89:
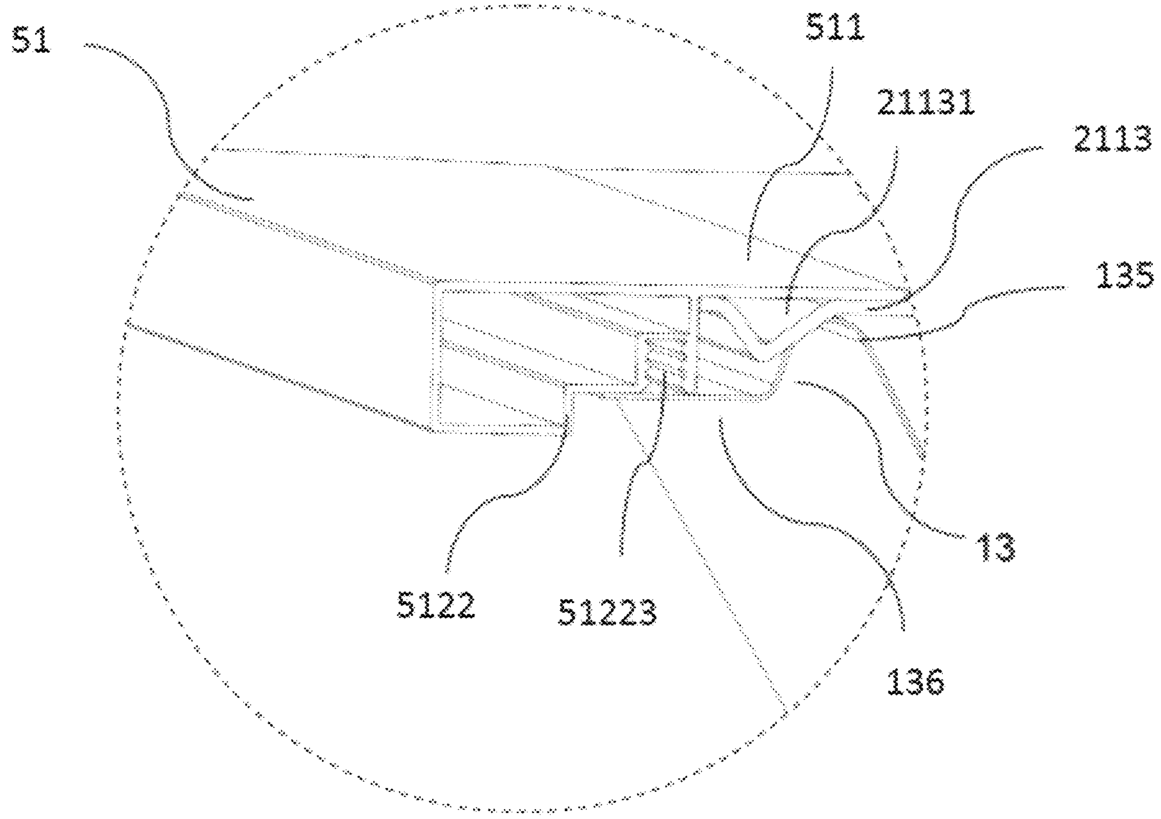
FIG. 89 is an enlarged view of part V in FIG. 88.

Please refer to FIGS. 87, 88 and 89. FIG. 87 is the partially enlarged view of part U in FIG. 86. FIG. 88 is the sectional schematic view of the LED lighting device in an embodiment of the present application. FIG. 89 is the partially enlarged view of part V in FIG. 88. Each support element 51 includes a first wall 511, the first wall 511 faces away from the light-emitting direction of the LED lighting device after the LED lighting device is assembled, the first wall 511 is provided with a plurality of step structures 5122, each step structure 5122 is further provided with at least one locking groove 51223, and the step structures 5122 are arranged in the width direction of the support element 51 or the first wall 511 and extend in the length direction of the support element 51.

The optical member 21 is clamped and fixed by the support elements 51 and the install end wall 13 of the sidewall 11 of the seat 1. Please refer to FIG. 89 for the details. As shown in FIG. 89, the seat 1 serves as the installing foundation of the LED lighting device, the optical member 21 is stacked on the seat 1, the first connecting wall 2113 of the optical member 21 is borne on the install end wall 13 of the seat 1, the positioning portion 21131 is snap-fitted with the limiting portion 135, the limiting portion 135 is located on the inner side of the positioning portion 21131, the limiting portion 135 is directly formed by the seat 1, and in the assembling process, the movement of the optical member 21, for example, the transverse shifting, can be effectively limited. At least a part (such as the first extension wall 51222 described hereinafter) of the wall of the step structure 5122 of the install border 5 perpendicular to the first wall 511 abuts against the outer edge (that is, the end of the bearing portion 136 away from the lamp body) of the bearing portion 136, the bearing portion 136 is packaged to a certain extent, a part is disposed on the surface of the bearing portion 136, meanwhile, the locking groove 51223 corresponds to the through hole 137 in the bearing portion 136, the inner wall of the locking groove 51223 is provided with a locking thread, and the screw, bolt or rivet reaches the locking groove 51223 through the through hole 137 to fix the install border 5 to the install end wall 13. A part of the first wall 511 of the install border 5 covers the optical member 21 and completely covers the positioning portion 21131, and when the fixing structure of the screw, bolt or rivet fixes the install border 5, the install border 5 has a pressure facing the end wall 13, that is, the first wall 511 presses the optical member 21, thereby fixing the seat 1, the optical member 21 and the install border 5.

The positioning portion 21131 is of a groove structure. In another embodiment of the present application, the groove structure can be filled with a sticky material for bonding the optical member 21 and the first wall 511 of the install border 5.

Please refer to FIGS. 46-53. In some embodiments, the difference of the width of the third connecting wall 2115 and the width of the first connecting wall 2113 does not exceed 15 mm, 12 mm, 10 mm or 8 mm. When the difference of the width of the third connecting wall 2115 and the width of the first connecting wall 2113 is controlled in the abovementioned range, the overall consistency of the optical member 21 will be better and the visual effect can be improved.

Please refer to FIGS. 46-53. The electric source 3 is extendedly to be disposed along the length direction of the LED lighting device. And the power source 3 may be disposed at the middle area in the width direction of the LED lighting device. Because the power source 3 possesses a certain structural strength, it can further enhance the structural strength of the seat 1 when being disposed on the seat 1. The power source 3 is located at the position between the corresponding optical walls 21124 of two sets of the second optical members 2112.

The power source 3 includes a power source circuit board 31 and electronic components 32 disposed on the power source circuit board 31. The power source circuit board 31 may be directly or indirectly attached on the front of the seat 1.

The power source 3 may further include a power source box 33 disposed on the front of the seat 1. A receiving space is formed between the power source box 33 and the seat 1 for accommodating the power source circuit board 31 and the electronic components 32.

The 3 power source 3 is disposed between two sets of the light sources component 20. The outside of the power source box 33 is disposed with a light redirecting unit 331 for redirecting the light emitted from the light source component 20 to the power source box 33 to make the light emitted from the LED lighting device, so as to reduce the light absorption of the power source 3 and improve the light emitting efficiency. The light redirecting unit 331 is equipped with functions of reflection and/or light diffusion.

In some embodiments, the outer surface of the power source box 33 directly forms the light redirecting unit 331.

In the embodiment, the outside of the power source box 33 is disposed with an independent element to form the light redirecting unit 331. The length of the power source box 33 is configured to account for less than half of the length of the LED lighting device. The length of the light redirecting unit 331 is greater than the length of the power source box 33. Further, an end of the light redirecting unit 331 in the length direction matches with (abuts against) a side of the seat 1 and the other end matches with (abuts against) the other side of the seat 1. Such an arrangement of the light redirecting unit 331 can prevent the power source 3 from affecting local light emission of the optical member 21.

Please refer to FIGS. 46-53. An interval is kept between the light redirecting unit 331 and the optical member 21. The interval forms a light channel 3311 with a minimum distance of 2.5 mm. In other words, a distance between any point on the light redirecting unit 331 and the any point on the optical member 21 is greater than or equal to 2.5 mm. Reflection and diffuse reflection of the light in the light channel 3311 will be affected if the interval is too small. The shortest distance between any point on the light redirecting unit 331 and the any point on the optical member 21 is not greater than 12 mm to be advantageous to the control of the overall size of the LED lighting device.

Please refer to FIGS. 46-53. The light channel 3311 includes a first light channel 33111 and a second light channel 33112 communicating therewith. The first light channel 33111 is formed between a lateral side 3312 of the light redirecting unit 331 and the optical wall 21124 of the second optical member 3112. The lateral side 3312 of the light redirecting unit 331 is parallel or substantially parallel to the optical wall 21124 of the second optical member 2112. The second light channel 33112 is formed between a top surface 3313 of the light redirecting unit 331 and the third connecting wall 2115. The top surface 3312 of the light redirecting unit 331 is parallel or substantially parallel to the third connecting wall 2115. In the embodiment, the interval between the lateral side 3112 of the light redirecting unit 331 and the optical wall 2112 of the second optical member 2112 is less than the interval between the top surface 3313 of the light redirecting unit 331 and the third connecting wall 2115 to allow more light to pass the second light channel 33112 and to emit from the third connecting wall 2115 so as to reduce the dark area formed by the third connecting wall 2115.

The electronic components 32 have length sizes, width sizes and height sizes. Please refer to FIG. 52. The electronic components 32 have at least two different kinds whose length size is greater than the width size. The length direction of the electronic components 32 is extendedly disposed along the length direction of the circuit board 202 to reduce the width required by installing the whole power source 3. The two kinds of electronic components 32 may include an electrolytic capacitor and a transformer. The length size of at least part of electronic components 32 (capacitors, ICs or resistors) is greater than the width size, and the length direction of the electronic components 32 is extendedly disposed along the width direction of the circuit board 202, so as to reduce the length required by installing the whole power source 3 to be advantageous to the control of the length size of the power source 3. The height size of at least part of electronic components 32 (such as transformers, capacitors or resistors) is less than the width size, and the height direction of the electronic components 32 is extendedly disposed along the thickness direction of the circuit board 202, so as to reduce the height of the whole power source 3 to reduce the impact on the light emission caused by installing the power source 3.

Please refer to FIGS. 52 and 54-56. In some embodiments, the length size of the power source 3 accounts for greater than one fifth of the length size of the LED lighting device. In an embodiment, the length size of the power source 3 accounts for greater than two fifths of the length size of the LED lighting device. The size of the power source 3 described here may be the length of the power source circuit board 31 (the size of the power source circuit board 31 in the length direction of the circuit board 202), may also be the size between the most lateral two of the electronic components 32 on both sides of the circuit board 202 in the length direction (the size includes these two electronic components 32 themselves). As a result, the power source 3 can be distributed on a wider area of the seat 1 to match with larger area of the seat 1 to be advantageous to improvement of the cooling performance.

Please refer to FIGS. 52 and 54-56. The power source circuit board 31 has a first side 311 and a second side 312. The first side is a side which is attached on or corresponds to the bottom of the power source box 33. The bottom of the power source box 33 is attached on the seat 1. The second side is the other side of the power source circuit board 31, which is opposite to the first side 311. In the embodiment, both the first side 311 and the second side 312 are disposed with the electronic components 32. The electronic components 32 on the first side 311 include one or more heat generating components 321 (such as resistors and ICs). The heat from the heat generating components 321 on the first side 311 when working can be rapidly transferred to the power source box 33 and dissipated by the seat 1. At least one heat generating component 321 on the first side 311 may be in contact with the bottom of the power source box 33 to form a heat conduction path so as to improve the cooling efficiency. In some embodiments, the distance between any one of the electronic components 32 on the first side 311 and the bottom of the power source box 33 is not greater than 4 mm or 3.5 mm so as to further improve the heat transfer efficiency between the electronic components 32 and the power source box 33.

In some embodiments, the power source box 33 adopts metal material to be advantageous to more rapidly transferring the heat from the heat generating components 321 to the power source box 33 and then to the seat 1.

Please refer to FIGS. 52 and 54-56. The first side 311 is disposed with a heat conduction material 3111. The heat conduction material 3111 is a material with high thermal conductivity (such as iron, aluminum, copper, tin or their alloy) or has thermal conductivity which is at least greater than the thermal conductivity of the power source circuit board 31. For example, the heat conduction material 3111 adopts tin or thermal conductive glue, and the power source circuit board 31 adopts a non-metallic plate such as a glass plate or epoxy resin plate, the thermal conductivity of the heat conduction material 3111 is greater than the thermal conductivity of the power source circuit board 31. The electronic components 32 on the second side 312 include heat generating elements 322 (such as transformers, inductors and ICs). The heat generating elements 322 on the second side 312 and the heat conduction material 3111 form a heat conduction path. In some embodiments, the heat generating elements 322 on the second side 312 are connected to the heat conduction material 3111 by their conductive pins and form heat conduction paths. The heat conduction material 3111 can transfer heat to the bottom of the power source box 33 through heat radiation or heat conduction.

Please refer to FIGS. 52 and 54-56. In some embodiments, the electronic components 32 on the first side 311 (particularly, the heat generating components 321) is greater than the electronic components 32 on the second side 312 (particularly, the heat generating elements 321) in amount. Because the electronic components 32 on the first side 311 are more adjacent to the power source box 33, heat can be more rapidly dissipated to improve the overall cooling efficiency of the power source 3.

Please refer to FIGS. 52 and 54-56. In some embodiments, on the second side 312 of the power source circuit board 31, the number of the electronic components 32 arranged per unit length (such as per 10 mm length) is less than 1, 0.9, 0.8 or 0.7. Under the condition of the width of the power source circuit board 31 being limited (if the width increases, the power source box 33 increases correspondingly, the light emission will be affected), the disposing density of the electronic components 32 in the length direction of the power source circuit board 31 can be controlled to be advantageous to the interval control between the electronic components 32 so as to reduce the mutual heat influence between the electronic components 32 (particularly, the heat generating elements). In addition, by the proper arrangement of the heat generating elements, the heat influence can be further reduced. For example, when the same side of the power source circuit board 31 (the first side 311/the second side 312) includes multiple electronic components 32 which generate high heat during work, these electronic components 32 which generate high heat can be disposed on the same side without adjacency, for example, other electronic components 32 (components which generate low heat and are not easy to be affected by heat, such as capacitors) can be disposed therebetween. This manner can further reduce the influence to the lamp because of the high heat of the electronic components 32 during work.

Please refer to FIGS. 10 to 14. In one embodiment, the power source 3 may also be disposed on the back of the baseplate 10. At this time, it is unnecessary to provide a receiving space in the optical unit 211, i.e., the third connecting wall 2115 is not necessary (as shown in FIGS. 3 and 5). This makes the continuity of the optical unit 211 better and enhances the effect of light emitting and appearance beauty.

In one embodiment, the seat 1 is further disposed with an install end wall 13. The install end wall 13 is formed on a periphery of the seat 1 and with connecting to the sidewall 11. The install end wall 13 and the baseplate 10 are parallel or substantially parallel to each other. The sidewall 11 and the install end wall 13 form a receiving space (there is a height difference between the install end wall 13 and the baseplate 10, at least part of the power source 3 is disposed in the height difference). At least part of the power source 3 in a height direction is located in the receiving space to reduce the height space of the LED lighting device occupied by the power source 3.

In one embodiment, at least half of the power source 3 in a height direction is located in the receiving space. A length of the power source 3 accounts for more than 80%, 85%, 90% or 95% of a length of the seat 1. Thus, the power source 3 can increase the structural strength of the seat 1 in a length direction.

Please refer to FIGS. 21 to 24. In one embodiment, the power source 3 is disposed between the seat 1 and the optical member 21. In detail, a surface of the seat 1 is outward (toward the back of the seat 1) formed with a bottom groove 101, the bottom groove 101 is formed with a bottom groove cavity 1013 on a front side of the seat 1, and part or all of the power source 3 is located in the bottom groove cavity 1013. Further, the seat 1 may be disposed with a groove cavity cover 102 which cloaks the bottom groove cavity 1013 so as to form a receiving space between the bottom groove cavity 1013 and the groove cavity cover 102. The power source 3 is located in the receiving cavity 1014. The groove cavity cover 102 protrusively disposed on a front side of the seat 1. Thus, the receiving cavity 1014 is greater than the bottom groove cavity 1013 in volume.

In the above embodiments, the electric power source 4 is not necessary to additionally provide an independent power source box to simplify structure and reduce costs.

Figure 26:
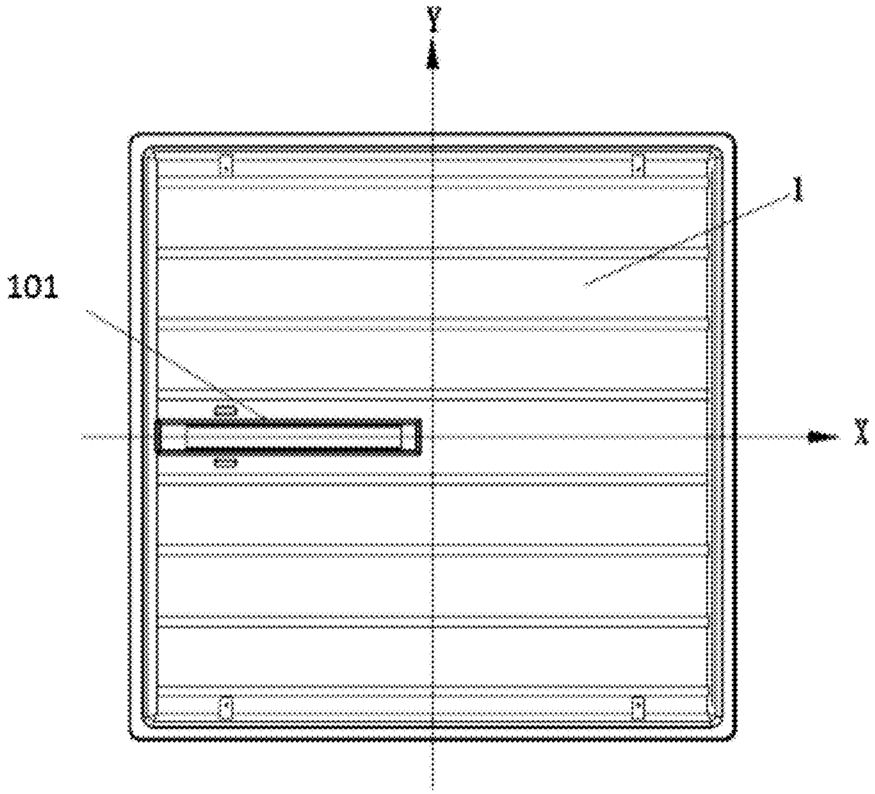
FIGS. 26-28 are front schematic views of some embodiments of the LED lighting device of the invention.
Figure 27:
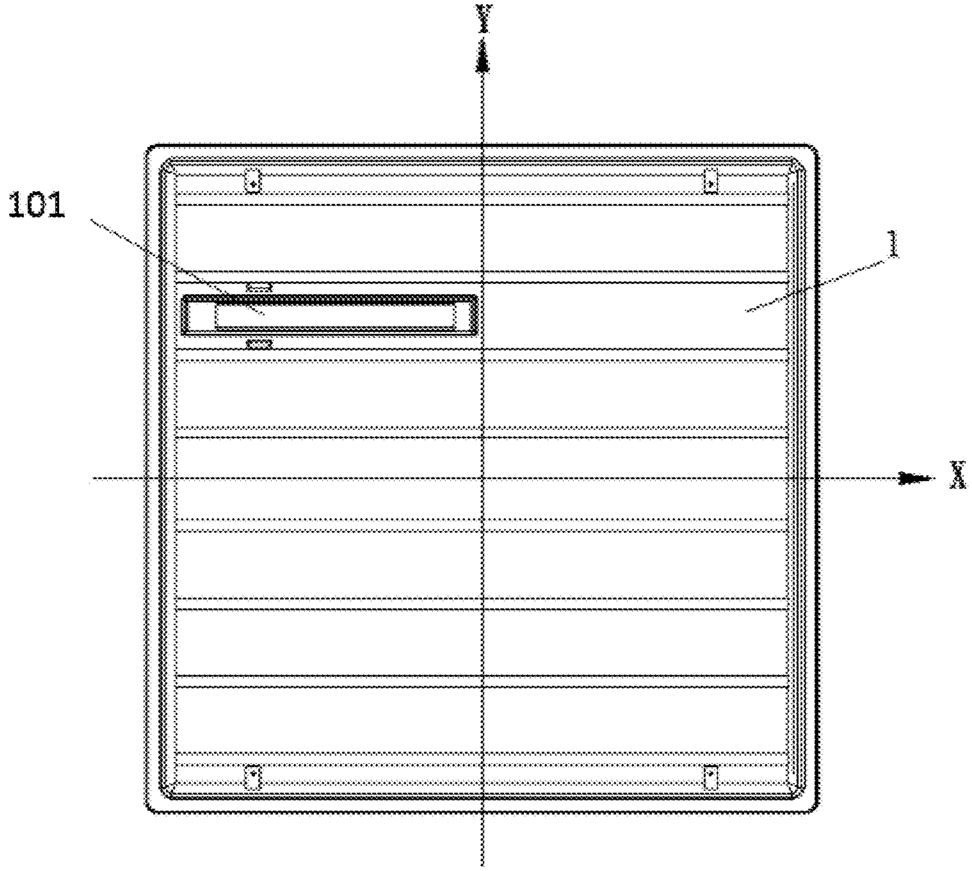

Please refer to FIGS. 26 and 27. In some embodiments, the bottom groove 101 is one in number. When two LED lighting devices are stacked in a back-to-back manner, one of the LED lighting devices is rotated with a specific angle (such as 90 degrees, 180 degrees or 270 degrees), the bottom groove 101 of the two LED lighting devices are interlaced to make the total height less than 2 times the height of a single LED lighting device. Thus, two or more LED lighting devices are stacked in the above manner, the package size and the transportation costs can be reduced. In the embodiment, the back of the LED lighting device is created with a coordinate system with taking the center of the LED lighting device as the origin, the protrusion 103 is completely located in one quadrant as shown in FIG. 27 or in completely located in two quadrants as shown in FIG. 26.

Figure 28:
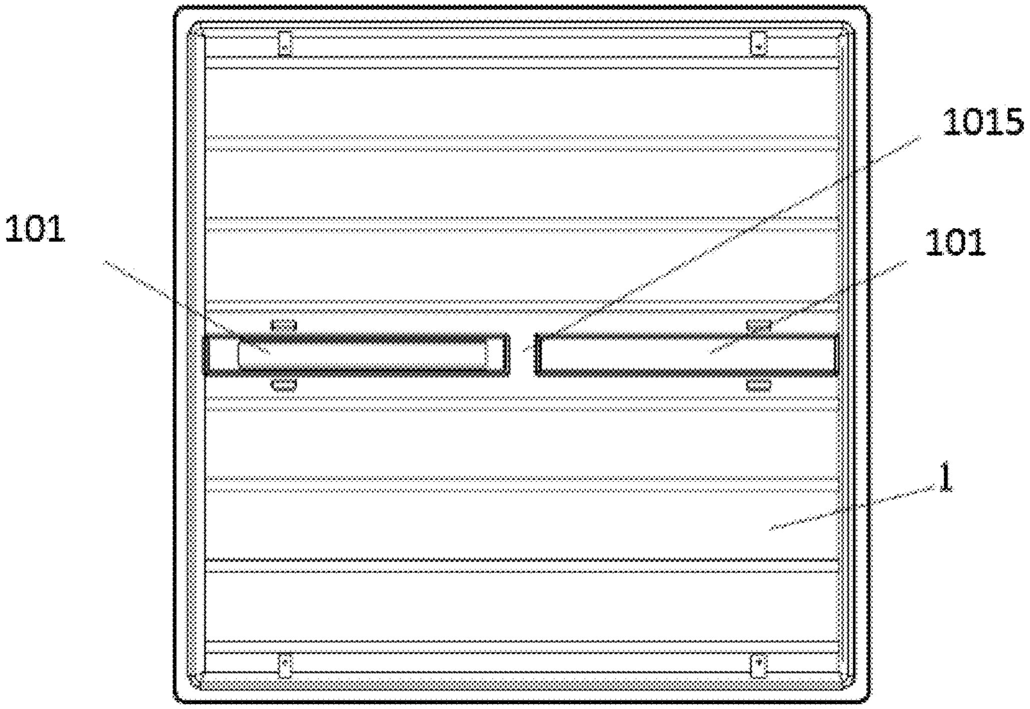

Please refer to FIG. 28. In some embodiments, the bottom groove 101 is two in number, and a groove clearance 1015 is formed between the two bottom grooves 101. The two bottom grooves 101 may be arranged along the same direction such as a length direction or a width direction of the LED lighting device. When two LED lighting devices are stacked in a back-to-back manner, one LED lighting device is rotated 90 degrees, and the bottom grooves 101 of the two LED lighting devices are interlaced, the total height is less than 2 times the height of a single LED lighting device. The groove clearance 1015 can prevent two bottom grooves 101 from interfering with each other when two LED lighting devices are connected in a back-to-back manner. In the embodiment, the groove clearance 1015 is located at the center of the seat 1, and its size in an extending direction of the bottom grooves 101 is greater than a width of the bottom grooves 101.

Figure 25:
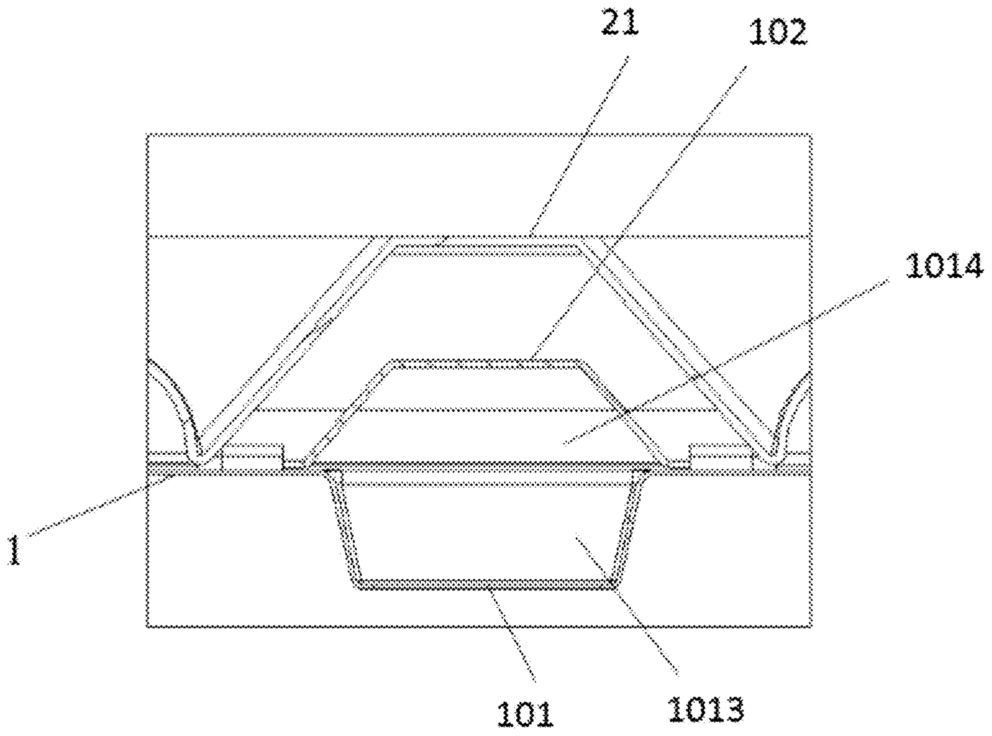
FIG. 25 is an enlarged view of part H in FIG. 22.
Figure 29:
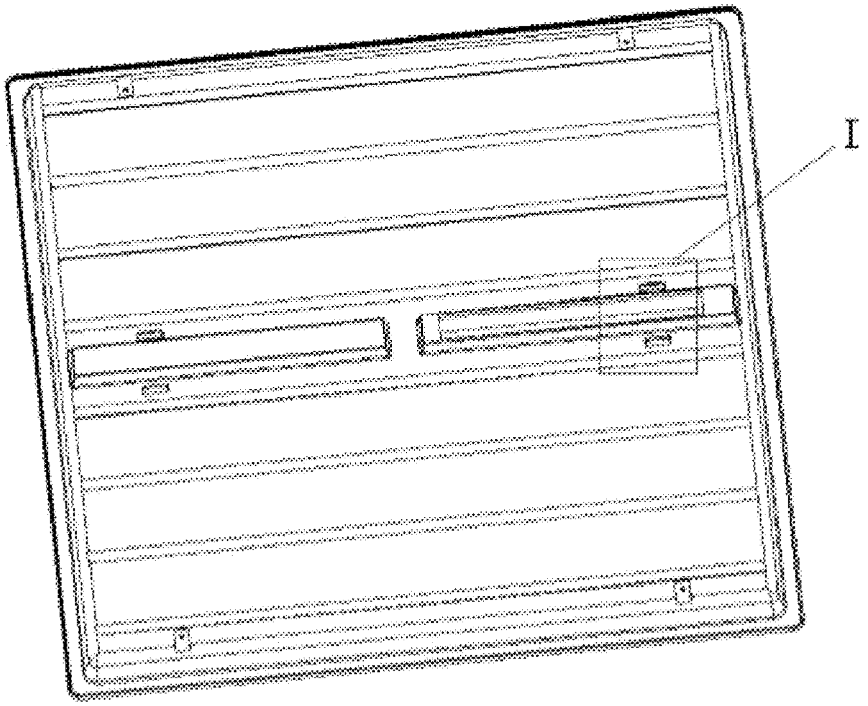
FIG. 29 is a perspective schematic view of an embodiment of the LED lighting device of the invention.
Figure 30:
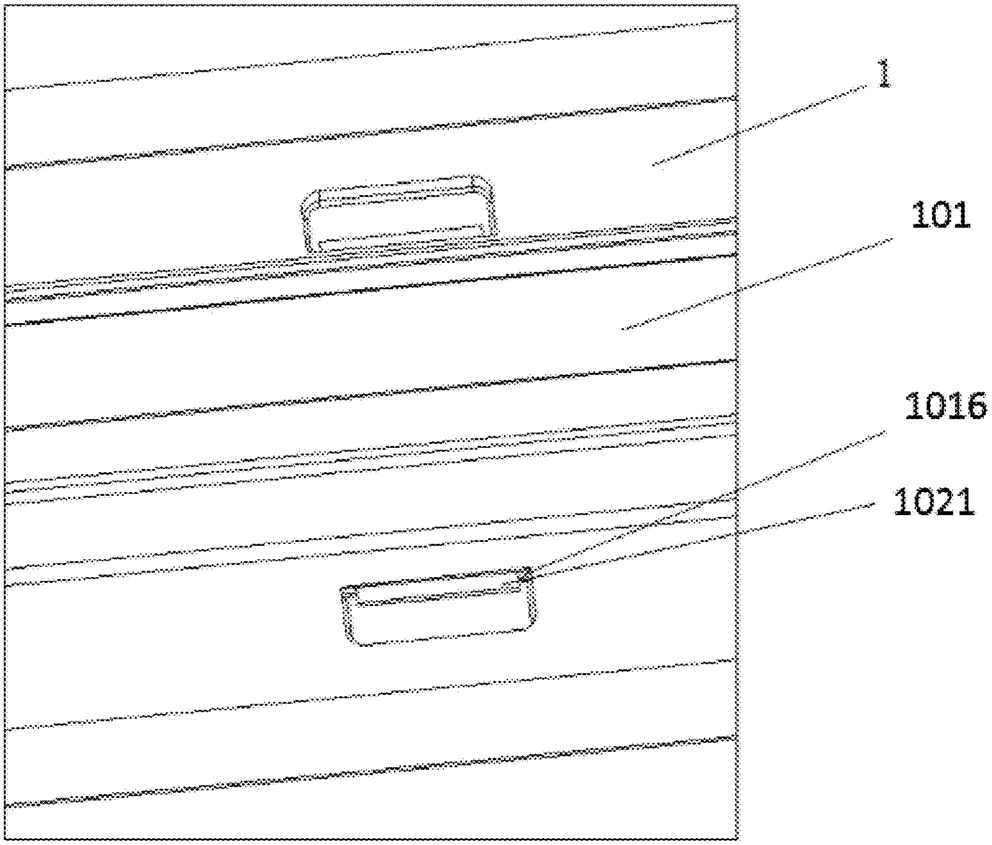
FIG. 30 is an enlarged view of part I in FIG. 29.

Please refer to FIGS. 25, 29 and 30. In the embodiment, the bottom grooves 101 is located at a middle position of the LED lighting device (seat 1) in a length direction or a width direction to make the LED lighting device be of a substantially symmetrical structure. In the embodiment, a groove cavity cover 102 separately associates with two bottom groove cavity 1013. The groove cavity cover 102 is disposed with an inserting department 1021. The seat 1 is correspondingly disposed with an inserting hole 1016. When the inserting department 1021 of the groove cavity cover 102 is inserted into the inserting hole 1016 of the seat 1, the groove cavity cover 102 can be fixed to the seat 1.

A distance between the LED chip 201 and the groove cavity cover 102 is configured to be greater than 15 mm. In addition, an angle a between a sidewall of the groove cavity cover 102 and a surface of the seat 1 is configured to be greater than 120 degrees. Thus, the influence of the groove cavity cover 102 to light emitting of the LED chip 201 can be reduced.

Please refer to FIG. 14. In one embodiment, the LED lighting device further includes a bracket 4. The bracket 4 is used to install the device LED lighting device onto a support of a ceiling. The bracket 4 may adopt metal such as copper or iron. In addition, the bracket 4 is in different shapes or includes different components in different embodiments, for example, the bracket includes one or more of rotary fastening portions, hanging hooks and corner protectors. An end of the bracket 4 is fixed to the install end wall 13, and the other end thereof is bent to be hung on the support.

In the embodiment, in the height direction of the LED lighting device, the height of the first optical member 2111 does not exceed half of the height of the second optical member 2112 to reduce the light directly emitted by the LED lighting device from the lateral side of the first optical member 2111. That is, more light emitted from the first optical member 2111 will be redirected by the second optical member 2112 to adjust the light emission of the LED lighting device.

Please refer to FIGS. 14 and 17 to 20. A beam angle of the LED chip 201 of the LED array 203 is A. As for the definition of the beam angle (at a place where the light intensity reaches 50% of the light intensity of the normal, the angle formed by the two sides is the beam angle) is well-known, details will not be described here. Optionally, the beam angle A may be between 100 degrees and 130 degrees. The LED chip 201 is projected onto an inner surface of the first optical member 2111 with the boundary of the beam angle A as the range, and a projection area m is formed on the inner surface of the first optical member 2111 (the projection area m is a curved surface, a plane or other irregular surface), an area of the projection area m is greater than 500 $mm^2$. To prevent the first optical member 2111 from forming a grainy sense when the LED chip 201 is lit, without considering the influence of the adjacent LED chips 201, the light intensity on the projection area m should be less than 50,000 lux.

The size of the projection area m depends on the distance from the LED chip 201 to the first optical member 2111. The longer the distance, the greater the thickness of the optical unit 211 (the total thickness will increase), this is disadvantageous to cost control. When the distance is small, the area of the projection area m is less than 500 $mm^2$, this makes the illuminance not easy to be controlled and forms a grainy sense. Thus, in the embodiment, the distance from the LED chip 201 to the first optical member 2111 is controlled to be between 6 mm and 15 mm. Also, without considering the influence of the adjacent LED chips 201, the light intensity on the projection area m should be greater than 10000 lux. When the projection area m is non-planar, the shortest distance from the center of the surface of the LED chip 201 to the first optical member 2111 within the range of the beam angle A can be used as the distance to be controlled.

The luminous flux of the LED chip 201 is L. When the LED chips 201 in the LED array 203 are arranged in only one row, the projection areas m of the LED chips 201 of the same LED array 203 on the inner surface of the first optical member 2111 may partially overlap. Considering the overlapping of the projection areas m of different LED chips 201 on the inner surface of the first optical member 2111, the illuminance of any position in any projection area m does not exceed 5 L/m, to prevent the overlapping of the projection areas m of the LED chips 201 from forming strong light. In one embodiment, the illuminance of any position in any projection area m does not exceed 4 L/m, so as to prevent the formation of strong light when the projection areas m of the LED chips 201 are superimposed. In one embodiment, the illuminance of any position in any projection area m does not exceed 3 L/m, so as to prevent the formation of strong light when the projection areas m of the LED chips 201 are superimposed. In one embodiment, the illuminance of any position in any projection area m does not exceed 2 L/m, so as to prevent the formation of strong light when the projection areas m of the LED chips 201 are superimposed.

One of the factors affecting the overlapping of the projection areas m of the LED chips 201 is the distance between the LED chips 201. In one embodiment, the center-to-center distance between the LED chips 201 is controlled to be greater than 4 mm or more than 4.5 mm.

In one embodiment, the number of LED chips 201 in the LED array 203 is n, and the number of projection areas m superimposed by any area of any projection area m is less than or equal to n. In one embodiment, the number of LED chips 201 in the LED array 203 is n, and the number of projection areas m superimposed by any area of any projection area m is less than n.

Figure 20:
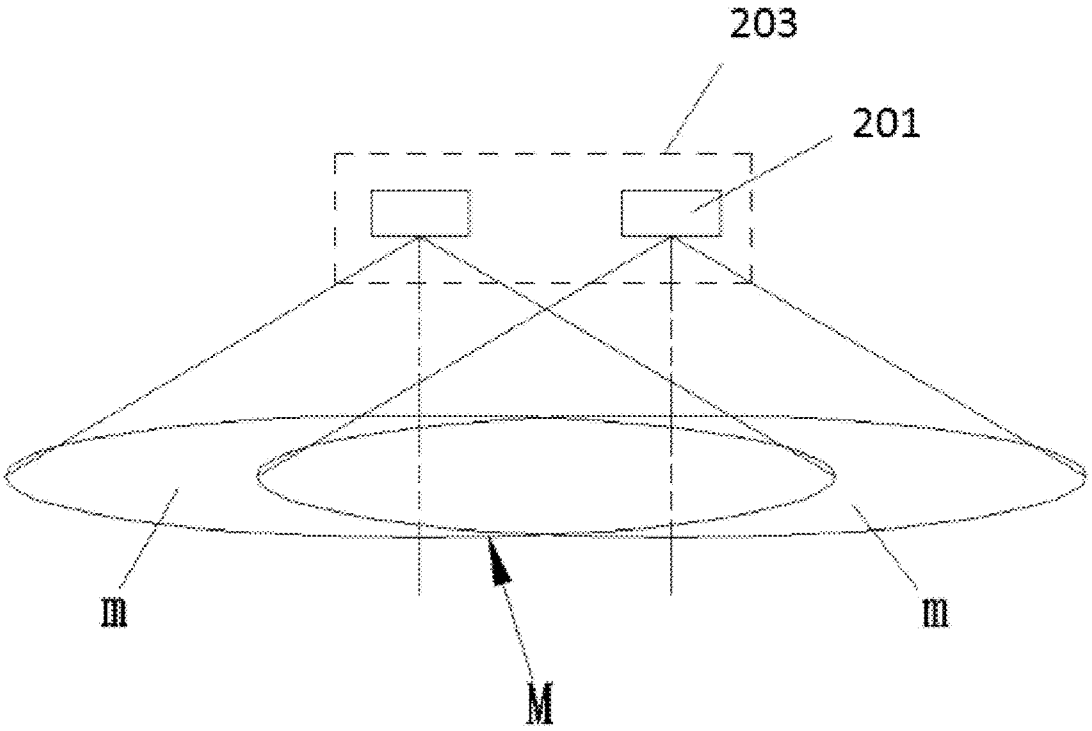
FIG. 20 is a schematic view of light emitting of the LED array.

The total area of the projection area on the inner surface of the first optical member 2111 is M. FIG. 20 as an example, when the LED array 203 has two LED chips 201, the projection areas m of the two LED chips 201 overlap, the area of the total projection area M on the inner surface of the first optical member 2111 is composed of the boundary of the projection areas m of the two LED chips 201 on the inner surface of the first optical member 2111. That is, the area of the total projection area M is that the sum of the areas of the projection areas m of the two LED chips 201 on the inner surface of the first optical member 2111 subtracts the area of the overlapping area.

The luminous intensity near an optical axis of the beam angle A is greater than the luminous intensity of the marginal area of the beam angle A. That is, in a single projection area m, the illuminous intensity within its range is not even. Therefore, it can be arranged as follows. More than 30%, 35%, or 40% of the total projection area M on the inner surface of the first optical member 2111 has the overlapping of at least two projection areas m, so as to improve the uniformity of illumination in the total projection area M. However, in order to avoid the overlapping of too many projection areas m to cause uneven illuminous intensity, not more than 25%, 20% or 18% of the area of the total projection area M on the inner surface of the first optical member 2111 can be configured to have the overlapping of four or more projected areas m.

Based on the above, in the embodiment, when only one optical unit is provided (without a lens), the uniformity of light emitting can be achieved, the structure is simplified, and the material cost is reduced.

Figure 21:
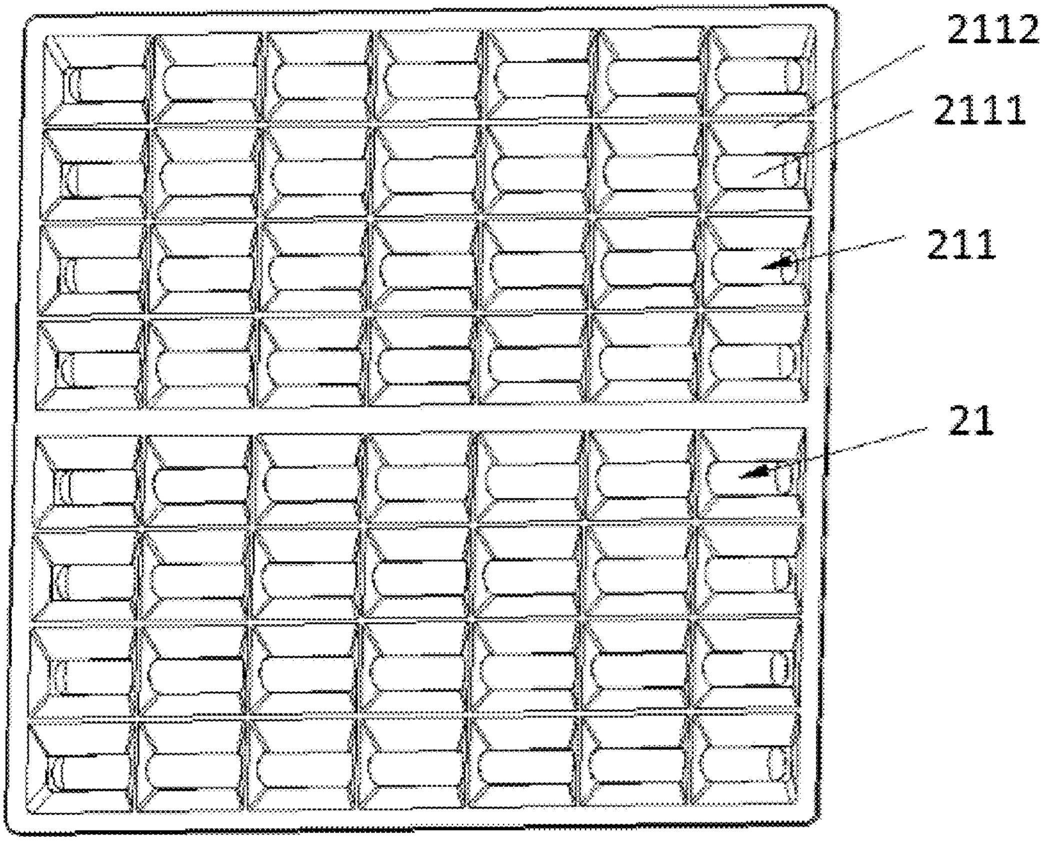
FIG. 21 is a perspective schematic view of an embodiment of the LED lighting device of the invention which removes the optical assembly.
Figure 22:
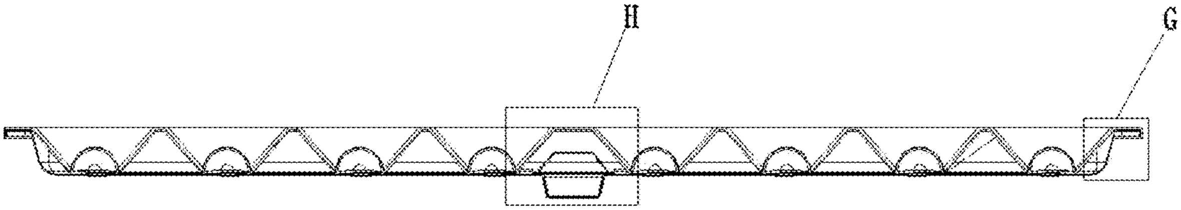
FIG. 22 is a cross-sectional schematic view of an embodiment of the optical assembly of the LED lighting device of the invention.
Figure 23:
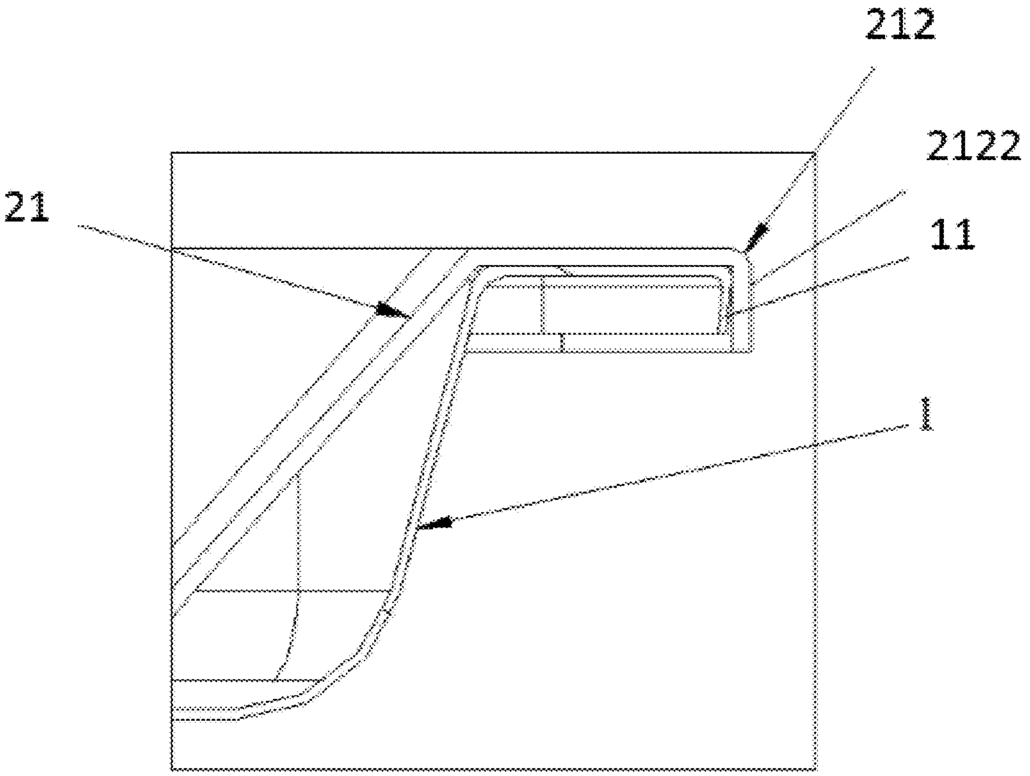
FIG. 23 is an enlarged view of part G in FIG. 22.
Figure 24:
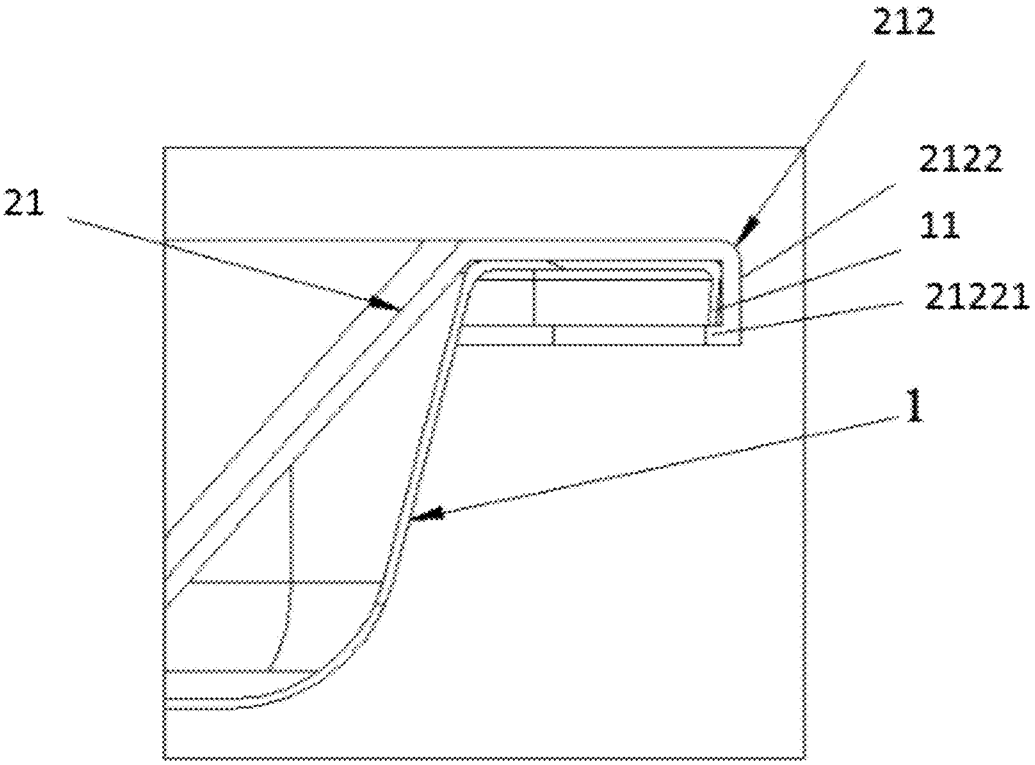
FIG. 24 is a partially cross-sectional view of the installing unit.
Figure 31:
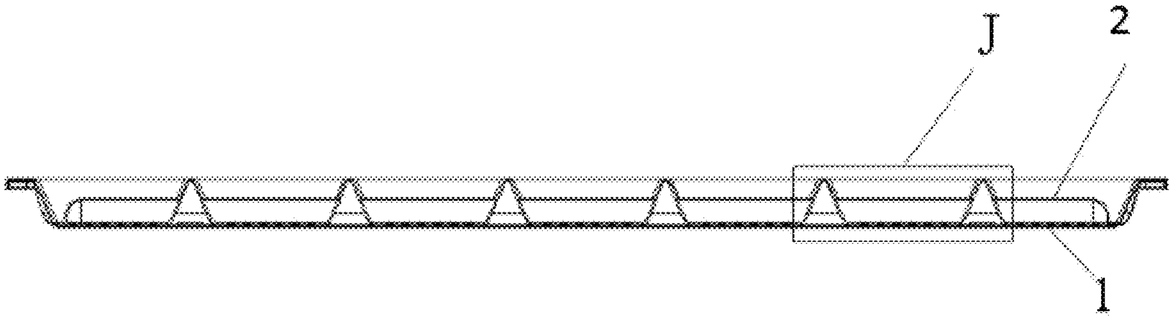
FIG. 31 is a cross-sectional schematic view of an embodiment of the LED lighting device of the invention.
Figure 32:
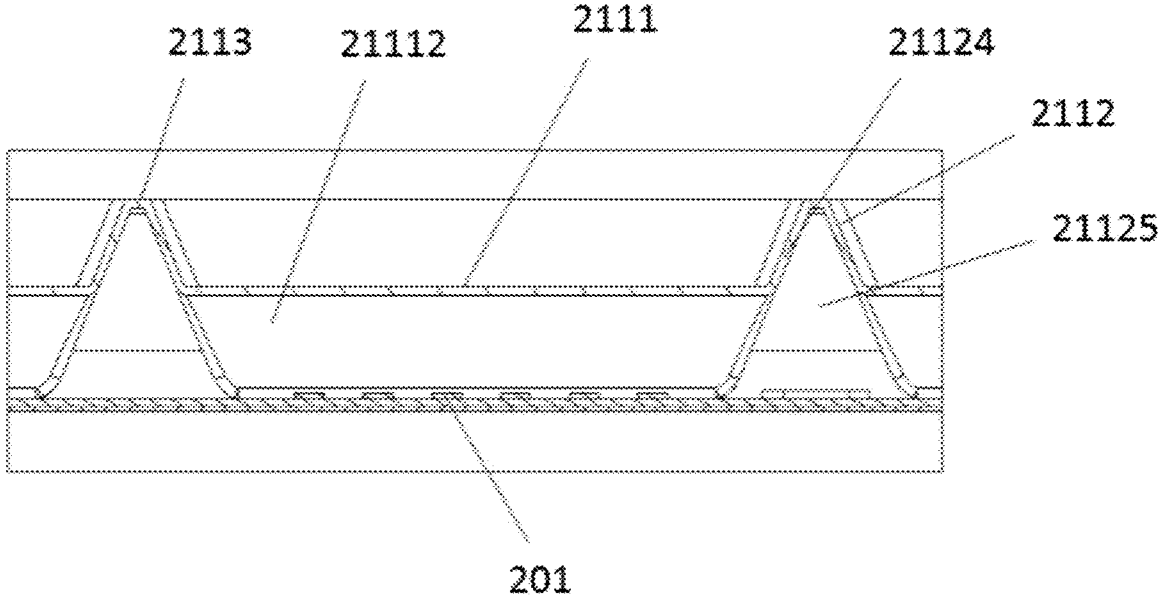
FIG. 32 is an enlarged view of part J in FIG. 31.
Figure 33:
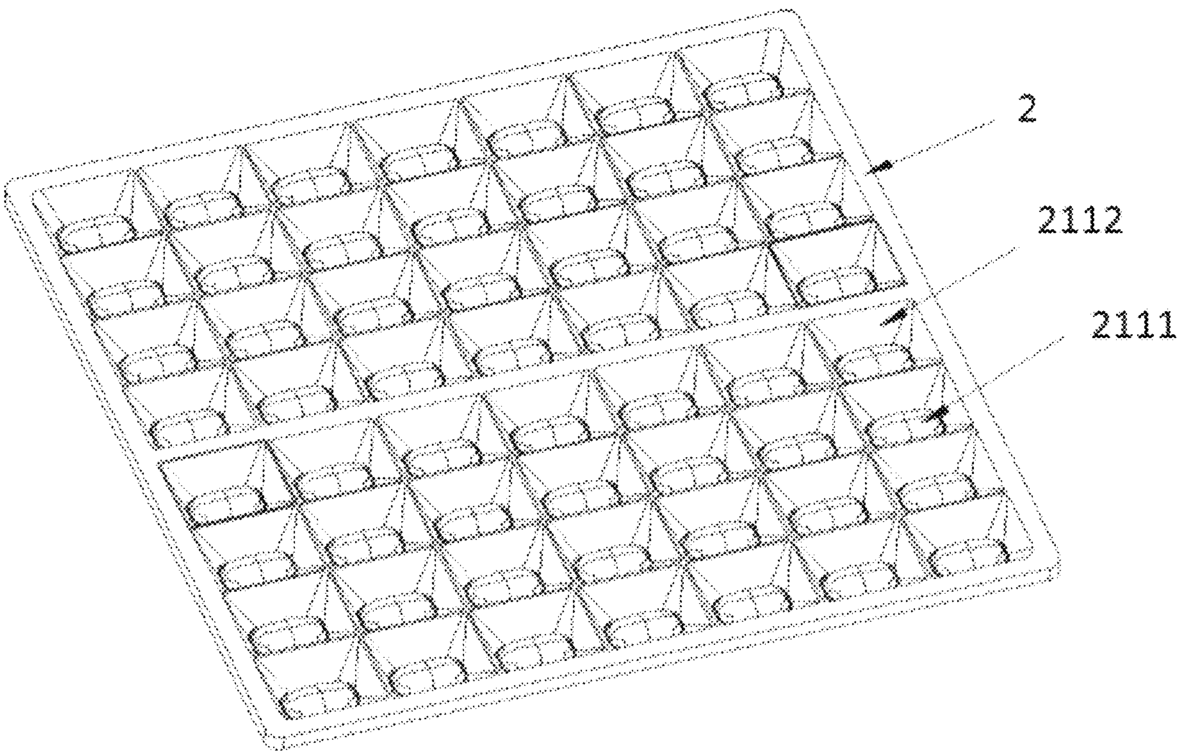
FIG. 33 is a perspective schematic view of an embodiment of the LED lighting device of the invention.
Figure 34:
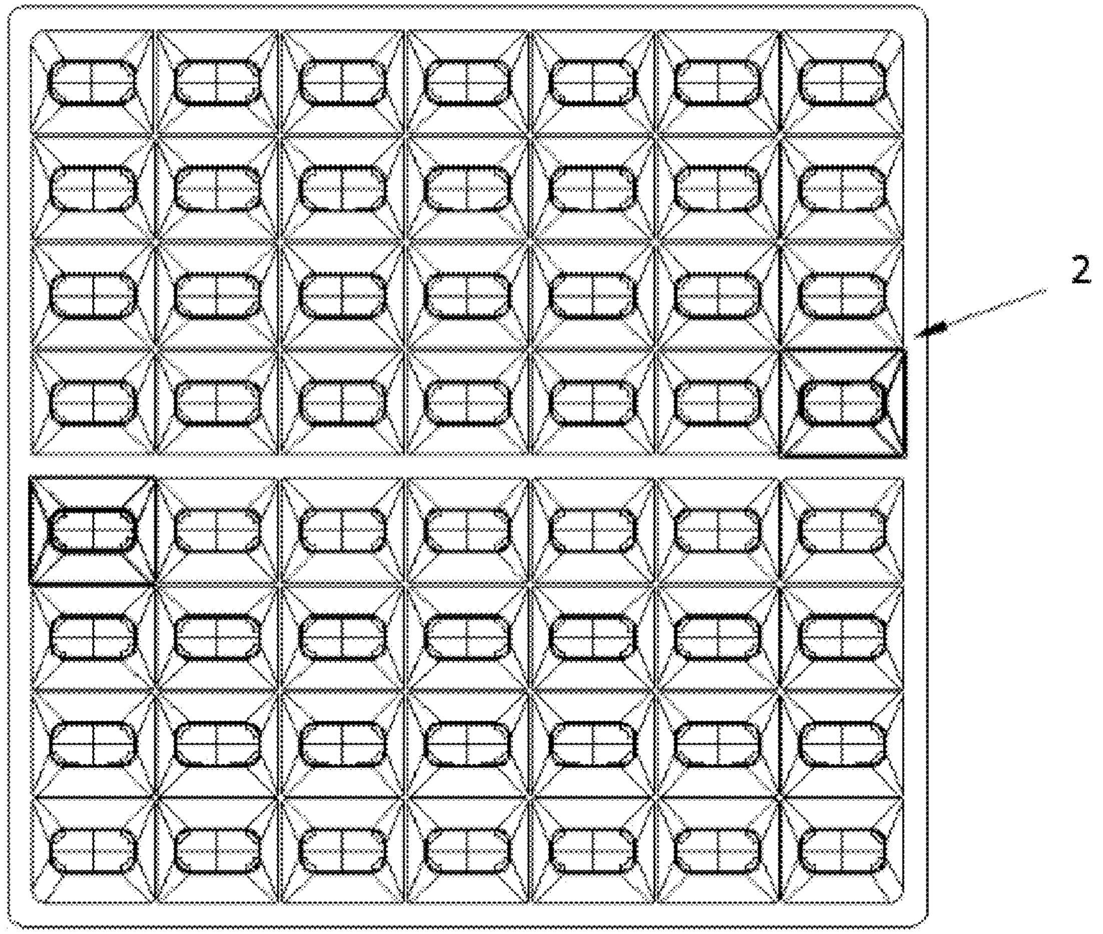
FIG. 34 is a front schematic view of an embodiment of the LED lighting device of the invention.
Figure 35:
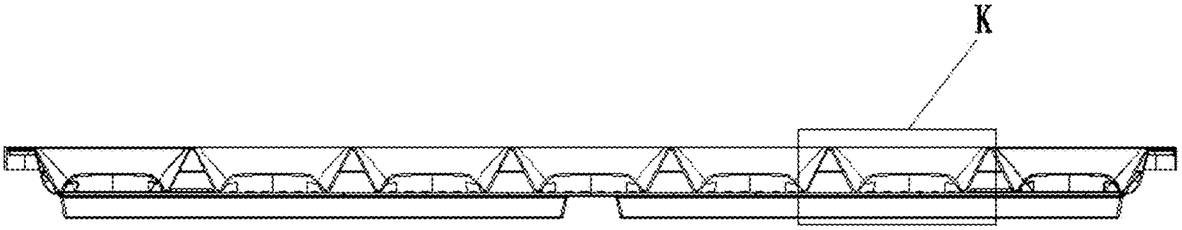
FIG. 35 is a cross-sectional schematic view of an embodiment of the LED lighting device of the invention.

As shown in FIGS. 21, 31 and 32, in one embodiment, a first cavity 21112 is formed in the first optical member 2111 (between the first optical member 2111 and a surface of the seat 1), and a second cavity 21125 is formed between adjacent second optical members 2112. The first optical member 2111 is connected to the optical wall 21124 of the second optical member 2112 in the length direction thereof, and the first cavity 21112 communicates with the second cavity 21125. When the LED chip 201 emits light, at least part of the light enters the second cavity 21125 after being reflected by the seat 1 and the first optical member 2111, and penetrates through the corresponding optical wall 21124 and/or the first connecting wall 2113 to improve the light emitting effect of the optical assembly 21.

Figure 36:
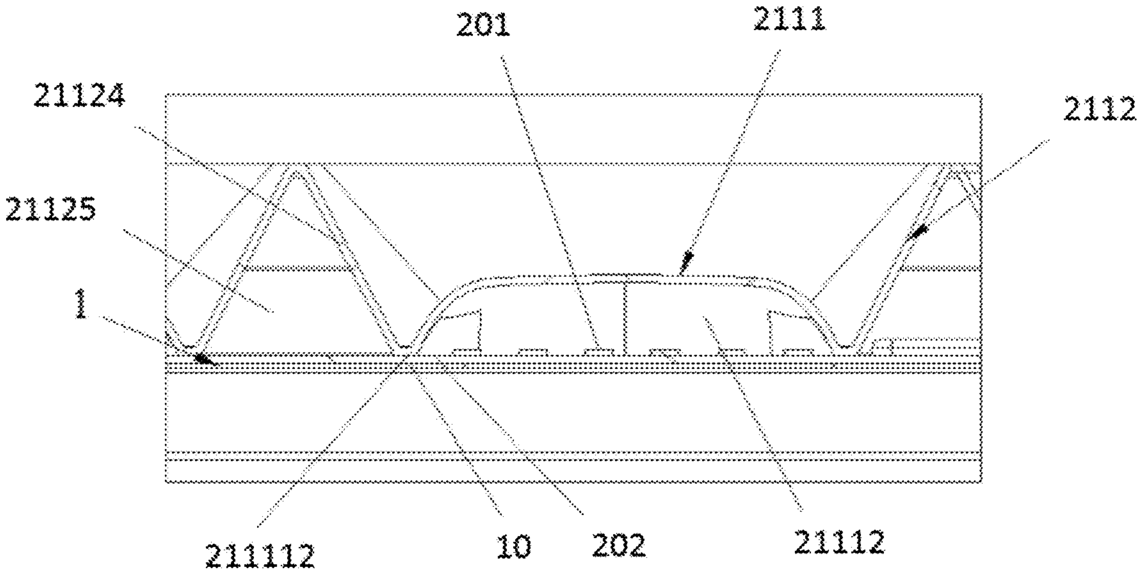
FIG. 36 is an enlarged view of part K in FIG. 35.
Figure 37:
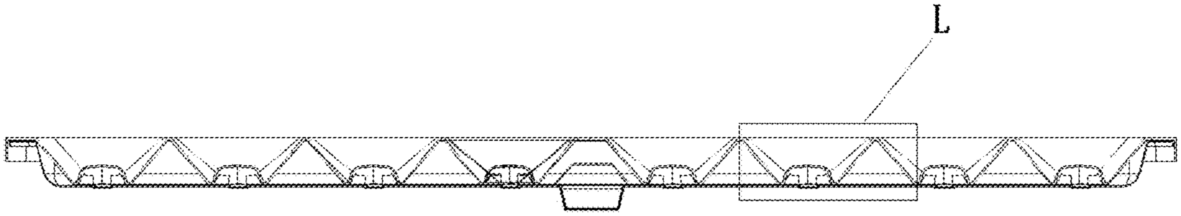
FIG. 37 is another cross-sectional schematic view of an embodiment of the LED lighting device of the invention, which shows a different cross-section from FIG. 35.
Figure 38:
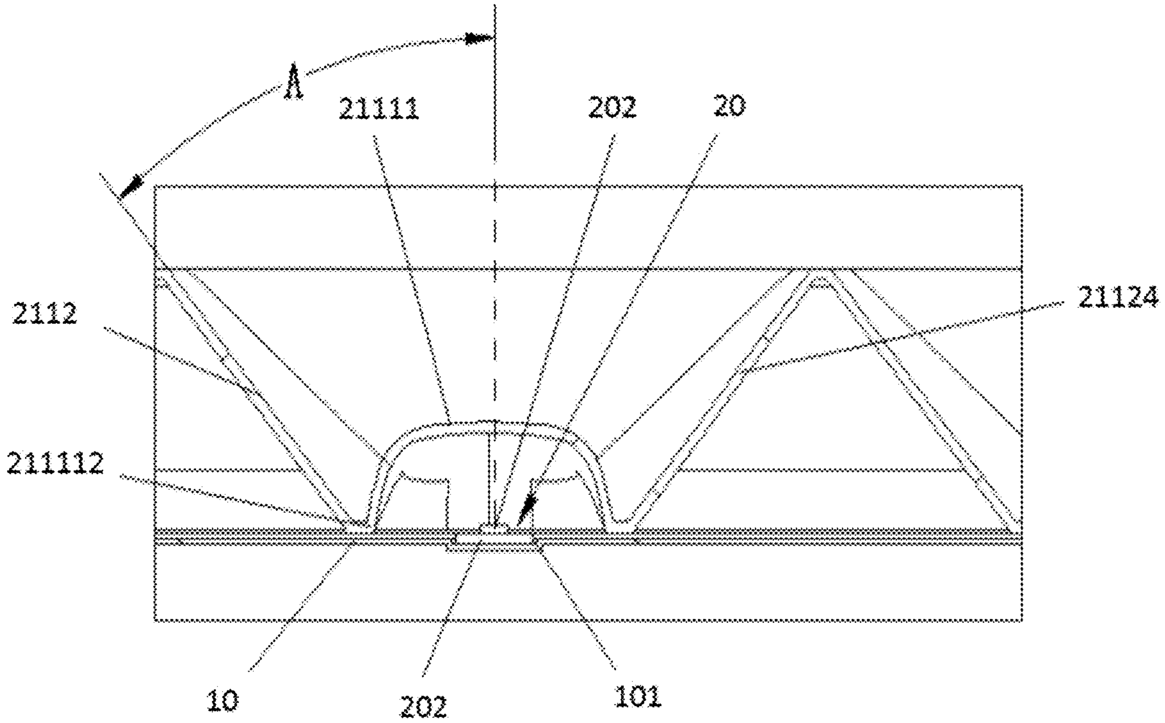
FIG. 38 is an enlarged view of part L in FIG. 37.

As shown in FIGS. 33 to 38, in one embodiment, a first cavity 21112 is formed in the first optical member 2111 (between the first optical member 2111 and the surface of the seat 1), and a second cavity 21125 is formed between adjacent second optical members 2111. The first optical member 2111 is not connected (not directly connected) with the optical wall 21124 of the second optical member 2112 in its length direction and width direction. Therefore, the first cavity 21112 does not communicate with the second cavity 21125 (excluding the connection caused by assembling gaps, it can be regarded as the first cavity 21112 not communicating with the second cavity 21125 when the assembly gap here is less than 5 mm). This can reduce the light from the light source component 20, which is reflected in the first cavity 21112 to enter the second cavity 21125, to make the light emitted through the first optical member 2111 more concentratedly when the light source component 20 works. As shown in FIGS. 36 and 38, in other words, the distance between an end of the first optical member 2111 (in terms of FIGS. 36 and 38, the lower portion of the first optical member 2111) and the baseplate 10 of the seat 1 is not more than 5 mm, 4 mm, 3 mm, 2 mm or 1 mm to reduce the leakage of the light emitted by the light source component 20 via the gaps between the first optical member 2111 and the baseplate 10. In one embodiment, an end of the first optical member 2111 (in terms of FIGS. 36 and 38, the lower portion of the first optical member 2111) is at least partially attached on the baseplate 11 of the seat 1 to further reduce light leakage.

In one embodiment, the baseplate 10 is disposed with a positioning unit 1011. The light source component 20 is at least partially accommodated in the positioning unit 1011 in the height direction thereof. In other words, the circuit board 202 of the light source component 20 is at least partially accommodated in the positioning unit 1011 in the thickness direction. When the surface of the circuit board 202 does not project from the positioning unit 1011 (that is, the circuit board 202 is completely accommodated in the positioning unit 1011 in the thickness direction), the end portion 211112 of the first optical member 2111 (in terms of FIGS. 36 and 38, the lower portion of the first optical member 2111) can be directly attached on the baseplate 10. When a part of the circuit board 202 is accommodated in the positioning unit 1011 in the thickness direction, the end portion 211112 of the first optical member 2111 (in terms of FIGS. 36 and 38, the lower portion of the first optical member 2111) abuts against a surface of the circuit board 202. At this time, the end portion 211112 of the first optical member 2111 (in terms of FIGS. 36 and 38, the lower portion of the first optical member 2111) and the baseplate 10 are kept at a distance, and the distance can be the height of an exposed portion of the circuit board 202 projecting from the positioning unit 1011.

In an embodiment, the surface of the circuit board 202 exceeds or is flush with the positioning unit 1011, that is, the surface of the circuit board 202 is higher than the baseplate 10.

In one embodiment, the optical wall 21124 has a function of reflection, which can reflect part of the light emitted from the first optical member 2111 to reduce light emitting of the LED lighting device in a lateral direction of the first optical member 2111 so as to reduce glare. In this embodiment, on a cross-section of the first optical member 2111 in a width direction, the optical wall 21124 and an optical axis of the LED chip 201 form an acute angle A. The acute angle A formed between the optical wall 21124 and the optical axis of the LED chip 201 is between 30 degrees to 60 degrees. The optical wall 21124 includes a wall portion corresponding to a length direction of the first optical member 2111 and another wall portion corresponding to a width direction of the first optical member 2111. The angle between each of the wall portion in the length direction of the first optical member 2111 and the wall portion in the width direction of the first optical member 2111 and the optical axis of the LED chip 201 is within the range of the aforementioned acute angle A. In one embodiment, the includes angle between corresponding two sets of optical walls 21124 in the width direction of the first optical member 2111 is smaller than the beam angle of the LED chip 201 to block light and reduce glare. In addition, the included angle between corresponding two sets of optical walls 21124 in the width direction of the first optical member 2111 (i.e., the double of the acute angle A) is greater than 70 degrees to prevent excessively restricting the light emitting angle of the LED lighting device.

Figure 39:
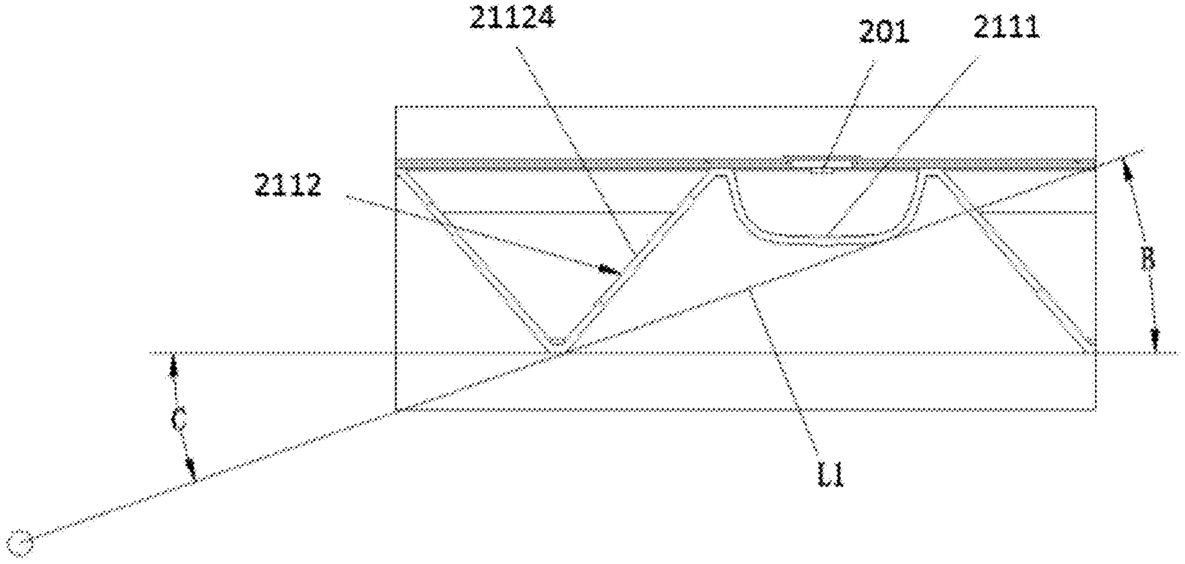
FIG. 39-43 are partially cross-sectional schematic views of some embodiments of the LED lighting device of the invention which is horizontally installed and downward emits light.

FIG. 39 shows a partially cross-sectional schematic view of an LED lighting device installed horizontally and emitting light downward in one embodiment, which shows a cross-section of the first optical member 2111 in the width direction. In this embodiment, on the cross-section of the first optical member 2111 in the width direction, the optical wall 21124 of the second optical member 2112 has a lower end point, and the lower end point extends along a direction and forms a straight line. The straight line L1 is tangent to an outer surface of the first optical member 2111. The included angle B between the straight line L1 and the horizontal plane (that is, the light-emitting surface of the LED lighting device, when the LED lighting device is installed along the level, the light-emitting surface is parallel or approximately parallel to the horizontal plane) is greater than 10 degrees, 12 degrees, 14 degrees, 16 degrees or 18 degrees. In one embodiment, the included angle B between the straight line L1 and the horizontal plane (that is, the light-emitting surface of the LED lighting device, when the LED lighting device is installed along the level, the light-emitting surface is parallel or substantially parallel to the horizontal plane) is between 15 degrees and 25 degrees. In one embodiment, the included angle B between the straight line L1 and the horizontal plane (that is, the light-emitting surface of the LED lighting device, when the LED lighting device is installed along the level, the light-emitting surface is parallel or substantially parallel to the horizontal plane) is between 18 degrees and 20 degrees. When a human eye and the first optical member 2111 (or the LED lighting device) are in a certain position (when the angle C between a straight line through the human eye and the light-emitting surface of the LED lighting device is less than the aforementioned included angle B), the human eye will not directly observe direct light emitting from the first optical member 2111, so glare can be reduced. From another point of view, a straight line L1 is set, one end of the straight line L1 is connected to the lower end point of the optical wall 21124, and the other end of the straight line L1 is tangent to the outer surface of the first optical member 2111, and the included angle between the straight line L1 and the horizontal plane (that is, the light-emitting surface of the LED lighting device, when the LED lighting device is installed along the level, the included angle B between the light-emitting surface is parallel or approximately parallel to the horizontal plane) is greater than 10 degrees, 12 degrees, 14 degrees, 16 degrees or 18 degrees. In some embodiments, the included angle B between the straight line L1 and the horizontal plane is between 15 degrees and 25 degrees. In some embodiments, the included angle B between the straight line L1 and the horizontal plane is between 18 degrees and 20 degrees. The shape of the cross-section of the optical wall 21124 in this embodiment may not be set to be straight and flat. Glare can be reduced as long as the position of the lower end point thereof meets the above requirements.

Figure 40:
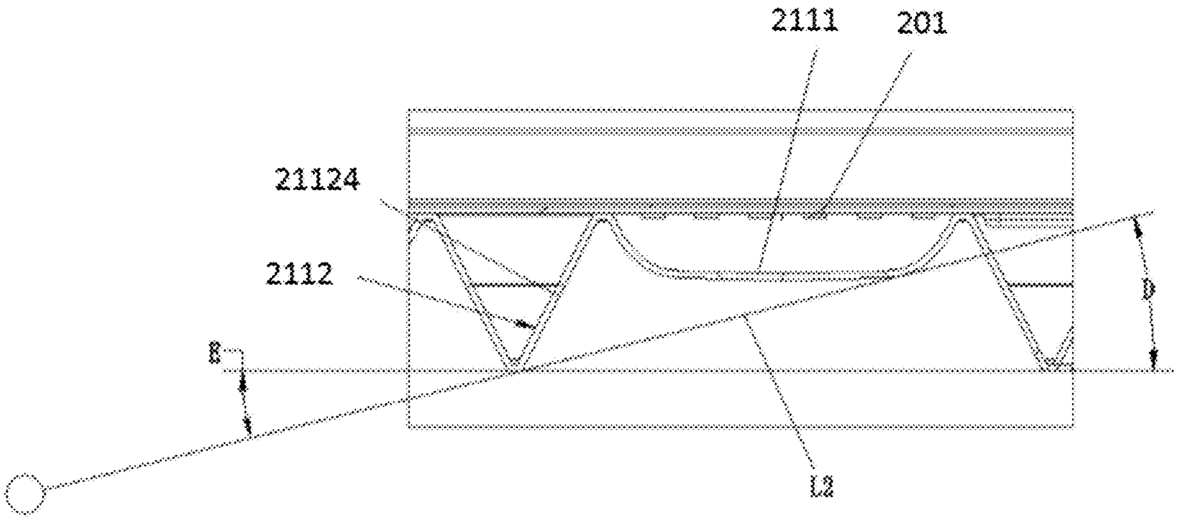

FIG. 40 shows a partially cross-sectional schematic view of the LED lighting device installed horizontally and emitting light downward in one embodiment, which shows a cross-section of the first optical member 2111 in the length direction. In this embodiment, on the cross-section of the first optical member 2111 in the length direction, the optical wall 21124 of the second optical member 2112 has a lower end point, and the lower end point extends along one direction and forms a straight line. The straight line L2 is tangent to the outer surface of the first optical member 2111. The included angle D between the straight line L2 and the horizontal plane (that is, the light-emitting surface of the LED lighting device, when the LED lighting device is installed along the level, the light-emitting surface is parallel or approximately parallel to the horizontal plane) is smaller than the included angle B. In some embodiments, the included angle D is greater than 10 degrees, 11 degrees, 12 degrees or 13 degrees. In one embodiment, the included angle D is between 10 degrees and 20 degrees. In one embodiment, the included angle D is between 12 degrees and 16 degrees. When a human eye and the first optical member 2111 (or the LED lighting device) are in a certain position (when the angle E between a straight line through the human eye and the first optical member 311 and the light-emitting surface of the LED lighting device is less than the aforementioned included angle D), the human eye will not directly observe direct light emitting from the first optical member 2111, so glare can be reduced. From another point of view, a straight line L2 is set, one end of the straight line L2 is connected to the lower end point of the optical wall 21124, and the other end of the straight line L2 is tangent to the outer surface of the first optical member 311, and the included angle D between the straight line L2 and the horizontal plane (that is, the light-emitting surface of the LED lighting device, when the LED lighting device is installed along the level, the light-emitting surface is parallel or approximately parallel to the horizontal plane) is between 10 degrees and 20 degrees. In some embodiments, the included angle D is between 12 degrees and 16 degrees. The shape of the cross-section of the optical wall 21124 in this embodiment may not be set to be straight and flat. Glare can be reduced as long as the position of the lower end point thereof meets the above requirements.

Figure 41:
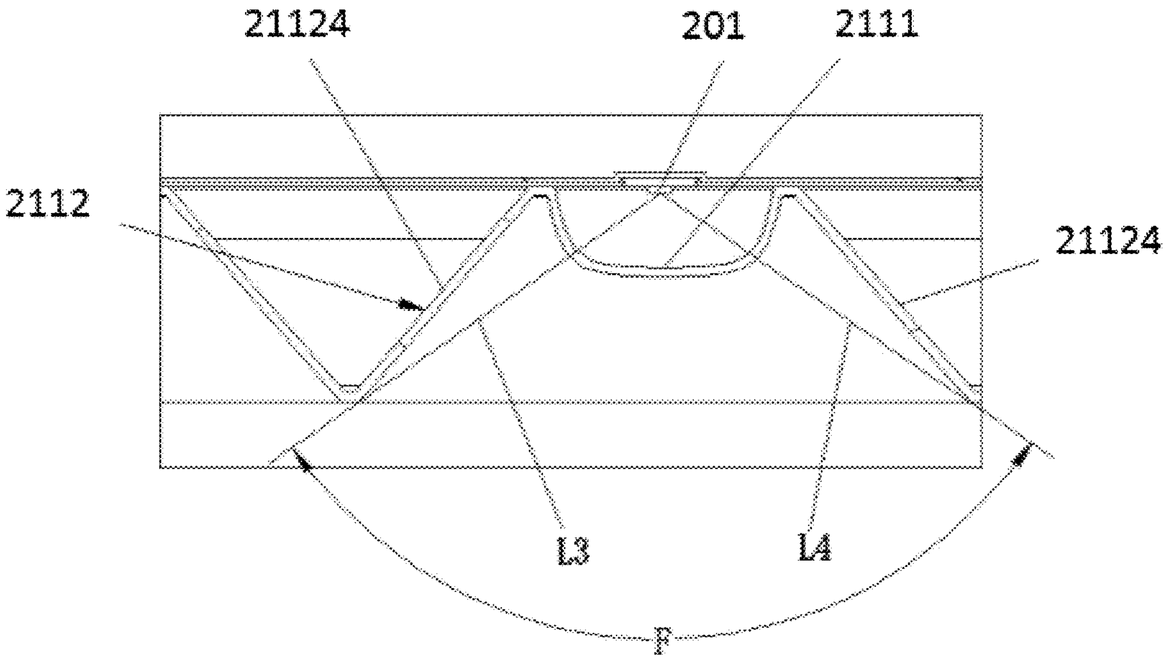

FIG. 41 shows a partially cross-sectional schematic view of the LED lighting device installed horizontally and emitting light downward in one embodiment, which shows a cross-section of the first optical member 2111 in the width direction. In this embodiment, on the cross section of the first optical member 2111 in the width direction, each of the two sets of optical walls 21124 of the second optical member 2112 corresponding to the LED chip 201 has a lower end point. The included angle F between each of two straight lines through the center of the light-emitting surface of the LED chip 201 and anyone of the lower end points of the two sets of optical walls 21124 is greater than 0.8 times the beam angle A of the LED chip 201 (at a place where the light intensity of the LED chip 201 reaches 50% of the luminous intensity of the normal, the angle formed by the two sides is the beam angle A), so as to prevent the optical walls 21124 from blocking the light emitting of the LED chip 201 excessively to cause light loss and reduce the light emitting efficiency. In some embodiments, the included angle F is less than 1.2 times the beam angle A of the LED chip 201 (at a place where the light intensity of the LED chip 21 reaches 50% of the luminous intensity of the normal, the included angle formed by the two sides is the beam angle A, where the beam angle A is about 120 degrees) to ensure that the optical walls 21124 have a certain light blocking effect to reduce glare.

Figure 42:
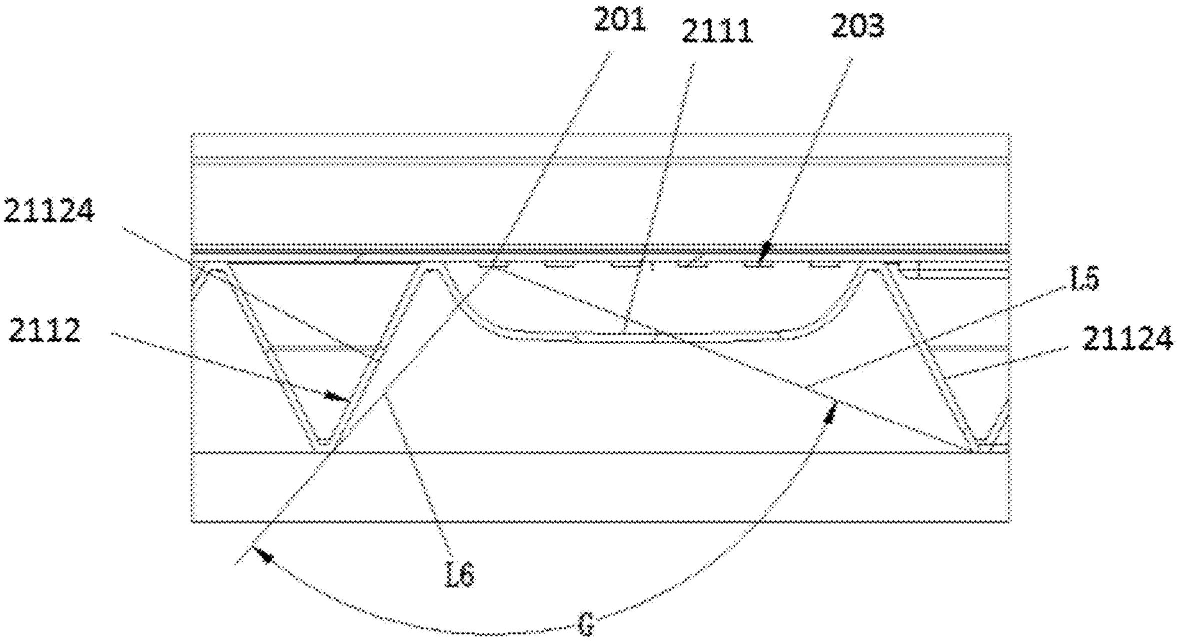

FIG. 42 shows a partially cross-sectional schematic view of the LED lighting device installed horizontally and emitting light downward in one embodiment, which shows a cross-section of the first optical member 2111 in the length direction. In this embodiment, on the cross-section of the first optical member 2111 in the length direction, there is an LED array 203 corresponding to the first optical member 2111, and the two sets of optical walls 21124 of the second optical member 2112 are correspondingly disposed to the LED array 203 in the first optical member 2111. Each set of optical walls 21124 has a lower end point. The included angle G between lines L5 and L6 through a midpoint of the light-emitting surface of any LED chip 201 in the LED array 203 corresponding to the first optical member 2111 and the lower end points of the two sets of optical walls 21124 is greater than 0.8 times the beam angle A of the LED chip 201 (at a place where the light intensity of the LED chip 201 reaches 50% of the luminous intensity of the normal, the included angle formed by the two sides is the beam angle A, where the beam angle A is about 120 degrees), so as to prevent the optical walls 21124 from blocking the light emitting of the LED chip 201 excessively to cause light loss and reduce the light emitting efficiency. In some embodiments, the included angle G is less than 1.2 times the beam angle A of the LED chip 201 (at a place where the light intensity of the LED chip 201 reaches 50% of the luminous intensity of the normal, the included angle formed by the two sides is the beam angle A) to ensure that the optical walls 21124 have a certain light blocking function to reduce glare.

Figure 43:
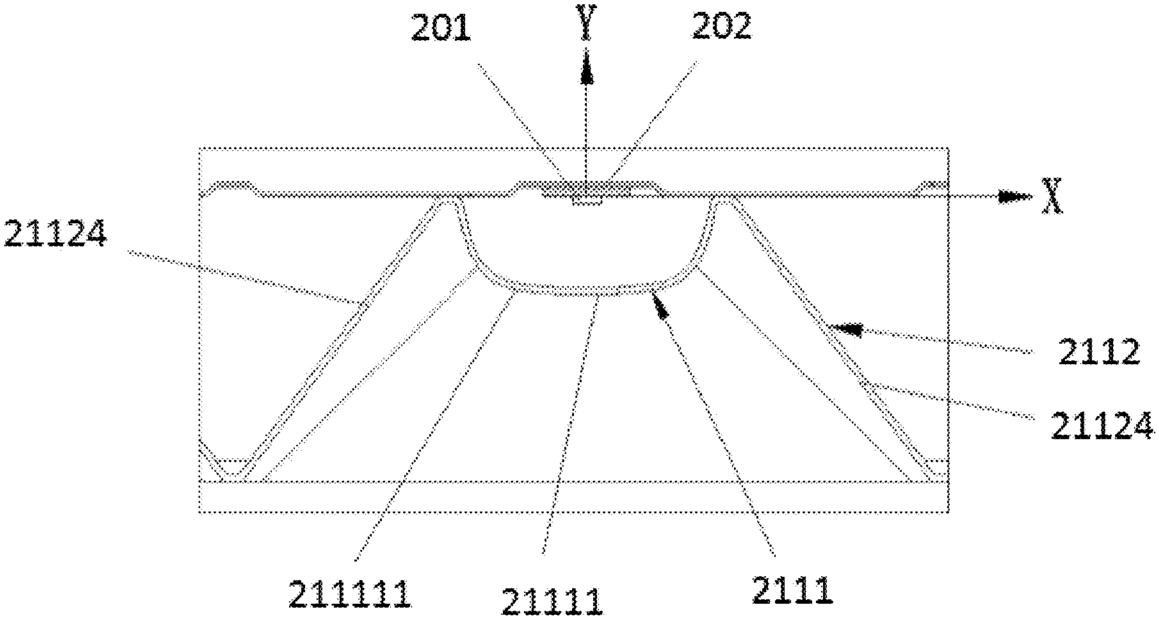

FIG. 43 shows a partially cross-sectional structural schematic view of the LED lighting device in some embodiments, which is horizontally installed and emits light downward. This figure shows a cross-section in the width direction of the first optical member 2111, and the cross-section sections is at the main portion 211111 of the first optical member 2111 in the length direction. A rectangular coordinate system is established, with the center of the width of the circuit board 202 as the origin, the thickness direction of the LED lighting device as the Y axis, and the width direction of the first optical member 311 as the X axis. Any point on the light-emitting surface 3111 of the first optical member 2111 satisfies the following formula:

$$y=Ax2+1E-15X-K$$

where A is a constant whose range is between 0.048 and 0.052, E means an exponent, and K is a constant whose range is between 9 and 12.

When any point on the first light-emitting surface 21111 of the first optical member 2111 satisfies the above formula, the light beam angle of the LED chips 201 better matches with the first light-emitting surface 21111 (in the width direction) of the first optical member 2111 after the LED chips 201 have been installed on the circuit board 202 (installed on the middle position in the width direction of the circuit board 202), so as to make the light-emitting surface 3111 have even light distribution.

In addition, in the above coordinate system, any point on the optical wall 3121 of the second optical member 312 satisfies the following formula:

$$y=ax+L$$

where a is a constant whose range of absolute value is between 1.35 and 1.45, and L is a constant whose range is between 18 and 22.

When any point on the optical wall 21124 of the second optical member 2112 satisfies the above formula, the optical wall 21124 can better redirect the light emitted to the optical wall 21124 to adjust the light distribution and improve the glare.

In one embodiment, there is only one thermal resistance layer (i.e., the optical assembly 21) on the optical axis direction (light-emitting direction) of the LED chip 201. When the LED chip 201 works, at least part of the heat generated by the LED chip 201 is radiated to the thermal resistance layer, and is outward dissipated through the thermal resistance layer. In comparison with the LED chip 201 which needs to use multiple thermal resistance layers (the prior art is disposed with at least two of a lampshade, a lens, a diffuser plate or a light guide plate to achieve the effect of uniform light emitting, but each of the above components constitutes a thermal resistance layer) to outward dissipate heat in the optical axial direction, the heat dissipation efficiency of the invention is improved.

In one embodiment, there is only one layer of light-permeable material (i.e., the optical assembly 21) on the optical axis direction (light-emitting direction) of the LED chip 201. When the LED chip 01 works, the light generated by the LED chip 201 is emitted to the light-permeable material and passes through the light-permeable material to be emitted from the Led lighting device. In comparison with the LED chip 201 which needs to use multiple light-permeable materials (the prior art is disposed with at least two of a lampshade, a lens, a diffuser plate or a light guide plate to achieve the effect of uniform light emitting, but each of the above components cause certain light loss) to outward emit light in the optical axial direction, the light-emitting efficiency of the invention is improved. In some embodiments, the light-emitting efficiency of the LED lighting device is greater than 80%, 85% or 90%. The light-emitting efficiency refers to the ratio of the luminous flux emitted from the LED lighting device to the total luminous flux generated by the LED chip 21.

In one embodiment, the light-permeable part (the first optical member 2111) and the anti-glare part (the second optical member 2112) adopt the same laminated material and are an integrated element.

Figure 44:
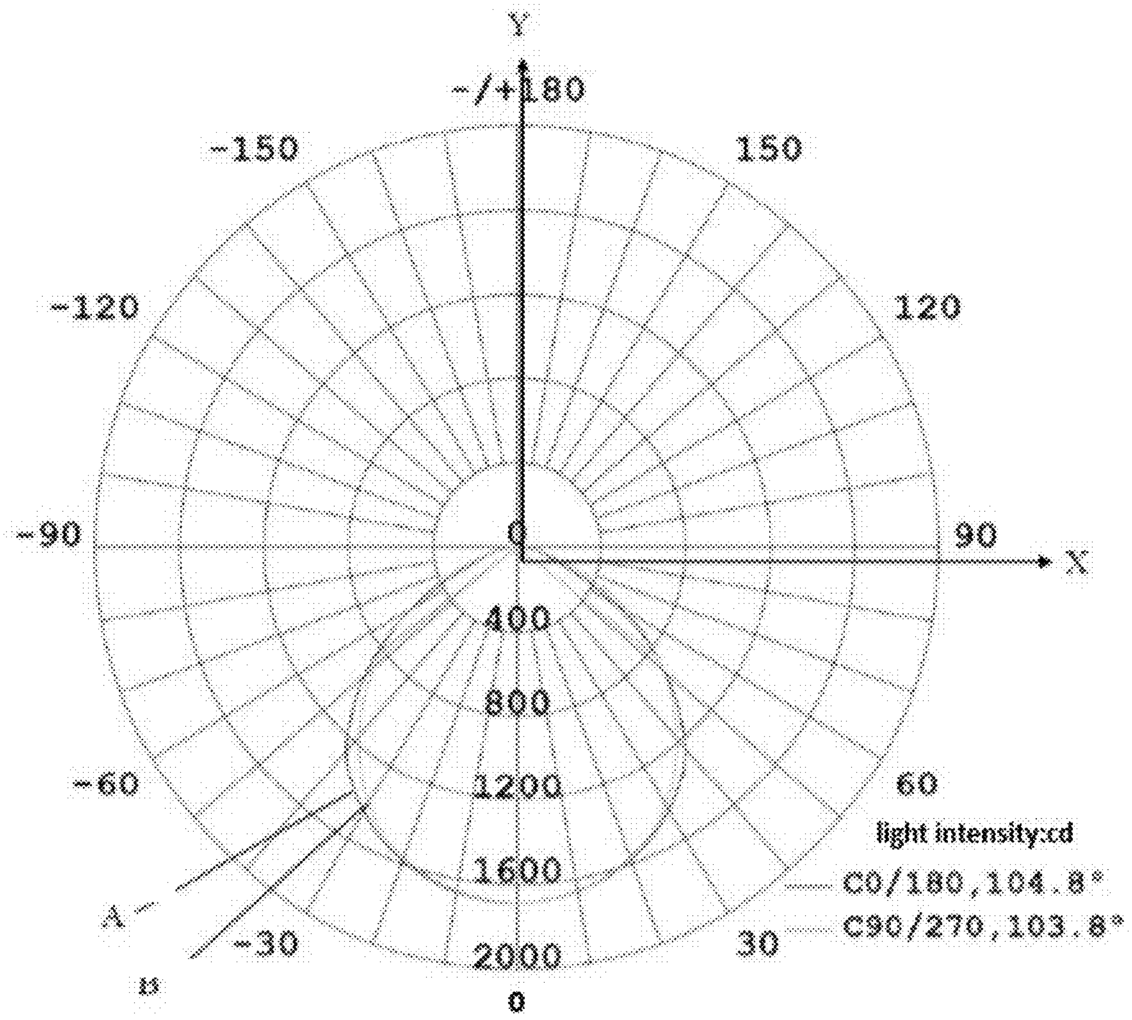
FIG. 44 is a light distribution curve of the LED lighting device in some embodiments.
Figure 45:
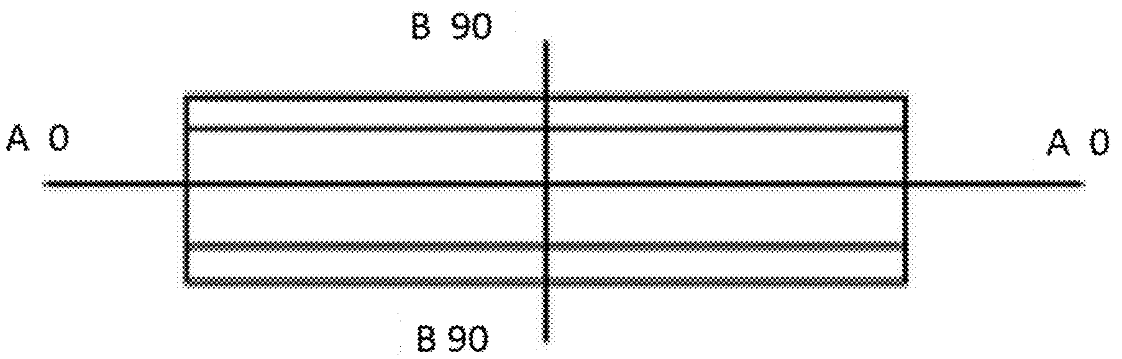
FIG. 45 is a schematic view of the LED lighting device in some embodiments.
Figure 46:
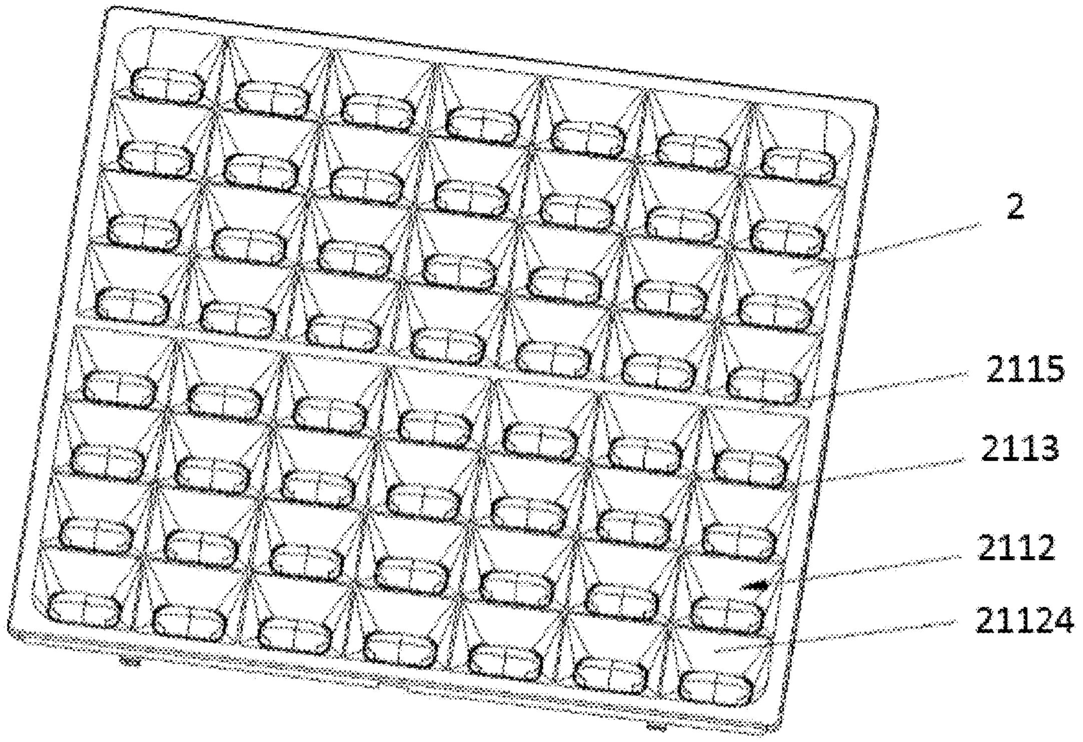
FIG. 46 is a perspective structural schematic view of the LED lighting device in some embodiments, which shows the front of the LED lighting device.
Figure 47:
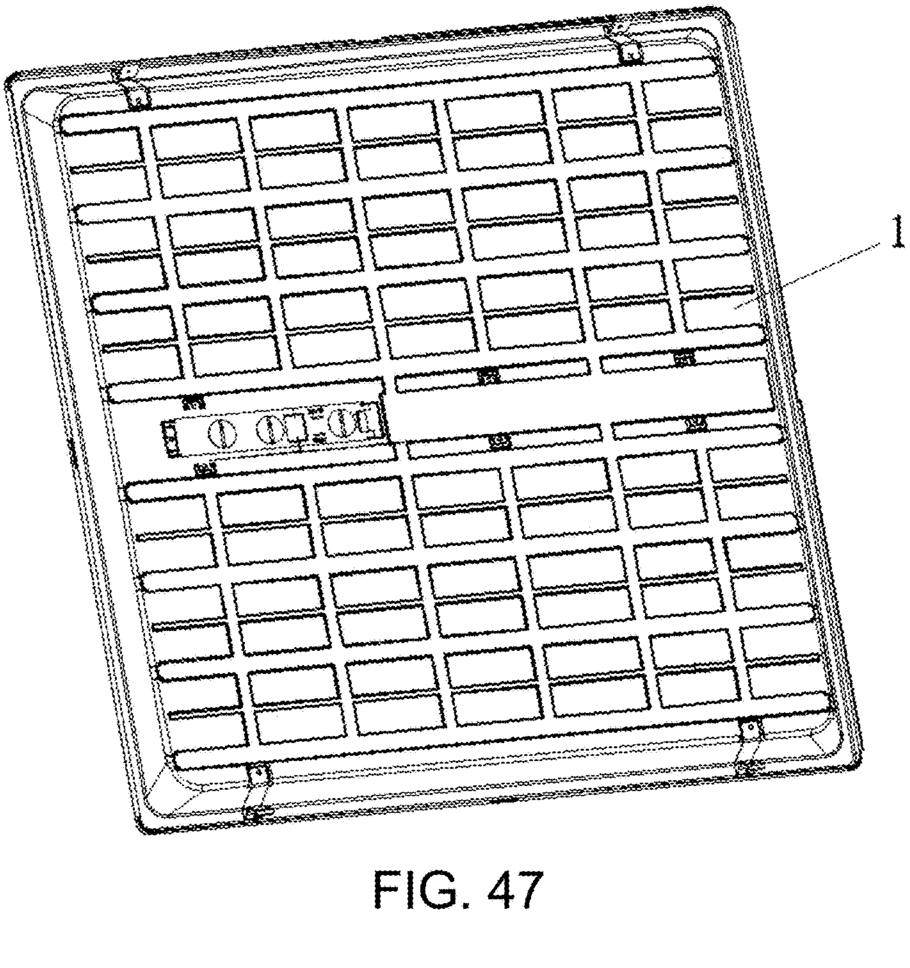
FIG. 47 is another perspective structural schematic view of the LED lighting device in some embodiments, which shows the back of the LED lighting device.
Figure 48:
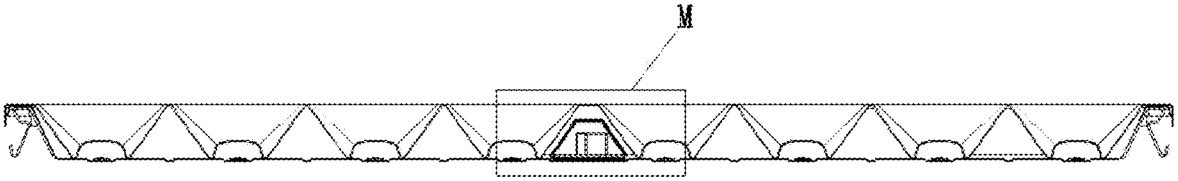
FIG. 48 is a cross-sectional structural schematic view of the LED lighting device in some embodiments.
Figure 49:
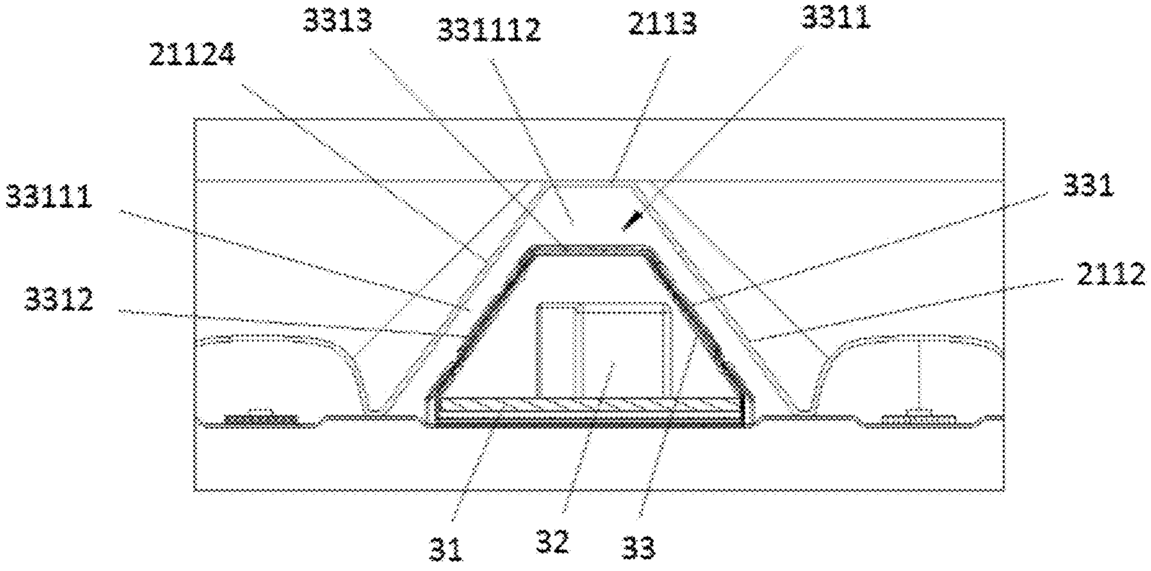
FIG. 49 is an enlarged view of part M in FIG. 48.
Figure 50:
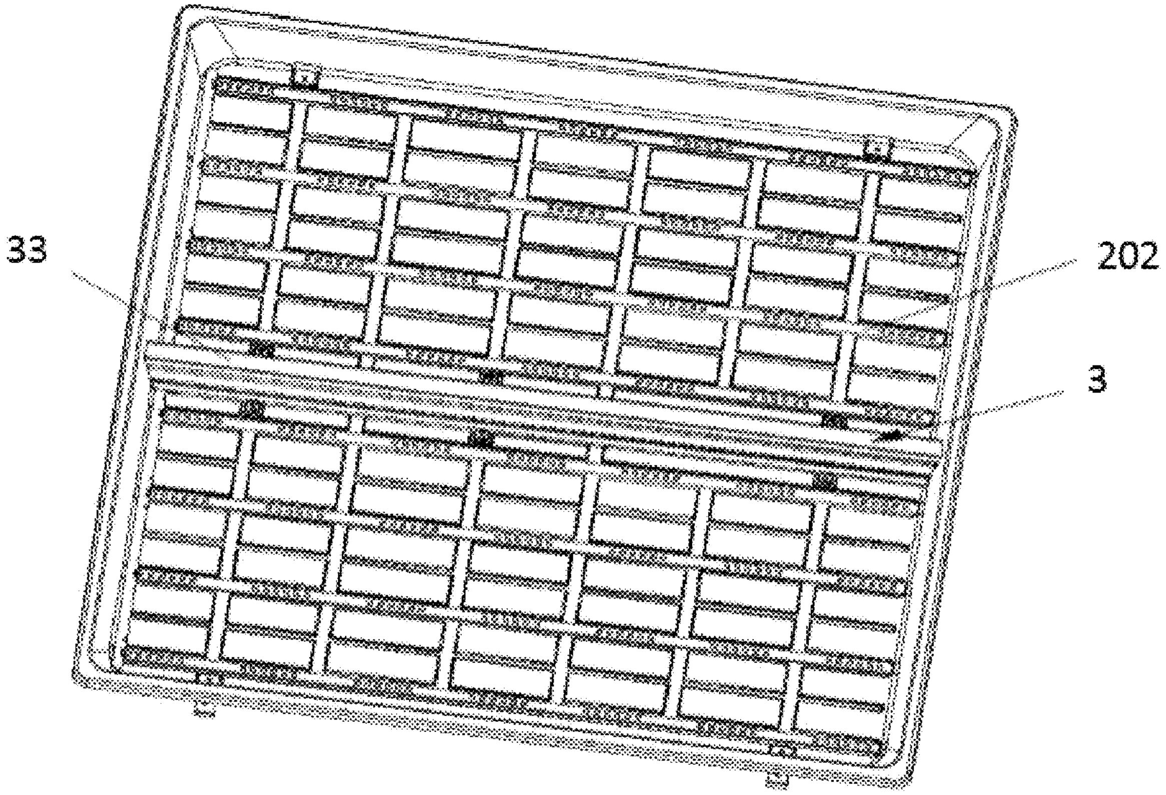
FIG. 50 is a perspective structural schematic view of FIG. 46 without the optical member.
Figure 51:
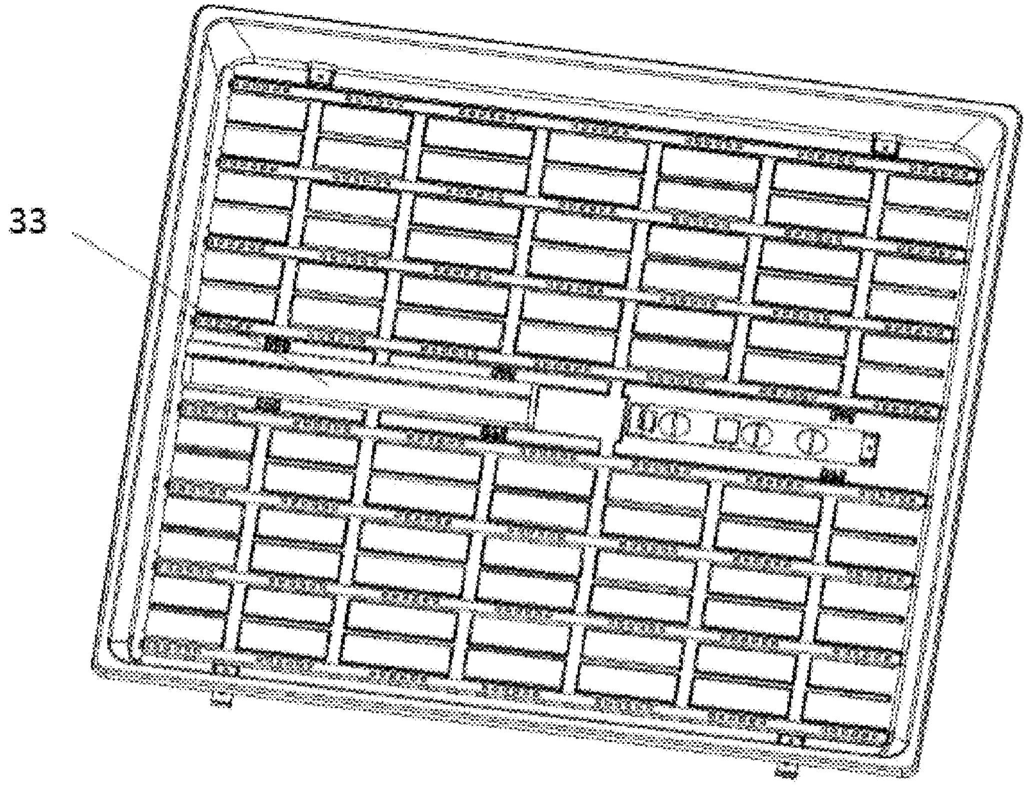
FIG. 51 is a perspective structural schematic view of FIG. 46 without the light redirecting unit.
Figure 52:
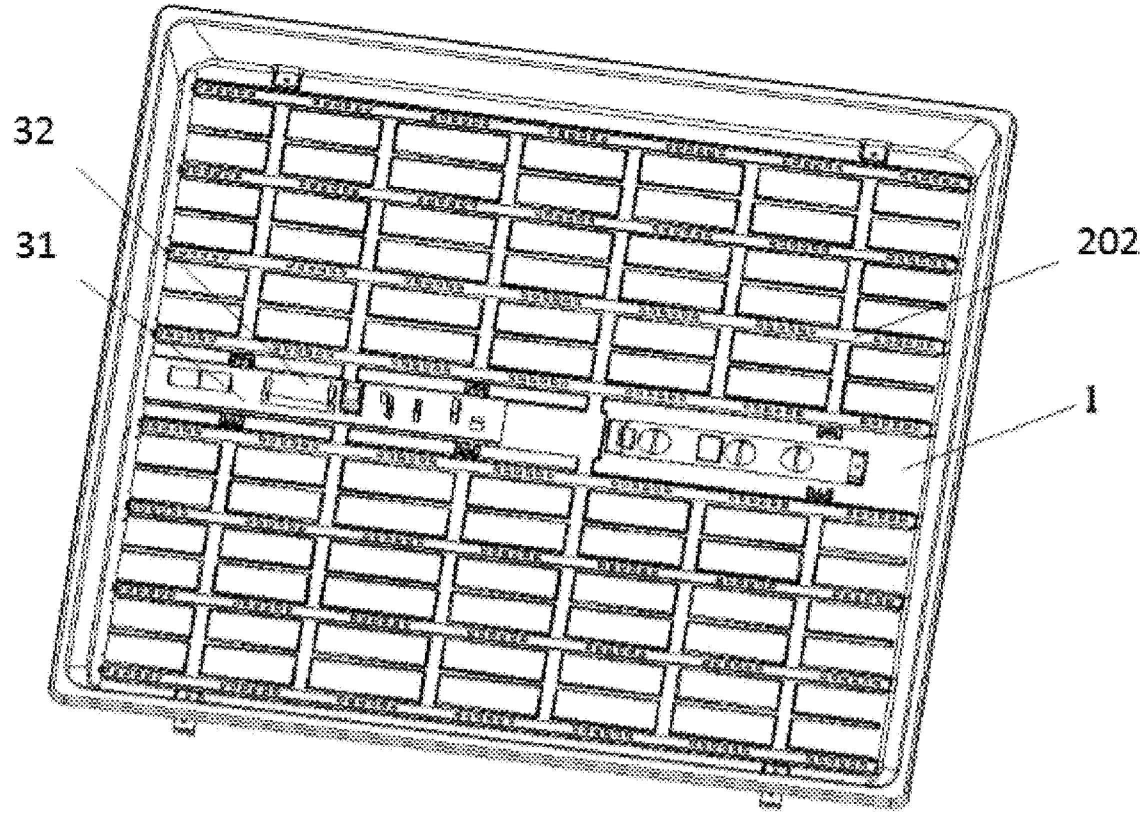
FIG. 52 is a perspective structural schematic view of FIG. 51 without the power source box.

In some embodiments, to control the glare of the LED lighting device and increase the light-emitting evenness in the light beam angle of the LED lighting device, a light distribution curve of the LED lighting device is designed (the light distribution curve means a light-emitting angle at each angle after the LED lighting device has been installed). In this embodiment, the LED lighting device is of a substantially square shape (such as two feet) or a lighting device described in any of the aforementioned embodiments, its light distribution curve is approximately axial symmetry (also called rotary symmetry, means the light distribution curve in each direction is basically symmetrical or the same). In other words, the ratio of luminous intensity (unit:cd) under the same angle of two light distribution curves in any direction is between 0.8 and 1.2. Furthermore, the ratio of luminous intensity (unit:cd) under the same angle of two light distribution curves in any direction is between 0.9 and 1.1. Moreover, the ratio of luminous intensity (unit:cd) under the same angle of two light distribution curves in any direction is between 0.95 and 1.05. In other words, when the ratio of luminous intensity under the same angle of two light distribution curves in any direction is in the above ranges, the light distribution curve of the LED lighting device in any direction is basically symmetrical or the same. For example, FIG. 44 shows light distribution curves on planes C0 and C90, where the light distribution curve on plane C0 is A and the light distribution curve on plane C90 is B. The ratio of luminous intensity of light distribution curve A and light distribution curve B at the same angle is between 0.8 and 1.2, 0.9 and 1.1 or 0.95 and 1.05. Plane C0 is a plane which is perpendicular to the light-emitting surface of the LED lighting device and penetrates the center line of the LED lighting device in one direction, where the "one direction" is parallel to the extended direction of length of the circuit board. Plane C90 is perpendicular to plane C0 and penetrates the center line of the LED lighting device in another direction, where the "another direction" is perpendicular to the extended direction of length of the circuit board. To further describe plane C0 and plane C90, please refer to FIG. 45. FIG. 45 shows a schematic view of the back of the LED lighting device. In FIG. 45, plane A0-A0 is plane C0 and plane B90-B90 is plane C90. The transverse direction of FIG. 45 is the installing direction of the circuit board.

The LED lighting device is of a substantially square shape (such as two feet), its light distribution curve is approximately axial symmetry, the light distribution curve in each direction is basically symmetrical or the same), so this embodiment takes the light distribution curve of plane C0 as an example. As shown in FIG. 44, the embodiment provides a light distribution curve to solve the glare and light-emitting evenness in the light beam angle of the LED lighting device. A coordinate system is established with point 0 of the light distribution curve as the center, in the range of 0 to 60 degrees, any point on the light distribution curve conforms to the following formula:

$$y = ax2 + bx + K$$

where a is a constant whose range is between −0.3 and −0.4, b is a constant whose range is between 3.5 and 4, and K is a constant whose range is between 1600 and 1700.

In the embodiment, the light beam angle of the light distribution curve of plane C0 is between 100 degrees and 110 degrees. The light distribution curve on two sides of the zero-degree angle of plane C0 is substantially symmetrical. In the range of 0 to 60 degrees, when any point on the light distribution curve satisfies the above formula, the LED lighting device has even light emission in the light beam angle and great glare control.

Please refer to FIG. 44. A coordinate system is established with point 0 of the light distribution curve as the center, in the range of −30 degrees to 30 degrees, any point on the light distribution curve satisfies the following formula:

$$y = ax2 + 1E - 13x + K$$

where a is a constant whose range is between −0.25 and −0.27, E means an exponent, and K is a constant whose range is between 1600 and 1720.

In the range of −30 degrees to 30 degrees, when any point on the light distribution curve satisfies the above formula, the LED lighting device has higher luminous intensity in the range of −30 degrees and 30 degrees to meet the requirement of light distribution in the angle range.

In the embodiment, the design of the above light distribution curve can be implemented by the above structural design.

As shown in FIGS. 69-75, an embodiment provides an optical member 21 which may be applied to the LED lighting device of the invention. The fundamental structure of the optical member 21 in the embodiment is substantially the same as the above embodiments (the optical member shown in the embodiments in FIGS. 1-56). In detail, the optical member 21 also includes a first optical member 2111 and a second optical member 2112. The first optical member 2111 is covered on the light-emitting direction of the corresponding LED array 203. That is, the first optical member 2111 is arranged in one-to-one correspondence with the LED array 203, and the both are arranged with the same amount. For example, in the embodiment, the outline size of the LED lighting device is 2 feet×2 feet (603 mm*603 mm), and the amount of the optical units 91 is 16.

In the embodiment, the range of luminous flux emitted from each optical member 21 is between 250 lumen and 350 lumen. In the embodiment, at least 50% of the luminous flux emitted from the optical member 21 is directly emitted from the first optical member 2111 (without being reflected by the second optical member 2112) to reduce the light loss caused by the reflection of the second optical member 2112 so as to guarantee the light-emitting efficiency. After passing through two layers of optical media, the light-emitting efficiency of existing technology lamps is usually not higher than 75%, while in the LED lighting device of the embodiment, at least 50% of luminous flux only passes one layer of optical medium (the first optical member 2111), its overall light-emitting efficiency can be higher than 80%. The light-emitting efficiency described here means the ratio of the luminous flux emitted from the LED lighting device to the sum of the luminous flux generated by all LED chips 201.

In the embodiment, the first optical member 2111 may be substantially the same as the first optical member 2111 in the aforementioned embodiments in structure.

In the embodiment, the second optical member 2112 includes an optical walls surrounding the first optical member 2111. The optical walls includes two first light redirecting walls 211241 and two second light redirecting walls 211242. The first light redirecting walls 211241 are disposed on two sides of the width direction of the circuit board 202, and the second light redirecting walls 211242 are disposed in the length direction of the circuit board 202. Each of the first light redirecting walls 211241 and the second light redirecting walls 211242 may be disposed with functions of reflection and/or transmittance.

In the embodiment, the light beam angle of the LED chip 201 is A (the definition of the light beam angle is the same as the abovementioned). The LED array 203 includes multiple LED chips 201. The multiple LED chips 201 are arranged in a row along the length direction of the circuit board 202. The angle a between the two first light redirecting walls 211241 of the second optical member 2112 is greater than the light beam angle A of the LED chip 201. Thus, even if the light emitted from the LED chips 201 is optically treated by the first optical member 2111 (such as diffusion), the light emitted from the LED chips 201 being emitted by the first light redirecting wall 211241 can still be reduced so as to reduce the light loss. In the embodiment, the difference between the angle a between the two first light redirecting walls 211241 of the second optical member 2112 and the light beam angle A of the LED chip 201 is not greater than 30 degrees, so as to make the first light redirecting wall 211241 reflect sufficient light (emitted from the LED chips 201) to make the LED lighting device have evener light distribution and better glare control.

In the embodiment, the angle b between two second light redirecting walls 211242 of the second optical member 2112 is less than the light beam angle A of the LED chip 201 and the angle a between two first light redirecting walls 211241. Thus, the second light redirecting walls 211242 can reflect more light from the LED chips 201 in the LED array 203 to both reduce the glare in the installing direction of the LED chips 201 of the LED array 203 of the LED lighting device and make the first light redirecting walls 211241 reflect sufficient light (emitted from the LED chips 201) to make the LED lighting device have evener light distribution. In some embodiments, the angle b between the second light redirecting walls 211242 of the second optical member 2112 is less than 90°, 85°, 80° or 75°.

In the embodiment, the LED array 203 has more than ten LED chips 201 (such as fourteen), and wherein the light emission in the range of the light beam angle A of at least two, four or six LED chips 203 corresponds to the second light redirecting walls 211242. In other words, without considering the light diffusion of the first optical member 2111, the light emission in the range of the light beam angle A of at least two, four or six LED chips 203 will be emitted to the second light redirecting walls 211242 to reduce glare and make the optical unit 211 have better light distribution.

As shown in FIGS. 57-64, in some embodiments, the LED lighting device may have different optical members to obtain different light-emitting effects. That is, the basic structure of the LED lighting device in the embodiment shown in FIGS. 57-60 is the same as the above embodiments (i.e., the seat, the electric power source and the light source are the same or substantially the same in structure), their difference is to replace a different optical member. As shown in FIGS. 57-60, in the embodiment, the optical member 21 includes a first optical member 2111 and a second optical element 2112. The first optical member 2111 is covered on the seat 1 and arranged to redirect the light emitted from at least part of the light source component 20. The second optical member 2112 is disposed on the first optical member 2111 and arranged to have one or more functions of light transmittance, diffusion, refraction and reflection.

The first optical member 2111 is disposed with multiple optical walls 21124 corresponding to the LED array 203 of the light source component 20. In detail, the optical walls 21124 includes a light-emitting hole 211243, which makes the LED array 203 corresponding thereto exposed from the optical walls 21124. In other words, in the direction of the optical axis of the LED chips 201 of the LED array 203, the optical walls 21124 does not form a cover and does not cause a light loss resulting from light passing different media.

The optical wall 21124 is attached on a surface of the circuit board 202 of the light source component 20 and there is no gap between the circuit board 202 and the wall portion of the periphery of the light-emitting hole 211243 in the direction of the optical axis of the LED chips 201 to prevent light from entering the gap to cause light loss. In some embodiments, the interval between the optical wall 21124 and the surface of the circuit board 202 of the light source component 20 is less than 1 mm (the interval between the surface of the circuit board 202 and the wall portion of the periphery of the light-emitting hole 211243 in the direction of the optical axis of the LED chips 201 is less than 1 mm) to reduce light entering the gap between the circuit board 202 and the wall portion of the periphery of the light-emitting hole 211243 so as to control light loss.

The optical wall 21124 includes a first light redirecting wall 211241 and a second light redirecting wall 211242. The first light redirecting wall 211241 is disposed on two sides of the width direction of the circuit board 202, and the second light redirecting walls 211242 is disposed in the length direction of the circuit board 202. Each of the first light redirecting wall 211241 and the second light redirecting wall 211242 may be disposed with functions of reflection and/or transmittance.

The first optical member 2111 is covered on second optical member 2112 to form an optical chamber composed of the first light redirecting wall 211241, the second light redirecting wall 211242 and first optical member 2111. The light generated by the working LED chips 201 will be finally emitted from the first optical member 2111. In the embodiment, at least 50% of the luminous flux generated by the working LED array 203 (light source component 20) is emitted from the LED lighting device only through one optical layer (not including air) so as to reduce light loss caused by passing multiple optical layers and improve the light-emitting efficiency.

The first light redirecting wall 211241 has a first reflecting portion 2112411 and a second reflecting portion 2112412. The first reflecting portion 2112411 is arranged to reflect the light directly emitted from the LED chips 201, and the second reflecting portion 2112412 is arranged to only reflect secondary light (the light directly emitted from the LED chips 201 being reflected and then projected to the second reflecting portion 2112412). In arrangement, the first reflecting portion 2112411 is more adjacent to the LED chips 201 than the second reflecting portion 2112412. In some embodiments, the area of the first reflecting portion 2112411 accounts for at least one fifth of the area of the first light redirecting wall 2112411 to prevent the light emission of the LED chips 201 from excessively concentrating after being reflected by the first reflecting portion with a small area, which causes uneven light emission. In the embodiment, the first optical component 211 is removed (excluding the influence of the reflected light by the first optical element 211), after the LED chips 201 been lit, part of the first light redirecting wall 211241, which is directly lit, can be deemed as the first reflecting portion 2112411 of the embodiment, the contrary part is the second reflecting portion 2112412.

Figure 61:
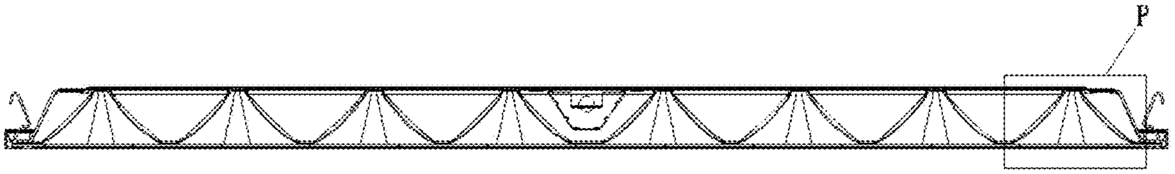
FIG. 61 is a cross-sectional structural schematic view of the LED lighting device in some embodiments.
Figure 62:
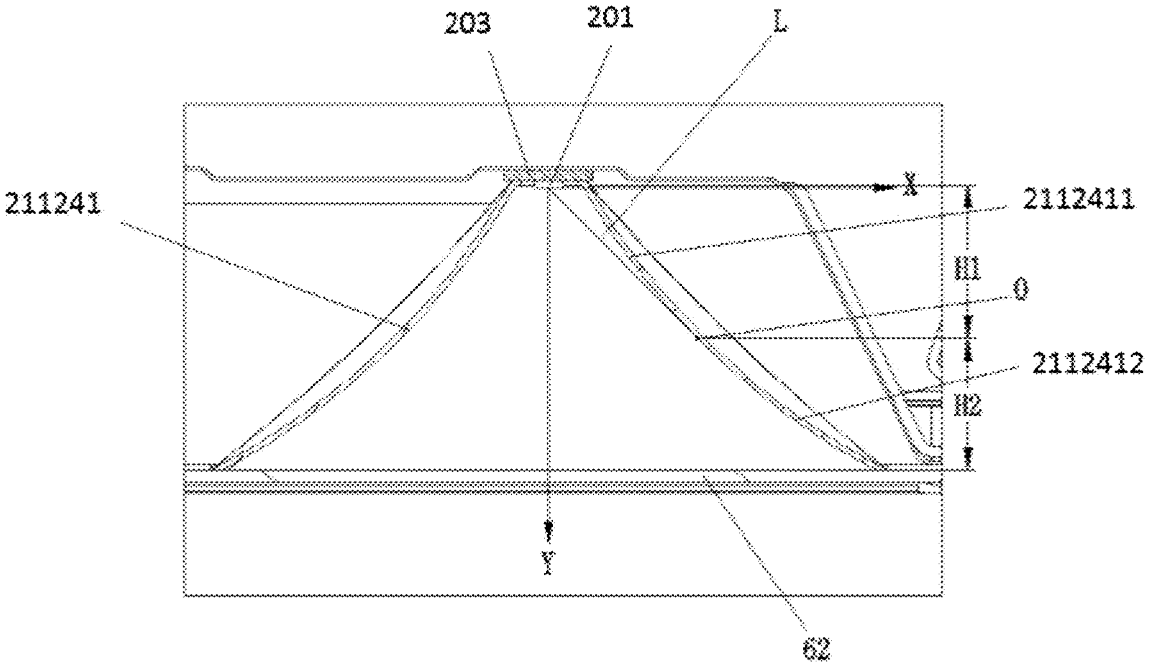
FIG. 62 is an enlarged view of part P in FIG. 61.

As shown in FIGS. 61-62, on the cross-section of the LED lighting device, the cross-section expresses the matching relationship of the first light redirecting wall 211241 and the LED chip 201. A straight line L, whose one end is connected to the center of the front of the LED chip 201 and the other end is tangent to the first light redirecting wall 211241, the tangent point between the straight line L and the first light redirecting wall 211241 is O, the tangent point O divides the first light redirecting wall 211241 into a first portion and a second portion, the first portion is more adjacent to the LED chip 201 than the second portion, the first portion is the first reflecting portion 2112411, and the second portion is the second reflecting portion 2112412. In FIG. 62, the ratio of the height H1 of the first portion to the height H2 of the second portion is between 1 and 1.3 to make the LED lighting device have better light-emitting evenness and better light-emitting angle. In detail, when the ratio of the height H1 of the first portion to the height H2 of the second portion is in the abovementioned range, on the one hand, the first reflecting portion 2112411 can have a larger area to reflect the light directly emitted from the LED chip 201 (or the first light redirecting wall 211241 can have a larger area to reflect the light directly emitted from the LED chip 201), so that the reflected light can be emitted more evenly. On the other hand, it can better control the light emission of LED lighting device, control its light-emitting angle, and reduce glare.

In the embodiment, the first light redirecting wall 211241 may be of an arcuate shape. The distance between the two first light redirecting walls 211241 corresponding to the LED chips 201 gradually increases in the direction on the optical axis of the LED chips 201, which is away from the LED chips 201, and the magnitude of its gradual increase also increases. In other words, a flared or dilated shape appears between the two first light redirecting walls 211231 corresponding to the LED chips 201.

As shown in FIG. 62, when the LED lighting device is installed horizontally and the optical axis of the LED chips 21 is vertically downward, a rectangular coordinate system is established with the center of the light-emitting surface of the LED chips 21 as the origin, the width direction of the circuit board 22 as the Y-axis, and the thickness direction of the LED lighting device as the Y-axis, any point on the first light redirecting wall 6112 satisfies the following formula:

$$y = ax^2 + bx + k$$

where a is a constant whose range is between 0.02 and 0.025, the range of the absolute value of b is between 1.6 and 1.8, and k is a constant whose range is between 5 and 6.

When satisfying the above formula, the first light redirecting wall 211241 has better reflection to the light directly emitted from the LED chips 201 and to the light reflected from the first optical component 2111, so that the LED lighting device can have better light-emitting evenness and light-emitting angle.

Figure 63:
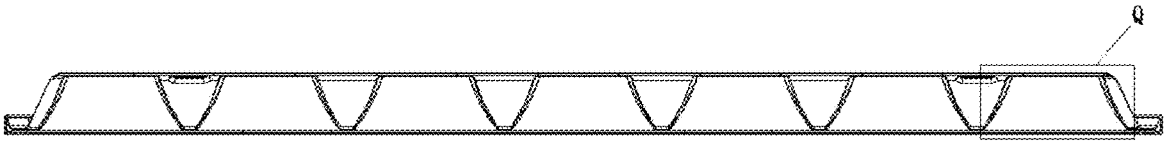
FIG. 63 is another cross-sectional structural schematic view of the LED lighting device in some embodiments.
Figure 64:
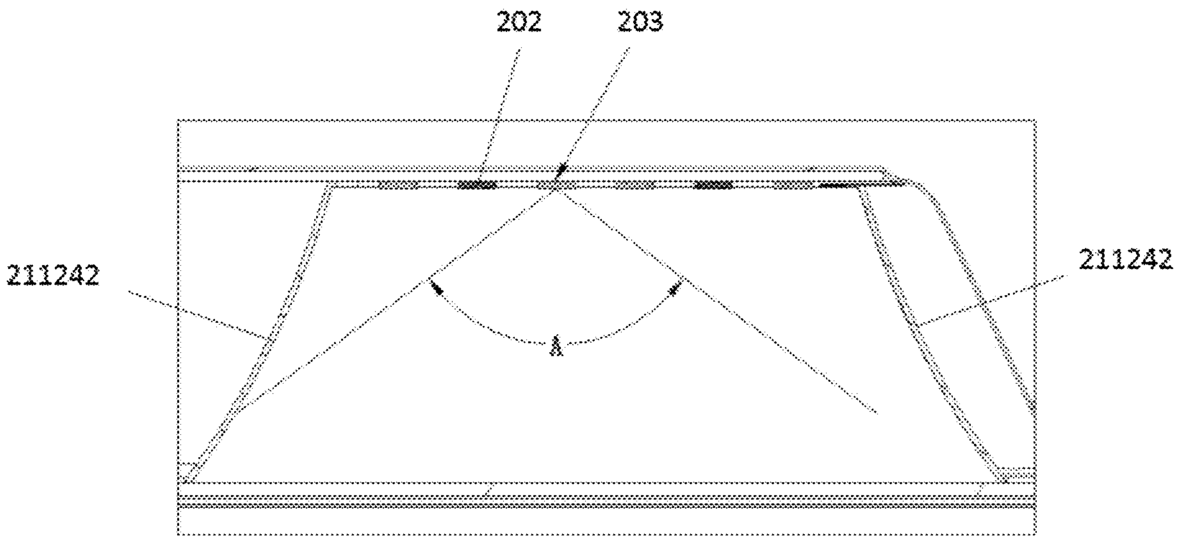
FIG. 64 is an enlarged view of part Q in FIG. 63.
Figure 65:
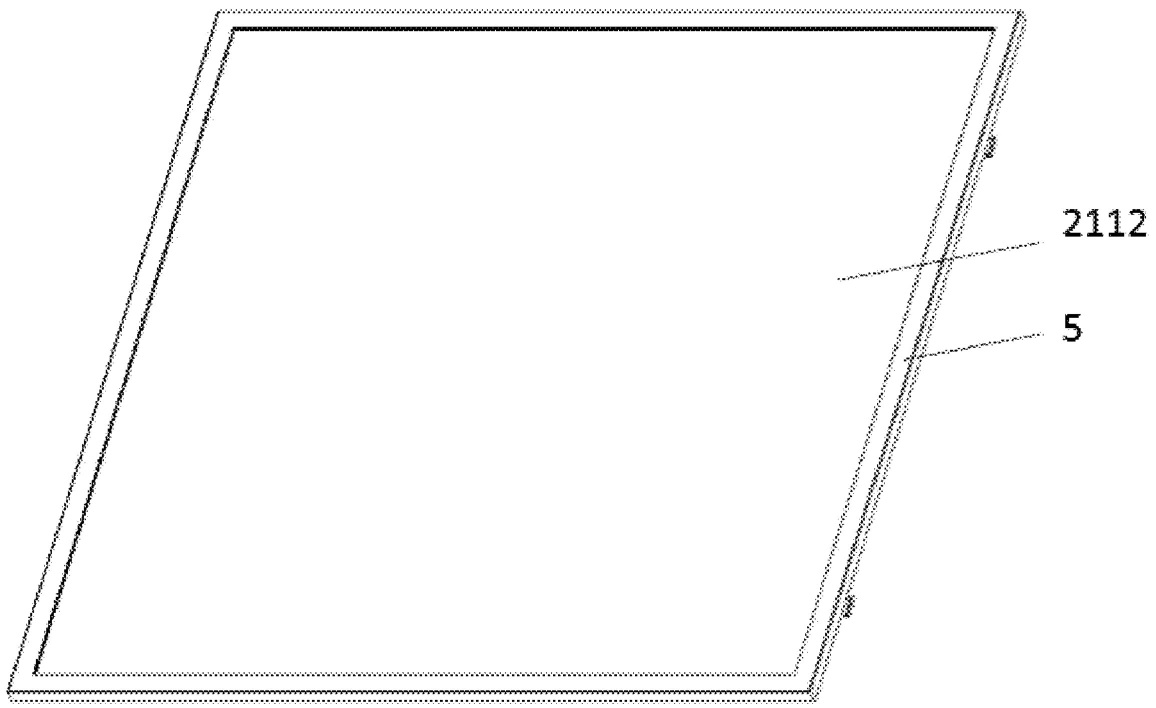
FIG. 65 is a perspective structural schematic view of the LED lighting device in some embodiments.
Figure 66:
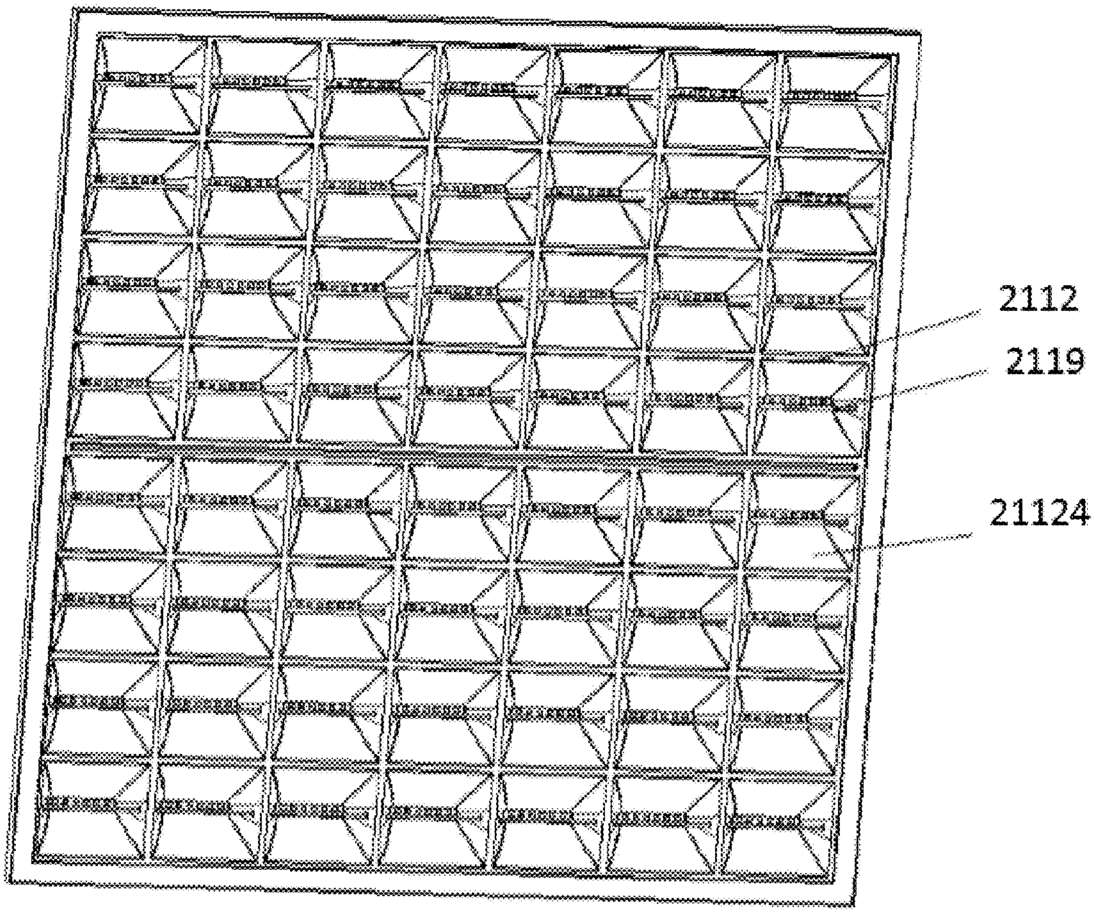
FIG. 66 is a perspective structural schematic view of FIG. 65 without the second optical element.
Figure 67:
FIG. 67 is a cross-sectional structural schematic view of the LED lighting device in some embodiments.
Figure 68:
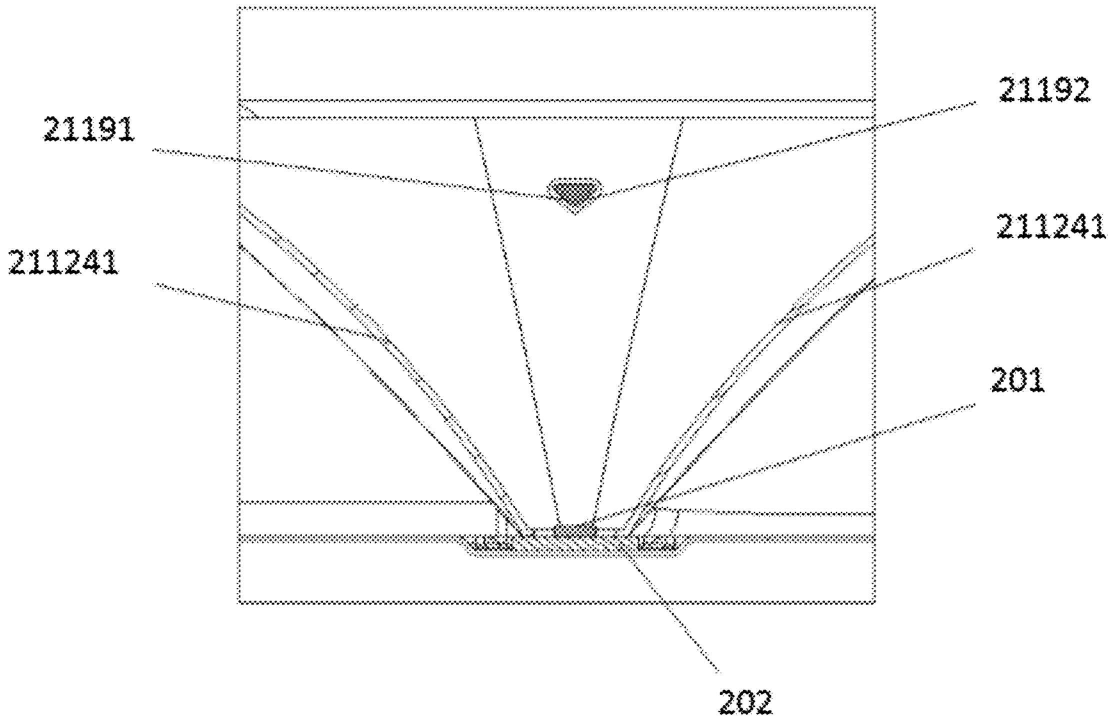
FIG. 68 is an enlarged view of part O in FIG. 67.
Figure 69:
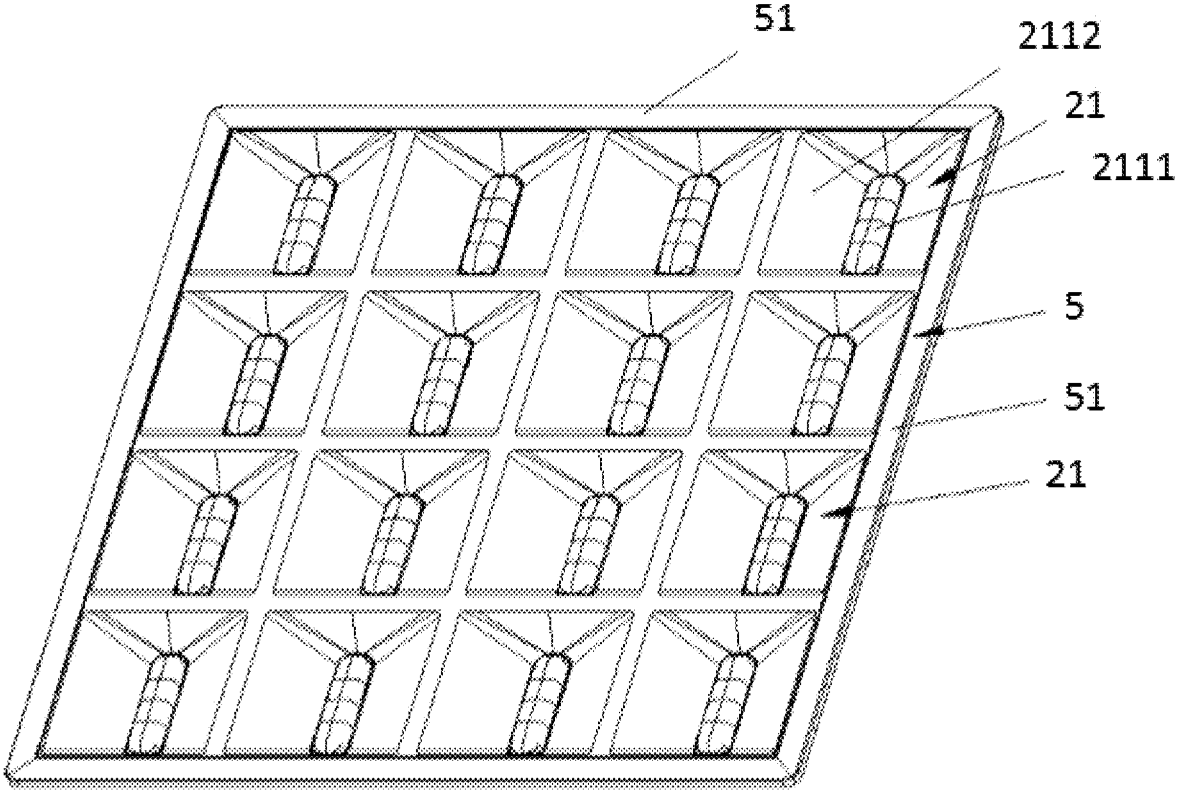
FIG. 69 is a perspective structural schematic view of the LED lighting device in some embodiments.
Figure 70:
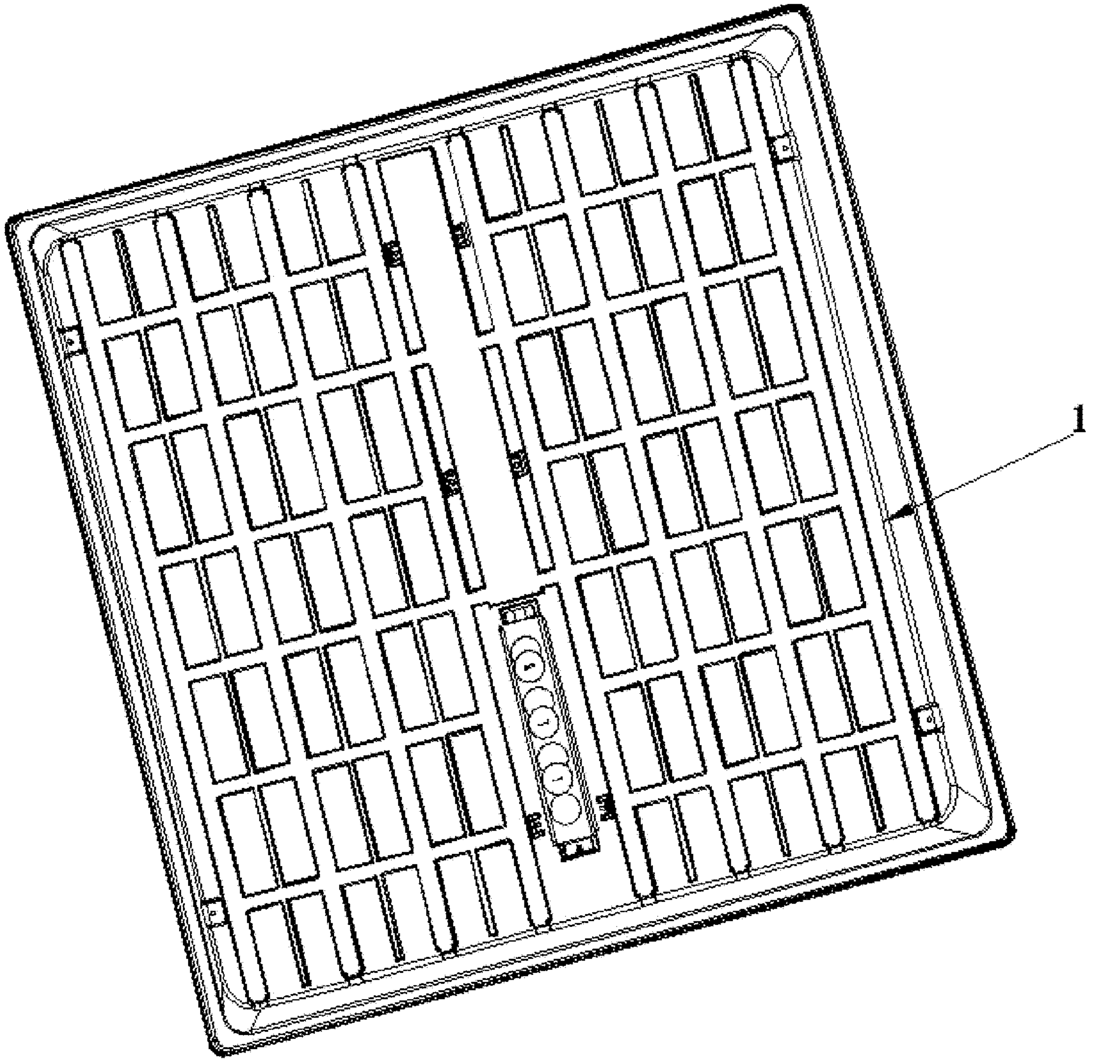
FIG. 70 is another perspective structural schematic view of the LED lighting device in some embodiments.
Figure 71:
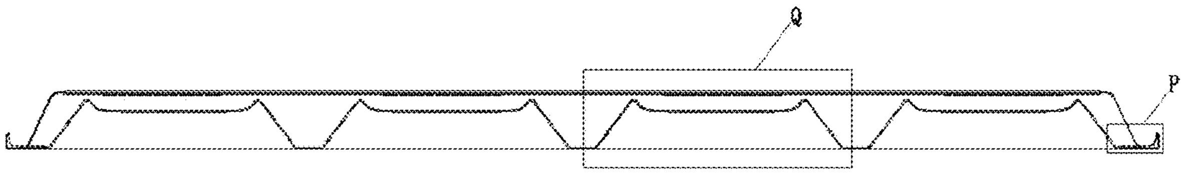
FIG. 71 is a perspective structural schematic view of the LED lighting device in some embodiments.
Figure 72:
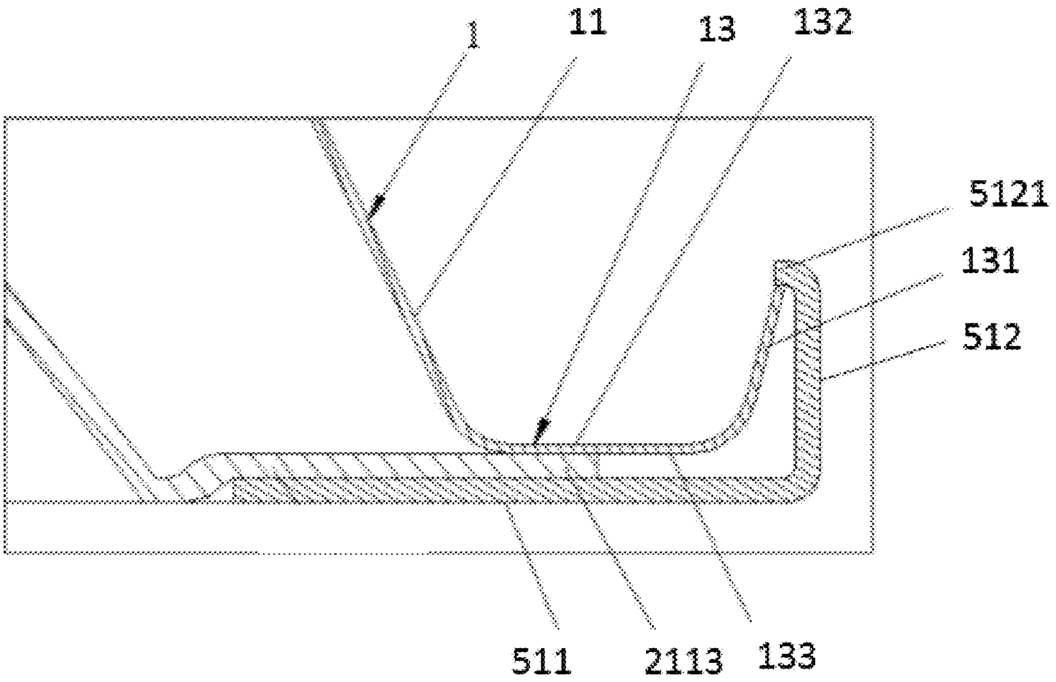
FIG. 72 is an enlarged view of part P in FIG. 71.
Figure 73:
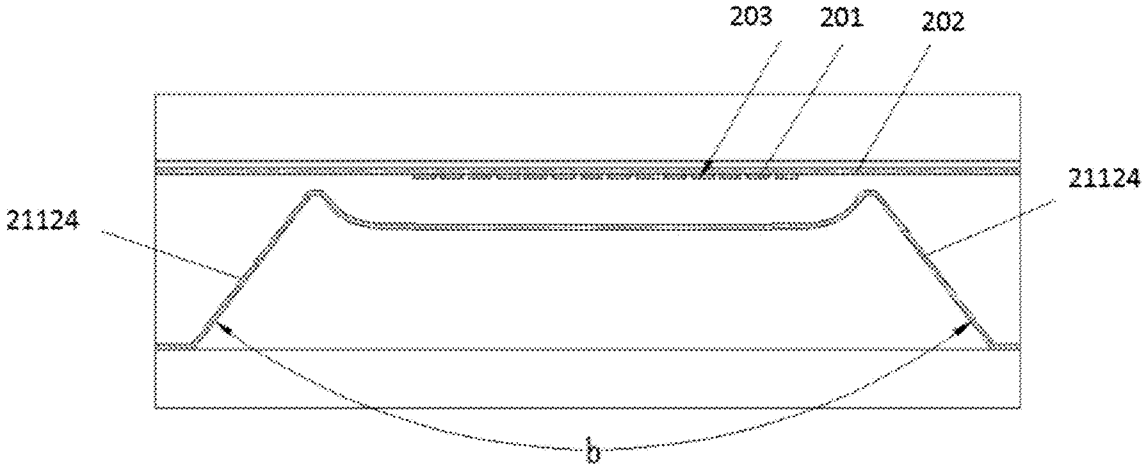
FIG. 73 is an enlarged view of part Q in FIG. 71.
Figure 74:
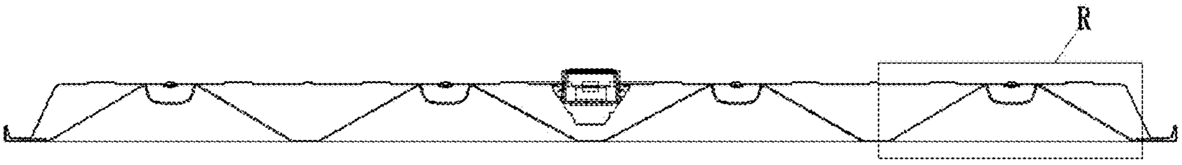
FIG. 74 is another cross-sectional schematic view of the LED lighting device in some embodiments.
Figure 75:
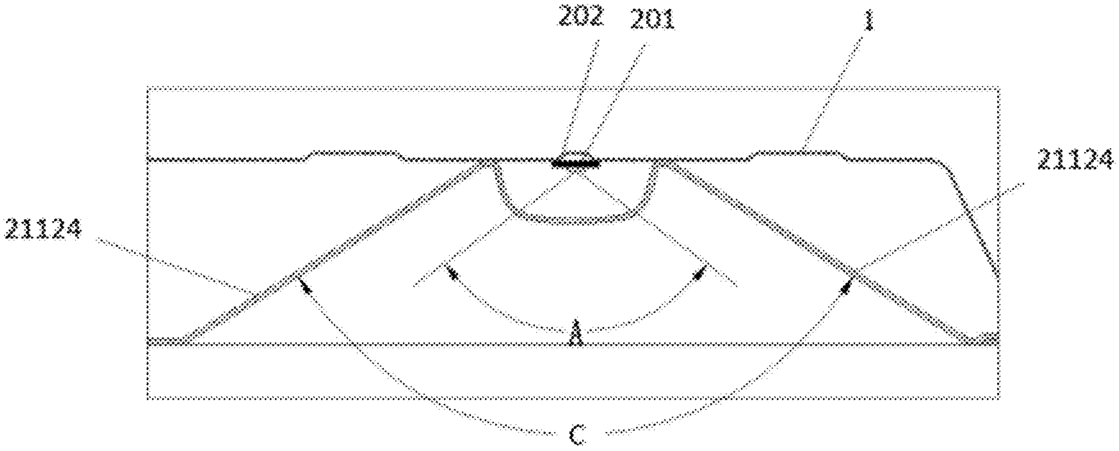
FIG. 75 is an enlarged view of part R in FIG. 74.

As shown in FIGS. 63-64, on the cross-section of the LED lighting device, the cross-section expresses the matching relationship of the second light redirecting wall 211242 and the LED array 203. At least part of the light emission in the range of the light beam angle A of one of the LED chips 201 in the same LED array 203 is directly emitted to the second light redirecting wall 211242 and reflected by the second light redirecting wall 6113. In other words, the boundary lines of the light beam angle A of one of the LED chips 201 in the same LED array 203 intersect the second light redirecting wall 211242. Thus, on the one hand, at least part of the light emission in the range of the light beam angle A of one of the LED chips 201 in the same LED array 203 is blocked by the second light redirecting wall 211242 to reduce glare. On the other hand, the reflection of the second light redirecting wall 211242 can improve the overall light emission to make the light-emitting distribution more reasonable.

In the embodiment, the first optical component 2111 may be configured to have a diffusion function (for example, the first optical component 2111 has a diffusion function by its own material property, such as acrylic material) to increase the evenness of light emission. In some embodiments, the first optical component 2111 are arranged in an array manner to have a light redirecting function.

As shown in FIGS. 65-68, in some embodiments, to make the LED lighting device have different light-emitting effects, the optical member 21 may be further disposed with a third optical component 2119. The third optical component 2119 is disposed along the length direction of the circuit board 202 and located in the direction of the optical axis of the LED chip 201. In some embodiments, the third optical component 2119 may be configured to only have a reflection function to reflect the light from the working LED chips 201 to the optical wall 21124 (the first light redirecting wall 211241 and the second light redirecting wall 211242) and then reflect it to the first optical component 2111 by the optical wall 21124 to perform light emission, so as to reduce the luminous intensity near the optical axis of the LED chip 201 to improve the evenness of light emission. In some embodiments, the third optical component 2119 is configured to have functions of reflection and transmittance to prevent the third optical component 2119 from forming a dark area.

The third optical component 2119 has a first reflecting face 21191 and a second reflecting face 21192. The first reflecting face 21191 corresponds to the first light redirecting wall 211241 on one side, and the second reflecting face 21192 corresponds to the first light redirecting wall 211241 on the other side. The first reflecting face 21191 and the second reflecting face 21192 are arranged symmetrically.

The optical axis of the LED chip 201 corresponds or substantially corresponds to the junction of the first reflecting face 21191 and the second reflecting face 21192. The first reflecting face 21191 is in the opposite direction of the junction of the first reflecting face 21191 and the second reflecting face 21192, and the distance from it to the surface of the circuit board 202 gradually increases.

The third optical member 2119 is of a strip shape and simultaneously corresponds to multiple optical walls 21124. The third optical member 2119 passes through the hole on the second light redirecting wall 211242 and is fixed on the second light redirecting wall 211242.

The LED lighting device in this embodiment can further include an install border 5, where the install border 5 can also serve as a decorative member, is disposed on the outer edge of the seat 1, and covers the outer edge of the optical member 21. The decorative components 7 can play a role in decoration, and can improve the structural strength of the LED lighting device.

Figure 90:
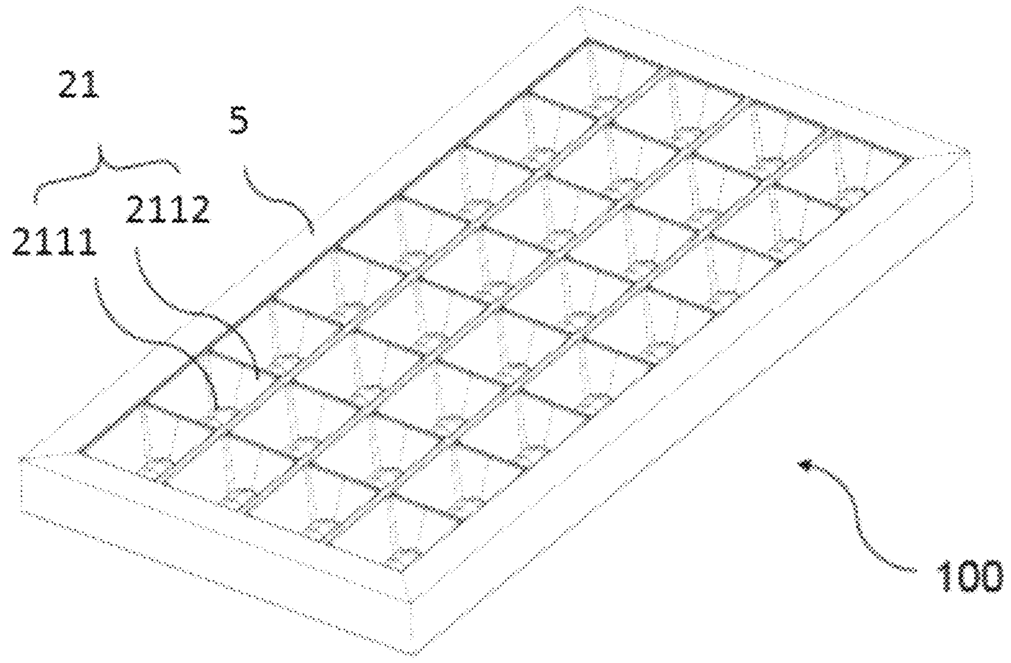
FIG. 90 is a front perspective schematic view of the LED lighting device in another embodiment of the present application.

Please refer to FIG. 90, which is the front perspective schematic view of the LED lighting device in another embodiment of the present application. As shown in the drawing, the LED lighting device 100 includes the optical member 21, where the optical member 21 includes the first optical members 2111 and the second optical members 2112 connected to each other. The install border 5 is disposed on the outer side of the optical member 21, and the install border 5 surrounds the periphery of the optical member 21 and covers the periphery of the optical member 21.

Figure 91:
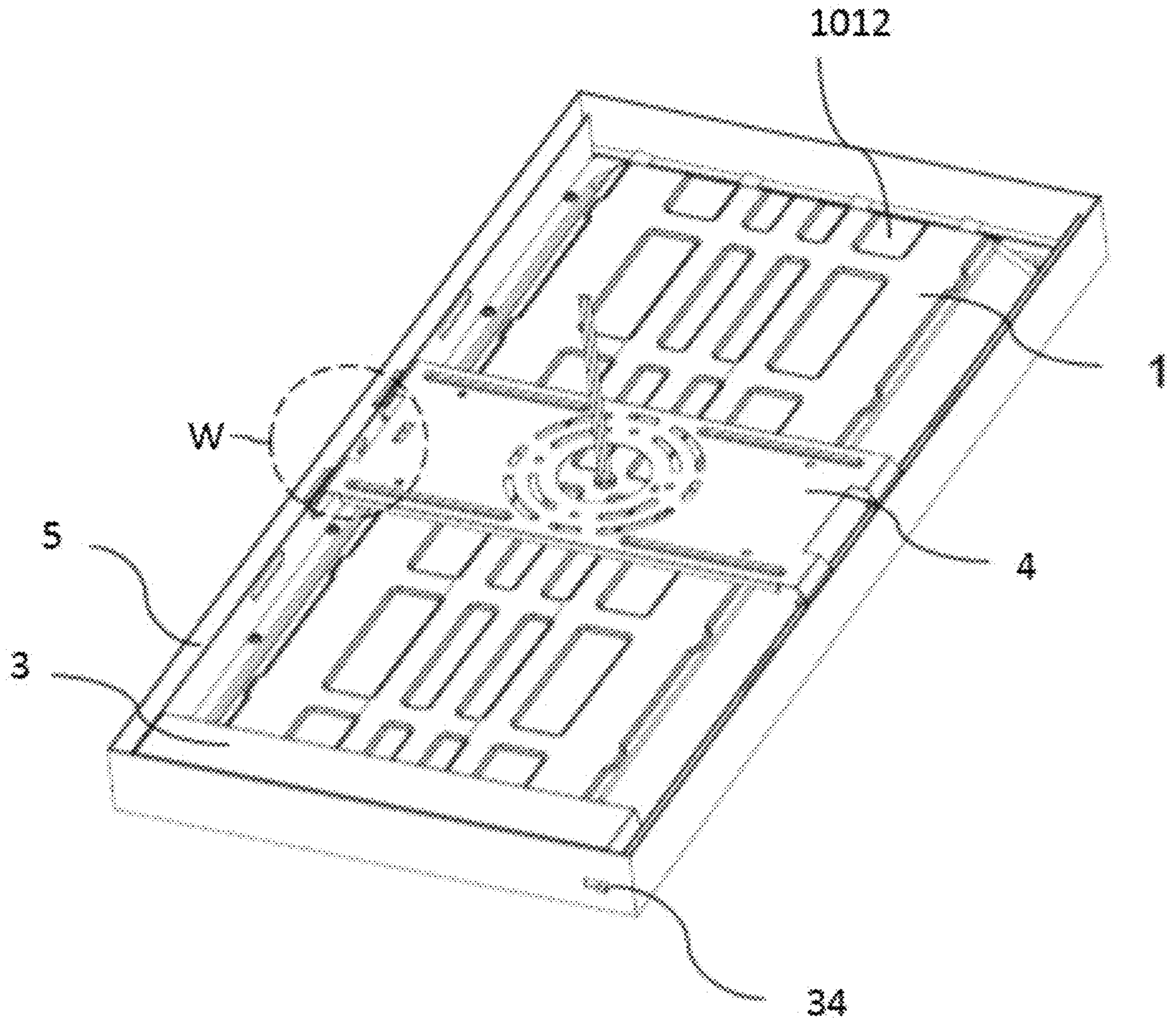
FIG. 91 is a back perspective schematic view of the LED lighting device in another embodiment of the present application.

Please refer to FIG. 91, which is the back perspective schematic view of the LED lighting device in another embodiment of the present application. As mentioned above, the device further includes the seat 1, where the optical member 21 is disposed on the seat 1, and the baseplate 10 of the seat 1 is also provided with the integrally formed reinforcement unit 1012. It is different from the LED lighting device described above in that the bracket 4 in this embodiment is of a disc structure, two ends thereof are fixed to the install border 5, and meanwhile, the flat surface is fixed to the installing environment (such as a ceiling), thereby fixing the LED lighting device 100 in the installing environment. A groove space is formed between the install border 5 and the seat 1, the power source 3 is disposed in the groove space and is attached to at least one side of the install border 5 (such as the side in the width direction of the LED lighting device), packaging of the power source 3 is completed together with the install border 5, and the height (or thickness) of the power source 3 does not exceed the height of the install border 5. The power source 3 further includes a regulating switch 34, the regulating switch 34 is electrically connected to the electronic components in the power source 3, and one side of the install border 5 corresponding to the power source 3 is provided with a through hole, so that the regulating switch 34 is exposed through the through hole, and the user can control the operating state, such as the light intensity and the color temperature, of the LED lighting device 100 by the regulating switch 34.

Figure 92:
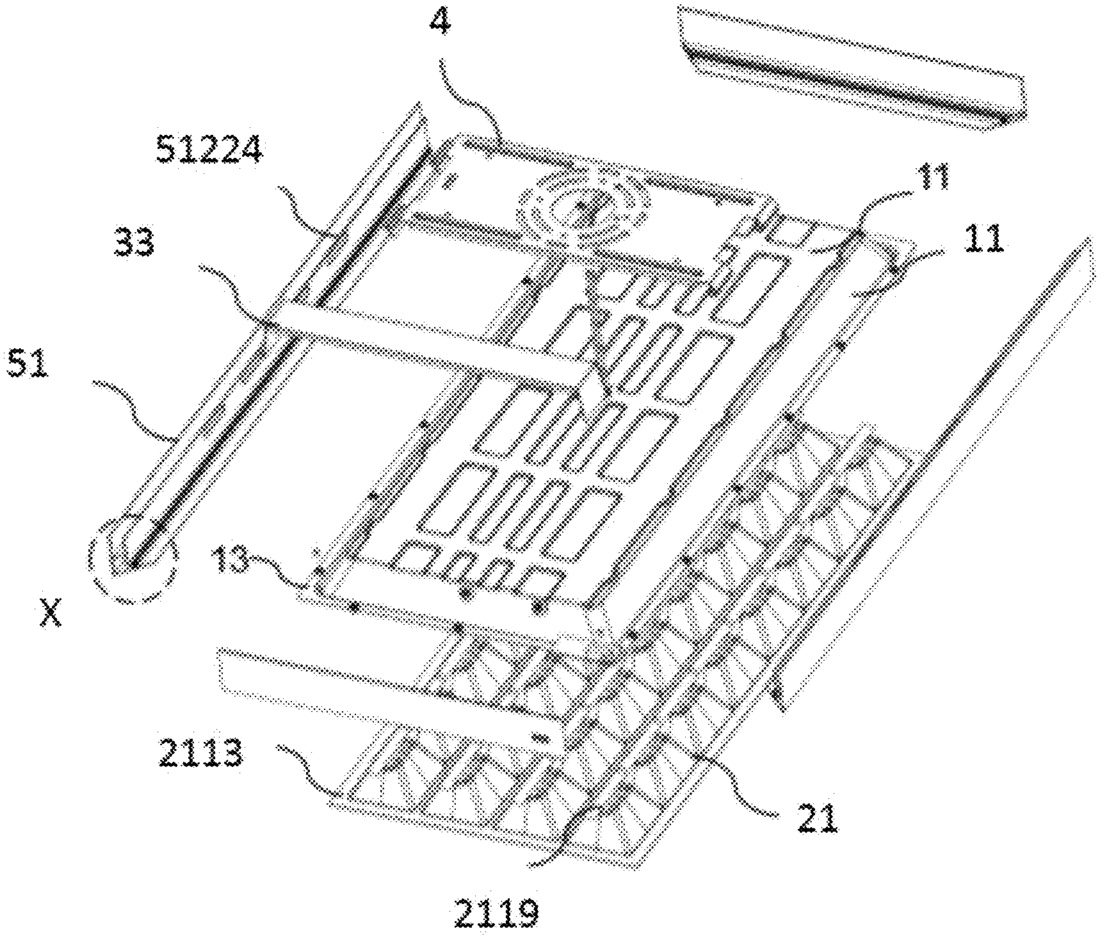
FIG. 92 is a back exploded schematic view of the LED lighting device in another embodiment of the present application.

FIG. 92 is the back exploded schematic view of the LED lighting device in another embodiment of the present application. The install border 5 is composed of a plurality of support elements 51, for example, four support elements 51, two long support elements 51 and two short support elements are connected end to end to form the install border 5. The support elements 51 are provided with rotary fastening grooves 51224, and two ends of the bracket 4 can be matched with the rotary fastening grooves 51224 to achieve fixing. As shown in FIG. 92, the bracket 4, the seat 1 and the optical member 21 are sequentially stacked, the seat 1 includes the baseplate 10 and the sidewall 11 surrounding the baseplate 10, and the baseplate 10 and the sidewall 11 form a groove 101 for receiving the optical member 21. One end of the sidewall 11 away from the baseplate 10 is provided with the install end wall 13 extending outwards (substantially parallel to the baseplate 10), and the periphery of the optical member 21 is provided with the first connecting wall 2113 substantially parallel to the baseplate 10. In the stacking process, a main portion (that is, the first optical members 2111 and the second optical members 2112) of the optical member 21 is received in the groove 101, and the first connecting wall 2113 of the optical member 21 abut against the install end wall 13 of the sidewall 11, that is, the first connecting wall 2113 is borne by the install end wall 13. In addition, the install border 5 or the support elements 51 cover the surface of the first connecting wall 2113 far away from the install end wall 13, that is, the optical member 21 is clamped by the seat 1 and the install border 5. In an embodiment of the present application, a third optical member 2119 is further included, the third optical member 2119 is disposed between the baseplate 10 and the optical member 21 to diffuse the light emitted by the light source and then transmit the light to the optical member 21, and the third optical member 2119 can be an arc-shaped diffusing plate.

The bracket 4 is attached to the back of the baseplate 10, that is, the surface away from the optical member 21, and the flat surface of the bracket 4 is parallel to the baseplate 10 and is spaced apart from the baseplate by a certain distance. Two ends of the bracket 4 are detachably connected to the install border 5 or the support elements 51.

Figure 93:
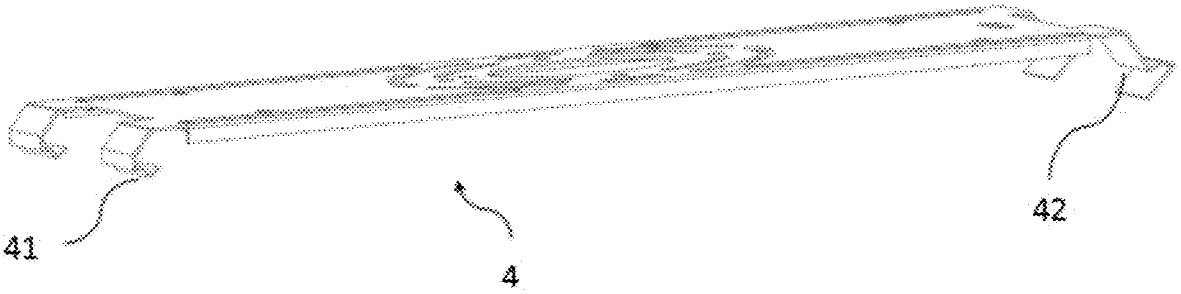
FIG. 93 is a schematic view of the bracket in another embodiment of the present application.

Please refer to FIG. 93. FIG. 93 is the schematic view of the bracket in another embodiment of the present application. As shown in the drawing, the entire bracket 4 is a flat rectangular surface, two opposite ends of the rectangular surface are bent to form the first rotary fastening portion 41 and the second rotary fastening portion 42, the first rotary fastening portion 41 and the second rotary fastening portion 42 are integrally formed with the bracket 4, the first rotary fastening portion 41 and the second rotary fastening portion 42 can be of the same structures or different structures and can be bent towards the middle of the bracket 4 or the outside of the bracket 4, as long as the bracket 4 can be fastened and fixed to the rotary fastening grooves 51224.

Figure 94:
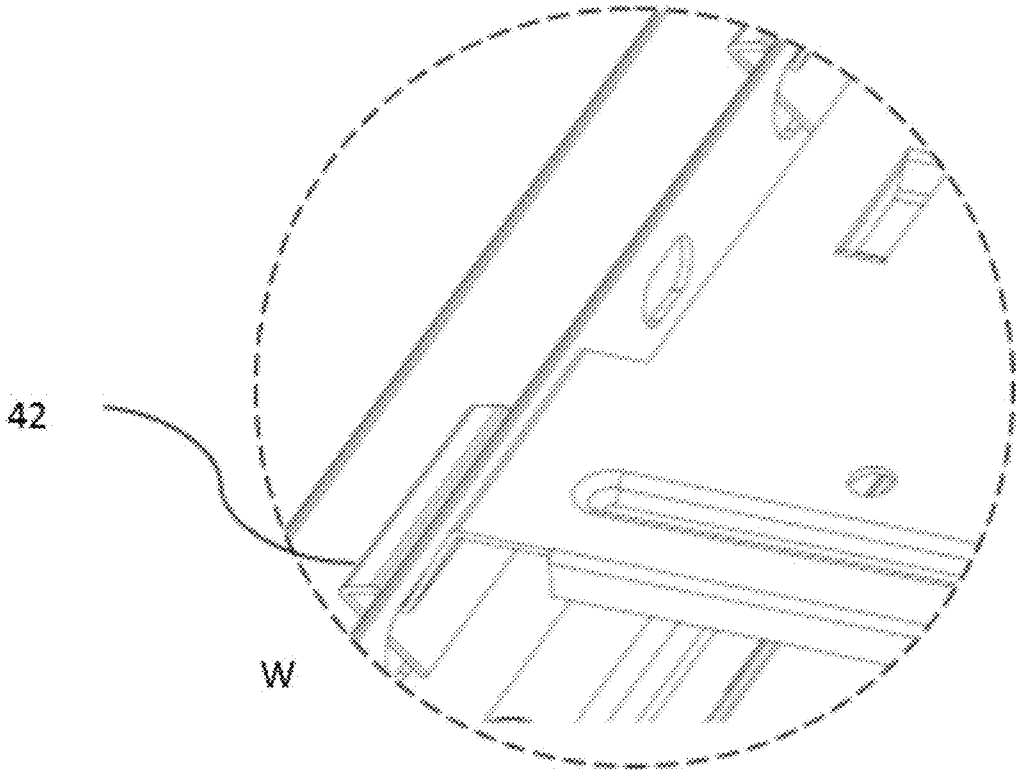
FIG. 94 is an enlarged view of part W in FIG. 91.
Figure 95:
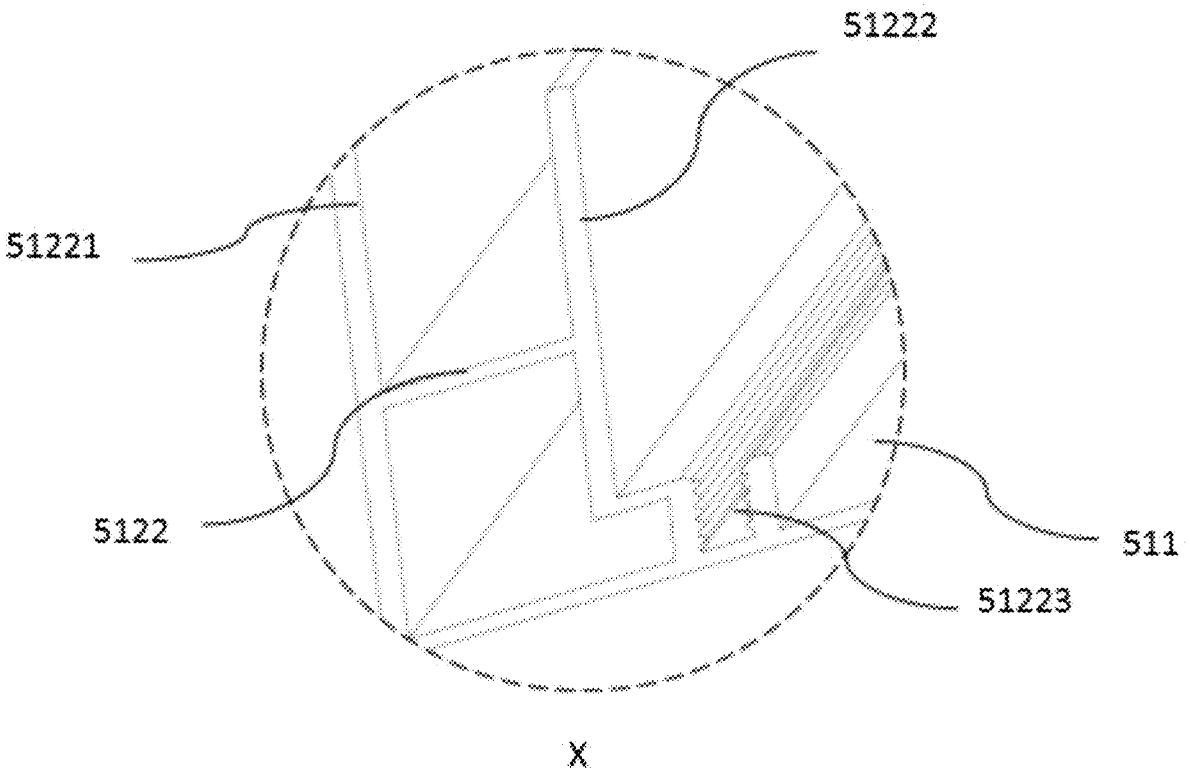
FIG. 95 is an enlarged view of part X in FIG. 92.

Please refer to FIG. 94 and FIG. 95. FIG. 94 is the enlarged view of part W in FIG. 91. FIG. 95 is the enlarged view of part X in FIG. 92. In view of FIG. 91, FIG. 92 and FIG. 93, two ends of the bracket 4, that is, the first rotary fastening portion 41 and the second rotary fastening portion 42 are respectively fastened on two opposite sides of the install border 5, or fastened on two opposite support elements 51. As shown in FIG. 95, each support element 51 is provided with the step structure 5122, and the step structure 5122 extends to form an outer extension wall 51221 and an inner extension wall 51222. In view of FIG. 92, it can be seen that each support element 51 is provided with the outer extension wall 51221 and the inner extension wall 51222 parallel to each other. The inner extension wall 51222 is provided with a plurality of rotary fastening grooves 51224. The rotary fastening grooves 51224 completely penetrate through the inner extension wall 51222, and at least a part of the first rotary fastening portion 41 and at least a part of the second rotary fastening portion 42 penetrate through the rotary fastening grooves 51224. As shown in FIG. 94, the second rotary fastening portion 42 penetrates through the rotary fastening groove 51224 and is fastened with the rotary fastening groove 51224 by means of a bent structure, the LED lighting lamp falls downwards under the action of the gravity, the second rotary fastening portion 42 is bent upwards, and the rotary fastening groove 51224 is located in a concave region formed by bending, so that the two parts are not prone to falling through combination of the gravity and the upward bending design.

Please refer to FIG. 95. The locking groove 51223 is further formed on one side of each step structure 5122. In view of FIG. 92, during assembly of the LED lighting device 100, one surface of the install end wall 13 of the sidewall 11 abuts against the first connecting wall 2113 of the optical member 21, the other surface abuts against the locking groove 51223 and is locked by a screw. In an embodiment, it can be fixed by glue, soldering or fastening structure.

Figure 96:
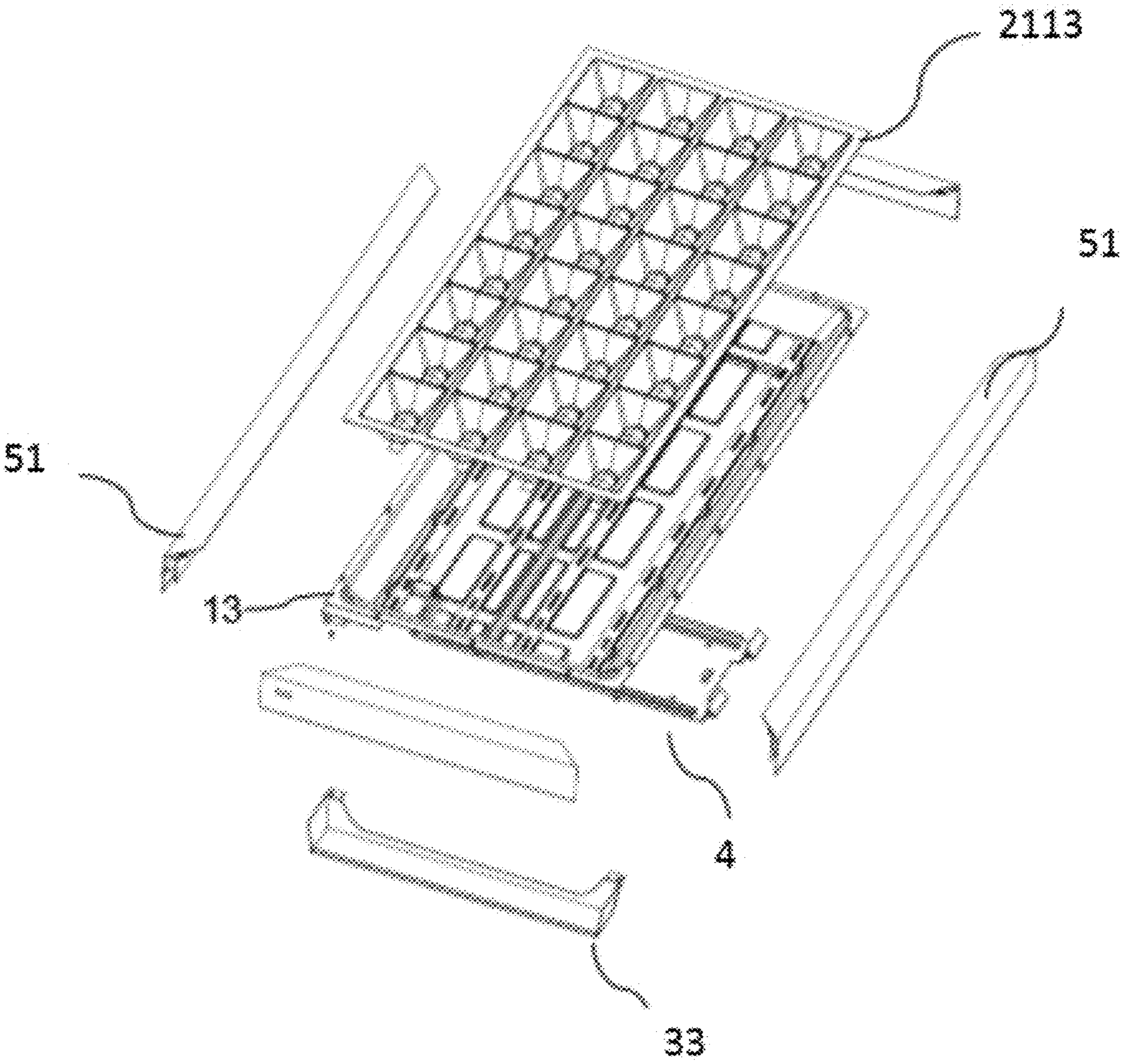
FIG. 96 is a front exploded schematic view of the LED lighting device in another embodiment of the present application.
Figure 97:
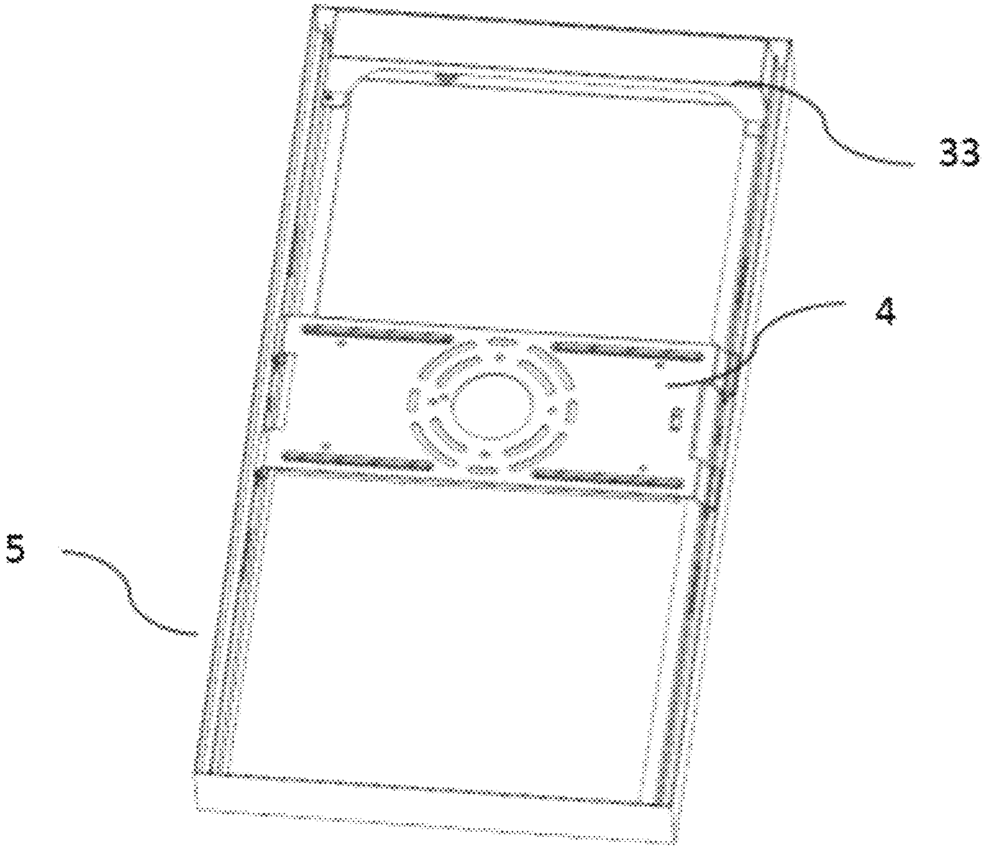
FIG. 97 is a schematic view of the main body frame of the LED lighting device in another embodiment of the present application.

FIG. 96 is the front exploded schematic view of the LED lighting device in another embodiment of the present application. Please refer to FIGS. 95 and 96. Each support element 51 further includes a first wall 511, and the first wall 511 is pressed on one surface of the first connecting wall 2113 of the optical member 21 away from the install end wall 13, thereby pressing and fixing the optical member 21 to the seat 1. Please refer to FIG. 97, which is the schematic view of the main body frame of the LED lighting device in another embodiment of the present application while the seat 1 and the optical member 21 are not displayed. It can be seen that the bracket 4 is disposed on the middle of the LED lighting device so as to ensure the relative uniform stress after the LED lighting device is fixed to ceiling, and the power source box 33 and a part of the install border 5 are combined to form a packaging structure, which is matched with the seat 1 to package the power source 3.

Figure 98:
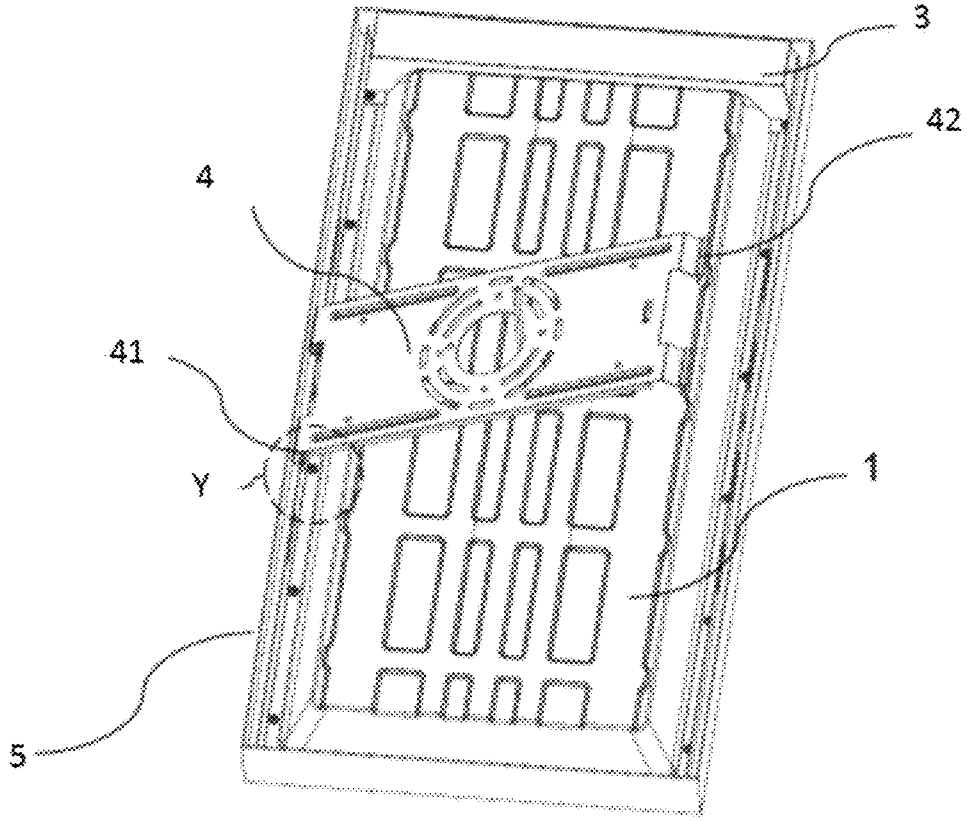
FIG. 98 is a schematic view of the bracket of the LED lighting device rotating to the certain angle relative to the main body of the LED lighting device in one embodiment of the present application.

Please refer to FIG. 98, which is the schematic view of the bracket of the LED lighting device rotating to the certain angle relative to the main body of the LED lighting device in another embodiment of the present application. In the process of installing the LED lighting device to ceiling, one end of the bracket 4 needs to be fastened to the LED lighting device first, and then the other end is fastened.

Figure 99:
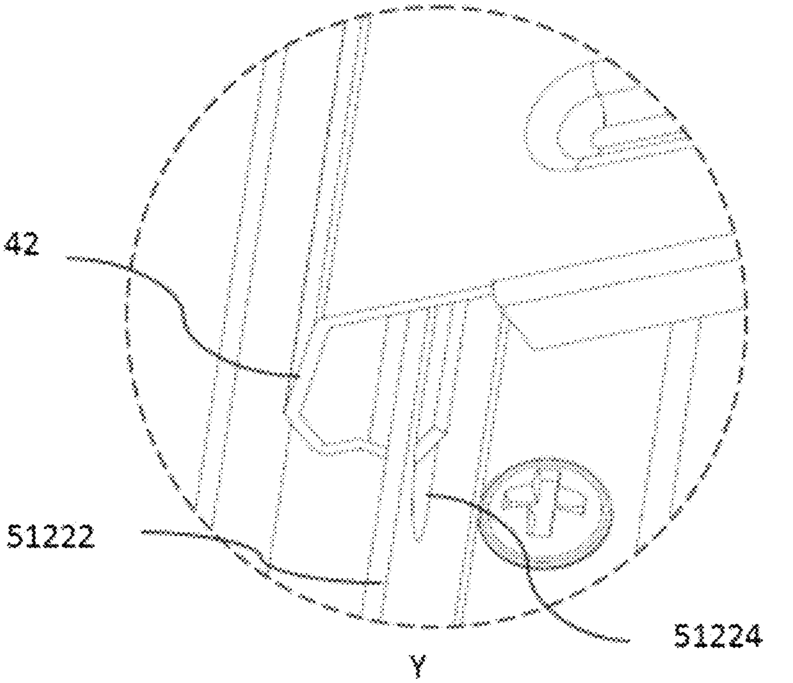
FIG. 99 is an enlarged view of part Y in FIG. 98 in one embodiment of the present application.

Please refer to FIG. 99, which is the enlarged view of part Y in FIG. 98 in the present application. The second rotary fastening portion 42 is taken as an example, it is firstly fastened into the rotary fastening groove 51224 of the inner extension wall 51222, and then the bracket 4 can rotate relative to the main body of the LED lighting device, that is, the bracket 4 is partially fixed to the main body (or the install border 5) of the LED lighting device.

Please refer to FIGS. 100-103, which are the schematic views for fixing of the LED lighting device to ceiling in one embodiment of the present application.

Figure 100:
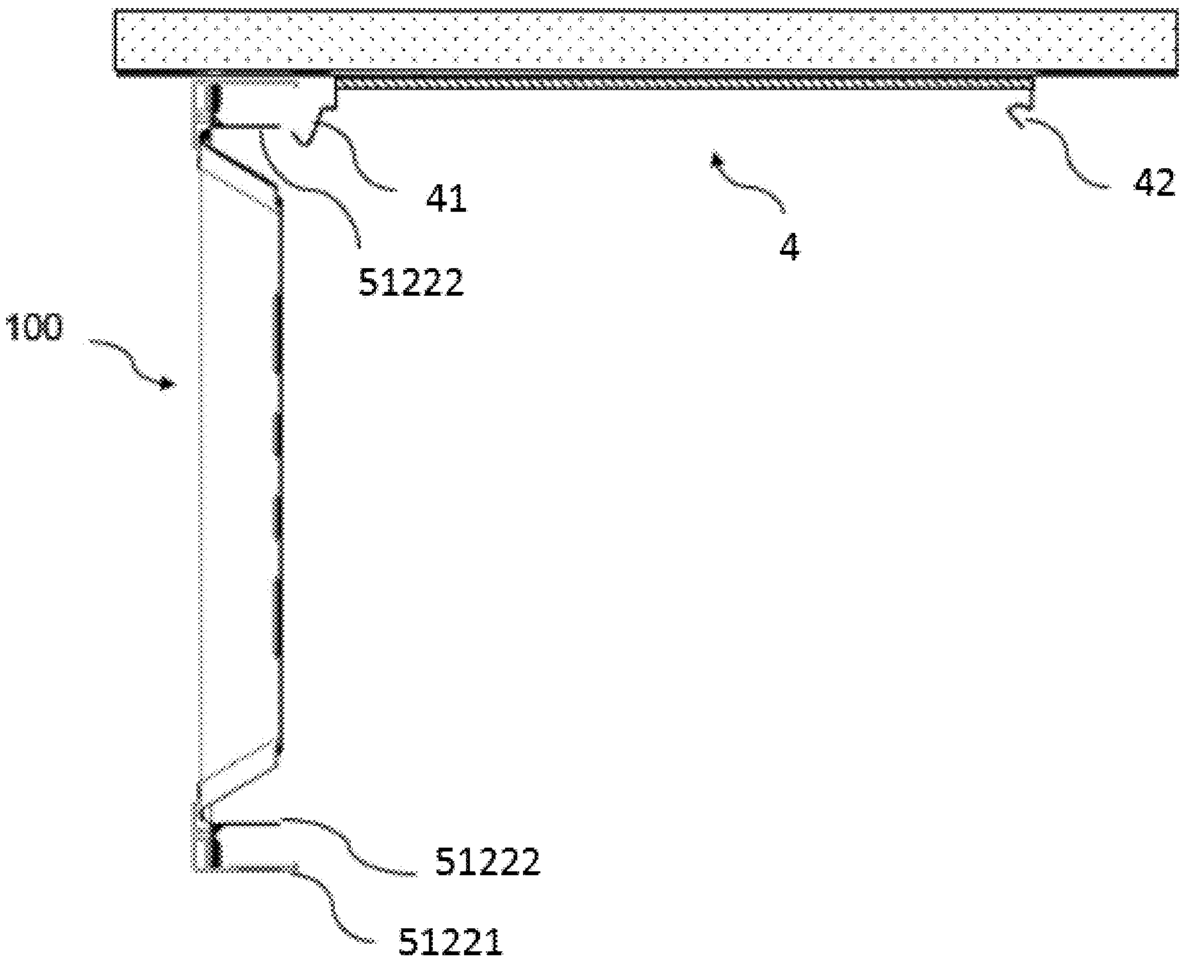
FIGS. 100-103 are schematic views for fixing of the LED lighting device in one embodiment of the present application.
Figure 101:
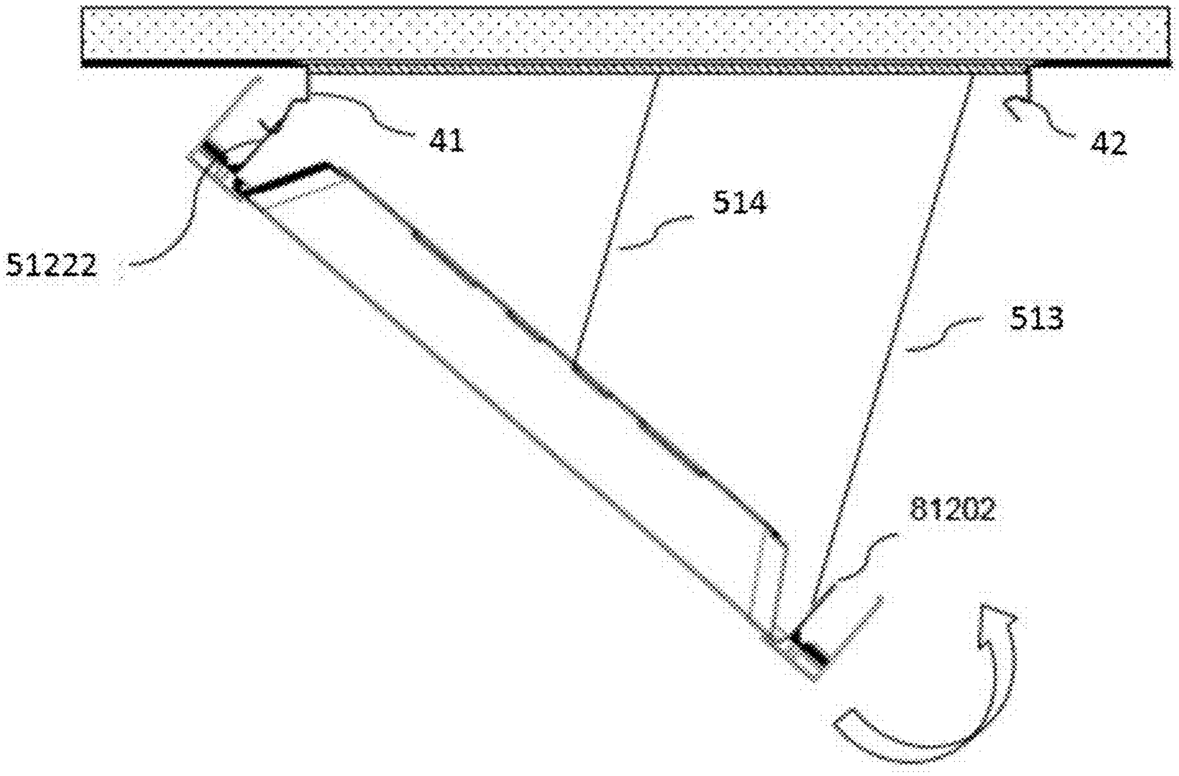
Figure 102:
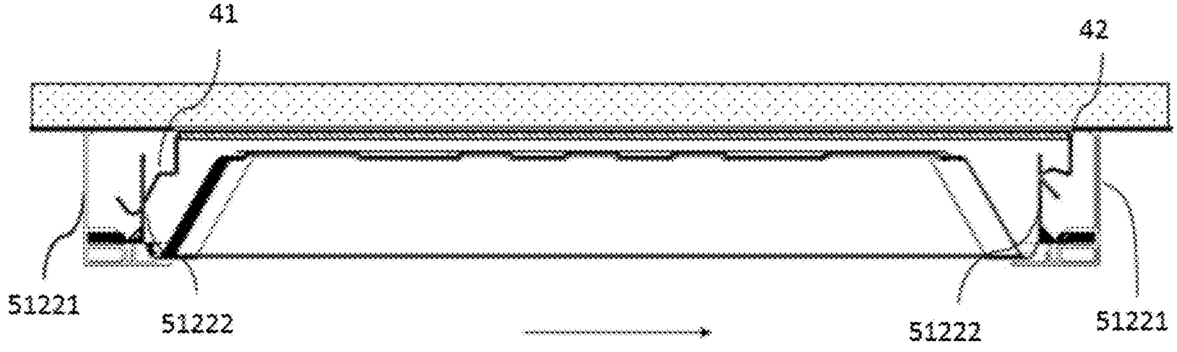
Figure 103:
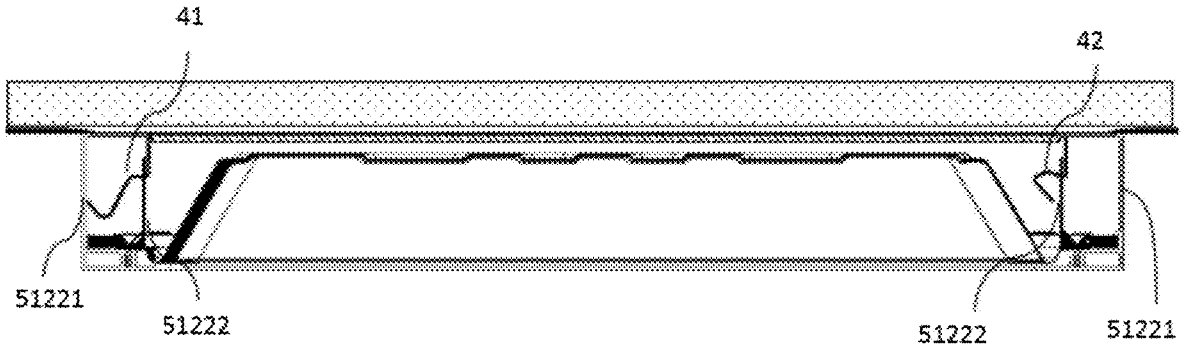

As shown in FIG. 100, when the LED lighting device is fixed to ceiling, firstly, the relatively flat surface of the bracket 4 needs to be locked to ceiling by means of screws or other manners, and then one end of the LED lighting device, that is, the inner extension wall 51222 at one end is fastened with one end of the bracket 4 by means of the rotary fastening groove 51224, for example, fastened with the first rotary fastening portion 41 of the bracket 4, thereby achieving partial fixing between the main body of the LED lighting device and the bracket 4. Referring to FIG. 101. The inner extension wall 51222 away from the first rotary fastening portion 41 is fixed to the bracket 4 or the ceiling by means of a safety rope 513, so that the bracket 4, the main body of the LED lighting lamp and the safety rope 513 form a temporary triangular structure, which prevents property losses or casualties caused by the fact that the main body of the LED lighting lamp is separated from the first rotary fastening portion 41 due to accidents. After the safety rope 513 is disposed, the LED lighting device is connected to the external lead 514, and the external power supply is obtained by means of the lead 514. After the lead 514 is disposed, the main body of the LED lighting device is rotated in the arrow direction, that is, on the premise of keeping the first rotary fastening portion 41 fastened with the inner extension wall 51222 on one side, one end of the LED lighting lamp away from the ceiling is pushed close to the second rotary fastening portion 42, and the LED lighting device is finally attached to the ceiling; and at this time, the safety rope 513 is removed, and the second rotary fastening portion 42 is not fastened to the inner extension wall 51222. Please refer to FIG. 102. A force is applied in the arrow direction in the drawing to push the LED lighting device, that is, the LED lighting device is pushed in the direction in which the bracket 4 is not fastened with the inner extension wall 51222, so that the inner extension wall 51222 presses the second rotary fastening portion 42 to be bent downwards and penetrate through the rotary fastening groove 51224; after the second rotary fastening portion 42 penetrates through the rotary fastening groove 51224, the application of the force is stopped, meanwhile, the second rotary fastening portion 42 is restored from deformation by means of its own material strength, that is, it is bounced towards the ceiling or upwards; and the rotary fastening portion 42 is locked by means of the bent portion, thereby achieving the fixing of the LED lighting device to the ceiling, and forming the structure as shown in FIG. 103. By means of such fixing manner, the installing efficiency of the LED lighting device can be greatly improved, and meanwhile, the adaptability of the LED lighting device to the installing environment can be improved.

In other embodiments of the present application, the safety rope 513 can also be removed after the second rotary fastening portion 42 is fastened to the inner extension wall 51222.

Figure 104:
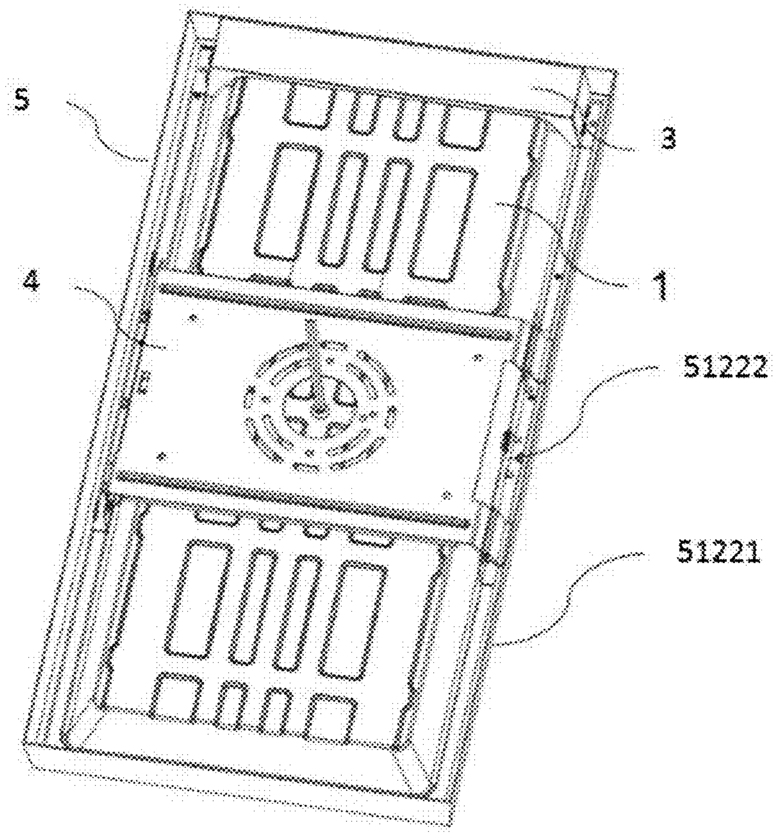
FIG. 104 is a perspective schematic view of the LED lighting device in one embodiment of the present application.

Please refer to FIG. 104, which is the perspective schematic view of the LED lighting device in one embodiment of the present application. Compared with the LED lighting device as shown in FIG. 91, the difference lies in the install border 5, the install border 5 including support elements 51. In FIG. 91, each support element 51 includes the outer extension wall 51221 and the inner extension wall 51222 which are integrally formed. However, with regard to the LED lighting device in FIG. 104, the outer extension wall 51221 and the inner extension wall 51222 of each support element 51 are formed in a split manner, that is, the inner extension wall 51222 is formed separately and then fixed to the support element 51. Please see FIG. 105 for details.

Figure 105:
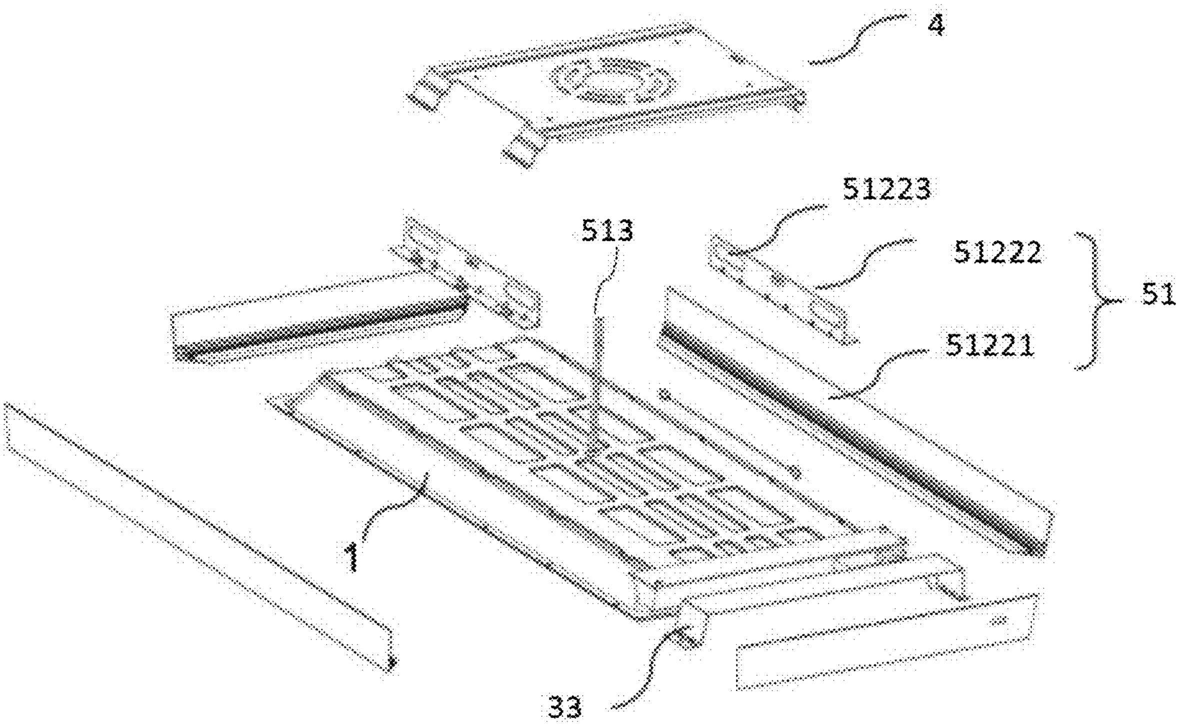
FIG. 105 is an exploded schematic view of the LED lighting device in one embodiment of the present application.

Please refer to FIG. 105, which is the exploded schematic view of the LED lighting device in another embodiment of the present application. Compared with the LED lighting device described in FIG. 90 to FIG. 103, the difference lies in the structure of the install border 5. In FIG. 90 to FIG. 103, each support element 51 of the install border 5 is provided with the outer extension wall 51221 and the inner extension wall 51222 which are integrally formed, for example, integrally punch-formed by means of sheet metals. However, in the LED lighting device as shown in FIG. 104 and FIG. 105, the outer extension wall 51221 and the inner extension wall 51222 are formed in a split manner, that is, the outer extension wall 51221 is integrally formed on each support element 51, and the inner extension wall 51222 is formed separately and then fixed to the support element 51. By means of such design, the LED lighting devices can be stacked when being packaged, so that the packaging efficiency and benefit are increased. The outer extension wall 51221 and the inner extension wall 51222 can be made of the same material or different materials. As shown in the drawings, each inner extension wall 51222 is also provided with a plurality of rotary fastening grooves 51224, and in an embodiment, each inner extension wall 51222 is provided with two rotary fastening grooves 51224. In the process of assembling the LED lighting device and installing same to the use environment, each inner extension wall 51222 also needs to be fixed to the support element 51 firstly by means of screws, soldering and fastening, and other issues are the same as those of the LED lighting device in FIG. 90 to FIG. 103, and are not repeated here.

In other embodiments of the present invention discloses an LED lighting device 100, which can be suspended or can be fixedly installed on a ceiling or a suspended ceiling. According to the different application manners, the LED lighting device 100 disclosed in the present application can also be called a panel lamp, a flat panel lamp, a grille lamp, a ceiling lamp, a recess lamp, a concave lamp, an embedded lamp and a ceiling-mounted lamp.

Figure 106:
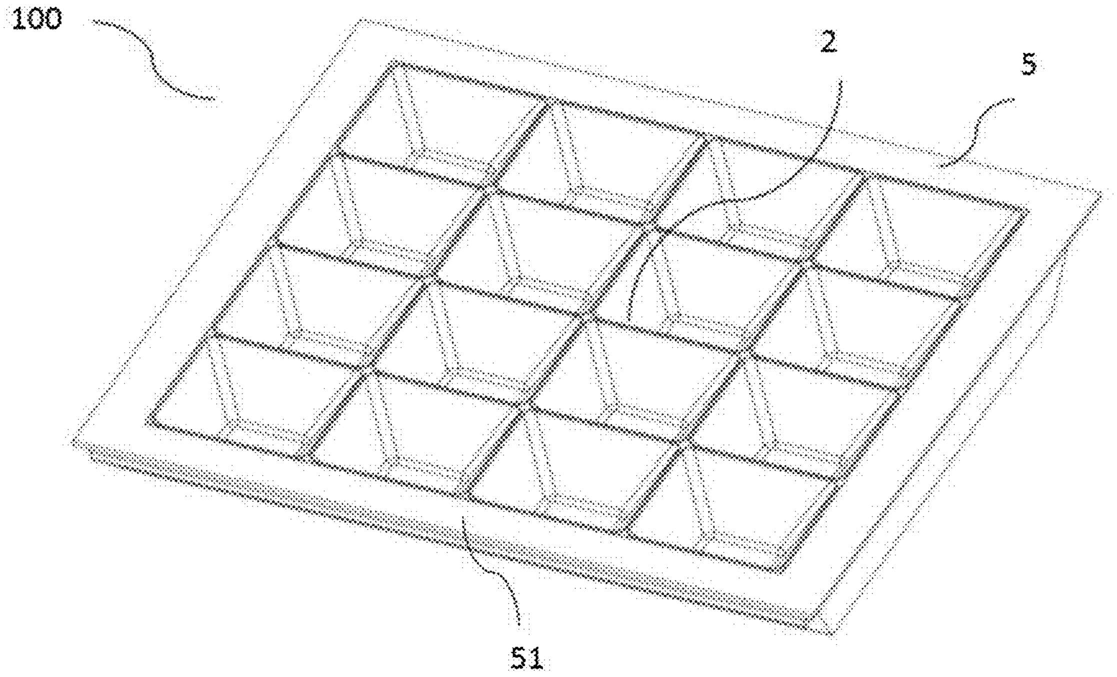
FIG. 106 is a front schematic view of the LED lighting device in an embodiment of the present invention.
Figure 108:
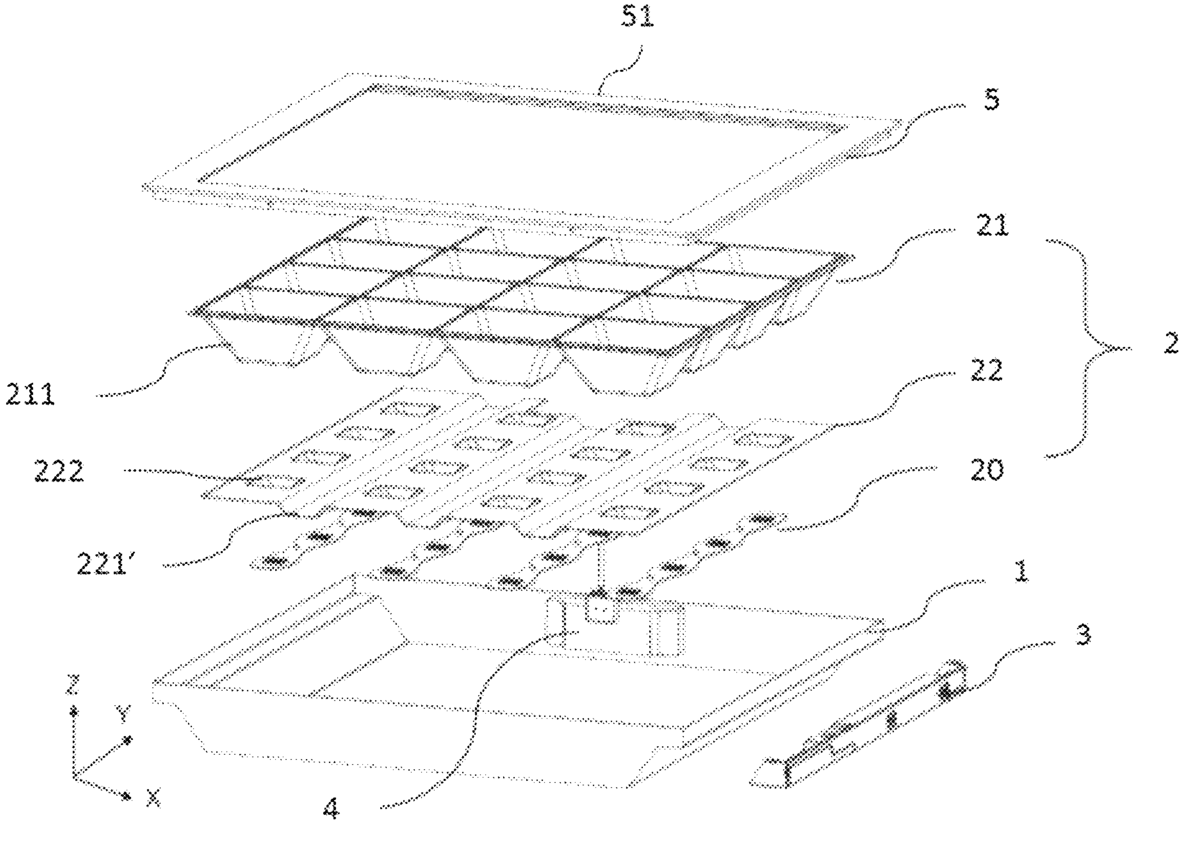
FIG. 108 is a front exploded schematic view of the LED lighting device in an embodiment of the present invention.

Please refer to FIG. 106 and FIG. 108. FIG. 106 is the front schematic view of the LED lighting device 100 in an embodiment of the present invention, and FIG. 108 is the front exploded schematic view of the LED lighting device 100 in an embodiment of the present invention. As shown in FIG. 108, the LED lighting device 100 includes the seat 1 serving as the main structure and installing foundation of the lighting device, where the seat 1 includes the groove structure, namely, the receiving space, other components, for example, the optical assembly 2, of the LED lighting device 100 can be received in the groove structure of the baseplate 10, and the optical assembly 2 emits light during operation for illumination. One install border 5 is disposed in the light-emitting direction of the LED lighting device, the install border 5 includes a plurality of support elements 51, the support elements 51 cover the LED device, and the support elements and the seat 1 clamp and fix the optical assembly 2, that is, the optical assembly 2 is located between the seat 1 and the support elements 51.

Please refer to FIG. 106. The entire LED lighting device 100 is rectangular, the install border 5 connected end to end and is disposed on the outermost side of the LED lighting device 100. The install border 5 includes a plurality of support elements 51, the support elements 51 are used for fixing optical members inside the lamp, meanwhile, the support elements 51 have flat surfaces, and the area enclosed by the longest sides of the support elements 51 is greater than that enclosed by the longest sides of the baseplate 10, that is, the longest sides of the support elements 51 are longer than those of the baseplate 10, so that the effect of shielding some irregular structures of the LED lighting device 100 can be achieved, and from the viewing angle of the user, the LED lighting device 100 has the regular and beautiful light-emitting surface. In order to facilitate subsequent description, the optical member can be called optical assembly 2, and the annular border can be called support elements 51.

Figure 107:
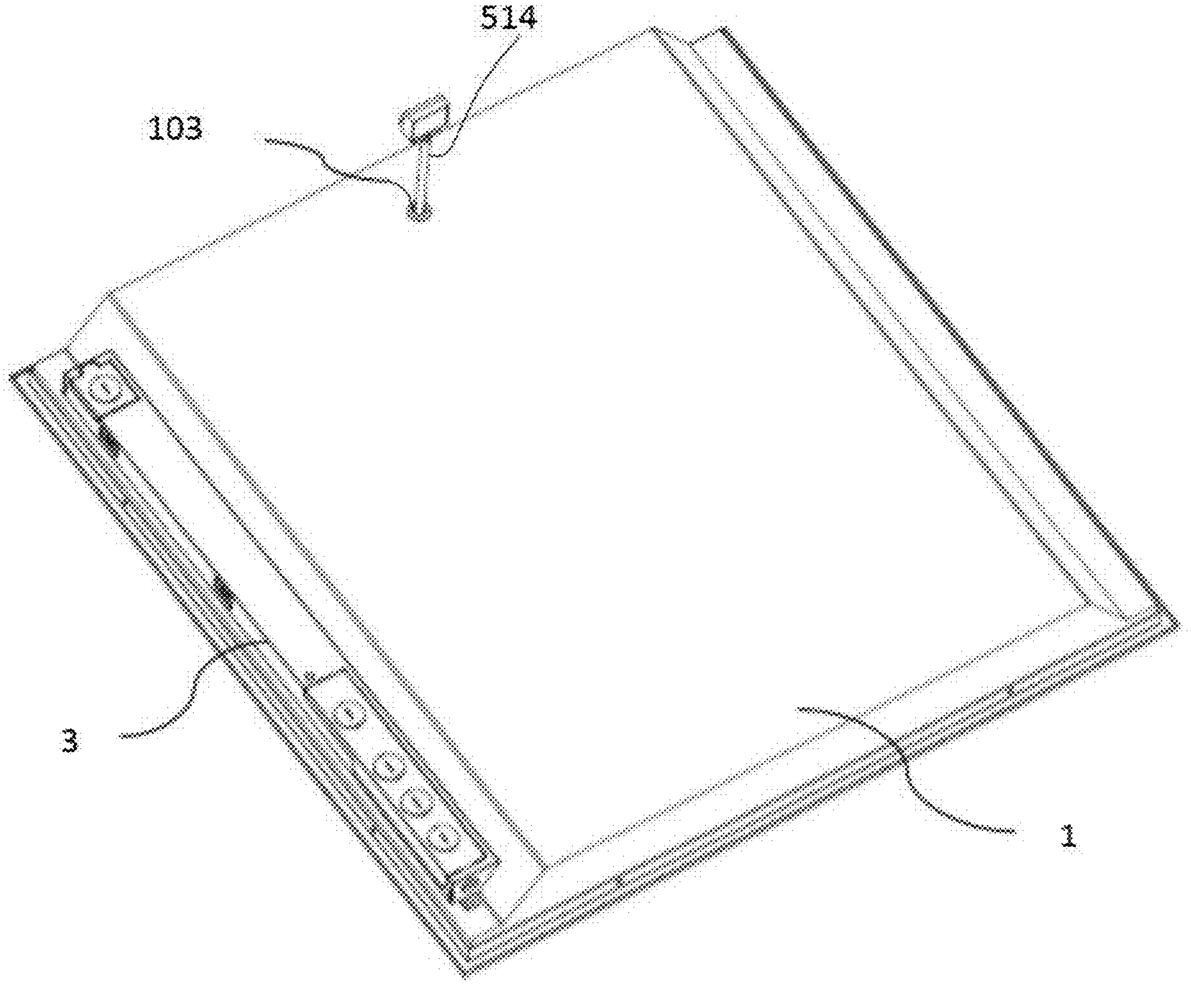
FIG. 107 is a back schematic view of the LED lighting device in an embodiment of the present invention.
Figure 109:
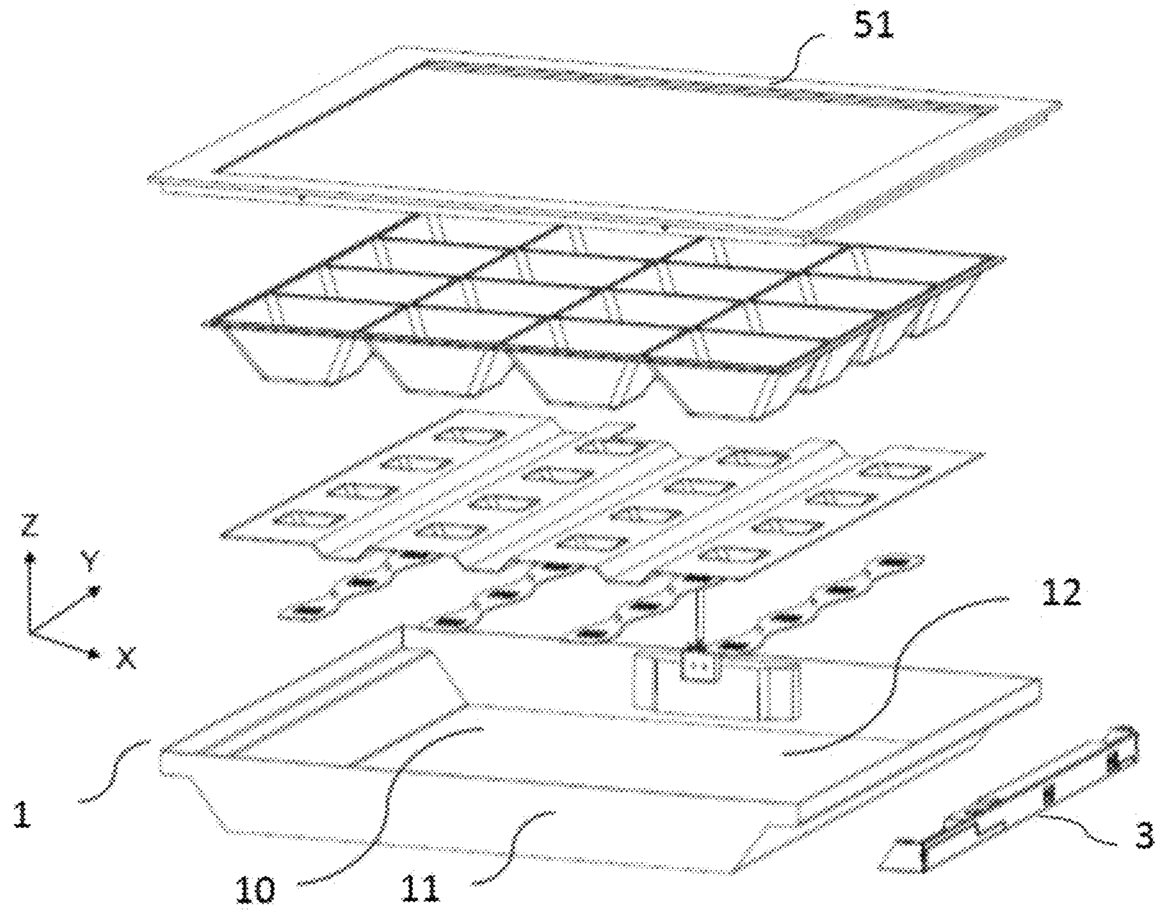
FIG. 109 is a schematic view of the seat in an embodiment of the present invention.
Figure 119:
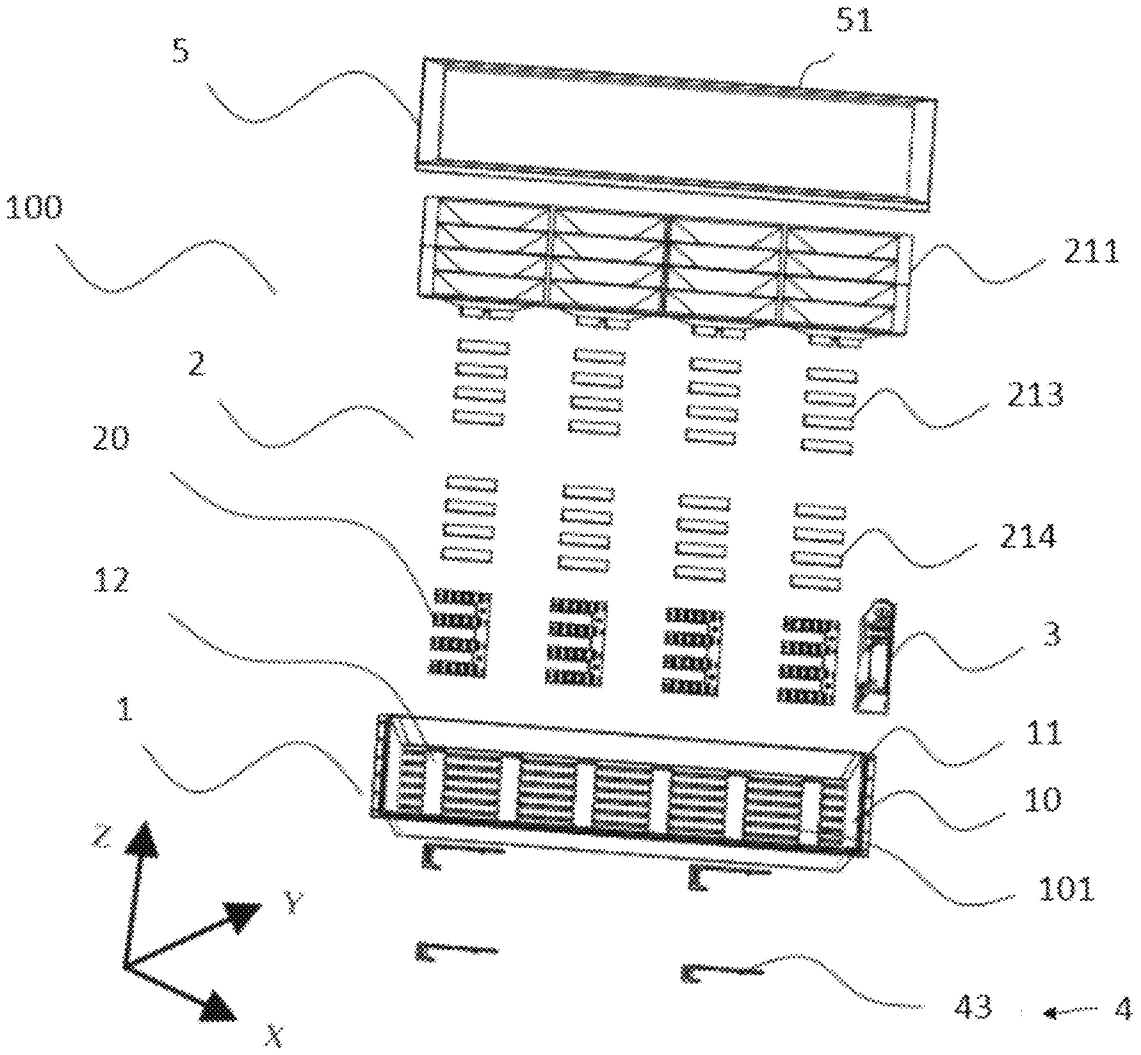
FIG. 119 is a front exploded schematic view of the LED lighting device in one embodiment of the present invention.

Please refer to FIG. 107, FIG. 108 and FIG. 109. FIG. 107 is the back schematic view of the LED lighting device 100 in an embodiment of the present invention, and FIG. 119 is the schematic view of the structure of the seat 1 in an embodiment of the present invention. As shown in the drawings, the LED lighting device 100 includes the seat 1, where the seat 1 includes a baseplate 10 and sidewall 11 surrounding the baseplate 10 and connected end to end, the power source 3 is disposed on the sidewall 11, and at least one surface of the power source 3 is attached to the sidewall 11. The baseplate 10 can also be provided with at least one wire hole 103, and at least part of leads of the LED lighting device 100 can pass through the wire hole 103 and be conducted to outside.

Please refer to FIGS. 108 and 109, which is the front exploded view of the LED lighting device 100 in an embodiment of the present invention. As shown in the drawings, a rectangular coordinate system is established with the light-emitting direction of the LED lighting device 100 as a Z axis. The LED lighting device 100 includes the seat 1 disposed at the bottom (that is, the lowest position of the LED lighting device 100 at the Z axis), where the seat 1 includes a baseplate 10 substantially parallel to a horizontal plane or a XY plane, a sidewall 11 surrounding the baseplate 10 and connected end to end to form an annular structure is disposed on the edge of the baseplate 10, the sidewall 11 roughly extends in the Z-axis direction, that is, extends in the positive direction of the Z axis, and the sidewall 11 and the baseplate 10 form a receiving space 12 with an opening. In order to facilitate description below, the light-emitting direction of the LED lighting device 100 is called the upper side, that is, the positive direction of the Z axis is the upper side. The optical assembly 2 is disposed in the seat 1, or the optical assembly 2 is disposed in the receiving space 12 formed by the baseplate 10 and the sidewall 11. In one embodiment, at least part of the optical assembly 2 is disposed in the receiving space 12. In the light-emitting direction of the LED lighting device 100, in the positive direction of the Z axis, the optical assembly 2 sequentially includes the light source component 20, the optical bearing portion 22 and the optical member 21, where the light source component 20 can be directly or indirectly disposed on the baseplate 10, for example, fixed to the baseplate 10 through glue coating, soldering, snap-fitting or screw locking. The light source component 20 includes at least one circuit board 202 and at least one LED array 203 disposed on the circuit board 202. The LED array 203 can be an LED chip array or an array formed by other light-emitting devices. In another embodiment of the present application, the circuit board 202 is provided with at least one light-emitting device. The circuit board 202 in the present invention can be plates structure that can be used for circuit connection and achieve functions of a circuit board, for example, an FPC, a PCB and an aluminum substrate, but is not limited to such plates. The circuit board 202 in an embodiment of the present invention can be disposed in the X direction, the Y direction or the length direction or width direction of the LED lighting lamp 100, or disposed at a certain included angle with the X axis (in a crossing manner), or disposed at a certain included angle with the Y axis in a crossing manner.

In an embodiment of the present invention, the light source component 20 includes a plurality of circuit boards 202 arranged in parallel, the optical bearing portion 22 is stacked and installed on the light source component 20, the optical bearing portion 22 is provided with a second polygonal frustum structure 221' in contact with the baseplate 10, and the second polygonal frustum structure 221' and the optical bearing portion 22 are integrally formed, so that there is a gap between at least part of a region of the optical bearing portion 22 and the baseplate 10. The optical member 21 is disposed on the optical bearing portion 22, and the optical member 21 includes optical units 211 arranged in an array. In an embodiment of the present invention, the optical units 211 can be inverted polygonal frustum structures or light reflecting cup structures. The optical bearing portion 22 is further provided with the window structures 222 corresponding to the LED arrays 203, so that when the optical bearing portion 22 is disposed on the baseplate 10 and covers the light source component 20, the light emitted by the LED arrays 203 in the light source component 20 can pass through the window structures 222 to be emitted outwards to reach the optical member 21, and is finally emitted from the LED lighting device 100. There is a gap between at least part of a region of the optical bearing portion 22 and the baseplate 10, when the optical member 21 is disposed on the optical bearing portion 22, a distance can be kept between the light source component 20 and the optical member 21 by the gap, so that, the granular feeling of the emitted light due to the optical member 21 is too close to the light source component 20 can be avoided, and the glare can be reduced by maintaining the certain distance.

The light source component 20, the optical bearing portion 22 and the optical member 21 are sequentially stacked in the receiving space 12 formed by the seat 1 and the sidewall 11 in the light-emitting direction of the LED lighting device 100.

In an embodiment of the present invention, the height of sequentially stacking the light source component 20, the optical bearing portion 22 and the optical member 21 in the light-emitting direction of the LED lighting device 100 does not exceed or is less than or equal to the height of the receiving space 12, that is, the height does not exceed or is less than or equal to the height of the sidewall 11 in the positive direction of the Z axis, thereby controlling the height of the LED lighting device 100 and facilitating assembling.

One support element 51 is disposed on the optical member 21 in the light-emitting direction or the positive direction of the Z axis, the surface of the support element 51 facing the baseplate 10 covers the outer edge of the optical member 21. The sidewall 11 and the support element 51 clamp and fix the optical member 21, and the light source component 20, the optical bearing portion 22 and the optical member 21 are sequentially stacked, so that the support element 51 can also fix the optical bearing portion 22, thereby achieving assembling of the LED lighting device 100. The support element 51 and the sidewall 11 can be fixed in one or more manners such as gluing, soldering, snap-fitting, sleeving, screw locking and magnetic attraction.

In the present invention, a power source 3 is disposed on a side of the sidewall 11 away from the receiving space 12, that is, the power source 3 is disposed outside the receiving space 12, does not in the receiving space 12 to occupy the space of other components, and does not additional increase the height of the LED lighting device 100 (in the Z-axis direction). A room is generated due to the inclined arrangement of the sidewall 11, and the power source 3 can be disposed in this room to reduce the occupation of other regional spaces.

Figure 110:
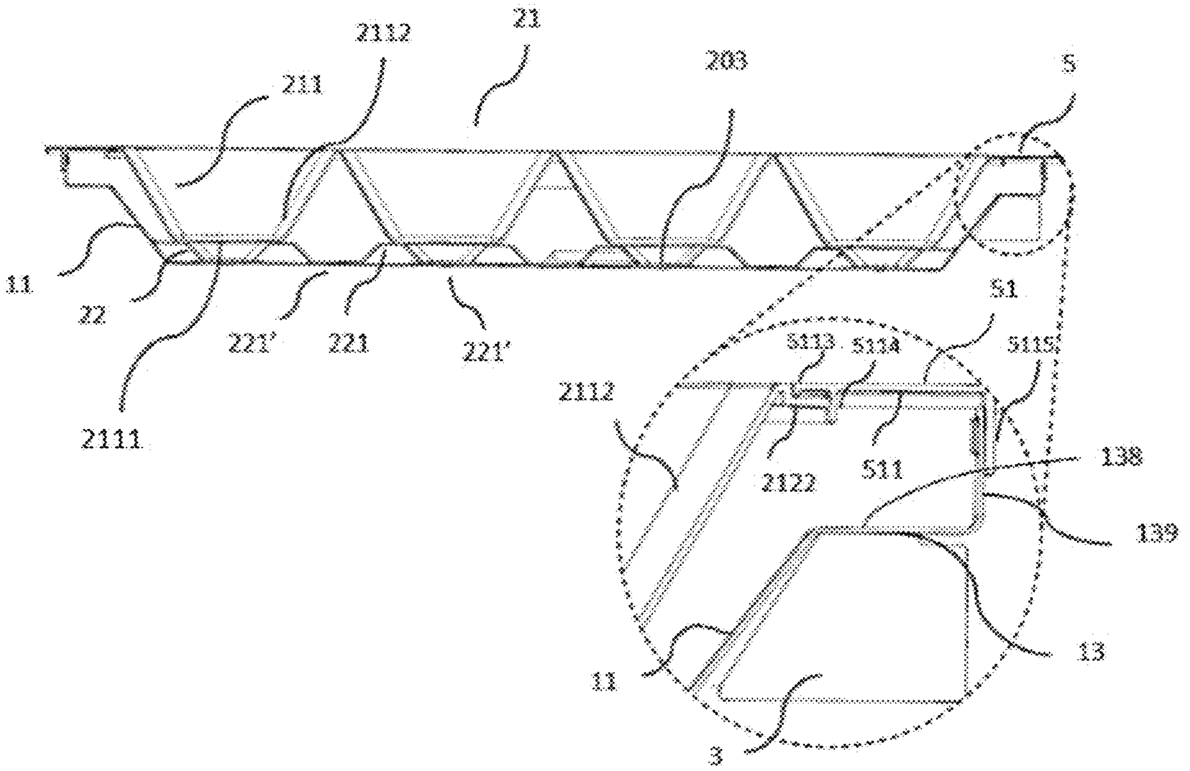
FIG. 110 is a sectional schematic view of the LED lighting device in an embodiment of the present invention.
Figure 111A:
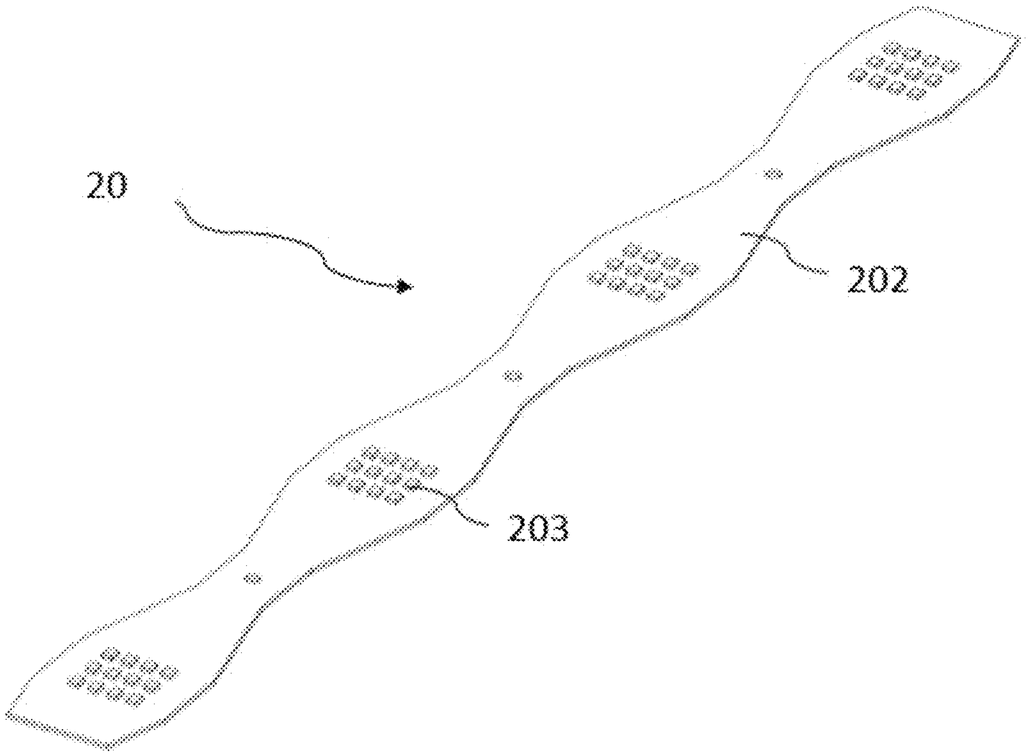
FIG. 111A is a schematic view of the light source component in an embodiment of the present invention.

Please refer to FIG. 110 and FIG. 111A. FIG. 110 is the sectional schematic view of the LED lighting device 100 in an embodiment of the present invention, and FIG. 111A is the schematic view of the light source component 20 in an embodiment of the present invention. As shown in FIG. 111A, the light source component 20 includes a circuit board 202 and an LED arrays 203 disposed on a side of the circuit board 202, each LED array 203 includes a plurality of regularly arranged LED chips, and another side of the circuit board 202 that is not provided with the LED arrays 203 is attached to the baseplate 10, for example, it is fixed to the baseplate 10 by gluing. The optical bearing portion 22 is provided with recesses and protrusions at intervals, which can also be called polygonal frustum structures without bottom surfaces, the polygonal frustum structures include first polygonal frustum structures 221 and second polygonal frustum structures 221'. The first polygonal frustum structures 221 and the second polygonal frustum structures 221' are staggered arrangement, as shown in FIG. 110, the polygonal frustum surface (small surface) of each first polygonal frustum structure 221 face upward (face the optical member 21) and the polygonal frustum surface (small surface) of each second polygonal frustum structure 221' face downward (face the baseplate 10), and soma of the polygonal frustum surfaces of the second polygonal frustum structures 221' are provided with windows, that is, through holes penetrating through the polygonal frustum surfaces. The area of each window is smaller than that of the polygonal frustum surface, so that the polygonal frustum surface reserves a part of the area which can cover the circuit board 202, and the LED array 203 is exposed through the window, that is, the window range is larger than the range of the LED array 203. The polygonal frustum surface of the first polygonal frustum structure 221 faces the light-emitting direction, that is, pointing to the positive direction of the Z axis, the first polygonal frustum surfaces of first polygonal frustum structures 221 are used for bearing the optical member 21, the optical member 21 is formed by a plurality of optical units 211 arranged in an array, each optical unit 211 includes a first optical member 2111 and a plurality of second optical members 2112 surrounding the first optical member, and the first optical member 2111 and the second optical members 2112 form groove structure. At least part of the first optical member 2111 covers the upward polygonal frustum surface of the optical bearing portion 22, that is, the polygonal frustum surface of the first polygonal frustum structure 221.

In the embodiment, each first optical member 2111 corresponds to one LED array 203, and the projection of the first optical member 2111 in the Z-axis direction on the baseplate 10 completely covers the LED array 203. Each LED array 203 is surrounded by the second polygonal frustum structure 221. In some embodiments, the side surface of the polygonal frustum structure has a light processing function, for example, a light reflecting function, at least reflect a part of the light emitted by the LED array 203, and reflect the light to the first optical member 2111, and then emit the light out of the first optical member 2111. Most light of each LED array 203 is directly emitted to the first optical member 2111.

In one embodiment, at least a part of the light emitted by the first optical member 2111 is directly emitted, that is, directly emitted out of the LED lighting device 100.

In one embodiment, at least a part of the light emitted by the first optical member 2111 is emitted to the second optical members 2112, and the light is reflected by the second optical members 2112 and then emitted out of the LED lighting device 100.

In an embodiment of the present invention, the optical member 21, the optical units 211, the first optical members 2111 and the second optical members 2112 at least have one or a combination of light projection, light reflection, light diffusion, light refraction and light diffraction.

The polygonal frustum surface of the first polygonal frustum structure 221' adjacent to the second polygonal frustum structure 221 and faces downwards and covers the baseplate 10, that is, the polygonal frustum surfaces of the optical bearing portion 22 facing upwards and downwards are disposed at intervals. At least one third of the polygonal frustum surfaces are provided with the windows. The first optical member 2111 of each optical unit 211 is disposed on the polygonal frustum surface, so that a certain distance is kept between the optical unit 211 (optical member 21) and the baseplate 10, that is, a certain distance or gap is maintained with the LED array 203. The granular feeling generated during light emitting is avoided by maintaining the gap, and meanwhile, the problem of glare of the lamp can be effectively reduced by maintaining the gap.

In one embodiment, the LED arrays 203 can be disposed on both surfaces of the circuit board 202.

Please refer to FIG. 110. As shown in the enlarged portion in FIG. 110, the support element 51 includes a first wall 511, the first wall 511 is a flat surface and is roughly parallel to the baseplate 10, the surface of the first wall 511 facing the baseplate 10 is provided with a first extension portion 5113, a second extension portion 5114 and a third extension portion 5115 pointing to the baseplate 10, the length of the third extension portion 5115 is greater than that of the second extension portion 5114, the length of the second extension portion 5114 is greater than that of the first extension portion 5113, and the first extension portion 5113, the second extension portion 5114 and the third extension portion 5115 are sequentially arranged towards the baseplate 10.

An installing wall 2122 bent downwards is provided on the outer circumferential edge of the optical member 21, at least part of the support element 51 is borne by the installing wall 2122, the first extension portion 5113 is disposed on the installing wall 2122, that is, the first extension portion 5113 covers the installing wall 2122, the tail end of the installing wall 2122 abuts against the second extension portion 5114, that is, the first extension portion 5113, the second extension portion 5114, the installing wall 2122 and the first wall 511 between the first extension portion 5113 and the second extension portion 5114 form a closed cavity channel, and the closed cavity channel can be internally provided with a glue material for connecting the support element 51 and the optical member 21.

The end of the sidewall 11 away from the baseplate 10 is provided with the first installing portion 138 and the second installing portion 139, the first installing portion 138 is substantially parallel to the baseplate 10, the second installing portion 139 is substantially perpendicular to the baseplate 10 and parallel to the third extension portion 5115, and the first installing portion 138 and the second installing portion 139 are integrally formed on the sidewall 11 or are formed by bending the end of the sidewall 11 away from the baseplate 10.

The power source 3 is disposed on the surface of the first installing portion 138 facing the baseplate 10, the power source 3 further includes an inclined surface attached to the sidewall 11, and the first installing portion 138 can be connected to the power source 3 by gluing, soldering, snap-fitting, fastening or screw locking.

The second installing portion 139 is disposed on the inner side of the third extension portion 5115, that is, disposed at the side of the third extension portion 5115 close to the optical member 21. The two parts can be connected and fixed by gluing, soldering, snap-fitting, fastening or screw locking, which enables the optical member 21 to be fixed by the support element 51 and the seat 1, thereby achieving packaging of the lamp.

Figure 112:
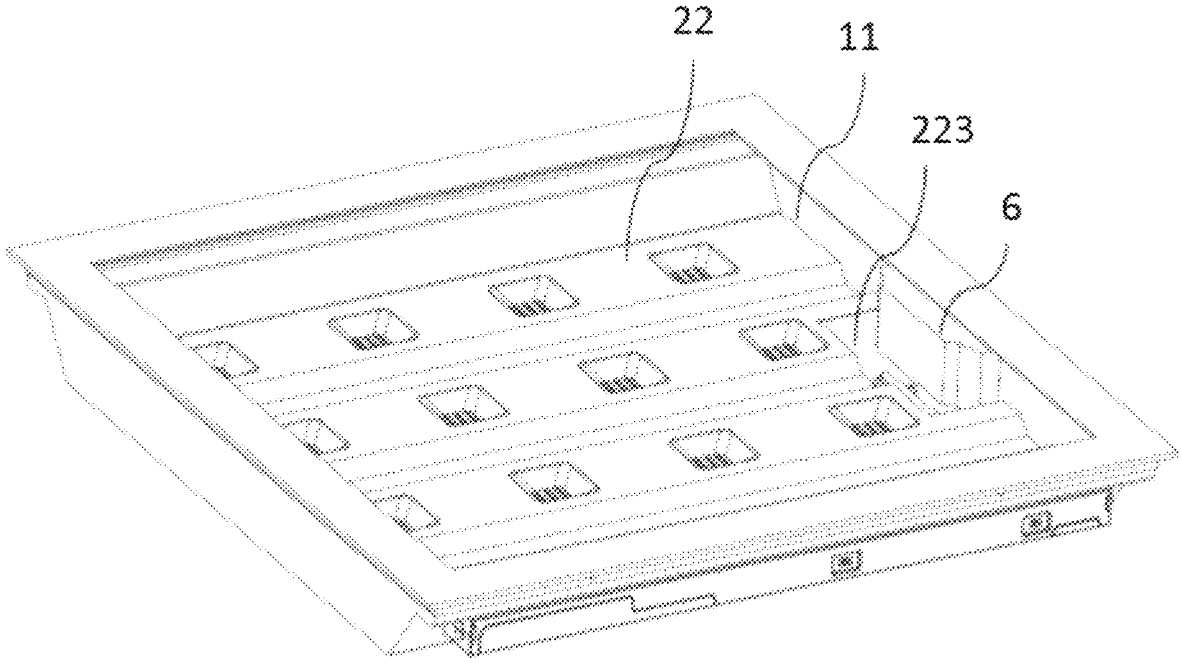
FIG. 112 is a schematic view of the LED lighting device without the light processing component in an embodiment of the present invention.

Please refer to FIG. 112, which is the schematic view of LED lighting device 100 without optical member 21 in an embodiment of the present invention. The LED lighting device 100 further includes the power cord box 6, where the power cord box 6 is disposed on the sidewall 11 perpendicular to the baseplate 10. The optical bearing portion 22 is provided with a retreated portion 223 at the position close to the sidewall 11 perpendicular to the baseplate 10, and the interference between the power cord box 6 and the optical bearing portion 22 is avoided by means of the retreated portion 223. The power cord box 6 is used for receiving some electronic elements, for example, a transformer and a light source control module, and some leads are also received therein, thereby improving the cleanliness inside the lamp.

In an embodiment of the present invention, the power cord box 6 can also directly receive the power source 3, so that the power source 3 is not required to be disposed on the outer side of the sidewall 11.

Please refer to FIG. 111A. The circuit board 202 is provided with a concave portion and a convex portion. The circuit board 202 is cut from a plate, when two circuit boards 202 on the plate to be cut correspond to each other, the concave portions and the convex portions thereof correspond to each other, that is, the convex portion of one circuit board 202 is embedded in the concave portion of the other light source plate. The concave portions and the convex portions are relatively staggered when the two corresponding circuit boards 202 are not cut, and thus the entire circuit board 202 with the same area can be cut into more single circuit boards 202. The LED arrays 203 (or the LED chips 201) are disposed on the convex portions.

Figure 111B:
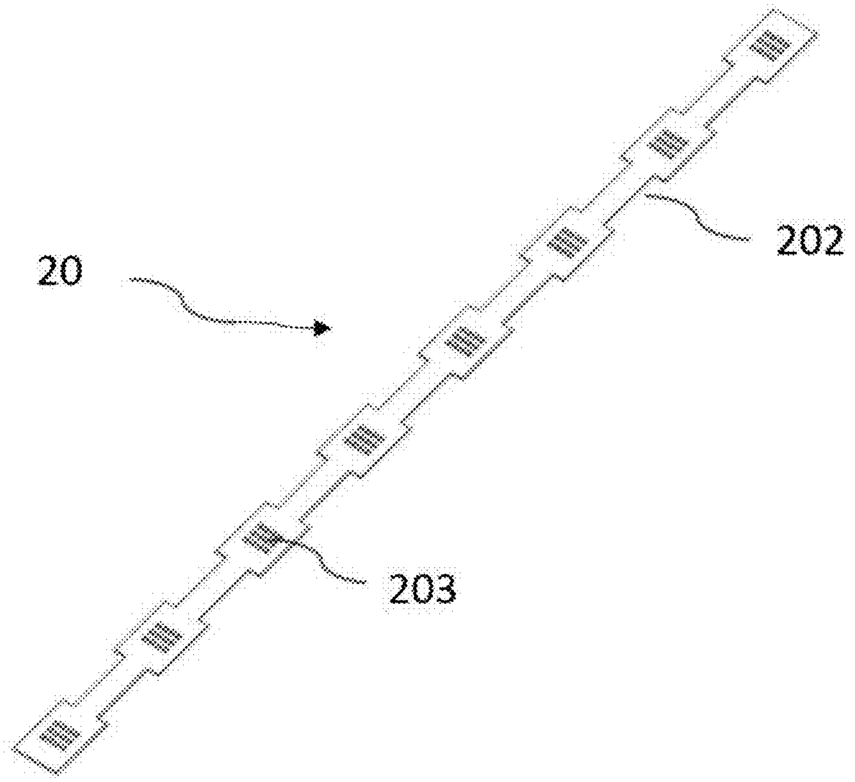
FIG. 111B is a schematic view of the light source component in another embodiment of the present invention.

Please refer to FIG. 111B, which is another embodiment of the circuit board 202 in the present invention.

Figure 113:
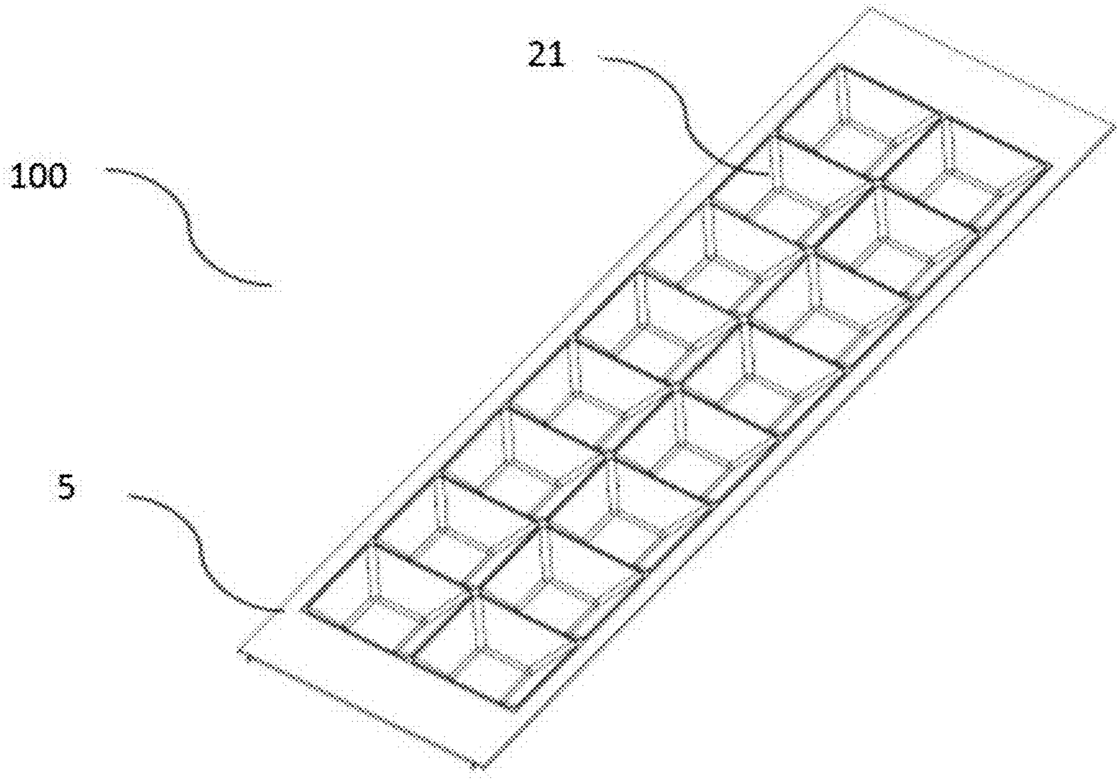
FIG. 113 is a front schematic view of some members of the LED lighting device in one embodiment of the present invention.

Please refer to FIG. 113, which is the schematic view of the LED lighting device 100 in another embodiment of the present invention. The embodiment is the same as the above embodiment in basic structure, and the difference lies in that in the embodiment, the LED lighting device 100 does not include the independent optical bearing portion 22, and some or all of the functions of the optical bearing portion 22 are achieved by means of the groove or step integrally formed on the seat 1.

Figure 114:
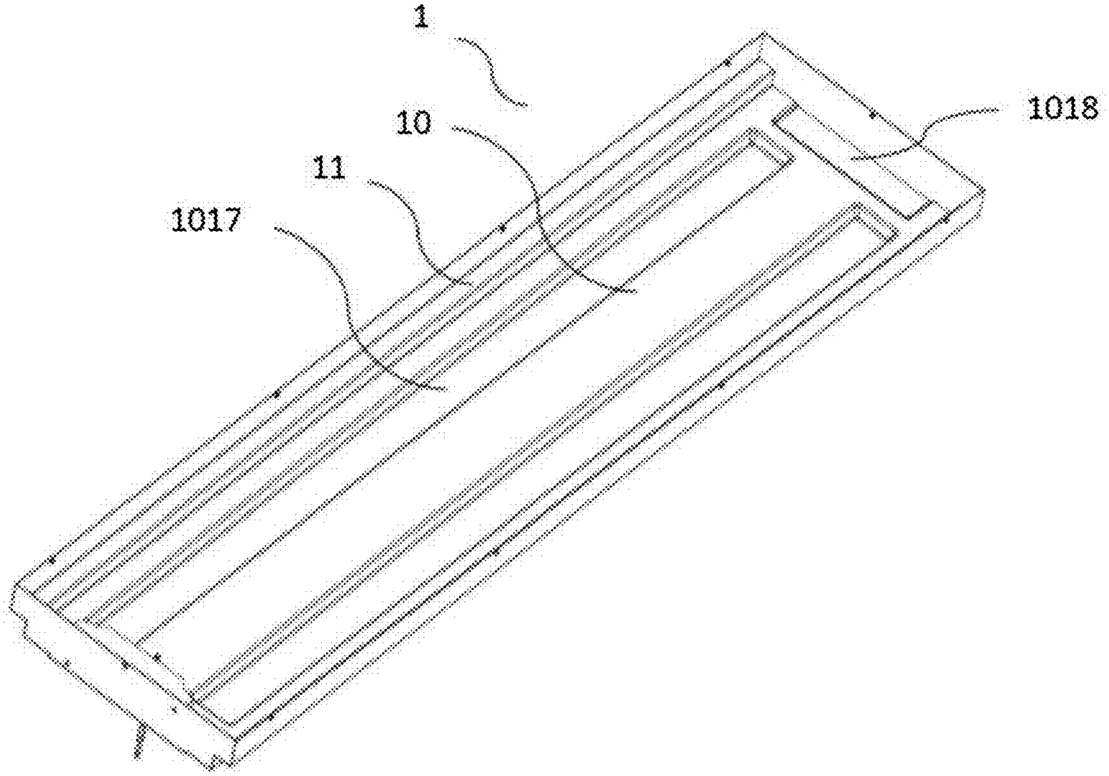
FIG. 114 is a front schematic view of the chassis of the LED lighting device in one embodiment of the present invention.

Please refer to FIG. 114, which is the front schematic view of the structure of the seat 1 in an embodiment of the present invention. The baseplate 10 of the seat 1 is provided with a groove extending in the length or width direction, in order to facilitate description, the groove is called bottom groove 101, and the bottom groove 101 has different functions in different embodiments, such as serving as a light source groove, a power source groove and a reinforcement structure. In an embodiment of the present application, the groove serves as the light source groove 1017 and is integrally formed on the baseplate 10 by means of pressure casting, stretching and stamping. In the embodiment, at least one light source groove 1017 is provided, more specifically, at least two light source grooves are provided, and the light source component 20 is disposed in the light source groove 1017 and attached to the bottom surface of the groove 1017. The baseplate 10 further includes a power source groove 1018, and the power source groove 1018 is used for receiving the power cord box 6. In the embodiment, the power source 3 is disposed in the power cord box 6, and the power source 3 is not required to be disposed outside.

Figure 115:
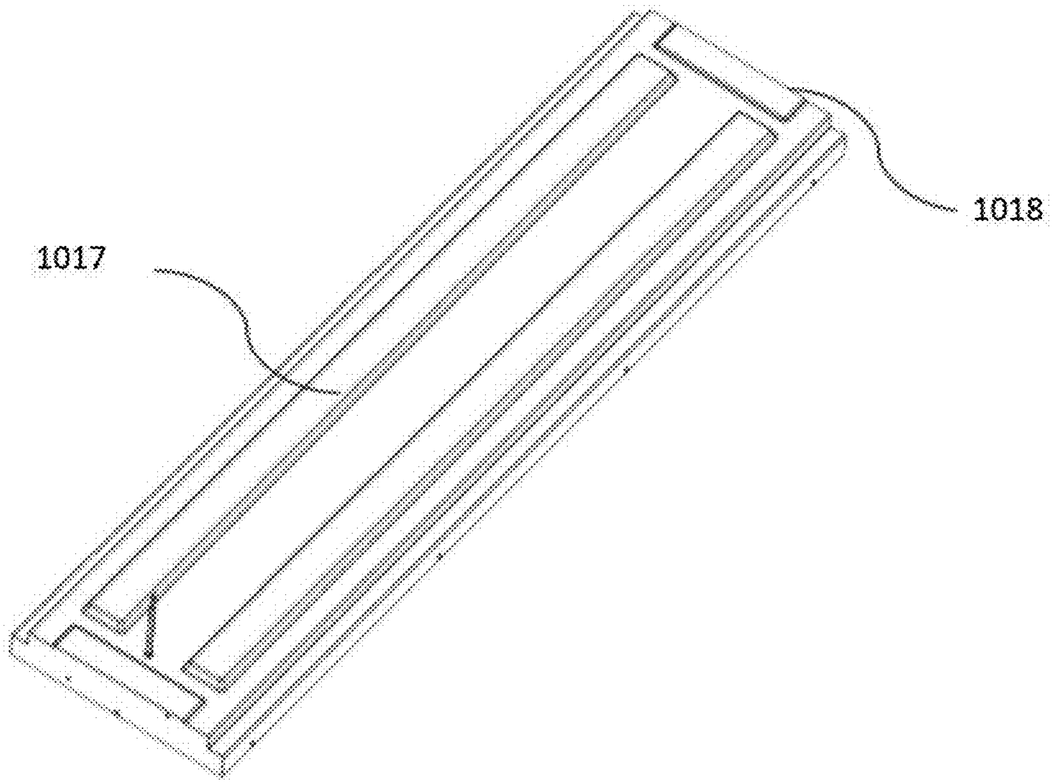
FIG. 115 is a back schematic view of the chassis of the LED lighting device in one embodiment of the present invention.

Please refer to FIG. 115, which is the back schematic view of the seat 1 in an embodiment of the present invention. In combination with FIG. 114 and FIG. 115, it can be seen that the depth of the power source groove 1018 is less than that of the light source groove 1017.

Figure 116:
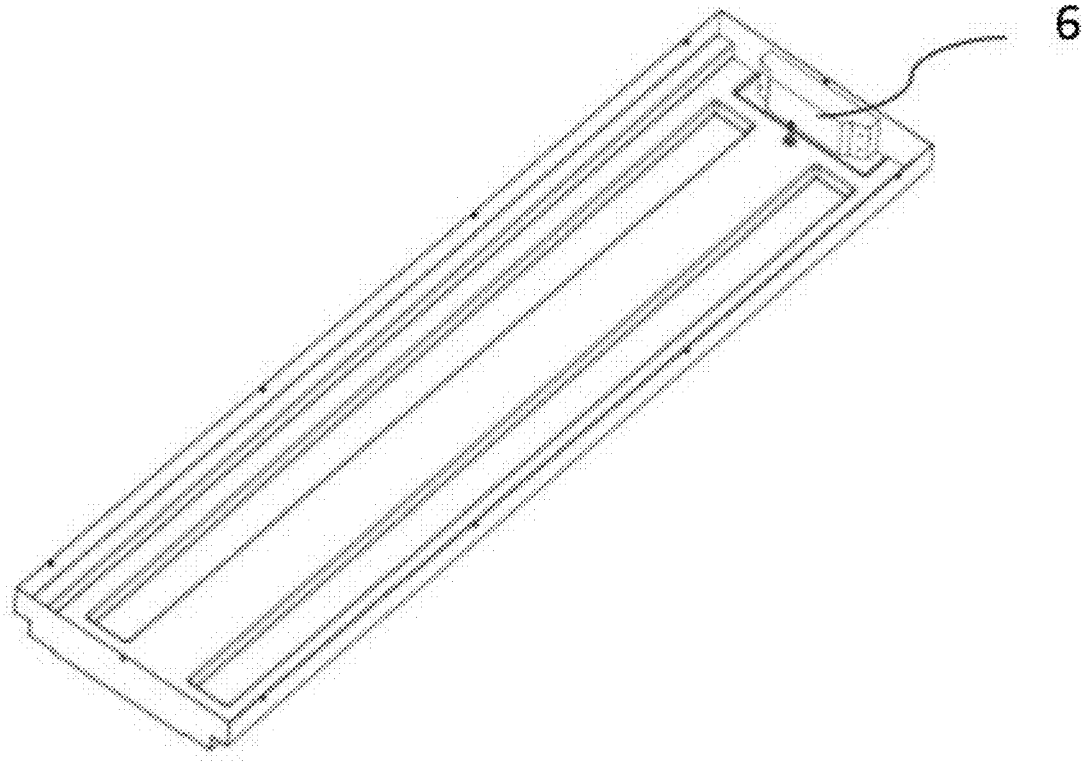
FIG. 116 is an assembling schematic view of the power cord box and the chassis in one embodiment of the present invention.

Please refer to FIG. 116, which is the assembling schematic view of the power cord box 6 and the seat 1. At least part of the power cord box 6 is received in the power source groove 1018.

Figure 117:
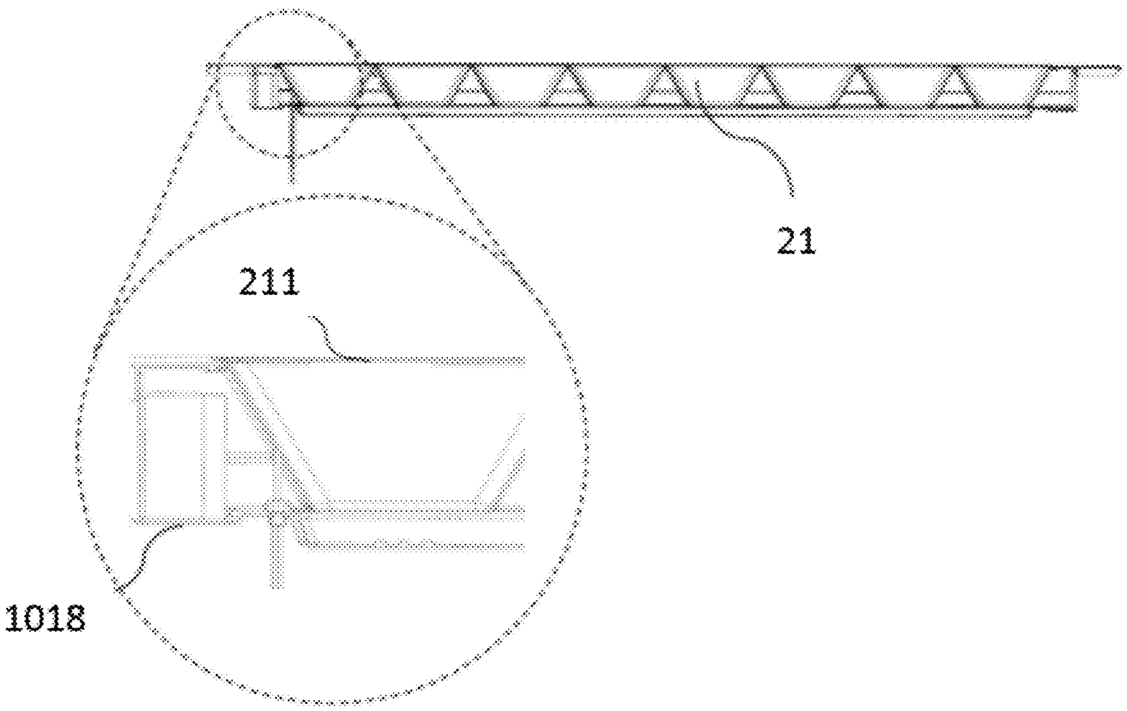
FIG. 117 is a sectional schematic view of the LED lighting device in a length direction in one embodiment of the present invention.
Figure 118:
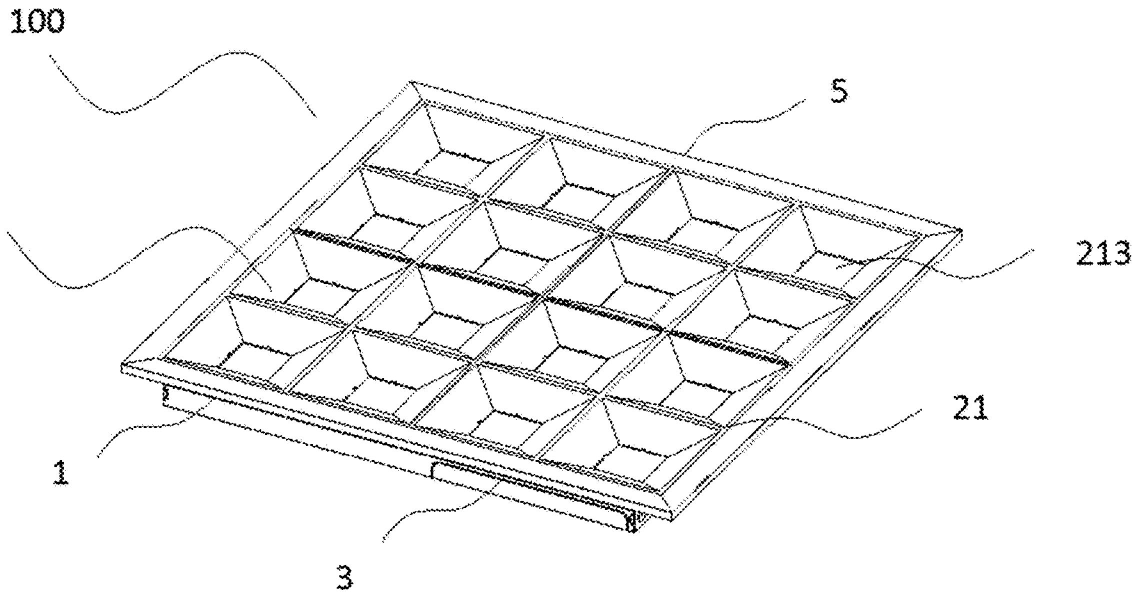
FIG. 118 is a schematic view of the LED lighting device in one embodiment of the present invention.

Please refer to FIG. 117, which is the sectional schematic view in the length direction of the LED lighting device 100 in an embodiment of the present invention. In combination with FIG. 115, FIG. 116 and FIG. 117, the optical member 21 is disposed on the baseplate 10, the optical units 211 are correspond to the light source grooves 1017, and the optical units are correspond to the LED arrays 203 on the light source components 20 in the light source grooves 1017. Through the arrangement of the light source grooves 1017, enough distances are maintained between the optical member 21 and the light source components 20 (LED arrays 203) to meet the light-emitting effect.

In the embodiment, the optical member 21 is an integrally formed structure, and is formed from a plastic material by integrated hot-pressing, stamping and blistering.

In an embodiment of the present invention, the light source grooves 1017 can also be disposed in a direction parallel to the width direction of the LED lighting device 100.

Please refer to FIG. 118 to FIG. 121, which are schematic views of the LED lighting device 100 in an embodiment of the present invention. The embodiment is the same as the above embodiment in basic structure, and the difference lies in that in the embodiment, the LED lighting device 100 does not include an independent optical bearing portion 22, and the optical member 21 is provided with the support portion 21126 (refer to FIG. 121, which is the partially enlarged view of part Z in FIG. 120) to achieve some or all of the functions of the optical bearing portion 22 in the above embodiment. In addition, the directed diffusing films 213 and the prism plates 214 are added, so that the light-emitting effect of the LED lighting device 100 is improved, the illumination requirement in a particular occasion is met, and the visual effect is improved.

Please refer to FIG. 119, which is the front exploded schematic view of the LED lighting device 100 in an embodiment of the present invention, or the exploded view in the light-emitting direction. As shown in the drawings, a rectangular coordinate system is established with the light-emitting direction of the LED lighting device 100 as the Z axis, and the exploded view of the LED lighting device 100 is taken in the positive direction of the Z axis. The LED lighting device 100 includes: the seat 1 disposed at the bottom (that is, the lowest position of the LED lighting lamp 100 at the Z axis) and the optical assembly 2, where the optical assembly 2 is disposed on the seat 1. The LED lighting device 100 further include an install border 5, where the install border 5 includes a plurality of support elements 51, the support elements 51 (or the install border 5) are connected to the seat 1 and fix the optical assembly 2 to the seat 1, that is, the support elements 51 and the seat 1 clamp the optical assembly 2.

Specifically, the seat 1 includes a baseplate 10 substantially parallel to the horizontal plane or the XY plane and a sidewall 11, the sidewall 11 roughly extends in the Z-axis direction, that is, extends in the positive direction of the Z axis. The sidewall 11 and the baseplate 10 form the groove with an opening, that is, the baseplate 10 and the sidewall 11 form the receiving space 12, and the optical assembly 2 is received in the receiving space 12. In order to facilitate description below, the light-emitting direction of the LED lighting device 100 is called the upper side, that is, the positive direction of the Z axis is the upper side. The baseplate 10 is substantially rectangular, for example, in a square or oblong shape, and can also be set in other shapes according to requirements. In the embodiment, the baseplate 10 is in the oblong shape. The baseplate 10 is preferably made of a metal material, thereby ensuring the structural strength of the baseplate 10 and avoiding deformation. The baseplate 10 is more preferably made of a metal material with the good heat conductivity, which is beneficial to heat dissipation of the LED lighting device 100. Meanwhile, the metal material has the high structural strength, thereby ensuring the stability of the LED lighting device 100, and prolonging the service life of the LED lighting device 100.

In an embodiment of the present invention, the baseplate 10 can be made of a light-transmitting material, for example, a transparent material, a semi-transparent material or an opaque material. When part of the light needs to be emitted from the back of the LED lighting device 100, the baseplate 10 can be made of the transparent material or the semi-transparent material; and part of the light is emitted from the back of the LED lighting device 100, so that the shadow at the back of the LED lighting device 100 can be eliminated, and the overall lighting effect of the LED lighting device 100 can be improved. The baseplate 10 can be set to be totally transparent, or partially transparent, or at least partially transparent, or completely opaque.

The sidewall 11 can be disposed on the outer edge of the baseplate 10 or close to the outer edge of the baseplate 10. The sidewall 11 is disposed around the baseplate 10, thereby forming the sidewall 11 of the annular structure connected end to end; and the sidewall and the baseplate 10 form the receiving space 12. The sidewall 11 can enhance the overall structural strength of the seat 1, and the sidewall 11 of the annular structure connected end to end can also prevent foreign matters such as dust and insects from entering the LED lighting device 100 from the sidewall 11. In some embodiments, the seat 1 can include multiple sections of sidewalls 11 arranged at intervals.

The sidewall 11 extends in the light-emitting direction of the LED lighting device 100 to form a certain height and forms the receiving space 12 with the baseplate 10, the height of the sidewall 11 determines the depth of the receiving space 12, and the optical assembly 2 is disposed in the receiving space 12. The height of the sidewall 11 can be determined according to actual requirements. In the embodiment, the thickness of the optical assembly 2 in the light-emitting direction of the LED lighting device 100 is less than or equal to the depth of the receiving space 12, that is, the thickness is less than or equal to the height of the sidewall 11 in the light-emitting direction of the LED lighting device 100, thereby controlling the thickness of the LED lighting device 100 and facilitating product assembling.

The sidewall 11 can be made of the light-transmitting material and the opaque material, for example, it is made of the transparent material, the semi-transparent material or the opaque material separately, or is made of at least two of the materials, which can be set according to requirements, thereby meeting lighting requirements in different occasions, for example, making the sidewall 11 completely transparent, or completely opaque, or partially transparent, or partially opaque (or at least partially transparent, or at least partially opaque, and the baseplate 10 can also be like this). The sidewall 11 is preferably made of a metal material, and the sidewall 11 is more preferably made of metal material with the good heat conductivity, thereby ensuring the strength and heat dissipation effect of the sidewall 11 at the same time.

The sidewall 11 and the baseplate 10 are split structures or an integrally formed structure. When the sidewall 11 and the baseplate 10 are split structures, the sidewall 11 and the baseplate 10 can be connected by glue coating, soldering, snap-fitting or screw locking. When the sidewall 11 and the baseplate 10 are integrally formed structure, the sidewall 11 and the baseplate 10 are preferably made of the same material, which is beneficial to production and manufacturing of the seat 1. The sidewall 11 and the baseplate 10 are integrally formed structure, so that the bonding force between the sidewall 11 and the baseplate 10 can be increased, and the size precision of the seat 1 can also be improved, meanwhile, batch manufacturing is facilitated, and the production cost can be reduced. For example, the baseplate 10 and the sidewall 11 are integrally stamped and formed by the same material, such as the metal material, or the sidewall 11 and the baseplate 10 are formed by bending one metal surface.

The bottom groove 101 can be formed in the baseplate 10, the bottom groove 101 can be a reinforced rib, and the bottom groove 101 can be formed in the surface of the baseplate 10 facing the receiving space 12 or the surface of the baseplate 10 facing away from the receiving space 12. In the embodiment, the bottom grooves 101 are formed in two surfaces of the baseplate 10 at the same time, and the bottom grooves 101 and the baseplate 10 are integrally formed through pressure casting, stretching and stamping. The bottom groove 101 protrudes or sinks relative to the baseplate 10 to form a three-dimensional structure, and the bottom groove 101 can further enhance the structural strength of the baseplate 10.

The seat 1 can be further provided with a bracket 4, which includes a plurality of hanging hooks 43 connected to the seat 1, one or more hanging hooks 43 can be provided, and the hanging hooks 43 can be disposed in the middle of the baseplate 10 or the periphery of the baseplate 10. In the embodiment, four hanging hooks 43 are provided, and the hanging hooks 43 are disposed on two opposite edge positions of the baseplate 10, that is, each side is provided with two hanging hooks 43. The hanging hooks 43 and the baseplate 10 can be connected through glue coating, soldering, snap-fitting or screw locking. The positions of the hanging hooks 43 can be other positions of the baseplate 10 or the sidewall 11.

The optical assembly 2 is disposed in the receiving space 12, the optical assembly 2 can include the light source component 20 and the optical member 21, the light source component 20 is disposed on the baseplate 10 of the seat 1, and the optical member 21 is disposed on one side of the light source component 20 away from the seat 1, that is, the optical member 21 covers the light source component 20. The light source component 20 can generate and emit light, the light of the light source component 20 can pass through the optical member 21, and the optical member 21 can process the light generated by the light source component 20, such as one of or a combination of light projection, light reflection, light diffusion, light refraction and light diffraction. The optical member 21 can include the directed diffusing film 213, and the directed diffusing film 213 can deflect the light in a specific direction by arranging micro optical array structure on the surface of the diffusing film, such as micro-prism array or a protrusion array; or the directed diffusing film 213 guides the light to be diffused in the specific direction by disposing plate-shaped regions with different refractive indexes in parallel alternatively in any direction of a film surface, that is, the directed diffusing film 213 has the function of diffusing the light in the specific direction. In some embodiments, the directed diffusing film 213 can also be called a bat wing diffusing film, a bat wing film, an anisotropic diffusing film or a unidirectional diffusing film, the directed diffusing film 213 can be the B-series from Bright view company, that is, the bat wing diffusing film, or the diffusing film with the specific surface microstructure and processed with a technology in patent CN110998176B, that is, the directed diffusing film 213 herein can be described as the bat wing diffusing film, the bat wing film, the anisotropic diffusing film or the unidirectional diffusing film, and the directed diffusing film 213 can diffuse the light, which is processed by said film or passes through the directed diffusing film 213, in the specific direction, that is, performing directed light diffusion to achieve different light-emitting effects, such as the bat wing light pattern.

Figure 122A:
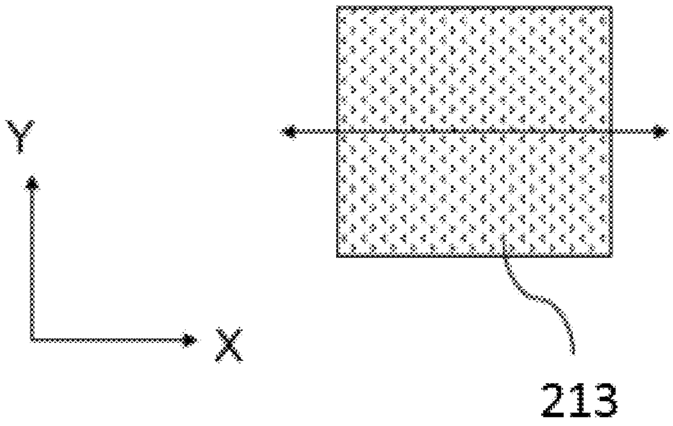
FIG. 122A is a schematic view of the directed diffusing film in one embodiment of the present invention.

Please refer to FIG. 122A, which is the brief schematic view of the directed diffusing film 213 in an embodiment of the present invention. As shown in the drawing, the directed diffusing film 213 can be implemented to be of a rectangular structure, more specifically, a square structure, the diffusing direction of the directed diffusing film 213 is shown by the arrow in the drawing, that is, after being processed by the directed diffusing film 213, the light passing through said film is diffused towards two opposite sides of the rectangle instead of being diffused randomly to form uniform light emitting around (up, down, left and right), and the subsequently emitted light is relatively concentrated on the two opposite side edges. Of course, when the directed diffusing film 213 is disposed in a coordinate system, the light diffusing direction thereof can also be described to be mainly concentrated in the positive and negative directions of the X axis, instead of being uniformly diffused in the positive and negative directions of the X axis and the positive and negative directions of the Y axis to form the Lambert light pattern.

In some embodiments, in the LED lighting device 100, the directed diffusing film 213 can be set to have one or more diffusing directions or at least have two diffusing directions, and the directed diffusing film 213 can change the light-emitting direction of the LED lighting device 100 so as to enlarge the beam angle of the emitted light of the LED lighting device 100, so that the light pattern of the emitted light of the LED lighting device 100 is the bat wing light pattern or the improved Lambert light pattern, thereby further improving the light-emitting effect of the LED lighting device 100, meeting the lighting requirements of the specific occasions, and improving the visual effect. Of course, the directed diffusing film 213 can also have only one diffusing direction, but the diffusing direction can vary with the placement position (orientation) of the directed diffusing film 213. The emitted light of the light source component 20 is regulated and controlled in a directed manner by means of the directed diffusing film 213, that is, the final pointed direction of the diffusing direction is the light concentration direction, thereby achieving targeted regulation and control of the light concentration region, and achieving the bat wing type light pattern or the improved Lambert light pattern.

Please refer to FIG. 119. A plurality of directed diffusing films 213 are provided, the number of the directed diffusing films 213 correspond to that of the LED arrays 203, and one directed diffusing film 213 corresponds to one LED array 203. The directed diffusing film 213 is disposed in front of the light-emitting direction of the LED array 203, and the light of the LED array 203 is emitted through the directed diffusing film 213. The directed diffusing films 213 are independent of each other, the positions of the directed diffusing films 213 relative to the light source component 20 can be changed by changing the installing orientations of the directed diffusing films 213, thereby changing the orientations of the diffusing directions of the directed diffusing films 213, and changing the light pattern of the emitted light of the LED lighting device 100. The plurality of directed diffusing films 213 have multiple arrangement combinations, thereby forming multiple light patterns of the emitted light of the LED lighting device 100.

Figure 122B:
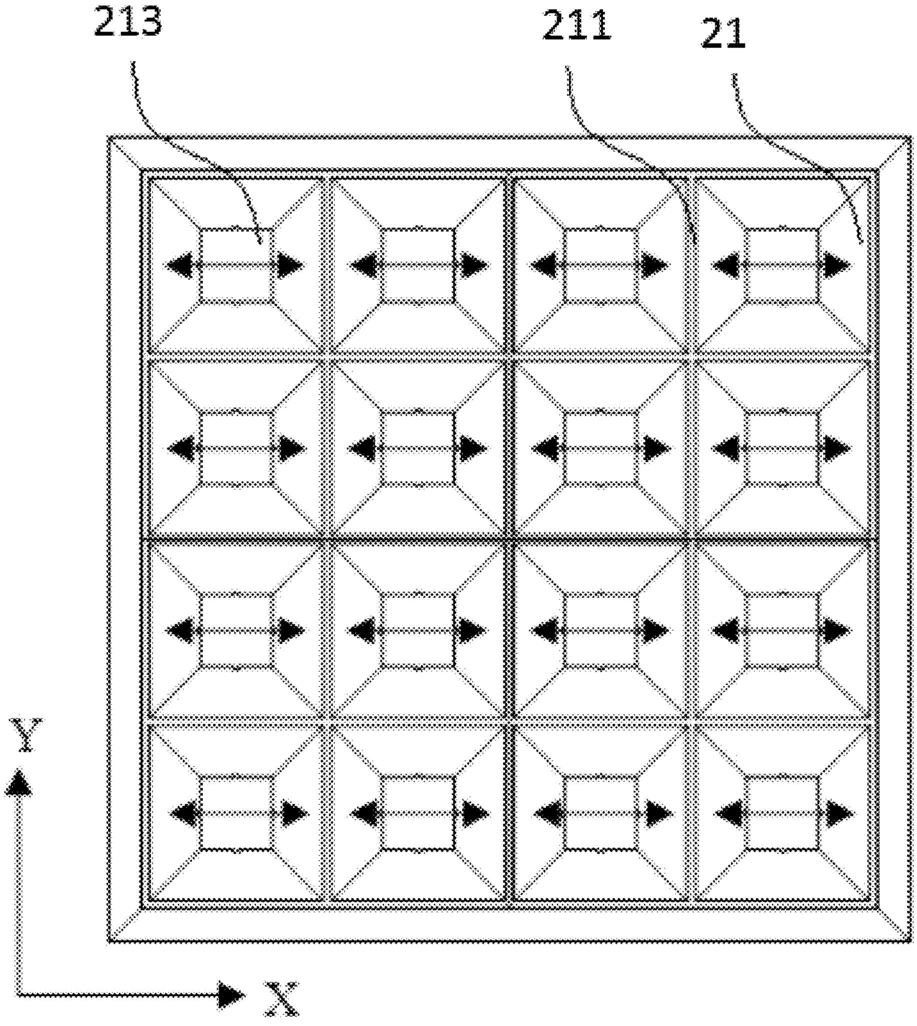
FIG. 122B is a schematic view of one kind of distribution of directed diffusing films in one embodiment of the present invention.

Please refer to FIG. 122B, which is the schematic view of one kind of distribution of directed diffusing films 213 of the LED lighting lamp 100 in an embodiment of the present invention. In combination with FIG. 122A, in an embodiment, the LED lighting device 100 is provided with sixteen directed diffusing films 213 which are distributed in a 4*4 manner, and the light diffusing direction of the emitted light by each directed diffusing film 213 faces the same direction relative to the LED lighting device 100, as shown by the arrow in FIG. 122B.

Figure 123:
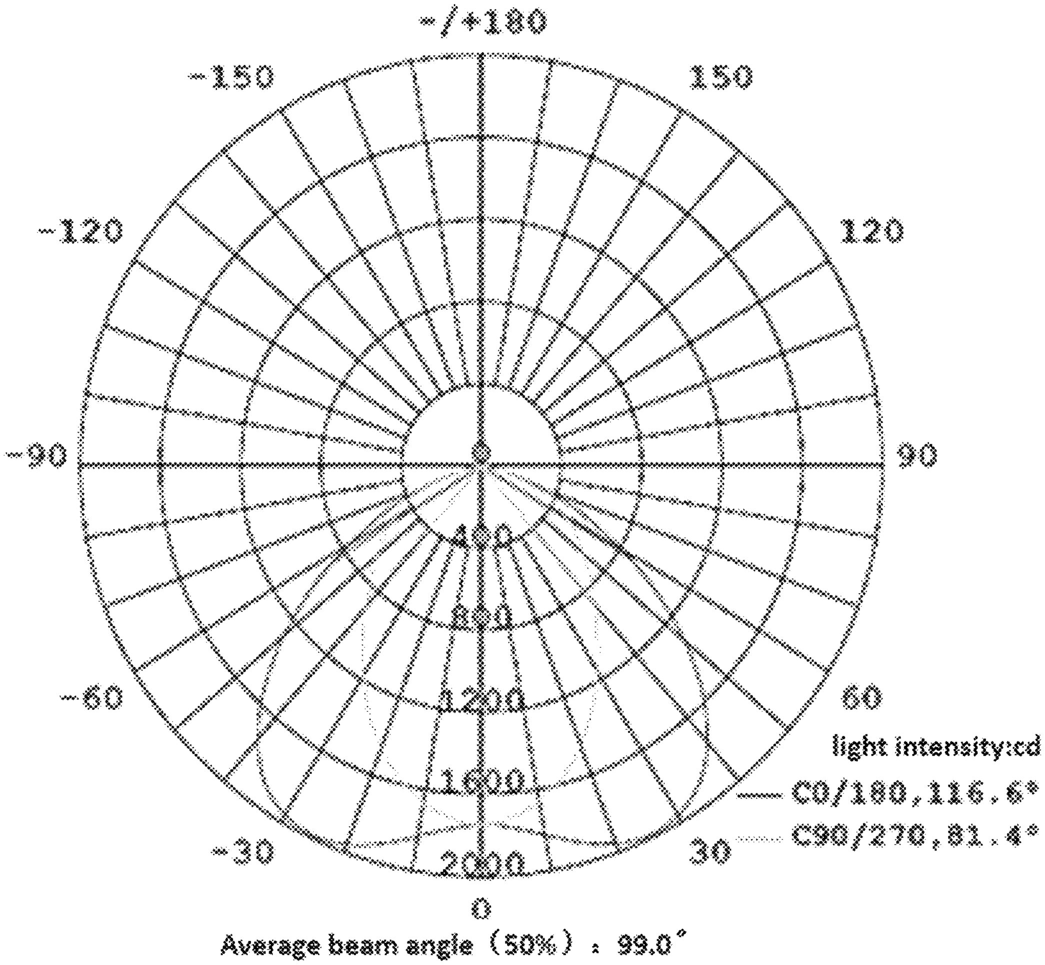
FIG. 123 is a light pattern of the LED lighting device when lighting in one embodiment of the present invention.

As shown in FIG. 122B, a mutually perpendicular X-Y rectangular coordinate system is established by the length and width of the LED lighting device 100. From the front of the LED lighting device 100, each optical unit 211 includes sixteen optical members 21, four optical members 21 are arranged in a row in the X direction, and four optical members 21 are arranged in a column in the Y direction; and each optical member 21 is correspondingly provided with one directed diffusing film 213, that is, sixteen directed diffusing films 213 are provided, four directed diffusing films 213 are arranged in a row in the X direction, and four directed diffusing films 213 are arranged in a column in the Y direction. Each directed diffusing film 213 has two diffusing directions, and the two diffusing directions respectively face the positive direction and the negative direction of the X axis. As shown in FIG. 122B, in one LED lighting device 100, the diffusing directions of the directed diffusing films 213 are set to be the same, that is, the diffusing directions of the directed diffusing films 213 are along the positive direction and the negative direction of the X axis, namely, the diffusing directions are along two opposite outer borders of the LED lighting device 100, and more specifically, the diffusing directions are along the two borders in the positive and negative directions of the X-axis direction, so that the light intensity/luminous flux of the finally emitted light of the LED lighting device 100 in the positive and negative directions of the X axis is obviously greater than that in the positive and negative directions of the Y axis, that is, in view of the coordinate system where XY is located, by taking the center of the LED lighting device 100 as an origin and the circle center, on the circumference with the same radius, the light intensity close to the X axis is obviously greater than the light intensity/luminous flux close to the Y axis, that is, the light intensity/luminous flux distribution is such that by taking a light source as the center, under the condition of equal distances from the light source, the light intensity/luminous flux in the X-axis direction is obviously greater than that in the Y-axis direction, thereby forming the bat wing light pattern diffused towards the two sides, that is, the optical diffusing directions are diffusing directions towards the two sides in the X direction, and by taking the light source (the center of the lamp) as the center (the circle center), the light is concentrated towards the two sides (the X axis). Referring to FIG. 123, which is the light pattern of the LED lighting device 100 after light emitting in an embodiment of the present invention. The diffusing directions of the directed diffusing films 213 are set as per FIG. 122B, so that the light pattern of the LED lighting device 100 after light emitting is the bat wing light pattern, the light-emitting effect of the LED lighting device 100 is improved, the illumination requirement in the particular occasion is met, and the visual effect is improved.

Figure 124:
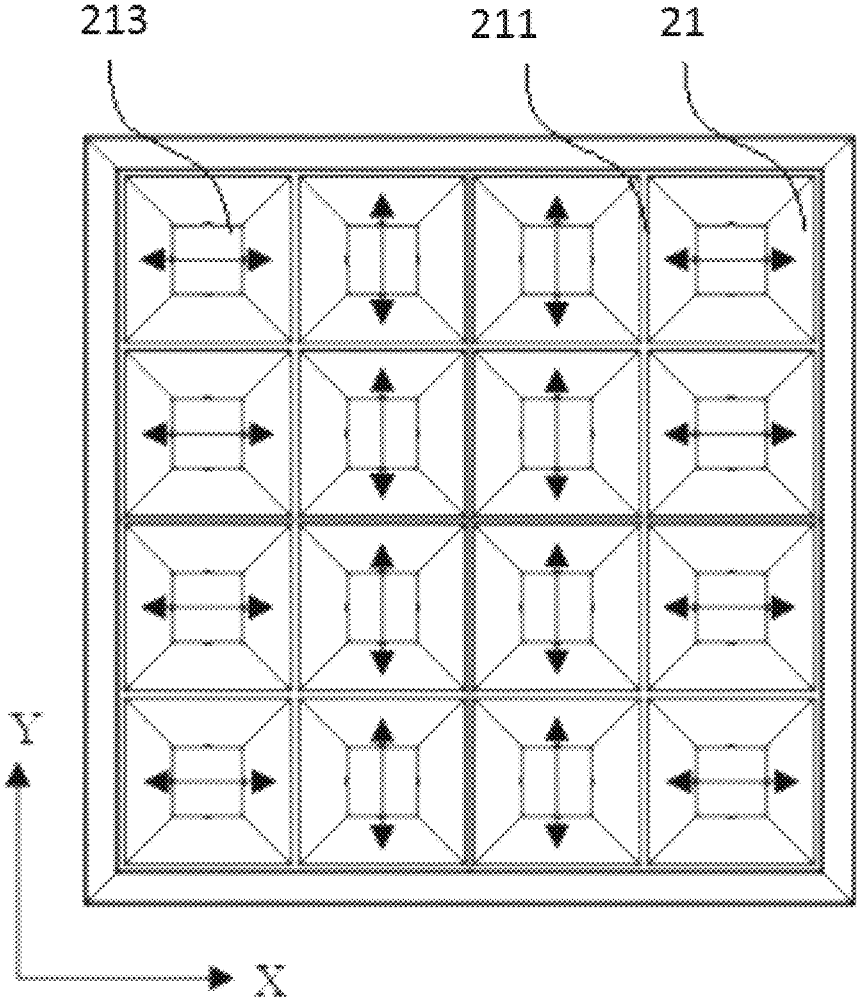

As shown in FIG. 124, a rectangular coordinate system is established by the length and width of the LED lighting device 100. From the front of the LED lighting device 100, each optical unit 211 includes sixteen optical members 21, four optical members 21 are arranged in a row in the X direction, and four optical members 21 are arranged in a column in the Y direction; and each optical member 21 is correspondingly provided with one directed diffusing film 213, that is, sixteen directed diffusing films 213 are provided, four directed diffusing films 213 are arranged in a row in the X direction, and four directed diffusing films 213 are arranged in a column in the Y direction. Each directed diffusing film 213 has two diffusing directions, and the two diffusing directions of each directed diffusing film 213 in the four directed diffusing films 213 in the first column and the four directed diffusing films 213 in the fourth column respectively face the positive direction and the negative direction of the X axis. The two diffusing directions of each directed diffusing film 213 in the four directed diffusing films 213 in the second column and the four directed diffusing films 213 in the third column respectively face the positive direction and the negative direction of the Y axis. That is, the diffusing directions of the directed diffusing films 213 in the first column and the fourth column are perpendicular to the diffusing directions of the directed diffusing films 213 in the second column and the third column, ½ of the diffusing directions of the directed diffusing films 213 are along the positive direction and the negative direction of the X axis, the other ½ of the diffusing directions are along the positive direction and the negative direction of the Y axis, and the diffusing directions are distributed uniformly and symmetrically. Therefore, in the final, in view of the coordinate system where XY is located, by taking the center of the LED lighting device 100 as the origin and the circle center, on the circumference with the same radius, the light intensity/luminous flux of the LED lighting device 100 close to the X axis is substantially close to the light intensity/luminous flux close to the Y axis, that is, the light intensity/luminous flux distribution is such that by taking the light source as the center, under the condition of equal distances from the light source, the light intensity/luminous flux on the two sides (close to the X-axis direction) is substantially close to that in the middle (close to the Y-axis direction), thereby forming the light pattern uniformly diffused around (positive and negative directions of the X axis and the Y axis), that is, by taking the light source (the center of the lamp) as the circle center, the light intensity/luminous flux in the circumferential direction is uniformly distributed, and thus the Lambert light pattern is realized or improved.

Please refer to FIG. 124, which is the schematic view of another kind of distribution of directed diffusing films 213 of the LED lighting device 100 in an embodiment of the present invention. As shown in the drawing, the LED lighting device 100 is provided with the sixteen directed diffusing films 213 which are distributed in a 4*4 manner, the diffusing directions of the directed diffusing films 213 in the two rows in the middle are the same relative to the LED lighting device 100, the diffusing directions of the directed diffusing films 213 in the two rows on the two sides are the same relative to the LED lighting device 100 and are perpendicular to the diffusing directions of directed diffusing films 213 in the two rows in the middle relative to the LED lighting device 100, that is, the directed diffusing films 213 have at least two diffusing directions, and the two diffusing directions are perpendicular to each other, that is, the diffusing directions are uniformly distributed as a whole around the LED lighting device 100, as shown by arrows in FIG. 124.

Figure 125:
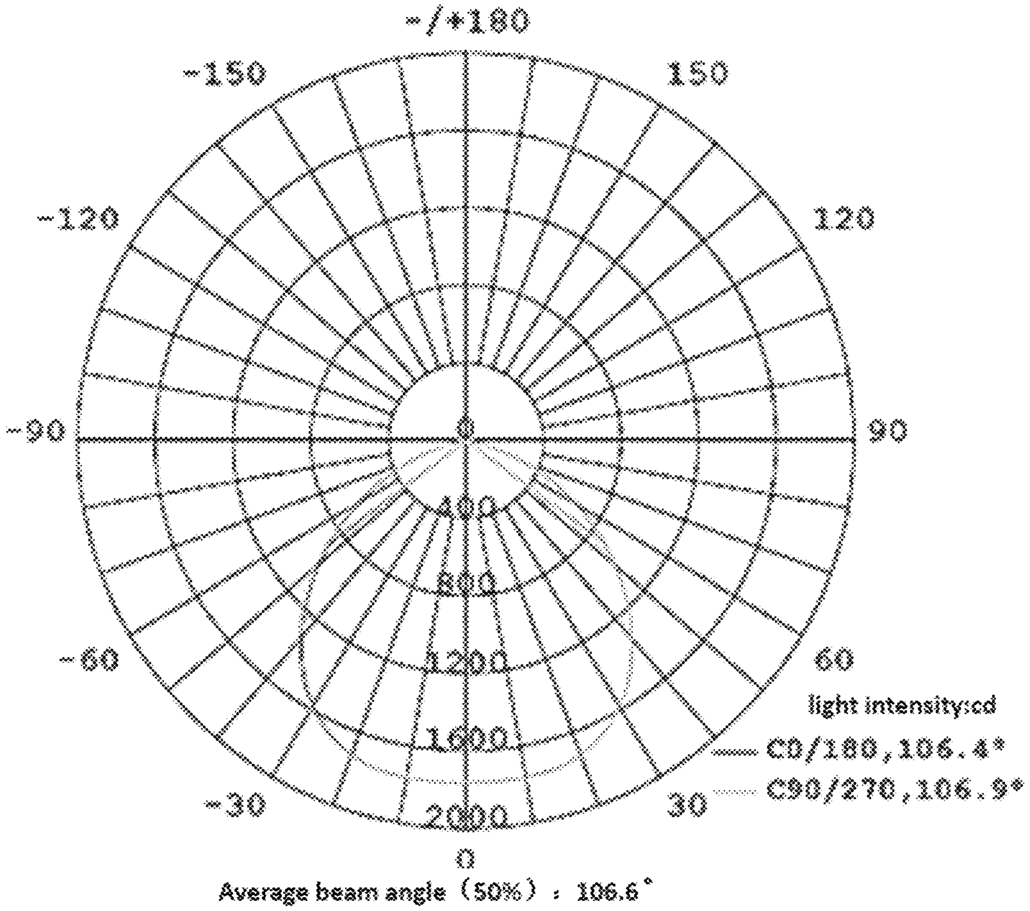

Referring to FIG. 125, which is another light pattern of the LED lighting device 100 after light emitting in another embodiment of the present invention. The diffusing directions of the directed diffusing films 213 are set as per FIG. 124, so that the light pattern of the LED lighting device 100 after light emitting is the improved Lambert light pattern, the light-emitting effect of the LED lighting device 100 is improved, the illumination requirement in the particular occasion is met, and the visual effect is improved.

In some embodiments, the diffusing directions of the adjacent directed diffusing films 213 in each row can cross each other (not limited to be perpendicular to each other), and the diffusing directions of the adjacent directed diffusing films 213 in each column can be parallel to each other.

In an embodiment, the light source component 20 can be directly or indirectly disposed on the baseplate 10, for example, fixed to the baseplate 10 through glue coating, soldering, snap-fitting or screw locking. One or more circuit boards 202 can be provided, and the lengths of the circuit boards 202 can be the same or different, which are set according to actual requirements. The circuit boards 202 can be plates that can be used for circuit connection and achieve functions of the circuit boards, for example, FPC, PCB and aluminum substrates, but are not limited to such plates. The circuit boards 202 can be disposed in the length direction or the width direction of the baseplate 10, or disposed in a cross manner in the length direction and the width direction of the baseplate 10, and the circuit boards 202 can be disposed substantially parallel to the baseplate 10, or form included angles with the baseplate 10. The LED lighting device 100 with different brightness and light-emitting effects can be obtained by adjusting the number and arrangement manner of the circuit boards 202. Each circuit board 202 is provided with at least one LED array 203, and the LED arrays 203 can be disposed on any one surface of the circuit board 202 or on two surfaces of the circuit board 202. The LED array 203 can be an LED chip array or an array formed by other light-emitting devices.

Please refer to FIG. 119. In an embodiment of the present invention, the optical member 21 can further include prism plates 214 and optical units 211. A plurality of prism plates 214 are provided, the number of the prism plates 214 correspond to that of the LED arrays 203, and one prism plate 214 corresponds to one LED array 203. The prism plate 214 is disposed in front of the light-emitting direction of the LED array 203, that is, the side of the LED array 203 away from the baseplate 10, light of the LED array 203 is emitted through the prism plate 214, and the prism plate 214 can refract or reflect the light, or refract and reflect the light, thereby achieving diffusing and scattering of the light. When the light of the LED lighting device 100 passes through the prism plates 214, the light can be dispersed into light in multiple directions, thereby achieving the more uniform lighting effect. Meanwhile, the material and design of the prism plates 214 can also affect the performance of the light, such as the color temperature and color rendition, so that a plurality of factors need to be considered comprehensively when selecting and designing the LED lamp. The prism plates 214 can convert direct light emitted by a light source array 2012 into scattered light, thereby achieving the more uniform lighting. In the embodiment, the directed diffusing films 213 are disposed in front of the prism plates 214, that is, the light of the LED arrays 203 first passes through the prism plates 214 and then through the directed diffusing films 213, thereby achieving repeated light processing, or repeated light diffusion.

Figure 120:
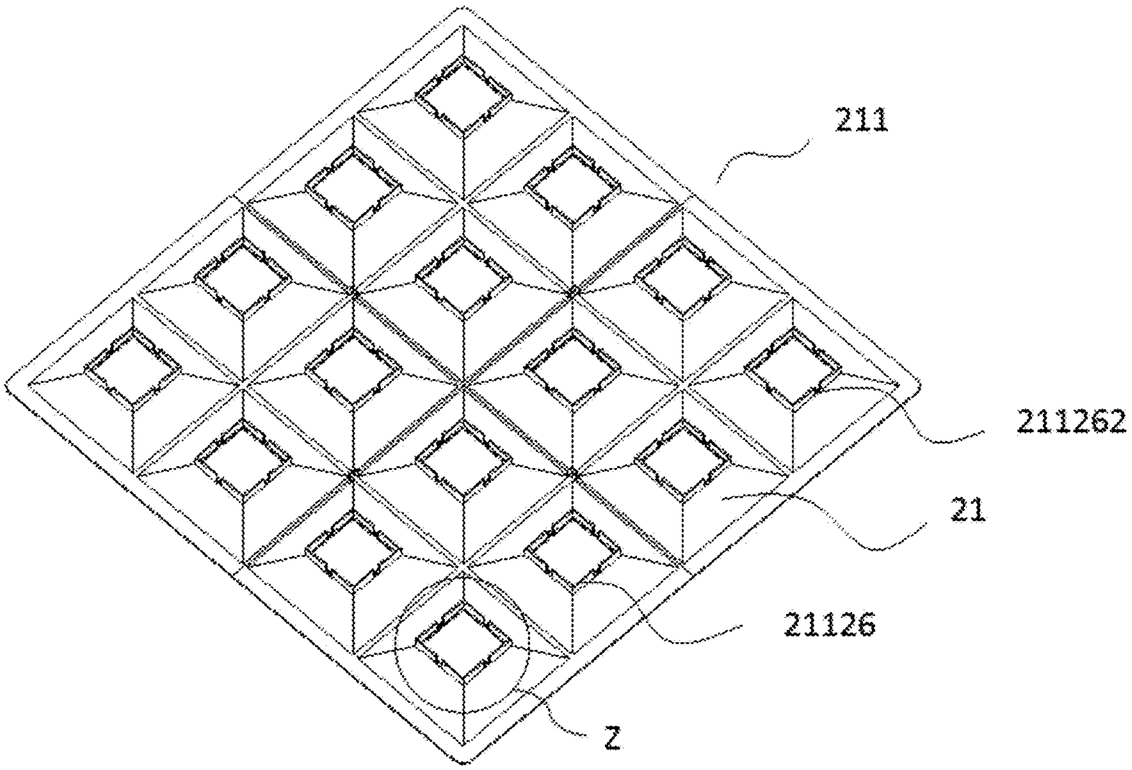
FIG. 120 is a schematic view of the light processing unit in one embodiment of the present invention.

Please refer to FIG. 119 and FIG. 120. Each optical unit 211 includes optical members 21, the number of the optical members 21 corresponds to that of the LED arrays 203, one optical member 21 corresponds to one LED array 203, and the optical member 21 can contain the LED array 203. The plurality of optical members 21 can be independent of each other, that is, each optical member 21 is independently formed, and the plurality of optical members 21 are spliced through glue coating, soldering, snap-fitting or screw locking to form the optical unit 211. Several optical members 21 can also be integrally formed, and then are spliced through glue coating, soldering, snap-fitting or screw locking to form the optical unit 211. The optical members 21 can form the optical units 211 in different numbers and different shapes through splicing according to requirements, so that the requirements of different application scenes are met. The replacement of a damaged optical members 21 is also facilitated, so that the entire optical units 211 are not required to be replaced, and the maintenance cost is saved. Of course, in an embodiment, the optical unit 211 can also be integrally formed by a plurality of optical members 21.

Figure 121:
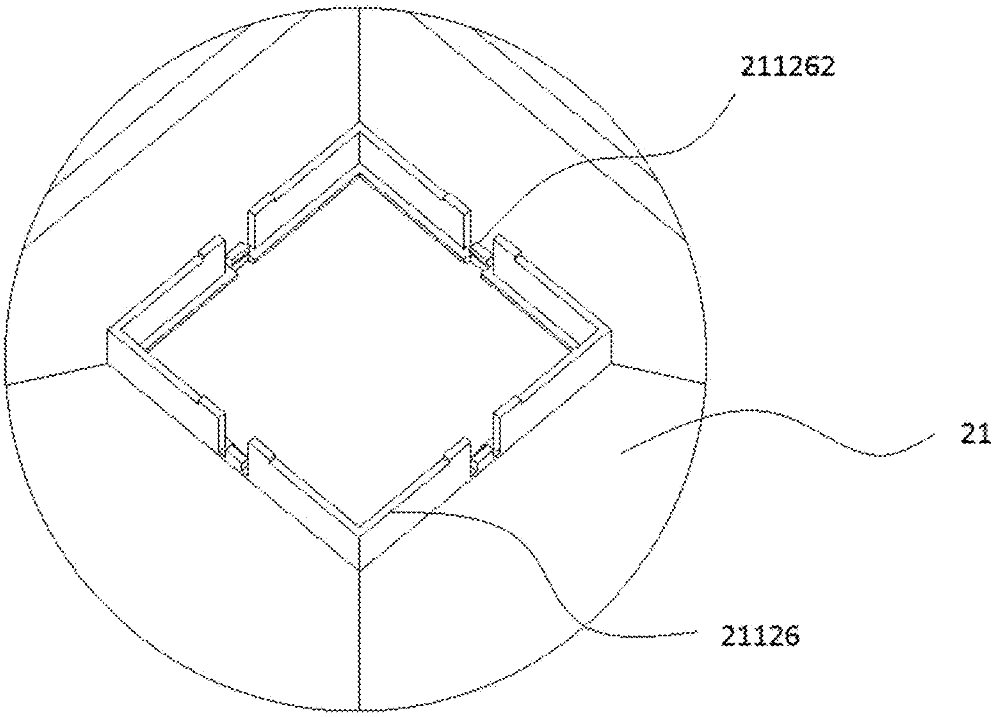
FIG. 121 is a partially enlarged view of part Z in FIG. 120.

In an embodiment of the present invention, the optical members 21 can be of inverted polygonal frustum structures, that is, light reflecting cup structures. The polygonal frustum surfaces of the optical members 21 are provided with windows, that is, through holes penetrating through the polygonal frustum surfaces of the optical members 21. Referring to FIG. 120 and FIG. 121. One end of the optical member 21 with a small opening faces the light source component 20, the end of the optical member 21 close to the light source component 20 is provided with first snap-fitting portions 211262, and the directed diffusing film 213 and the prism plate 214 are connected to the optical member 21 by the first snap-fitting portions 211262. The directed diffusing film 213 and the prism plate 214 can be respectively connected to the different first snap-fitting portions 211262, or the directed diffusing film 213 and the prism plate 214 can be snap-fitted with the same first snap-fitting portion 211262 at the same time, and then the directed diffusing film 213 and the prism plate 214 are connected to each other. The directed diffusing film 213 can form a sealed structure with the opening of the optical member 21, thereby preventing the foreign matters such as the dust and insects from entering the LED lighting device 100 from the sidewall 11.

Please refer to FIG. 120 and FIG. 121. One end of the optical member 21 close to the light source component 20 is provided with support portions 21126, and the support portions 21126 are preferably integrally formed with the optical member 21. The support portions 21126 are in contact with the baseplate 10, so that a gap is formed between the optical member 21 and the baseplate 10, and the gap is also formed between the directed diffusing film 213 and the prism plate 214 and the baseplate 10.

The LED lighting device 100 further includes a power source 3 and a power cord box 6, and the installing positions of the power source 3 and the power cord box 6 are the same as or similar to those in the above embodiments.

Figure 111C:
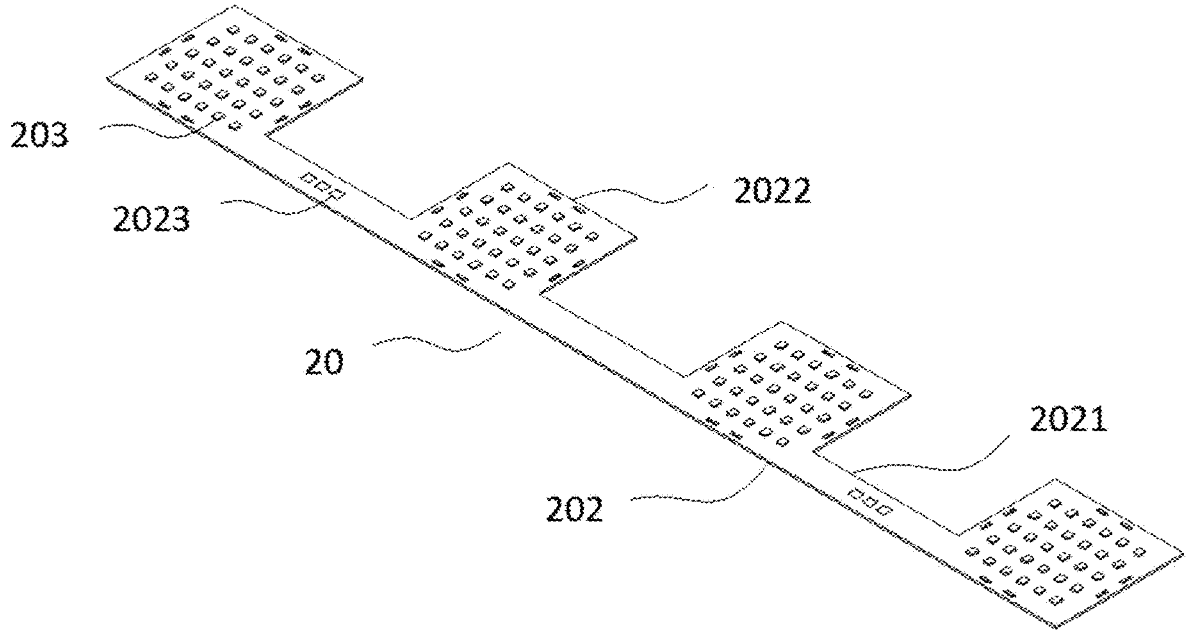
FIG. 111C is a schematic view of the light source component in another embodiment of the present invention.

Please refer to FIG. 111C, which is one embodiment of the circuit board 202 in the present invention. The circuit board 202 is provided with a concave portion 2021 and a convex portion 2022 that are staggered arrangement. The circuit board 202 can further be provided with one or more circuit board installing holes 2023, for example, fixing members such as screws can pass through the circuit board installing holes 2023 to fix the circuit board 202 to the baseplate 10, or adhesives or thermal adhesives can be provided on forward and reverse surfaces of the circuit board 202 for fixing to the baseplate 10, thereby enhancing the connection strength between the circuit board 202 and the baseplate 10.

Figure 111D:
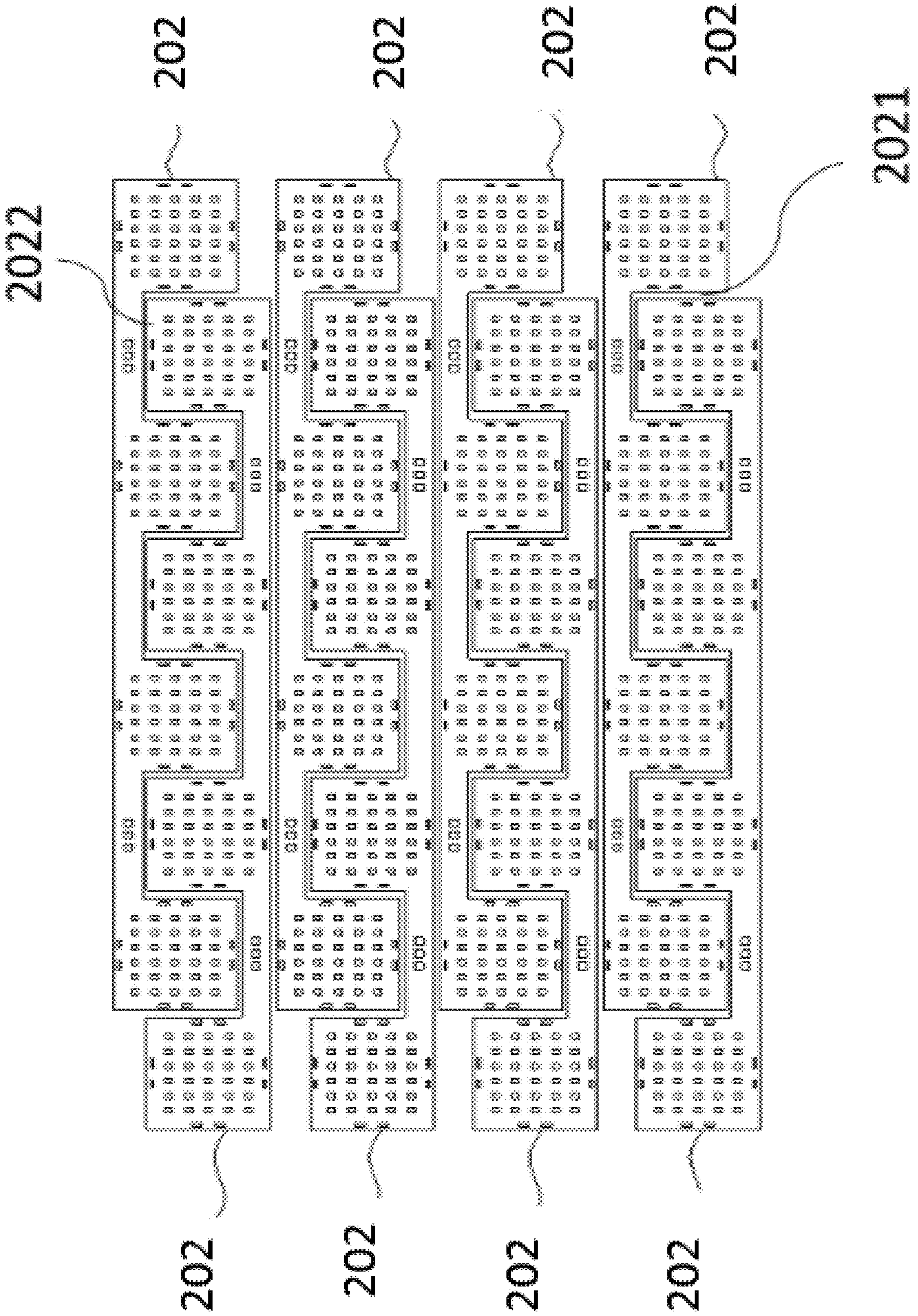
FIG. 111D is a schematic view of a plurality of light source components during cutting in the present invention.

Please refer to FIG. 111D, which is the schematic view of a plurality of circuit boards 202 during cutting in the present invention. The concave portions 2021 and the convex portions 2022 are staggered in the length directions of the circuit boards 202, so that the circuit board of the same area can be cut into more single circuit boards 202.

Figure 126:
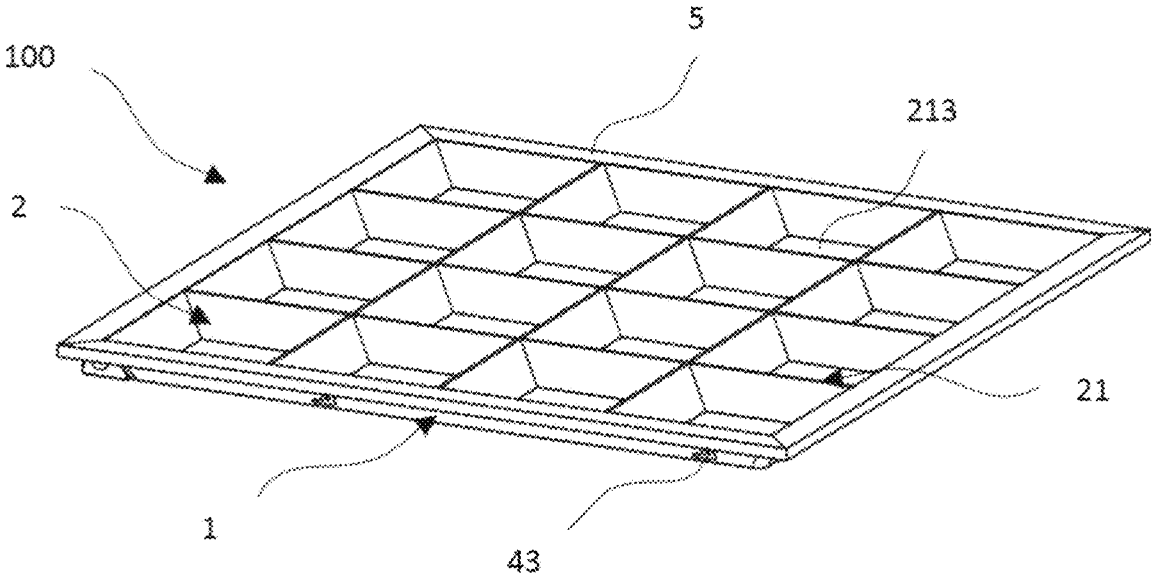
Figure 127:
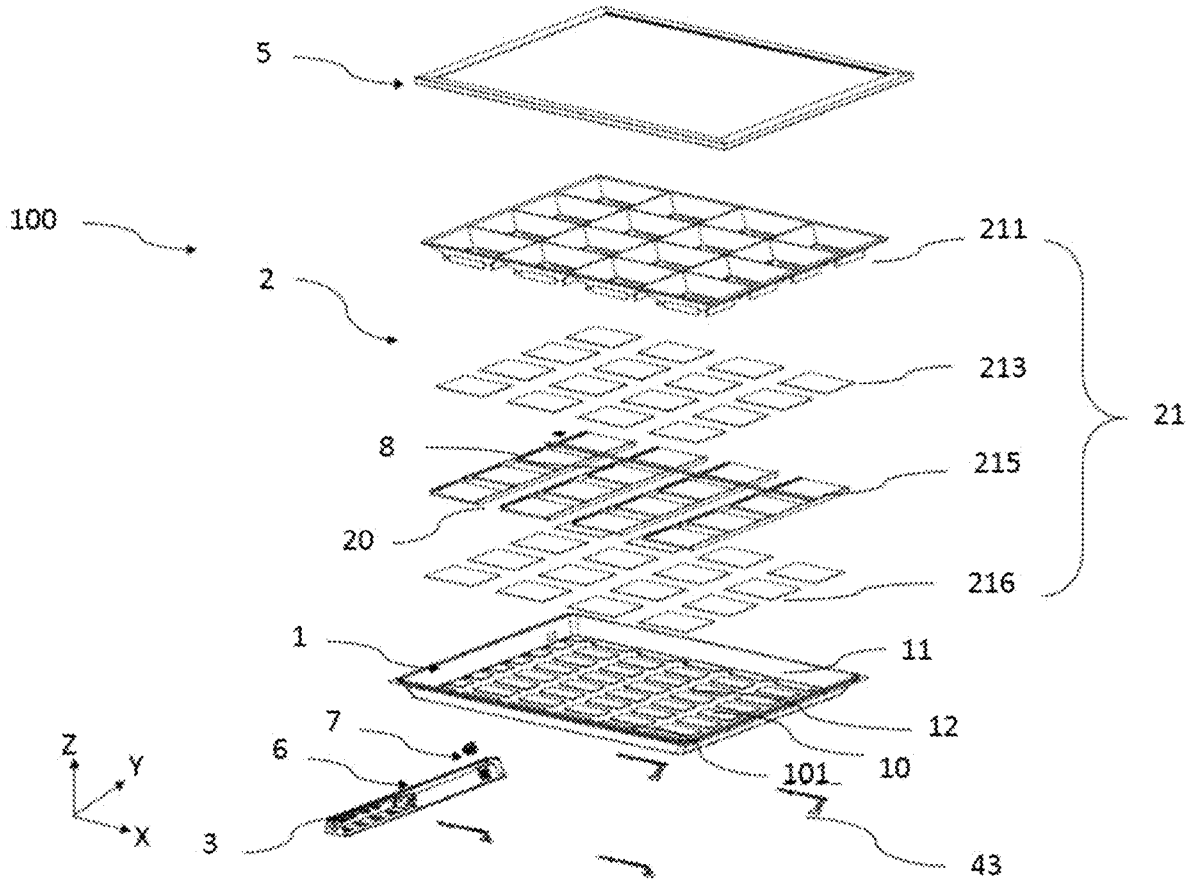
Figure 128:
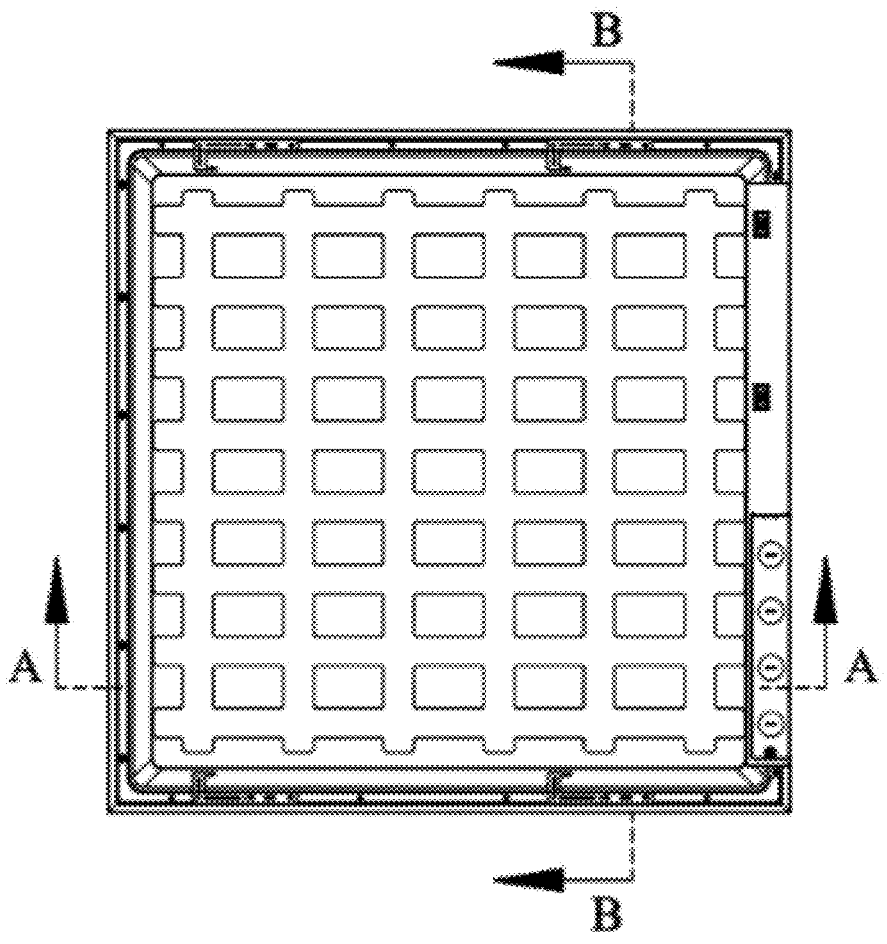

Please refer to FIG. 126 and FIG. 127. FIG. 126 is the schematic view of the LED lighting device 100 in an embodiment of the present invention, and FIG. 127 is the front exploded schematic view of the LED lighting device 100 in an embodiment of the present invention, or the exploded view in the light-emitting direction. As shown in the drawings, a rectangular coordinate system is established with the light-emitting direction of the LED lighting device 100 as the Z axis, and the exploded view of the LED lighting device 100 is taken in the positive direction of the Z axis. The LED lighting device 100 includes: the seat 1 disposed at the bottom (that is, the lowest position of the LED lighting lamp 100 at the Z axis) and the optical assembly 2, where the optical assembly 2 is disposed on the seat 1. The LED lighting device 100 further include support elements 51 connected to the seat 1 and fixed the optical assembly 2 to the seat 1, that is, the support elements 51 and the seat 1 clamp the optical assembly 2.

The embodiment is the same as the above embodiment in basic structure, and the difference lies in that this embodiment does not include an independent optical bearing portion 22. This embodiment includes a support portion 21126 (refer to FIG. 135) to achieve some or all of the functions of the optical bearing portion 22. Please refer to FIG. 127. The light reflecting paper 216 is disposed, the prism plate 214 is replaced with the light guide plate 215, and the light source components 20 are disposed on two sides of the light guide plate 215, so that light emitted by the light source components 20 enters from side edges of the light guide plate 215, such that the light-emitting effect of the LED lighting device 100 is improved, the illumination requirement in a particular occasion is met, and the visual effect is improved.

Please refer to FIG. 127. Specifically, the seat 1 includes the baseplate 10 substantially parallel to the horizontal plane or the XY plane and the sidewall 11, the sidewall 11 roughly extends in the Z-axis direction, that is, extends in the positive direction of the Z axis, the sidewall 11 and the baseplate 10 form the groove with an opening, that is, the baseplate 10 and the sidewall 11 form the receiving space 12, and at least part of the optical assembly 2 is received in the receiving space 12. Preferably, the sidewall 11 is inclined relative to the baseplate 10, and the sidewall 11 is inclined outwards, that is, the sidewall 11 is inclined in a direction away from the optical assembly 2. In other words, for the sidewalls 11 opposite to each other in pairs, the distance between the opposite sidewalls 11 is gradually increased in the light-emitting direction of the LED lighting device 100.

In order to facilitate description below, the light-emitting direction of the LED lighting device 100 is called the upper side, that is, the positive direction of the Z axis is the upper side. The baseplate 10 is substantially rectangular, for example, in a square or oblong shape, and can also be set in other shapes according to requirements. In the embodiment, the baseplate 10 is in the oblong shape, and the baseplate 10 has the length and width. The baseplate 10 is preferably made of a metal material, thereby ensuring the structural strength of the baseplate 10, and avoiding deformation during use. The baseplate 10 is more preferably made of a metal material with the good heat conductivity, which is beneficial to heat dissipation of the LED lighting device 100; meanwhile, the metal material has the high structural strength, thereby ensuring the operation stability of the LED lighting device 100, and prolonging the service life of the LED lighting device 100.

The baseplate 10 can also be made of a light-transmitting material, for example, a transparent material, a semi-transparent material or an opaque material. When part of the light needs to be emitted from the back of the LED lighting device 100, the baseplate 10 can be made of the transparent material or the semi-transparent material; and part of the light is emitted from the back of the LED lighting device 100, so that the shadow at the back of the LED lighting device 100 can be eliminated, and the overall lighting effect of the LED lighting device 100 can be improved. The baseplate 10 can be set to be totally transparent, or partially transparent, or at least partially transparent, or of course, completely opaque.

In some embodiments, the seat 1 can be made of a chromic material, such as an electrochromic material or a thermochromic material, and the light transmittance of the seat 1 can vary within 0-100%. That is, the baseplate 10 and the sidewall 11 of the seat 1 are made of the chromic materials, and the light transmittance of the baseplate 10 and the sidewall 11 of the seat 1 varies within 0-100%.

In some embodiments, the baseplate 10 and the sidewall 11 of the seat 1 are made of the chromic materials, and the light transmittance of at least one of the baseplate 10 and the sidewall 11 of the seat 1 varies within 0-100%.

The sidewall 11 can be disposed on the outer edge of the baseplate 10 or close to the outer edge of the baseplate 10. The sidewall 11 is disposed around the baseplate 10, thereby forming the sidewall 11 of the annular structure connected end to end; and the sidewall and the baseplate 10 form the receiving space 12. The sidewall 11 can enhance the overall structural strength of the seat 1, the sidewall 11 of the annular structure connected end to end can also prevent foreign matters such as dust and insects from entering the LED lighting device 100 from the sidewall 11. In some embodiments, the seat 1 can include multiple sections of sidewalls 11 arranged at intervals.

The sidewall 11 extends in the light-emitting direction of the LED lighting device 100 to form a certain height and forms the receiving space 12 with the baseplate 10. The height of the sidewall 11 defines the depth of the receiving space 12, and the optical assembly 2 is disposed in the receiving space 12. The height of the sidewall 11 can be determined according to requirements. In the embodiment, the thickness of the optical assembly 2 in the light-emitting direction of the LED lighting device 100 is less than or equal to the depth of the receiving space 12, that is, the thickness is less than or equal to the height of the sidewall 11 in the light-emitting direction of the LED lighting device 100, thereby controlling the height of the LED lighting device 100 and facilitating product assembling.

The sidewall 11 can be made of the light-transmitting material and the opaque material, for example, it is made of the transparent material, the semi-transparent material or the opaque material separately, or is made of at least two of the materials, which can be set according to actual requirements, thereby meeting lighting requirements in different occasions, for example, making the sidewall 11 completely transparent, or completely opaque, or partially transparent, or partially opaque (or at least partially transparent, or at least partially opaque, and the baseplate 10 can also be like this). The sidewall 11 is preferably made of a metal material, and the sidewall 11 is more preferably made of a metal material with the good heat conductivity, thereby ensuring the strength and heat dissipation effect of the sidewall 11.

The sidewall 11 and the baseplate 10 can be a split structure or an integrally formed structure. When the sidewall 11 and the baseplate 10 are split structures, the sidewall 11 and the baseplate 10 can be connected through glue coating, soldering, snap-fitting or screw locking. When the sidewall 11 and the baseplate 10 are of the integrally formed structure, the sidewall 11 and the baseplate 10 are preferably made of the same material, which is beneficial to production and manufacturing of the seat 1. The sidewall 11 and the baseplate 10 are of the integrally formed structure, so that the bonding force between the sidewall 11 and the baseplate 10 can be increased, the size precision of the seat 1 can also be improved, meanwhile, batch manufacturing is facilitated, and the production cost can be reduced. For example, the baseplate 10 and the sidewall 11 are integrally stamped and formed by the same material, such as the metal material, or the sidewall 11 and the baseplate 10 are formed by bending one metal surface.

Figure 129:
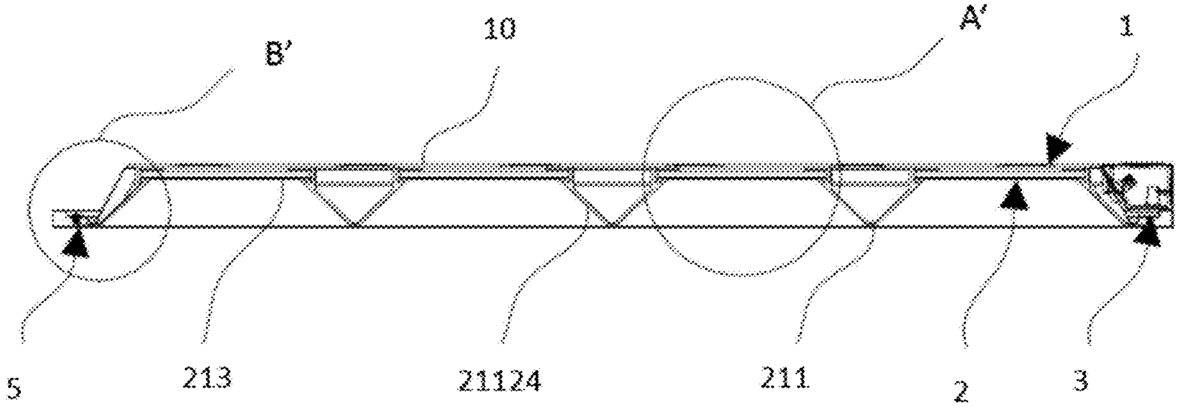
Figure 131:
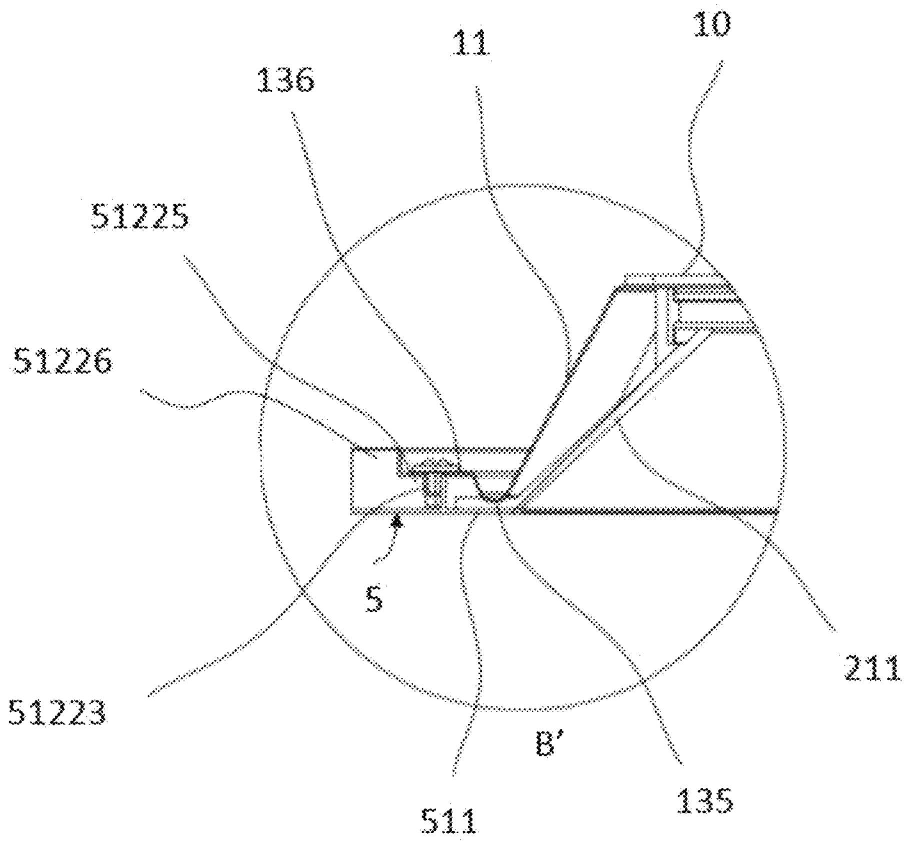

Please refer to FIG. 129 and FIG. 131. FIG. 131 is the partially enlarged view of part B' in FIG. 129. One end of the sidewall 11 away from the baseplate 10 can be provided with a limiting portion 135, the limiting portion 135 rises towards the light-emitting direction of the LED lighting device 100, and the limiting portion 135 is provided along the sidewall 11, thereby forming the limiting portion 135 of an annular structure connected end to end. The limiting portion 135 can enhance the overall structural strength of the seat 1, and when the support element 51 and the seat 1 clamp the optical assembly 2, the limiting portion 135 can abut against the optical assembly 2, so that the optical assembly 2 can be better fixed. Meanwhile, the limiting portion 135 can also have certain elasticity, so that it is suitable for clamping optical assemblies 2 with different thicknesses. That is, when the limiting portion 135 abuts against the optical assembly 2 with the large thickness, the deformation amount of the limiting portion 135 is increased, and the optical assembly 2 can be stably clamped; and when the limiting portion 135 abuts against the optical assembly 2 with the small thickness, the deformation amount of the limiting portion 135 is decreased, and the optical assembly 2 can also be stably clamped. In some embodiments, the seat 1 can include multiple sections of limiting portions 135 arranged at intervals.

Please refer to FIG. 129 and FIG. 131. One end of the limiting portion 135 away from the sidewall 11 can be provided with a bearing portion 136, the bearing portion 136 is substantially parallel to the baseplate 10, and the bearing portion 136 is provided along the limiting portion 135, thereby forming the bearing portion 136 of an annular structure connected end to end. When the support element 51 is connected to the seat 1, the support element 51 can be connected to the seat 1 through glue coating, soldering, snap-fitting or screw locking. In the embodiment, the bearing portion 136 is connected to the support element 51 by means of a screw. Preferably, the outer edge of the bearing portion 136 is retracted on the outer edge of the support element 51, that is, the outer edge of the bearing portion 136 is located on the inner side of the outer edge of the support element 51 and does not exceed the outer edge of the support element 51, so that from the front of the LED lighting device 100, the support element 51 can shield the outer edge of the seat 1, thereby improving the attractiveness of the LED lighting device 100. In some embodiments, the seat 1 can include multiple sections of limiting portions 135 arranged at intervals.

Please refer to FIG. 129 and FIG. 131. The support element 51 extends by a certain distance in a direction parallel to the baseplate 10. The portion of the support element 51 corresponding to the limiting portion 135 is first wall 511, and the first wall 511 and the limiting portion 135 jointly clamp the optical assembly 2. An outer side of the first wall 511 is provided with a step structure 5122, which includes the first step portion 51225 and the second step portion 51226, the first step portion 51225 abuts against the bearing portion 136, the second step portion 51226 surrounds the outer side of the bearing portion 136, the step structure 5122 can enhance the structural strength of the support element 51, and the first step portion 51225 surrounds the first wall 511, thereby forming the first step portion 51225 of an annular structure connected end to end. The first step portion 51225 can be provided with a locking groove 51223, the locking groove 51223 can be in a U shape, the side portion of the locking groove 51223 can be provided with a thread (not shown), and when the bearing portion 136 is connected to the support element 51 by a screw, the screw is matched with the thread on the side portion of the locking groove 51223, so that the seat 1 is connected more stably to the support element 51. The depth of the locking groove 51223 is preferably less than the length of the screw, the length of the screw is preferably less than the depth of the first step portion 51225, so that when the bearing portion 136 is connected to the support element 51 by the screw, the screw penetrates through the bottom of the locking groove 51223 and is not exposed out of the surface of the support element 51, the seat 1 and the support element 51 can be connected more stably further, and the attractiveness of the LED lighting device 100 can also be considered. In some embodiments, the support element 51 can include multiple sections of first step portions 51225 arranged at intervals.

Please refer to FIG. 129 and FIG. 131. The outer side of the first step portion 51225 can be provided with the second step portion 51226, the second step portion 51226 can further enhance the structural strength of the support element 51, and the second step portion 51226 surrounds the first step portion 51225, thereby forming the second step portion 51226 of the annular structure connected end to end. In some embodiments, the support element 51 can include multiple sections of second step portions 51226 arranged at intervals. The first step portion 51225 and the second step portion 51226 preferably protrude towards the baseplate 10, so that the side of the support element 51 facing the light-emitting direction of the LED lighting device 100 is a plane, and the entire LED lighting device 100 is more attractive.

Please refer to FIG. 127. The bottom groove 101 can be formed in the baseplate 10, the bottom groove 101 can be a reinforced rib, and the bottom groove 101 can be formed in the surface of the baseplate 10 facing the receiving space 12 or the surface of the baseplate 10 facing away from the receiving space 12. In the embodiment, the bottom grooves 101 are formed in two surfaces of the baseplate 10, and the bottom grooves 101 and the baseplate 10 are integrally formed through pressure casting, stretching and stamping. The bottom groove 101 protrudes or sinks relative to the baseplate 10 to form a three-dimensional structure, and the bottom groove 101 can further enhance the structural strength of the baseplate 10.

Please refer to FIG. 127. The seat 1 can be further provided with the hanging hooks 43, one or more hanging hooks 43 can be provided, and the hanging hooks 43 can be disposed in the middle of the seat 1 or the periphery of the seat 1. In the embodiment, four hanging hooks 43 are provided, and the hanging hooks 43 are disposed on the two opposite bearing portions 136 of the seat 1, that is, each bearing portion 136 is provided with two hanging hooks 43. The hanging hooks 43 and the seat 1 can be connected through glue coating, soldering, snap-fitting or screw locking. In an embodiment, the hanging hooks 43 are connected to the seat 1 by means of the screws, and meanwhile, the screws can also be connected to the locking grooves 51223 of the support elements 51, that is, the screws can connect the hanging hooks 43, the seat 1 and the support elements 51 at the same time, thereby reducing repeated connections and damage to the structure of the lamp body due to perforations in multiple places. Meanwhile, by connecting a plurality of parts at the same time, the use of fixing members such as the screws can be reduced, thereby reducing the production cost of the LED lighting device 100.

The optical assembly 2 is disposed in the receiving space 12, and the optical assembly 2 can include the light source component 20 and the optical member 21. The light source component 20 generate and emit light, the light of the light source component 20 pass through the optical member 21, and the optical member 21 process the light generated by the light source component 20, such as one of or a combination of light projection, light reflection, light diffusion, light refraction and light diffraction.

Figure 111E:
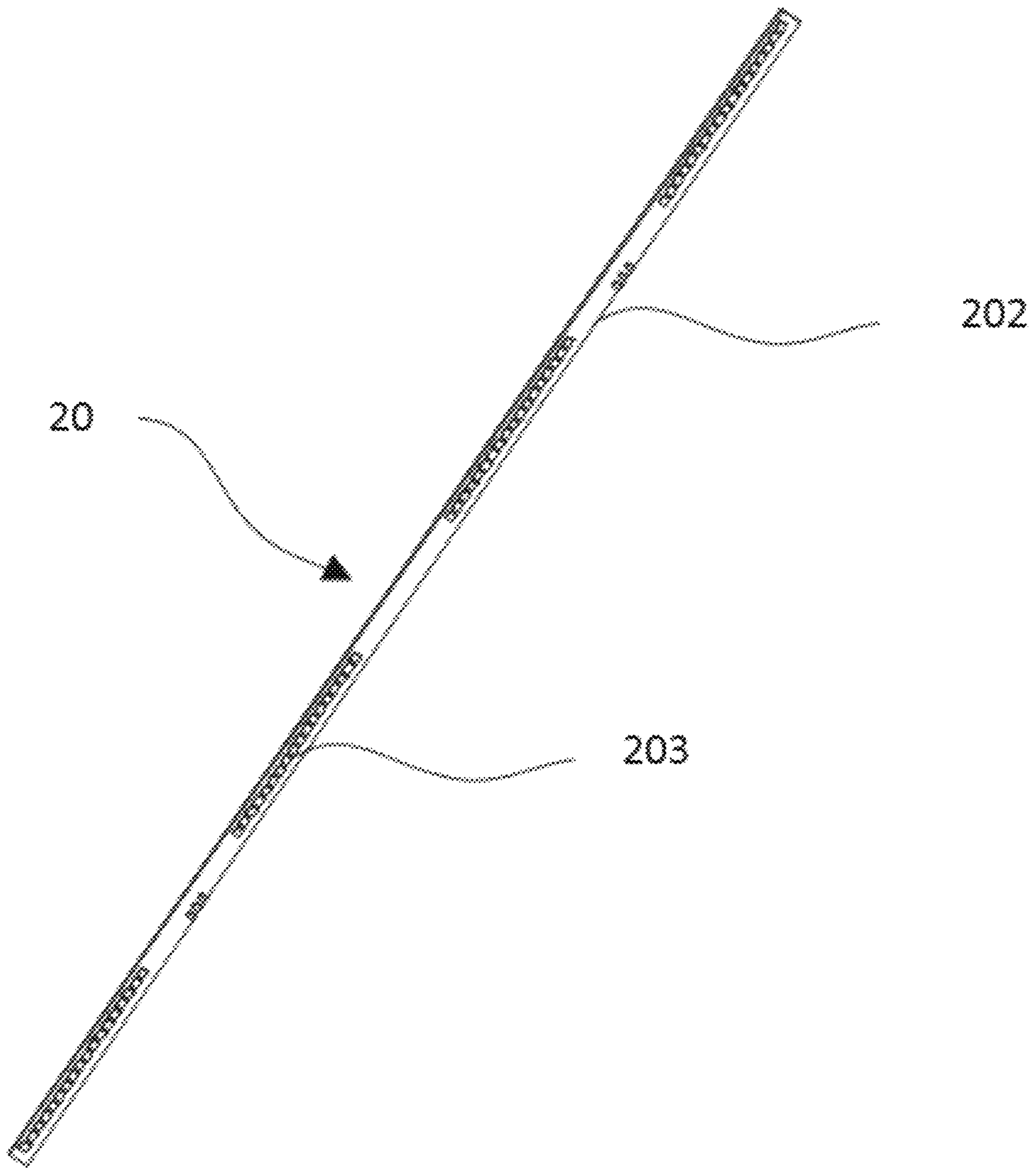
FIG. 111E is a schematic view of the light source component in an embodiment of the present invention.

Please refer to FIG. 127. The optical member 21 include optical units 211, directed diffusing films 213 and light guide plates 215, the directed diffusing films 213 and the light guide plates 215 are parallel to or substantially parallel to the baseplate 10, and the directed diffusing films 213 are disposed on a side of the light guide plates 215 away from the baseplate 10. The light source components 20 are disposed on two opposite sides of each light guide plate 215, that is, the light source components 20 are perpendicular to or substantially perpendicular to the baseplate 10, so that the light emitted by the light source components 20 is emitted from the two opposite sides of the light guide plate 215. Of course, the light source components 20 can also be disposed on a certain side, any two sides or any three sides of the light guide plate 215, or the light source components 20 can be disposed around the light guide plate 215. Each light source component 20 includes the circuit board 202 and the LED arrays 203 disposed on the circuit board 202. One or more circuit boards 202 can be provided, and the lengths of the circuit boards 202 can be the same or different, which are set according to actual requirements. The circuit boards 202 can be plates that can be used for circuit connection and achieve functions of the circuit boards, for example, FPC, PCB and aluminum substrates, but are not limited to such plates. In an embodiment, the circuit boards 202 can be disposed in the length direction or the width direction of the baseplate 10, or disposed in a cross manner in the length direction and the width direction of the baseplate 10, and the circuit boards 202 can be disposed substantially perpendicular to the baseplate 10, or form included angles with the baseplate 10. The LED lighting device 100 with different brightness and light-emitting effects can be obtained by adjusting the number and arrangement manner of the circuit boards 202. Each circuit board 202 is provided with at least one LED array 203, and the LED arrays 203 can be disposed on any one surface of the circuit board 202 or on two surfaces of the circuit board 202 at the same time. The LED array 203 can be an LED chip array or an array formed by other light-emitting devices. Please refer to FIG. 111E. The LED arrays 203 are preferably arranged in a straight line. In an embodiment, the LED arrays 203 can be other arrangement manners. The LED arrays 203 are preferably disposed in the middles or the substantially middle positions of the light guide plates 215 in the thickness direction.

The light generated by the light source component 20 first passes through the light guide plate 215, the light guide plate 215 refracts or reflects the light to guide the light go to the directed diffusing film 213, and then the light passes through the directed diffusing film 213. The directed diffusing film 213 diffuses the light in a predetermined direction, that is, it performs directed light diffusion to achieve the different light-emitting effect, and finally, the light is emitted by the optical unit 211. By means of such design, the original light-emitting direction perpendicular to the baseplate 10 can be changed to be parallel to the baseplate 10 and then perpendicular to the baseplate 10, that is, changing the light path in the LED lighting device 100, so that the advancing distance of the light in the device 100 can be increased without changing the thickness of the device 100, and the granular feeling of the emitted light of the LED lighting device and the glare can be reduced. In the traditional design, the distance is perpendicular to the baseplate 10, which significantly affect the thickness of the LED lighting device. In the present invention, the light emitted by the LED array 203 first enters the light guide plate 215 in a direction parallel to the baseplate 10, and then exits from the light guide plate 215 in a direction perpendicular to and away from the baseplate 10 to reach the optical unit 211, and at least part of the light path is parallel to the baseplate 10, thereby reducing the thickness of the LED lighting device 100.

The light guide plate 215 can receive the light on the incident surface of the light and transmit the light to the emitting surface, thereby achieving transmission and guide of the light, that is, the light guide plate 215 can guide the light from one position to another position to effectively transmit and utilize the light. The light guide plate 215 can convert the light distributed non-uniformly into the light distributed uniformly, by means of the internal optical structure, the light guide plate 215 can reflect and refract the light repeatedly in the transmission process, thereby uniforming the original non-uniform light. The light guide plate 215 can diffuse the light from a point light source to form the wider lighting range. The structure, distribution and function of the directed diffusing films 213 are the same as or similar to those in the above embodiment, and are not repeated here.

Please refer to FIG. 127. The optical member 21 can further include light reflecting paper 216, and the light reflecting paper 216 is disposed between the light guide plate 215 and the baseplate 10, that is, the light reflecting paper 216 is disposed on one side of the light guide plate 215 close to the baseplate 10. When part of the light emitted by the light source component 20 is reflected or refracted by the light guide plate 215 to the light reflecting paper 216, the light reflecting paper 216 can reflect this part of light back to the light guide plate 215, so that the light is finally emitted by the optical unit 211, the loss of the light of the light source component 20 is avoided, and the light-emitting efficiency of the LED lighting device 100 is improved.

Preferably, a plurality of directed diffusing films 213, a plurality of light guide plates 215 and a plurality of light reflecting paper 216 are provided and correspond to one another on a one-to-one basis, and one LED array 203 is disposed on each of the two opposite sides of each light guide plate 215. Compared with the full large-area directed diffusing film 213, light guide plate 215 and light reflecting paper 216, the plurality of independent small-area directed diffusing films 213, light guide plates 215 and light reflecting paper 216 are cheaper, so that the production cost can be reduced. Meanwhile, the diffusing directions of the directed diffusing films 213 can be set or changed conveniently, the directed diffusing films 213, the light guide plates 215 and the light reflecting paper 216 can also be replaced conveniently, and the maintenance cost of the LED lighting device 100 is reduced.

The light source component 20 can be directly or indirectly disposed on the seat 1 or the optical member 21, for example, fixed to the seat 1 or the optical member 21 through glue coating, soldering, snap-fitting or screw locking. In the embodiment, the light source component 20 is fixed to the optical member 21 through snap-fitting.

Figure 132:
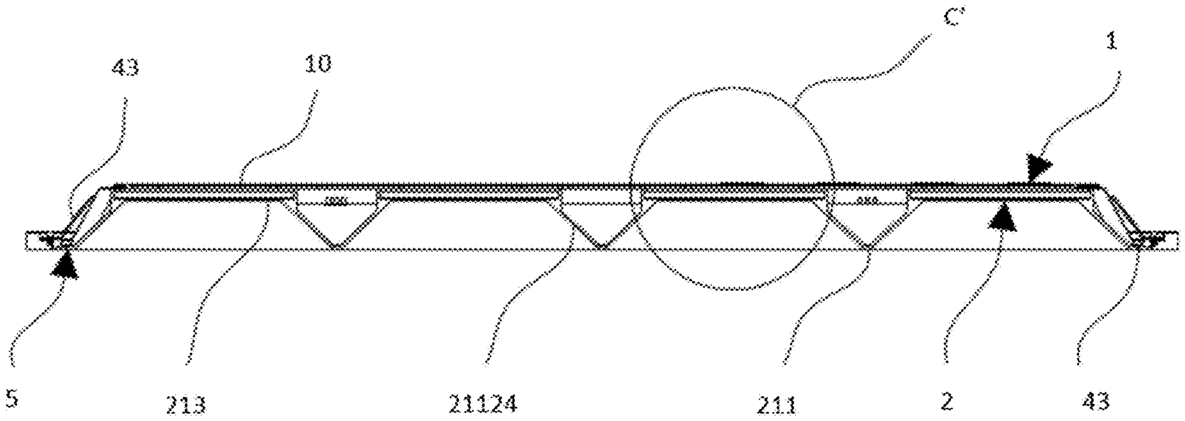
Figure 133:
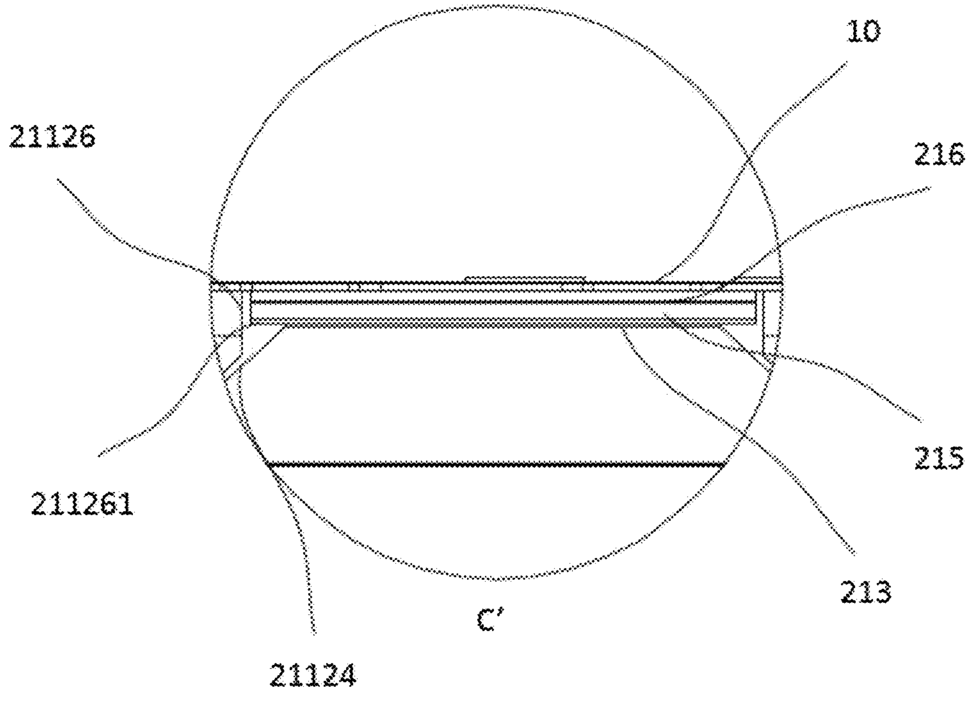
Figure 134:
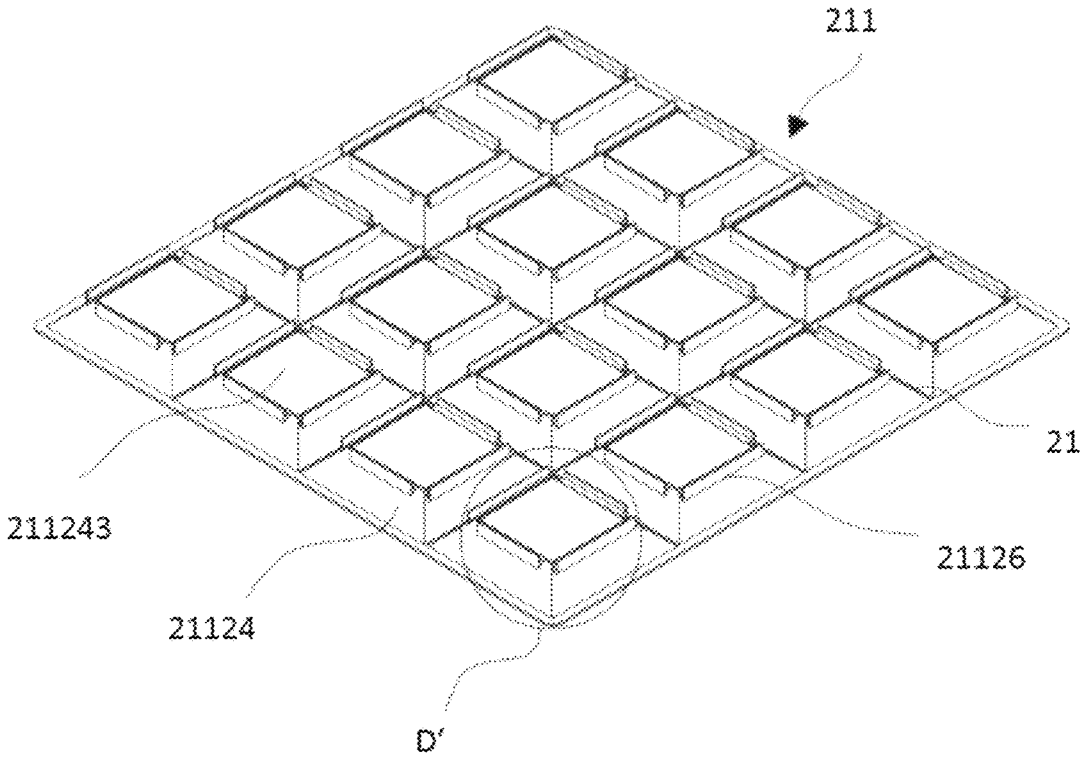
Figure 135:
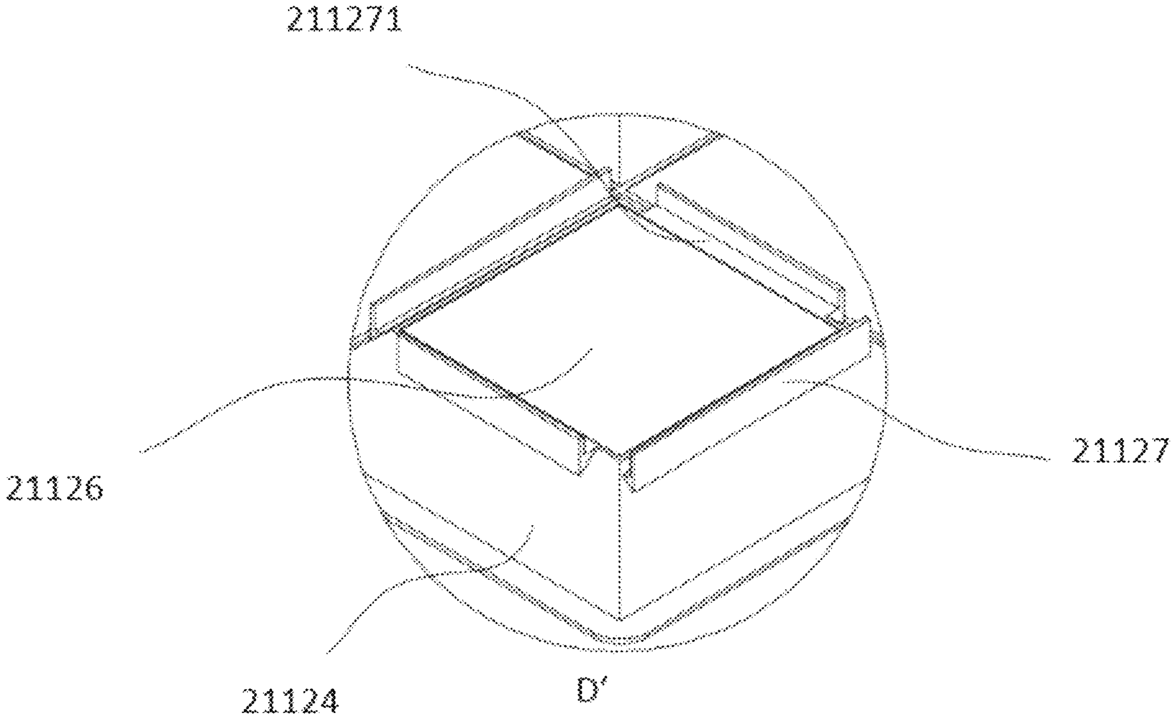

Please refer to FIG. 134 and FIG. 135. FIG. 135 is the partially enlarged view of part D' in FIG. 134. Specifically, the optical unit 211 includes optical members 21, and a plurality of optical members 21 are provided and correspond to the light guide plates 215 in number. The optical members 21 are inverted polygonal frustum structures, or light reflecting cup structures. In the embodiment, the polygonal frustum structures are quadrangular platforms. Please refer to FIG. 134. The polygonal frustum surfaces of the optical members 21 are provided with light-emitting holes 211243, that is, through holes penetrating through the polygonal frustum surfaces of the optical members 21. In the embodiment, each optical member 21 includes optical wall 21124 surrounding the light-emitting hole 211243 and connected end to end, one end of the optical member 21 with a small opening faces the baseplate 10 and is provided with the support portions 21126, that is, one side of the optical member 21 close to the baseplate 10 is provided with the support portions 21126. The support portions 21126 extend in the direction close to the baseplate 10, and the support portions 21126 are preferably integrally formed with the optical member 21. The support portions 21126 are preferably provided in pair, and are respectively disposed on the two opposite sides of each optical member 21, that is, each edge of the light-emitting holes 211243 is provided with one support portion 21126, the optical member 21 can be provided with two or four support portions 21126. In an embodiment, each optical member 21 is provided with four support portions 21126, and the four support portions 21126 are spaced apart from one another, that is, the four support portions 21126 are independent of one another. Please refer to FIG. 128 to FIG. 133. FIG. 133 is the partially enlarged view of part C' in FIG. 132. The support portions 21126 have certain elasticity, and the two corresponding support portions 21126 are in interference fit with the directed diffusing film 213, the light guide plate 215, the light reflecting paper 216 and the circuit board 202, that is, the two corresponding support portions 21126 have a clamping force on the directed diffusing film 213, the light guide plate 215, the light reflecting paper 216 and the circuit board 202. The directed diffusing films 213, the light guide plates 215, the light reflecting paper 216 and part of the circuit boards 202 can be clamped by the support portions 21126, so that installing and removal of the directed diffusing films 213, the light guide plates 215, the light reflecting paper 216 and part of the circuit boards 202 are facilitated, and shaking of the directed diffusing films 213, the light guide plates 215, the light reflecting paper 216 and the circuit boards 202 during use can also be prevented. In some embodiments, each side of the optical member 21 can also be provided with multiple sections of support portions 21126 arranged at intervals.

Figure 130:
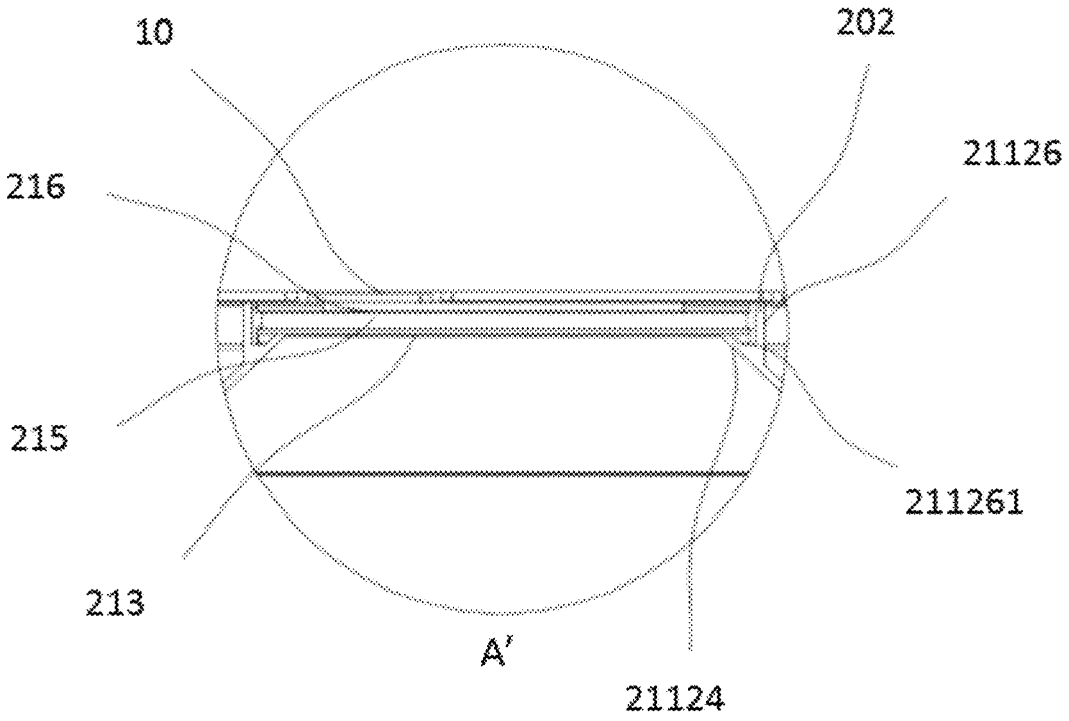

Preferably, please refer to FIG. 129, FIG. 130, FIG. 132 and FIG. 133. FIG. 130 is the partially enlarged view of part A' in FIG. 129. The support portions 21126 are disposed on the outer side of the optical wall 21124, that is, the support portions 21126 are disposed on the side of the optical wall 21124 facing the seat 1, and in other words, the support portions 21126 are disposed on the non-light-emitting surface of the optical member 21. Connecting portions 211261 are formed between the support portions 21126 and the optical walls 21124, the connecting portions 211261 can be flush with the ends of the optical walls 21124 close to the baseplate 10, or the connecting portions 211261 and the ends of the optical walls 21124 close to the baseplate 10 may not be located on the same horizontal plane. Please refer to FIG. 129 and FIG. 130. In the embodiment, each connecting portion 211261 provided with the circuit board 202 is lower than the end of the optical wall 21124 close to the baseplate 10, that is, the support portion 21126, the connecting portion 211261 and the portion of the optical wall 21124 close to the baseplate 10 form a groove, which is used for receiving the circuit board 202. Please refer to FIG. 132 and FIG. 133. Each connecting portion 211261 which is not provided with the circuit board 202 is flush with the end of the optical wall 21124 close to the baseplate 10. Please refer to FIG. 129 and FIG. 130. When the optical assembly 2 is installed on the seat 1, the side of the connecting portion 211261 provided with the circuit board 202 abuts against the circuit board 202, the end of the optical wall 21124 close to the baseplate 10 abuts against the directed diffusing film 213, and at least part of the end of the support portion 21126 close to the baseplate 10 abuts against the baseplate 10. Please refer to FIG. 127, FIG. 132 and FIG. 133. The side of the connecting portion 211261 which is not provided with the circuit board 202 and the end of the optical wall 21124 close to the baseplate 10 jointly abut against the circuit board 202 in a perpendicular manner, that is, said parts are inserted into the gap between the adjacent light guide plates 215 and are parallel to the edges of the light guide plates 215 which are not provided with the circuit boards 202, and at least part of the end of the support portion 21126 close to the baseplate 10 abuts against the baseplate 10. That is, the support portion 21126, the optical wall 21124, the connecting portion 211261 and the baseplate 10 jointly clamp the directed diffusing film 213, the light guide plate 215, the light reflecting paper 216 and the circuit board 202, so that a restriction is formed by solid structures of components, and the positions of the directed diffusing film 213, the light guide plate 215, the light reflecting paper 216 and the circuit board 202 can be more stable.

Preferably, the side of the circuit board 202 close to the baseplate 10 is flush with the end of the support portion 21126 close to the baseplate 10, so that two ends of the circuit board 202 respectively abut against the connecting portion 211261 and the baseplate 10, and the position of the circuit board 202 is more stable. Meanwhile, the support portion 21126 is in contact with the baseplate 10, so that the optical member 21 is spaced apart from the baseplate 10 by a certain distance, the light reflecting paper 216, the light guide plate 215 and the directed diffusing film 213 can also be spaced apart from the baseplate 10 by a certain distance, the optical properties of the light reflecting paper 216, the light guide plate 215 and the directed diffusing film 213 are ensured, and damage to the light reflecting paper 216, the light guide plate 215 and the directed diffusing film 213 due to deformation of the baseplate 10 can also be avoided.

Referring to FIG. 122B, which is the schematic view of one kind of distribution of directed diffusing films 213 of the LED lighting device 100 in an embodiment of the present invention. In combination with FIG. 122A, in an embodiment, the LED lighting device 100 is provided with sixteen directed diffusing films 213 which are distributed in a 4*4 manner, and the light diffusing direction of the emitted light by each directed diffusing film 213 faces the same direction relative to the LED lighting device 100, as shown by the arrow in FIG. 122B.

As shown in FIG. 122B, a mutually perpendicular X-Y rectangular coordinate system is established by the length and width of the LED lighting device 100. From the front of the LED lighting device 100, each optical unit 211 includes sixteen optical members 21, four optical members 21 are arranged in a row in the X direction, and four optical members 21 are arranged in a column in the Y direction; and as shown in FIG. 122B, one circuit board 202 is disposed on each of two sides of each column of optical members 21, each circuit board 202 is provided with four LED arrays 203, each optical member 21 is correspondingly provided with one directed diffusing film 213, that is, sixteen directed diffusing films 213 are provided, four directed diffusing films 213 are arranged in a row in the X direction, and four directed diffusing films 213 are arranged in a column in the Y direction. Each directed diffusing film 213 has two diffusing directions, and the two diffusing directions respectively toward the positive direction and the negative direction of the X axis. As shown in FIG. 122B, in one LED lighting device 100, the diffusing directions of the directed diffusing films 213 are set to be the same, that is, the diffusing directions of the directed diffusing films 213 are along the positive direction and the negative direction of the X axis, namely, the diffusing directions are along two opposite outer borders of the LED lighting device 100, and more specifically, the diffusing directions are along the two borders in the positive and negative directions of the X-axis direction, so that the light intensity/luminous flux of the finally emitted light of the LED lighting device 100 in the positive and negative directions of the X axis is obviously greater than that in the positive and negative directions of the Y axis, that is, in view of the coordinate system where XY is located, by taking the center of the LED lighting device 100 as an origin and the circle center, on the circumference with the same radius, the light intensity of the point close to the positive and negative directions of the X axis is obviously greater than the light intensity/luminous flux close to the positive and negative directions of the Y axis, that is, the light intensity/luminous flux distribution is such that by taking a light source as the center, under the condition of equal distances from the light source, the light intensity/luminous flux on the two sides (close to the X-axis direction) is obviously greater than that in the middle (close to the Y-axis direction), thereby forming the bat wing light pattern diffused towards the two sides, that is, the optical diffusing directions are diffusing directions towards the two sides in the X direction, and by taking the light source (the center of the lamp) as the center (the circle center), the light is concentrated towards the two sides. Please refer to FIG. 136, which is the light pattern of the LED lighting device 100 after light emitting in an embodiment of the present invention. The diffusing directions of the directed diffusing films 213 are set as per FIG. 122B, so that the light pattern of the LED lighting device 100 after light emitting is a bat wing light pattern, the light-emitting effect of the LED lighting device 100 is improved, the illumination requirement in the particular occasion is met, and the visual effect is improved.

In some embodiments, the diffusing directions of the adjacent directed diffusing films 213 in each row can cross each other (not limited to be perpendicular to each other), and the diffusing directions of the adjacent directed diffusing films 213 in each column can be parallel to each other.

In an embodiment, the light source component 20 can be directly or indirectly disposed on the baseplate 10, for example, fixed to the baseplate 10 through glue coating, soldering, snap-fitting or screw locking. One or more circuit boards 202 can be provided, and the lengths of the circuit boards 202 can be the same or different, according to requirements. The circuit boards 202 can be plates that can be used for circuit connection and achieve functions of the circuit boards, for example, FPC, PCB and aluminum substrates, but are not limited to such plates. The circuit boards 202 can be disposed in the length direction or the width direction of the baseplate 10, or disposed in a cross manner in the length direction and the width direction of the baseplate 10, and the circuit boards 202 can be disposed substantially parallel to the baseplate 10, or form included angles with the baseplate 10. The LED lighting device 100 with different brightness and light-emitting effects can be obtained by adjusting the number and arrangement manner of the circuit boards 202. Each circuit board 202 is provided with at least one LED array 203, and the LED arrays 203 can be disposed on any one surface of the circuit board 202 or on two surfaces of the circuit board 202 at the same time. The LED array 203 can be an LED chip array or an array formed by other light-emitting devices.

Please refer to FIG. 127. The LED lighting device 100 further includes a power source 3 and a power cord box 6, and the installing positions of the power source 3 and the power cord box 6 are the same as or similar to those in the above embodiments. The LED lighting device 100 further includes a wiring terminal 7 and a connecting board 8, where the connecting board 8 is used for electrically connecting the plurality of circuit boards 202, and the connecting board 8 is electrically connected to the power source 3 by the wiring terminal 7, so that connecting leads between the circuit boards 202 and the power source 3 can be reduced, and installing and removal between the connecting plate 8 and the power source 3 can be facilitated.

Please refer to FIG. 137 and FIG. 138. FIG. 137 is the schematic view of the LED lighting device 100 in an embodiment of the present invention, and FIG. 138 is the front exploded schematic view of the LED lighting device 100 in an embodiment of the present invention, or the exploded view in the light-emitting direction. As shown in FIG. 138, a rectangular coordinate system is established with the light-emitting direction of the LED lighting device 100 as the Z axis, and the exploded view of the LED lighting device 100 is taken in the positive direction of the Z axis. The LED lighting device 100 includes: the seat 1 disposed at the bottom (that is, the lowest position of the LED lighting device 100 at the Z axis) and the optical assembly 2, where the optical assembly 2 is disposed on the seat 1. The embodiment is the same as the above embodiment in basic structure, and the main difference lies in that, this embodiment does not include the independent optical bearing portion 22 and the support elements 51, and the optical member 21 is provided with the support portion 21126 (refer to FIG. 151, which is the partially enlarged view of part J' in FIG. 145) to achieve some or all of the functions of the optical bearing portion 22. Please refer to FIG. 138, this embodiment does not include the prism plate 214, the light guide plate 215 and the light reflecting paper 216, the directed diffusing film 213 is replaced by the diffusing member 217, the diffusing member 217 can more effectively diffuse the light, the light in the middle is reduced, and the bat wing light pattern is formed, so that the light-emitting effect of the LED lighting device 100 is improved, the illumination requirement in a particular occasion is met, and the visual effect is improved.

Please refer to FIG. 138. The seat 1 includes the baseplate 10 substantially parallel to the horizontal plane or the XY plane and the sidewall 11, the sidewall 11 roughly extends in the Z-axis direction, that is, extends in the positive direction of the Z axis, the sidewall 11 and the baseplate 10 form the groove with an opening, that is, the baseplate 10 and the sidewall 11 form the receiving space 12, and at least part of the optical assembly 2 is received in the receiving space 12. Preferably, the sidewall 11 is inclined relative to the baseplate 10, and the sidewall 11 is inclined outwards, that is, the sidewall 11 is inclined in a direction away from the optical assembly 2. In other words, the sidewall 11 is inclined outwards to form the seat 1 with the large opening and small bottom.

In order to facilitate description below, the light-emitting direction of the LED lighting device 100 is called the upper side, that is, the positive direction of the Z axis is the upper side. The baseplate 10 is substantially rectangular, for example, in a square or oblong shape, and can also be set in other shapes according to requirements. In the embodiment, the baseplate 10 is in the oblong shape, and the baseplate 10 has a length and a width. In the embodiment, the length and width of the baseplate 10 are equal or substantially equal, that is, the baseplate 10 is substantially in the square shape. The baseplate 10 is preferably made of a metal material, thereby ensuring the structural strength of the baseplate 10, and avoiding deformation during use. The baseplate 10 is more preferably made of a metal material with the good heat conductivity, which is beneficial to heat dissipation of the LED lighting device 100; meanwhile, the metal material has the high structural strength, thereby ensuring the operation stability of the LED lighting device 100, and prolonging the service life of the LED lighting device 100.

The baseplate 10 can also be made of a light-transmitting material, for example, a transparent material, a semi-transparent material or an opaque material. When part of the light needs to be emitted from the back of the LED lighting device 100, the baseplate 10 can be made of the transparent material or the semi-transparent material; and part of the light is emitted from the back of the LED lighting device 100, so that the shadow at the back of the LED lighting device 100 can be eliminated, and the overall lighting effect of the LED lighting device 100 can be improved. The baseplate 10 can be set to be totally transparent, or partially transparent, or at least partially transparent, or of course, completely opaque.

Please refer to FIG. 138. The bottom groove 101 is formed in the baseplate 10, the bottom groove 101 can be a reinforced rib, and the bottom groove 101 can be formed in the surface of the baseplate 10 facing the receiving space 12 or the surface of the baseplate 10 facing away from the receiving space 12. In the embodiment, the bottom grooves 101 are formed in both two surfaces of the baseplate 10, and the bottom grooves 101 and the baseplate 10 are integrally formed through pressure casting, stretching and stamping. The bottom groove 101 protrudes or sinks relative to the baseplate 10 to form a three-dimensional structure, and the bottom groove 101 can further enhance the structural strength of the baseplate 10.

The sidewall 11 is disposed on the outer edge of the baseplate 10 or close to the outer edge of the baseplate 10. The sidewall 11 is disposed around the baseplate 10, thereby forming the sidewall 11 of the annular structure connected end to end; and the sidewall and the baseplate 10 form the receiving space 12. The sidewall 11 can enhance the overall structural strength of the seat 1, the sidewall 11 of the annular structure connected end to end can also prevent foreign matters such as dust and insects from entering the LED lighting device 100 from the sidewall 11. In some embodiments, the seat 1 include multiple sections of sidewalls 11 arranged at intervals.

The sidewall 11 extends in the light-emitting direction of the LED lighting device 100 to form a certain height and forms the receiving space 12 with the baseplate 10, the height of the sidewall 11 defines the depth of the receiving space 12, and the optical assembly 2 is disposed in the receiving space 12. The height of the sidewall 11 is determined according to requirements. In an embodiment, the thickness of the optical assembly 2 in the light-emitting direction of the LED lighting device 100 is less than or equal to the depth of the receiving space 12, that is, the thickness is less than or equal to the height of the sidewall 11 in the light-emitting direction of the LED lighting device 100, thereby controlling the height of the LED lighting device 100 and facilitating product assembling.

The sidewall 11 is made of the light-transmitting material and the opaque material, for example, it is made of the transparent material, the semi-transparent material or the opaque material separately, or is made of at least two of the materials, which can be set according to actual requirements, thereby meeting lighting requirements in different occasions, for example, making the sidewall 11 completely transparent, or completely opaque, or partially transparent, or partially opaque (or at least partially transparent, or at least partially opaque, and the baseplate 10 can also be like this). The sidewall 11 is preferably made of a metal material, and the sidewall 11 is more preferably made of a metal material with the good heat conductivity, thereby ensuring the strength and heat dissipation effect of the sidewall 11 at the same time. In the embodiment, the sidewall 11 and the baseplate 10 are preferably made of the same material.

The sidewall 11 and the baseplate 10 are split structures or an integrally formed structure. When the sidewall 11 and the baseplate 10 are split structures, the sidewall 11 and the baseplate 10 can be connected through glue coating, soldering, snap-fitting or screw locking. When the sidewall 11 and the baseplate 10 are integrally formed structure, the sidewall 11 and the baseplate 10 are preferably made of the same material, which is beneficial to production and manufacturing of the seat 1. The sidewall 11 and the baseplate 10 are of the integrally formed structure, so that the bonding force between the sidewall 11 and the baseplate 10 is increased, the size precision of the seat 1 is improved, meanwhile, batch manufacturing is facilitated, and the production cost is reduced. For example, the baseplate 10 and the sidewall 11 are integrally stamped and formed by means of the same material, such as the metal material, or the sidewall 11 and the baseplate 10 are formed by bending one metal surface.

Referring to FIG. 149A and FIG. 149B. FIG. 149B is the enlarged view of part I' in FIG. 149. One end of the sidewall 11 away from the baseplate 10 is provided with an install end wall 13, the install end wall 13 is provided with the first installing portion 138 and the second installing portion 139, the first installing portion 138 is substantially parallel to the baseplate 10, the second installing portion 139 is substantially perpendicular to the baseplate 10, and the second installing portion 139 is bent towards the baseplate 10, that is, the second installing portion 139 extends towards the baseplate 10. The first installing portion 138 and the second installing portion 139 are integrally formed on the sidewall 11, or are formed by bending the end of the sidewall 11 away from the baseplate 10.

Referring to FIG. 149A, FIG. 138, FIG. 140 and FIG. 141. FIG. 140 is the sectional schematic view along C-C in FIG. 139, and FIG. 141 is the partially enlarged view at part E' in FIG. 140. In the embodiment, the first installing portion 138 can surround the sidewall 11, thereby forming the first installing portion 138 of the annular structure connected end to end; the first installing portion 138 can enhance the overall structural strength of the seat 1, and the optical assembly 2 can also be connected to the first installing portion 138 through glue coating, soldering, snap-fitting or screw locking, thereby enhancing the stability of the position of the optical assembly 2.

Please refer to FIG. 149A. The second installing portion 139 also surrounds the sidewall 11, the first installing portion 138 of the annular structure connected end to end can be formed, and the second installing portion 139 located at a corner of the seat 1 can be cut off, thereby preventing winkling of the second installing portion 139 located at the corner of the seat 1, and improving the overall flatness of the second installing portion 139; and the second installing portion 139 can also enhance the overall structural strength of the seat 1.

Please refer to FIG. 138 and FIG. 149A. Corner protectors 44 are disposed at corners of the seat 1, the entire corner protectors 44 are in L shapes, and the four corner protectors 44 are provided and respectively disposed at the four corners of the seat 1 through glue coating, soldering, snap-fitting or screw locking. The corner protectors 44 can enhance the structural strength of the corners of the seat 1, thereby avoiding the risk of deformation of the seat 1 due to cutting the second installing portion 139 at the corner of the seat 1.

Please refer to FIG. 138, FIG. 139 and FIG. 148. The seat 1 is further provided with the hanging hooks 43, one or more hanging hooks 43 are provided, and the hanging hooks 43 are disposed in the middle of the seat 1 or the periphery of the seat 1. In the embodiment, four hanging hooks 43 are provided, and the hanging hooks 43 are disposed on the corner protectors 44, that is, each corner protector 44 is provided with one hanging hook 43. In addition, the hanging hooks 43 are respectively disposed on two opposite length edges of the seat 1, that is, each length edge of the seat 1 is provided with two hanging hooks 43. In an embodiment, the hanging hooks 43 are respectively disposed on two opposite width edges of the seat 1, that is, each width edge of the seat 1 is provided with two hanging hooks 43. The hanging hooks 43 and the corner protectors 44 can be connected through glue coating, soldering, snap-fitting or screw locking. In the embodiment, the hanging hooks 43 are connected to the corner protectors 44 by means of screws.

Referring to FIG. 149A and FIG. 149B. The first installing portion 138 includes one or more installing portions parallel to the baseplate 10. In the embodiment, the first installing portion 138 includes a first horizontal installing portion 1381 and a second horizontal installing portion 1382, the first horizontal installing portion 1381 is close to the sidewall 11 and is connected to the sidewall 11, the second horizontal installing portion 1382 is close to the second installing portion 139 and is connected to the second installing portion 139, and the first horizontal installing portion 1381 and the second horizontal installing portion 1382 are located on the same horizontal plane or the same XY plane. In an embodiment, the first horizontal installing portion 1381 and the second horizontal installing portion 1382 are located on different horizontal planes or different XY planes. In the embodiment, the first horizontal installing portion 1381 and the second horizontal installing portion 1382 are integrally formed, and the first horizontal installing portion 1381 and the second horizontal installing portion 1382 can be formed by bending. The first horizontal installing portion 1381 and the second horizontal installing portion 1382 are located on the different horizontal planes or the different XY planes, and in a positive direction of the Z axis, the first horizontal installing portion 1381 is higher than the second horizontal installing portion 1382, that is, in the positive direction of the Z axis, the first horizontal installing portion 1381 is closer to the baseplate 10, thereby enhancing the structural strength of the first installing portion 138, and further enhancing the overall structural strength of the seat 1.

Please refer to FIG. 148, FIG. 149A and FIG. 149B. The first horizontal installing portion 1381 is provided with a plurality of through holes 137, and the through holes 137 have different functions, for example, the through holes may serve as assembly holes or positioning holes. In an embodiment, the through holes 137 include at least one assembly hole 1371 and at least one first positioning hole 1372, the assembly hole 1371 is round or square, the first positioning hole 1372 is also round or square, and a plurality of assembly holes 1371 and a plurality of first positioning holes 1372 are formed. In the embodiment, the corner protectors 44 are disposed on the sides of the first horizontal installing portion 1381 and the second horizontal installing portion 1382 facing the baseplate 10, and some of the surfaces of the corner protectors 44 abut against or are snap-fitted with part of the sidewall 11, the first horizontal installing portion 1381 and the second horizontal installing portion 1382. The assembly holes 1371 are close to corner of the first horizontal installing portion 1381, that is, the assembly holes 1371 are close to the corners of the seat 1. In addition, the assembly holes 1371 correspond to the corner protectors 44, and the corner protectors 44 is connected to the assembly holes 1371 by means of screws, thereby connecting the corner protectors 44 to the seat 1. Of course, the hanging hooks 43, the corner protectors 44 and the seat 1 can be connected and fixed by means of the screws at the same time. The first positioning holes 1372 is formed close to the middles of the edges of the seat 1, each edge of the seat 1 is provided with one or more first positioning holes 1372, and when the plurality of first positioning holes 1372 are formed, the plurality of first positioning holes 1372 are uniformly distributed.

Please refer to FIG. 138. The optical assembly 2 is disposed in the receiving space 12, the optical assembly 2 includes the light source components 20 and the optical member 21. The light source components 20 is disposed on the baseplate 10 of the seat 1, and the optical member 21 is disposed on a side of the light source components 20 away from the seat 1, that is, the optical member 21 covers the light source components 20. The light source components 20 generate and emit light, and the light of the light source components 20 pass through the optical member 21. The optical member 21 can process the light generated by the light source component 20, such as one of or a combination of light projection, light reflection, light diffusion, light refraction and light diffraction.

Figure 111F:
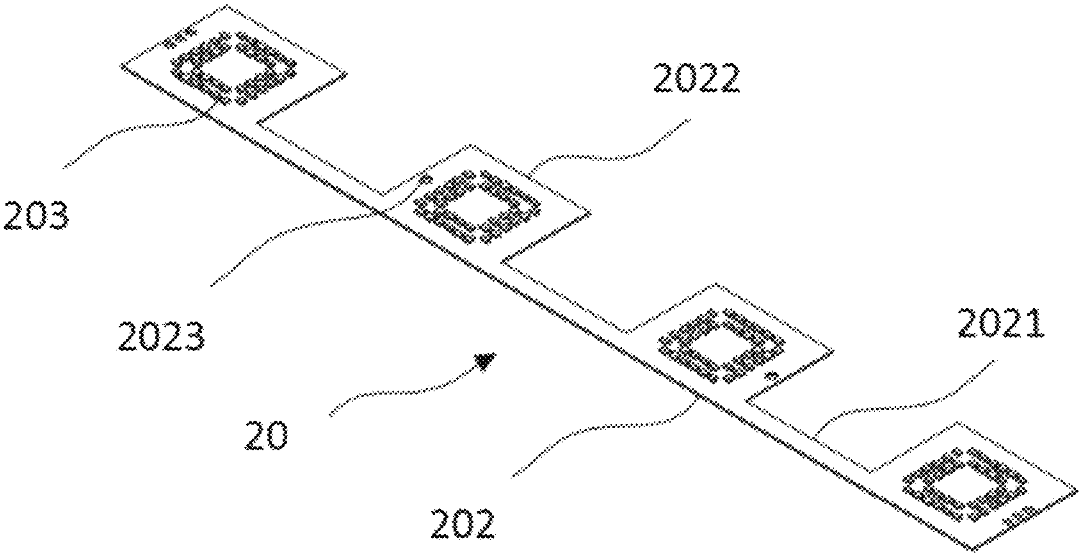
FIG. 111F is a schematic view of the light source component in an embodiment of the present invention.

Please refer to FIG. 111F and FIG. 138. The light source components 20 include the circuit board 202 and the LED arrays 203 disposed on the circuit board 202. The light source components 20 are directly or indirectly disposed on the seat 1. The optical member 21, for example, fixed to the seat 1 or the optical member 21 through glue coating, soldering, snap-fitting or screw locking.

Please refer to FIG. 111F and FIG. 138. One or more circuit boards 202 are provided, and the lengths of the circuit boards 202 can be the same or different according to requirements. The circuit boards 202 can be plates that can be used for circuit connection and achieve functions of the circuit boards, for example, FPC, PCB and aluminum substrates, but are not limited to such plates. The circuit boards 202 can be disposed in a length direction or a width direction of the baseplate 10, or disposed in a cross manner in the length direction and the width direction of the baseplate 10, and the circuit boards 202 can be disposed substantially parallel to the baseplate 10, or form included angles with the baseplate 10. The LED lighting device 100 with different brightness and light-emitting effects can be obtained by adjusting the number and arrangement manner of the circuit boards 202. Each circuit board 202 is provided with at least one LED array 203, and the LED arrays 203 are disposed on any one surface of the circuit board 202 or on two surfaces of the circuit board 202. The LED array 203 can be an LED chip array or an array formed by other light-emitting devices. Referring to FIG. 111F. The light-emitting devices of the LED arrays 203 are arranged in circles, and the light-emitting devices of each LED array 203 can be arranged in one or more circles. In an embodiment, the light-emitting devices of each LED array 203 are arranged in two circles, so that the light in the middle of the LED array 203 is reduced, and the light on the periphery of the LED array 203 is increased, and the LED lighting device 100 can form the bat wing light pattern.

In an embodiment, the diffusing members 217 are combined with the circle-arranged LED arrays 203, so that the light can be further effectively diffused around, the light in the middle is reduced, the bat wing light pattern is formed, and the light-emitting effect of the LED lighting device 100 is improved, the illumination requirement in a particular occasion is met, and the visual effect is improved.

Please refer to FIG. 111F. The circuit board 202 is provided with the concave portions 2021 and the convex portions 2022 are staggered to each other. The circuit board 202 can further be provided with one or more circuit board installing holes 2023, for example, fixing members such as screws can pass through the circuit board installing holes 2023 to fix the circuit board 202 to the baseplate 10, and adhesives or thermal adhesives can be provided on forward and reverse surfaces of the circuit board 202 for fixing to the baseplate 10, thereby enhancing the connection strength between the circuit board 202 and the baseplate 10.

Please refer to FIG. 111D, which is the schematic view of a plurality of circuit boards 202 during cutting in the present application. During cutting, the concave portions 2021 and the convex portions 2022 are staggered in the length directions of the circuit boards 202, so that the circuit board of the same area can be cut into more single circuit boards 202.

Please refer to FIG. 138. The optical member 21 includes optical units 211 and diffusing members 217, and the diffusing members 217 are snap-fitted with the optical units 211. A plurality of diffusing members 217 are provided, the number is consistent with the number of the LED arrays 203, and the diffusing members correspond to the LED arrays on a one-to-one basis, that is, one diffusing member 217 corresponds to one LED array 203, and the light emitted by each LED array 203 can be diffused by the diffusing member 217, so that the light emitted by the LED arrays 203 is emitted in the predetermined direction, that is, being diffused in a directed manner to achieve different light-emitting effects, and the light is finally emitted by the optical units 211. In the embodiment, sixteen diffusing members 217 and sixteen LED arrays 203 are provided and are distributed in a 4*4 manner. Each diffusing member 217 is preferably independently disposed. Compared with the integral diffusing member, the plurality of independently disposed diffusing members 217 are cheaper, so that the production cost can be reduced, meanwhile, the diffusing directions of the diffusing members 217 can be conveniently set or changed, replacement of the diffusing members 217 can also be facilitated, and the maintenance cost of the LED lighting device 100 is reduced.

The diffusing members 217 can deflect the light in a specific direction by means of the micro optical array structures disposed on the surfaces thereof, for example, micro prism arrays or protrusion arrays. The diffusing members 217 can guide the light to be diffused in the specific direction by means of disposing plate-shaped regions with different refractive indexes in parallel alternatively in any direction of a film surface, that is, the diffusing members 217 have the function of diffusing light in a specific direction.

Please refer to FIG. 147 and FIG. 148. The diffusing member 217 includes a flat portion 2171 substantially parallel to the horizontal plane or the XY plane and a three-dimensional portion 2172, and the entire three-dimensional portion 2172 is in a prismatic shape, a circular truncated cone shape, a pyramidal shape or a conical shape. In the embodiment, the entire three-dimensional portion 2172 is a quadrangular platform, the small end of the three-dimensional portion 2172 is disposed close to the LED array 203, and the large end of the three-dimensional portion 2172 is disposed facing the light-emitting direction of the LED lighting device 100. The flat portion 2171 is disposed close to the small end of the three-dimensional portion 2172, and the three-dimensional portion 2172 is disposed close to the center of the flat portion 2171, that is, the small end of the three-dimensional portion 2172 passes through the center of the flat portion 2171 and protrudes from the flat portion 2171.

The light emitted by the light source components 20 can be subjected to one of or a combination of light projection, light reflection, light diffusion, light refraction and light diffraction by the flat portion 2171 and the three-dimensional portion 2172, finally, part of the light is emitted through the flat portion 2171, and part of the light is emitted through the three-dimensional portion 2172, so that the light is more effectively diffused, the light in the middle is reduced, a bat wing light pattern is formed, the light-emitting effect of the LED lighting device 100 is improved, the illumination requirement in a particular occasion is met, and the visual effect is improved.

Please refer to FIG. 150 and FIG. 151. Each optical unit 211 includes optical members 21, a plurality of optical members 21 are provided, the number of the optical members corresponds to that of the diffusing members 217, that is, one optical member 21 corresponds to one diffusing member 217, and the diffusing member 217 is disposed in the optical member 21. The optical members 21 are inverted polygonal frustum structures, that is, light reflecting cup structures. In the embodiment, the polygonal frustum structures are quadrangular platforms. In the embodiment, sixteen diffusing members 217 and sixteen optical members 21 are provided and are distributed in a 4*4 manner.

Please refer to FIG. 138 and FIG. 151. The polygonal frustum surfaces of the optical members 21 are provided with light-emitting holes 211243, that is, through holes penetrating through the polygonal frustum surfaces of the optical members 21. In the embodiment, each optical member 21 includes the optical wall 21124 surrounding the light-emitting hole 211243 and connected end to end, one end of the optical member 21 with the small opening faces the baseplate 10 and is provided with the support portions 21126, that is, one side of the optical member 21 close to the baseplate 10 is provided with the support portions 21126, the support portions 21126 extend in the direction close to the baseplate 10, ends of the support portions 21126 can abut against the circuit boards 202 and cover the peripheries of the LED arrays 203, and the support portions 21126 are preferably integrally formed with the optical member 21. Each optical member 21 is preferably provided with four support portions 21126, and the four support portions 21126 can be spaced apart from one another, and can be connected end to end. Each diffusing member 217 includes the flat portion 2171, the three-dimensional portion 2172 and the clamping hooks 2173, the flat portion 2171 has a surface parallel to the baseplate and a side surface perpendicular to the baseplate, and the three-dimensional portion 2172 is disposed on the surface of the flat portion 2171 parallel to the baseplate 10 and is integrally formed with the flat portion 2171. The flat portion 2171 is disposed on the baseplate 10 by means of the side surface (which can also be the reinforcement portion 21711) perpendicular to the baseplate, and covers the LED array. One or more clamping hooks 2173 can be disposed around the flat portion 2171 of the diffusing member 217, and the clamping hooks 2173 can be snap-fitted with the support portions 21126.

Referring to FIG. 142, FIG. 143A and FIG. 151. FIG. 142 is the sectional schematic view along D-D in FIG. 139, and FIG. 143A is the partially enlarged view of part F' in FIG. 142. Preferably, the end of each support portion 21126 close to the circuit board 202 is provided with the first snap-fitting portion 211262, and the clamping hook 2173 is snap-fitted with the first snap-fitting portion 211262. In the embodiment, the first snap-fitting portions 211262 are preferably disposed between two adjacent support portions 21126. In an embodiment, the first snap-fitting portions 211262 are disposed at other positions of the support portions 21126. Four first snap-fitting portions 211262 are preferably provided, the number of the clamping hooks 2173 is preferably equal to that of the first snap-fitting portions 211262, that is, four clamping hooks 2173 are provided, and the four clamping hooks 2173 are respectively snap-fitted with the first snap-fitting portions 211262. The depth of the first snap-fitting portions 211262 is equal to or substantially equal to the thickness of the clamping hooks 2173. When the clamping hooks 2173 are snap-fitted with the first snap-fitting portions 211262, the clamping hooks 2173 and the surfaces of the support portions 21126 facing the circuit boards 202 can be located on the same plane, that is, both the clamping hooks 2173 and the support portions 21126 abut against the circuit boards 202, so that the positions of the diffusing members 217 and the optical members 21 are more stable, and the deviation of the diffusing members 217 and the optical members 21 is prevented.

Please refer to FIG. 143A, FIG. 151 and FIG. 147. One end of the three-dimensional portion 2172 close to the circuit board 202 is preferably flush with one end of the support portion 21126 close to the circuit board 202, that is, the top of the clamping hook 2173 is flush with an end of the support portion 21126, so that the end of the three-dimensional portion 2172 close to the circuit board 202 can abut against the circuit board 202, that is, both the clamping hook 2173 and the support portion 21126 abut against the circuit board 202, and the stability of the positions of the diffusing member 217 and the optical member 21 is further enhanced. Meanwhile, the reinforcement portions 21711 can also be disposed around the flat portion 2171, the reinforcement portions 21711 are substantially perpendicular to the flat portion 2171, the reinforcement portions 21711 can extend towards the circuit boards 202 or in the light-emitting direction of the LED lighting device 100, and the reinforcement portions 21711 can enhance the structural strength of the flat portion 2171.

The four support portions 21126 are connected end to end, the support portions 21126 and the clamping hooks 2173 cover the periphery of the LED array 203, and the flat portion 2171 and the three-dimensional portion 2172 cover the portion in front of the light-emitting direction of the LED array 203. The four support portions 21126 are preferably made of opaque materials, and the loss of the light due to the light emitted by the LED array 203 passes through the support portions 21126 is avoided. Part of the light emitted by the LED array 203 pass through the support portions 21126 to be subjected to one of or a combination of light transmission, light reflection, light diffusion, light refraction and light diffraction, and finally, this part of light is emitted through the diffusing member 217. Part of the light emitted by the LED array 203 first passes through the flat portion 2171 and the three-dimensional portion 2172 located above the flat portion 2171 to be subjected to one of or a combination of light transmission, light reflection, light diffusion, light refraction and light diffraction. Part of the light is emitted through the flat portion 2171 and the three-dimensional portion 2172 located above the flat portion 2171, part of the light passes through the three-dimensional portion 2172 located below the flat portion 2171 again to be subjected to one of or a combination of light transmission, light reflection, light diffusion, light refraction and light diffraction, and finally, this part of light is emitted through the three-dimensional portion 2172 located below the flat portion 2171. That is, the light emitted by the LED array 203 passes through the flat portion 2171, the three-dimensional portion 2172 located above the flat portion 2171 and the three-dimensional portion 2172 located below the flat portion 2171 repeatedly to be subjected to one of or a combination of light transmission, light reflection, light diffusion, light refraction and light diffraction, so that the light emitted by the LED array 203 is more effectively diffused, the light in the middle is reduced, light concentration is avoided, a bat wing light pattern is formed, the light-emitting effect of the LED lighting device 100 is improved, the illumination requirement in a particular occasion is met, and the visual effect is improved.

The diffusing member 217 is disposed in the optical member 21, the light diffused by the diffusing member 217 is diffused again by the optical member 21, the light emitted by the LED array 203 is further more effectively diffused, the light concentrated in the middle is reduced, light concentration is avoided, the bat wing light pattern is formed, and the light-emitting effect of the LED lighting device 100 is further improved.

Referring to FIG. 143B, which is the schematic view of a light path in FIG. 143A. As shown in FIG. 143B, at least part of the light emitted by the LED array 203 is directly emitted from the lower portion of the three-dimensional portion 2172 (that is, being emitted from the LED lamp), or by taking the plane where the flat portion 2171 is located as a boundary, at least part of the light is emitted after refraction a certain angle by the portion of the three-dimensional portion 2172 closer to the LED array 203. At least part of the light emitted by the LED array 203 passes through the flat portion 2171, and then passes through the portion of the three-dimensional portion 2172 away from the LED array 203 to be emitted from the LED lamp after refraction a certain angle. At least part of the light emitted by the LED array 203 passes through the flat portion 2171, and at least part of the light is reflected by the outer surface of the three-dimensional portion 2172 to be projected to the optical wall 21124 and is emitted from the LED lamp after being reflected by the optical wall 21124.

In an embodiment, the distance between the optical wall 21124 and the three-dimensional portion 2172 is gradually increased in the light-emitting direction, the light is reflected to the optical wall 21124 by the outer surface of the three-dimensional portion 2172, and the reflection angle varies with the distance between the optical wall 21124 and the three-dimensional portion 2172, thereby further increasing the light diffusion effect.

In combination with FIG. 152, which is the partially exploded view of the LED lighting device in an embodiment. As shown in the drawing, the LED array 203 is in hollow annular distribution, that is, the middle region is not provided with the light-emitting devices, in view of the projection direction of the light-emitting devices in the light-emitting direction, the LED array surrounds the three-dimensional portion 2172, and the light is diffused to form the bat wing light pattern after being repeatedly refracted and/or reflected by the three-dimensional portion 2172 and the optical wall 21124.

Please refer to FIG. 142, FIG. 143A and FIG. 150. Preferably, the side of the optical unit 211 facing the baseplate 10 is provided with first connectors 21121, that is, the end of the optical member 21 close to the baseplate 10 is provided with the first connectors 21121, the first connectors 21121 are disposed on the side of the optical wall 21124 facing the seat 1, and in other words, the first connectors 21121 are disposed on the non-light-emitting surface of the optical member 21. The first connectors 21121 can be installing columns provided with threaded holes, the optical member 21, the circuit board 202 and the baseplate 10 can be fixedly connected by screwing through the first connectors 21121. Meanwhile, the diffusing member 217 can be clamped, that is, the optical member 21, the circuit board 202 and the baseplate 10 are fixed by means of the screws at the same time, and the diffusing member 217 is clamped tightly by means of the generated clamping force. Each optical member 21 can be provided with one or more first connectors 21121. In an embodiment, some optical members 21 may not be provided with the first connectors 21121 according to requirements.

Please refer to FIG. 149A and FIG. 150. The first wall 511 is disposed around the optical units 211, the first wall 511 is provided with second connectors 5111 and first positioning members 5112, and the second connectors 5111 and the first positioning members 5112 are disposed on the side of the first wall 511 facing the baseplate 10. The positions where the first positioning members 5112 are disposed correspond to the first positioning holes 1372, the first positioning members 5112 can be snap-fitted with the first positioning holes 1372, on one hand, the first positioning members 5112 facilitate installing of the optical units 211 on the seat 1, and meanwhile, a certain holding force exists between the first positioning members 5112 and the first positioning holes 1372, so that the optical units 211 are connected to the seat 1 more stably.

Please refer to FIG. 140 and FIG. 141. The second connectors 5111 can be installing columns provided with threaded holes, the positions where the second positioning members 5111 are disposed correspond to the assembly holes 1371 and the corner protectors 44, and the optical units 211, the corner protectors 44 and the baseplate 10 can be fixedly connected by screwing through the second connectors 5111, that is, the optical units 211, the corner protectors 44 and the baseplate 10 are fixed by means of the screws at the same time. Preferably, the hanging hooks 43 can also be locked at the same time, that is, the optical units 211, the hanging hooks 43, the corner protectors 44 and the baseplate 10 can be fixed by means of the screws at the same time.

Please refer to FIG. 140 and FIG. 141. Preferably, the corner protector 44 is provided with a third connector 411, the first positioning member 5112 can be an installing column with a threaded hole, the position where the third connector 411 is disposed corresponds to the assembly hole 1371 and the first positioning member 5112, the hole diameter of the third connector 411 is greater than or equal to the outer diameter of the first positioning member 5112, and the first positioning member 5112 can be inserted into the third connector 411, so that the first positioning member 5112 is connected to the third connector 411 more stably, and meanwhile, installing of the first positioning member 5112 and the third connector 411 is facilitated.

Please refer to FIG. 140 and FIG. 141. The first wall 511 is disposed on the side of the first horizontal installing portion 1381 facing away from the baseplate 10, and the thickness of the first wall 511 is equal to or substantially equal to the height difference between the first horizontal installing portion 1381 and the second horizontal installing portion 1382, so that from the light-emitting side of the LED lighting lamp 100, the surface of the first wall 511 is flush with or substantially flush with the surfaces of the four installing portions, thereby improving the overall attractiveness of the LED lighting lamp 100.

Please refer to FIG. 138, FIG. 139 and FIG. 144. FIG. 144 is the sectional schematic view along E-E in FIG. 139. The LED lighting device 100 further includes the power source 3 and the power cord box 6, where the power source 3 is installed in the power cord box 6, the power cord box 6 can be installed on the side of the optical unit 211 facing the baseplate 10, that is, the power cord box 6 is installed in a gap between the adjacent optical members 21, and in other words, the power cord box 6 is installed between the optical unit 211 and the seat 1. The power cord box 6 is provided with second positioning members 61 and third positioning members 62, the baseplate 10 is provided with first power source box positioning holes 104 and second power source box positioning holes 105, the second positioning members 61 can be snap-fitted with the first power source box positioning holes 104, and the third positioning members 62 can be snap-fitted with the second power source box positioning holes 105.

Please refer to FIG. 138 and FIG. 144. The LED lighting device 100 further includes a wiring cover plate 9, where the wiring cover plate 9 is disposed on the baseplate 10, and an external lead can be electrically connected to the power source 3 by means of the wiring cover plate 9, thereby supplying power to the LED lighting device 100. Please refer to FIG. 145, FIG. 146 and FIG. 148. Two ends of the wiring cover plate 9 are respectively provided with a second snap-fitting portion 801 and a third snap-fitting portion 802, the baseplate 10 is provided with a fourth snap-fitting portion 106, the second snap-fitting portion 801 is snap-fitted with the baseplate 10, and the third snap-fitting portion 802 and the fourth snap-fitting portion 106 are snap-fitted with each other and form an interlocked state. The second snap-fitting portion 801, the third snap-fitting portion 802 and the fourth snap-fitting portion 106 preferably have certain elasticity, thereby improving the snap-fitting effects of the second snap-fitting portion 801, the third snap-fitting portion 802 and the fourth snap-fitting portion 106.

Please refer to FIG. 138. The LED lighting device 100 further includes the connecting plate 8, where the connecting plate 8 is, for example, an FPC connecting plate, the connecting plate 8 is used for electrically connecting the plurality of circuit boards 202, and the connecting plate 8 is electrically connected to the power source 3, so that connecting leads between the circuit boards 202 and the power source 3 can be reduced, and installing and removal between the connecting plate 8 and the power source 3 can be facilitated.

The technical contents of this invention will become apparent with the detailed description of embodiments accompanied with the illustration of related drawings as abovementioned. It is intended that the embodiments and drawings disclosed herein are to be considered illustrative rather than restrictive. While this invention has been described by means of specific embodiments, numerous modifications and variations could be made thereto by those skilled in the art without departing from the scope and spirit of this invention set forth in the claims.

What is claimed is:

1. An LED lighting device, comprising:

a seat comprising a baseplate and a sidewall, the side wall surrounding a peripheral portion of the baseplate and forming a receiving space with the baseplate;

a light source component comprising a plurality of circuit boards, a plurality of LED arrays and an electric connecting unit, the plurality of circuit boards disposed in the receiving space and attached to the baseplate, wherein the plurality of LED arrays are mounted on the plurality of circuit boards and the circuit boards are electrically connected to each other by the electric connecting unit;

an optical member disposed in the receiving space, the optical member comprising a plurality of optical units arranged in an array, each of the optical units comprising a first optical member and a second optical member surrounding a periphery of the first optical member, wherein the optical units covers the plurality of LED arrays and are disposed in a light-emitting direction of the LED arrays;

an install border disposed on the sidewall and the optical member, the install border and the sidewall forming a redundant space separating from the receiving space, wherein the optical member is clamped by the sidewall and the install border; and a power source disposed in the redundant space and electrically connecting to the plurality of the circuit boards, wherein the power source is covered by the install border.

2. The LED lighting device according to claim 1, wherein the first optical members cover the plurality of LED arrays, and at least a part of light generated by the LED arrays is emitted from the first optical members.

3. The LED lighting device according to claim 2, wherein each of the second optical members comprises a set of optical walls surrounding the first optical member, and the optical walls reflect a part of the light emitted from the first optical member.

4. The LED lighting device according to claim 3, wherein the sidewall comprises an install end wall at an end thereof and parallel to the baseplate, the install border and the install end wall clamp the optical member.

5. The LED lighting device according to claim 4, wherein the install end wall comprises a bearing portion and a limiting portion, the bearing portion is a flat plate parallel to the baseplate and the limiting portion is an arc-shaped protrusion on the bearing portion.

6. The LED lighting device according to claim 5, wherein the optical member comprises a connecting wall and a position portion, the connecting wall is a flat plate surrounding a peripheral portion of the optical member, the position portion is a protrusion on the connecting wall, further wherein the position portion is snap-fitted with the limiting portion.

7. The LED lighting device according to claim 6, wherein the install border comprises a plurality of support elements, each of the support elements comprises a first wall, the first wall is a flat plate parallel to the bearing portion and clamps the optical member with the install end wall.

8. The LED lighting device according to claim 7, wherein the support element comprises a step structure connecting to the first wall, the support element connects to the seat by fixing the step structure to the bearing portion.

9. The LED lighting device according to claim 8, wherein each of the LED arrays comprises a plurality of LED chips, each of the circuit boards comprises a convex portion and a concave portion, and the LED chips are mounted on the convex portions.

10. An LED lighting device, comprising:

a seat comprising a baseplate and a sidewall, the side wall surrounding a peripheral portion of the baseplate and forming a receiving space with the baseplate;

a light source component comprising a plurality of circuit boards, a plurality of LED arrays and an electric connecting unit, the plurality of circuit boards disposed in the receiving space and attached to the baseplate, wherein the plurality of LED arrays are mounted on the plurality of circuit boards and the circuit boards are electrically connected to each other by the electric connecting unit;

an optical bearing portion disposed in the receiving space and on the circuit boards, the optical bearing portion comprising a plurality of openings corresponding to the plurality of LED arrays, one LED array corresponding to on opening window;

an optical member disposed in the receiving space and on the optical bearing portion, the optical member comprising a plurality of optical units arranged in an array, wherein the optical units covers the plurality of LED arrays, one LED array corresponding to one optical unit; and an install border disposed on the sidewall and the optical member, wherein the optical member is clamped by the sidewall and the install border, wherein light emitted by the LED arrays passes through the openings and then reach the optical unit.

11. The LED lighting device according to claim 10, wherein the optical bearing portion comprises a plurality of first polygonal frustum structure and a plurality of second polygonal frustum structure, the first polygonal frustum structures and the second polygonal frustum structures are arranged alternately, the first polygonal frustum structures comprise a first polygonal frustum surfaces including the openings, the second polygonal frustum structures comprise the second polygonal frustum surfaces cover the baseplate.

12. The LED lighting device according to claim 11, wherein each of the optical units comprises a first optical member covers the LED array and a second optical member surrounding the first optical member.

13. The LED lighting device according to claim 12, wherein each of the LED arrays comprises a plurality of LED chips, each of the circuit boards comprises a convex portion and a concave portion, and the LED chips are disposed on the convex portions.

14. An LED lighting device, comprising:

a seat comprising a baseplate and a sidewall, the side wall surrounding a peripheral portion of the baseplate and forming a receiving space with the baseplate;

a light source component comprising a plurality of circuit boards, a plurality of LED arrays and an electric connecting unit, the plurality of circuit boards disposed in the receiving space, wherein the plurality of LED arrays are mounted on the plurality of circuit boards and the circuit boards are electrically connected to each other by the electric connecting unit;

a power source attached to the seat and electrically connected to the circuit boards;

an optical member disposed in the receiving space, the optical member comprising a plurality of optical units arranged in an array, each of the optical units comprising a first optical member, a second optical member surrounding a periphery of the first optical member; and an install border disposed on the sidewall and the optical member, wherein the optical member is clamped by the sidewall and the install border, wherein the first optical member comprises a diffusing film, a light guide plate and light reflecting paper stack on the baseplate, the light reflecting paper is attached to the baseplate and the second optical member surrounds the light guide plate, and the circuit boards are attached to side surfaces of the light guide plates.

15. The LED lighting device according to claim 14, wherein each of the second optical members comprises a support portion connecting to the baseplate, such that the second optical member is spaced from the baseplate.

16. The LED lighting device according to claim 15, wherein the support portion is surrounded the side surfaces of the light guide plate and fixes the light guide plate on the baseplate.

17. The LED lighting device according to claim 16, wherein the install border and the sidewall form a redundant space separating from the receiving space, the power source is disposed in the redundant space.

18. The LED lighting device according to claim 17, wherein the LED lighting device further comprises a plurality of hanging hooks fixed to a backside of the seat.

19. The LED lighting device according to claim 18, wherein the sidewall comprises an install end wall at an end thereof and parallel to the baseplate, the install border and the install end wall clamp the optical member.

20. The LED lighting device according to claim 19, wherein the install end wall comprises a bearing portion and a limiting portion, the bearing portion is a flat plate parallel to the baseplate and the limiting portion is an arc-shaped protrusion on the bearing portion.

* * * * *